(12) United States Patent
Mitsuishi

(10) Patent No.: US 6,745,320 B1
(45) Date of Patent: Jun. 1, 2004

(54) DATA PROCESSING APPARATUS

(75) Inventor: Naoki Mitsuishi, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/559,571

(22) Filed: Apr. 28, 2000

(30) Foreign Application Priority Data

| Apr. 30, 1999 | (JP) | 11-123450 |
| May 31, 1999 | (JP) | 11-151890 |
| Jul. 6, 1999 | (JP) | 11-191608 |
| Nov. 11, 1999 | (JP) | 11-320518 |
| Feb. 28, 2000 | (JP) | 2000-056019 |

(51) Int. Cl.[7] .............. G06F 9/30; G06F 9/40; G06F 9/44; G06F 13/40
(52) U.S. Cl. .......... 712/225; 712/201; 712/202; 712/203; 712/209; 712/245; 712/227; 711/212; 711/214
(58) Field of Search .............. 712/245, 213, 712/209, 210, 244, 225, 247, 200, 228, 26, 202, 203, 227, 201; 711/214, 212; 710/74, 310

(56) References Cited

U.S. PATENT DOCUMENTS

| 3,839,705 A | * | 10/1974 | Davis et al. | 712/247 |
| 5,596,733 A | * | 1/1997 | Worley, Jr. et al. | 712/244 |
| 5,684,983 A | * | 11/1997 | Ando | 712/225 |
| 5,796,970 A | * | 8/1998 | Higaki et al. | 712/200 |

FOREIGN PATENT DOCUMENTS

| JP | 6-051981 | 2/1994 |
| JP | 8-263290 | 10/1996 |
| JP | 9-198272 | 7/1997 |
| JP | 11-123450 | 5/1999 |
| JP | 11-151890 | 6/1999 |
| JP | 11-191608 | 7/1999 |

* cited by examiner

*Primary Examiner*—Daniel H. Pan
(74) *Attorney, Agent, or Firm*—Mattingly, Stanger & Malur, P.C.

(57) ABSTRACT

There is provided a data processing apparatus capable of increasing a number of general purpose registers while maintaining upper compatibility. Register designating information for designating a register is divided in two portions. The two portions are arranged in separate basic units on the basic units of an instruction code. When one instruction code is made ignorable and the ignorable instruction code is ignored, a control unit (CONT) executes register selecting operation by implicitly assuming predetermined register designating information. Thereby, when only a general purpose register (existing general purpose register) capable of being designated implicitly is used, the ignorable instruction code can be ignored and accordingly, the instruction codes are not increased. When an at least conventionally equivalent general purpose register is used, a conventionally equivalent instruction code may be used. By preventing the instruction codes from increasing, processing speed is not reduced.

89 Claims, 90 Drawing Sheets

2.⟨EA⟩ - ⟨EA⟩ TRANSFER
(EXECUTE TRANSFER BETWEEN MEMORIES BY COMBINATION OF CONTROL CODE+EA1+EA2)

| CONTROL CODE | EA1 (SOURCE SIDE) | | EA2 (DESTINATION SIDE) | | OPERATION |
|---|---|---|---|---|---|
| ☐<br>1 WORD<br>1 STATE | R | NONE<br>0 WORD<br>0 STATE | R | NONE<br>0 WORD<br>0 STATE | NONE<br>0 WORD<br>0 STATE |
| | @ER | ☐<br>1 WORD<br>2 STATE (BW)<br>3 STATE (L) | @ER | ☐<br>1 WORD<br>2 STATE (BW)<br>3 STATE (L) | |
| | @-ER<br>@ER+ | ☐<br>1 WORD<br>3 STATE (BW)<br>4 STATE (L) | @-ER<br>@ER+ | ☐<br>1 WORD<br>3 STATE (BW)<br>4 STATE (L) | |
| | @(d:16, ER) | ☐☐<br>2 WORD<br>3 STATE (BW)<br>4 STATE (L) | @(d:16, ER) | ☐☐<br>2 WORD<br>3 STATE (BW)<br>4 STATE (L) | |
| | @(d:32, ER) | ☐☐☐<br>2 WORD<br>5 STATE (BW)<br>6 STATE (L) | @(d:32, ER) | ☐☐☐<br>4 WORD<br>5 STATE (BW)<br>6 STATE (L) | |
| | @aa:16 | ☐☐<br>2 WORD<br>3 STATE (BW)<br>4 STATE (L) | @aa:16 | ☐☐<br>2 WORD<br>3 STATE (BW)<br>4 STATE (L) | |
| | @aa:32 | ☐☐☐<br>3 WORD<br>4 STATE (BW)<br>5 STATE (L) | @aa:32 | ☐☐☐<br>3 WORD<br>4 STATE (BW)<br>5 STATE (L) | |

FIG. 3

GENERAL PURPOSE REGISTER AND EXPANSION REGISTER

| | 15      0 | 7      0 | 7      0 | |
|---|---|---|---|---|
| ER0 | E0 | R0H | R0L | |
| ER1 | E1 | R1H | R1L | |
| ER2 | E2 | R2H | R2L | |
| ER3 | E3 | R3H | R3L | GROUP 0 |
| ER4 | E4 | R4H | R4L | |
| ER5 | E5 | R5H | R5L | |
| ER6 | E6 | R6H | R6L | |
| ER7 (SP) | E7 | R7H | R7L | |
| ER8 | E8 | R8H | R8L | |
| ER9 | E9 | R9H | R9L | |
| ER10 | E10 | R10H | R10L | |
| ER11 | E11 | R11H | R11L | GROUP 1 |
| ER12 | E12 | R12H | R12L | |
| ER13 | E13 | R13H | R13L | |
| ER14 | E14 | R14H | R14L | |
| ER15 | E15 | R15H | R15L | |
| ER16 | E16 | R16H | R16L | |
| ER17 | E17 | R17H | R17L | |
| ER18 | E18 | R18H | R18L | |
| ER19 | E19 | R19H | R19L | GROUP 2 |
| ER20 | E20 | R20H | R20L | |
| ER21 | E21 | R21H | R21L | |
| ER22 | E22 | R22H | R22L | |
| ER23 | E23 | R23H | R23L | |
| ER24 | E24 | R24H | R24L | |
| ER25 | E25 | R25H | R25L | |
| ER26 | E26 | R26H | R26L | |
| ER27 | E27 | R27H | R27L | GROUP 3 |
| ER28 | E28 | R28H | R28L | |
| ER29 | E29 | R29H | R29L | |
| ER30 | E30 | R30H | R30L | |
| ER31 | E31 | R31H | R31L | |

CONTROL REGISTER

PC: 23      0

CCR: 7      0 — I U I H U N Z V C

EXR: 7      0 — T    I2-I0

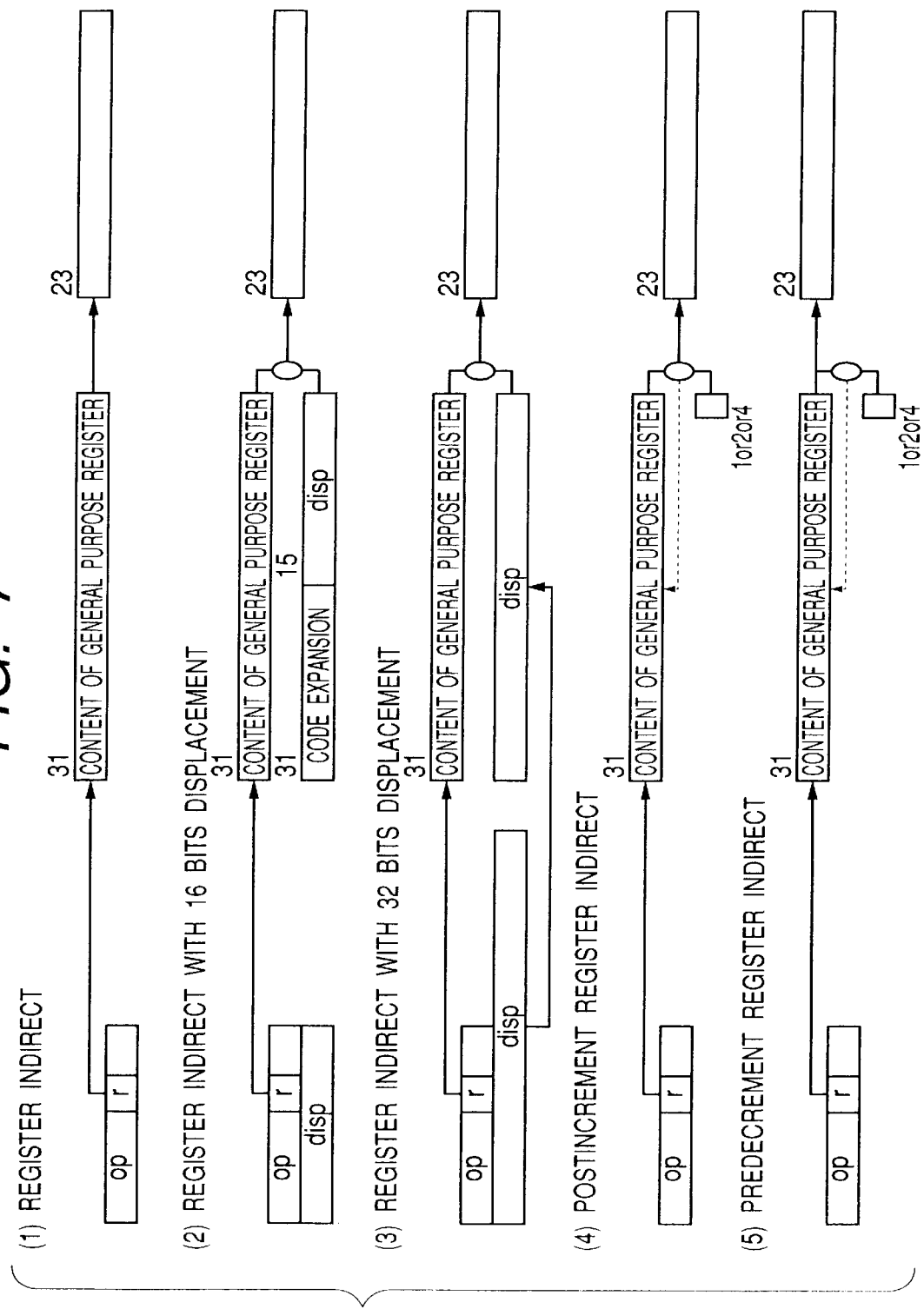

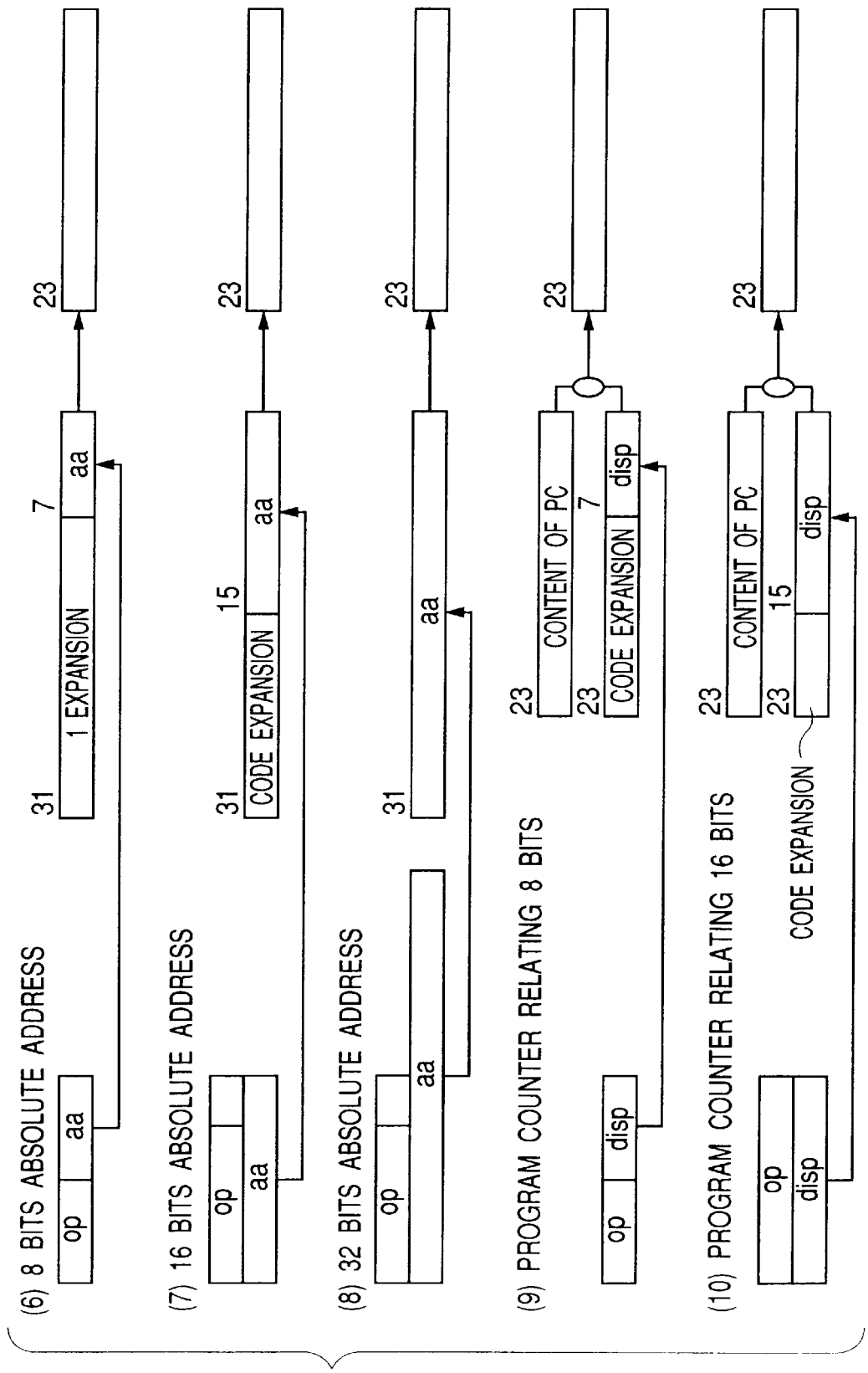

FIG. 9

(1) ONLY OPERATION FIELD

| op |
|---|

EXAMPLE: NOP

| 0000 |
|---|

(2) OPERATION FIELD AND REGISTER FIELD

| op | r1 | r2 |
|---|---|---|

EXAMPLE: ADD.W R0, R1

| 09 | 0 | 1 |
|---|---|---|

(3) OPERATION FIELD, REGISTER FIELD AND GROUP FIELD

| op | gr1 | gr2 | op | r1 | r2 |
|---|---|---|---|---|---|

EXAMPLE: ADD.W R8, R17

| 00 | 1 | 2 | 09 | 0 | 1 |
|---|---|---|---|---|---|

(4) OPERATION FIELD, REGISTER FIELD AND EA EXPANSION PORTION

| op | r1 | r2 | EA |
|---|---|---|---|

EXAMPLE: MOV.W R2, @(0010, R3)

| 6F | 0 | 3 | 2 | 0010 |
|---|---|---|---|---|

(5) OPERATION FIELD, REGISTER FIELD, GROUP FIELD AND EA EXPANSION PORTION

| op | gr1 | gr2 | op | r1 | r2 | EA |
|---|---|---|---|---|---|---|

EXAMPLE: MOV.W R2, @(0010, R27)

| 00 | 3 | 0 | 6F | 0 | 3 | 2 | 0010 |
|---|---|---|---|---|---|---|---|

(6) OPERATION FIELD, CONDITION FIELD AND EA EXPANSION PORTION

| op | cc | EA |
|---|---|---|

EXAMPLE: BEQ $+20

| 4 | 7 | 20 |
|---|---|---|

FIG. 10
(1) REGISTER INDIRECT
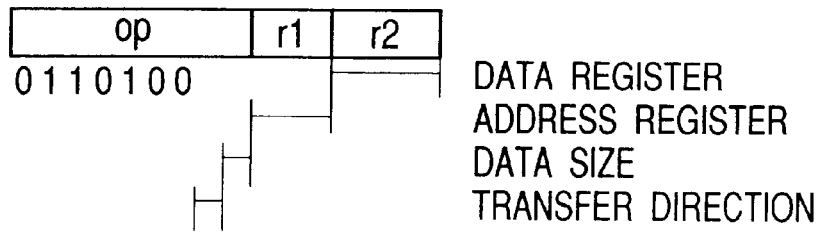
(2) POSTINCREMENT/PREDECREMENT REGISTER INDIRECT
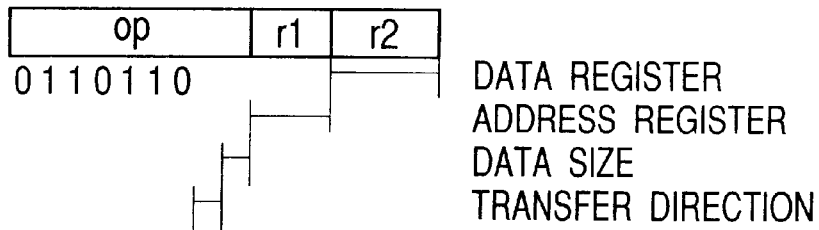
(3) REGISTER INDIRECT WITH 16 BITS DISPLACEMENT
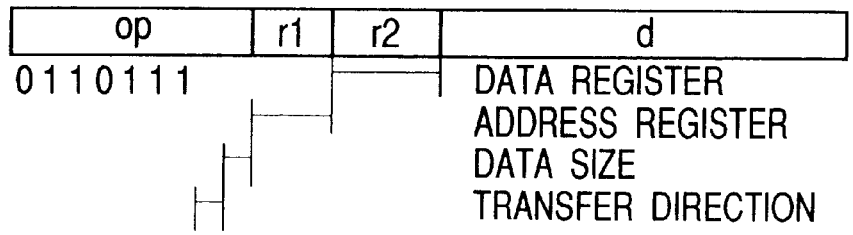
(4) 16 BITS ABSOLUTE ADDRESS
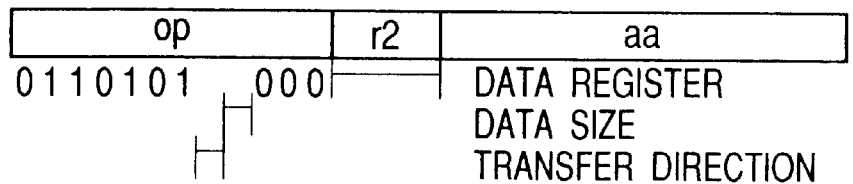

1. ⟨EA⟩ — ⟨EA⟩ OPERATION
(EXECUTE OPERATION TO MEMORY BY COMBINATION OF CONTROL CODE+EA1+EA2+OPERATION)

| CONTROL CODE | EA1 (SOURCE SIDE) | | EA2 (DESTINATION SIDE) | | OPERATION |
|---|---|---|---|---|---|
| 1 WORD<br>1 STATE | R | NONE<br>0 WORD<br>0 STATE | R | NONE<br>0 WORD<br>0 STATE | 1 WORD<br>1 STATE |
| | @ER | 1 WORD<br>2 STATE (BW)<br>3 STATE (L) | @ER | 1 WORD<br>3 STATE (BW)<br>5 STATE (L) | |
| | @-ER<br>@ER+ | 1 WORD<br>3 STATE (BW)<br>4 STATE (L) | @-ER<br>@ER+ | 1 WORD<br>4 STATE (BW)<br>6 STATE (L) | |
| | @(d:16, ER) | 2 WORD<br>3 STATE (BW)<br>4 STATE (L) | @(d:16, ER) | 2 WORD<br>4 STATE (BW)<br>6 STATE (L) | |
| | @(d:32, ER) | 2 WORD<br>5 STATE (BW)<br>6 STATE (L) | @(d:32, ER) | 4 WORD<br>6 STATE (BW)<br>8 STATE (L) | |
| | @aa:16 | 2 WORD<br>3 STATE (BW)<br>4 STATE (L) | @aa:16 | 2 WORD<br>4 STATE (BW)<br>6 STATE (L) | |
| | @aa:32 | 3 WORD<br>4 STATE (BW)<br>5 STATE (L) | @aa:32 | 3 WORD<br>5 STATE (BW)<br>7 STATE (L) | |

FIG. 11

2. ⟨EA⟩ ← ⟨EA⟩ TRANSFER
(EXECUTE TRANSFER BETWEEN MEMORIES BY COMBINATION OF CONTROL CODE + EA1 + EA2)

| CONTROL CODE<br>1 WORD<br>1 STATE | EA1 (SOURCE SIDE) | EA2 (DESTINATION SIDE) | OPERATION<br>CONTROL CODE + EA1 + EA2 |
|---|---|---|---|
| | R | R<br>NONE<br>0 WORD<br>0 STATE | NONE<br>0 WORD<br>0 STATE |
| | @ER<br>1 WORD<br>2 STATE (BW)<br>3 STATE (L) | @ER<br>1 WORD<br>2 STATE (BW)<br>3 STATE (L) | |
| | @-ER<br>@ER+<br>1 WORD<br>3 STATE (BW)<br>4 STATE (L) | @-ER<br>@ER+<br>1 WORD<br>3 STATE (BW)<br>4 STATE (L) | |
| | @(d:16, ER)<br>2 WORD<br>3 STATE (BW)<br>4 STATE (L) | @(d:16, ER)<br>2 WORD<br>3 STATE (BW)<br>4 STATE (L) | |
| | @(d:32, ER)<br>2 WORD<br>5 STATE (BW)<br>6 STATE (L) | @(d:32, ER)<br>4 WORD<br>5 STATE (BW)<br>6 STATE (L) | |
| | @aa:16<br>2 WORD<br>3 STATE (BW)<br>4 STATE (L) | @aa:16<br>2 WORD<br>3 STATE (BW)<br>4 STATE (L) | |
| | @aa:32<br>3 WORD<br>4 STATE (BW)<br>5 STATE (L) | @aa:32<br>3 WORD<br>4 STATE (BW)<br>5 STATE (L) | |

FIG. 12

3. #-⟨EA⟩ OPERATION
(EXECUTE OPERATION TO MEMORY BY COMBINATION OF CONTROL CODE+EA2+OPERATION)
(OBJECT INSTRUCTION: ADD, SUB, CMP, OR, XOR, AND)

| CONTROL CODE | EA1 (SOURCE SIDE) | EA2 (DESTINATION SIDE) | OPERATION |
|---|---|---|---|
| 1 WORD<br>1 STATE | NONE<br>0 WORD<br>0 STATE | @ER<br>1 WORD<br>3 STATE (BW)<br>5 STATE (L) | #8<br>1 WORD<br>1 STATE |
| | | @-ER<br>@ER+<br>1 WORD<br>4 STATE (BW)<br>6 STATE (L) | #16<br>2 WORD<br>2 STATE |
| | | @(d:16, ER)<br>2 WORD<br>4 STATE (BW)<br>6 STATE (L) | #32<br>3 WORD<br>3 STATE |
| | | @(d:32, ER)<br>4 WORD<br>6 STATE (BW)<br>8 STATE (L) | |
| | | @aa:16<br>2 WORD<br>4 STATE (BW)<br>6 STATE (L) | |
| | | @aa:32<br>3 WORD<br>5 STATE (BW)<br>7 STATE (L) | |

FIG. 13

4. #-⟨EA⟩ TRANSFER
(EXECUTE TRANSFER TO MEMORY BY COMBINATION OF CONTROL CODE+OPERATION+EA2)

| CONTROL CODE | EA1 (SOURCE SIDE) | EA2 (DESTINATION SIDE) | OPERATION |
|---|---|---|---|
| 1 WORD<br>1 STATE | NONE<br>0 WORD<br>0 STATE | @ER<br>1 WORD<br>2 STATE (BW)<br>3 STATE (L) | #8<br>1 WORD<br>1 STATE |
| ONLY THE CASES OF<br>(1) BYTE SIZE<br>AND<br>(2) @ER+ | | @-ER<br>@ER+<br>1 WORD<br>3 STATE (BW)<br>4 STATE (L) | #16<br>2 WORD<br>2 STATE |
| | | @(d:16, ER)<br>2 WORD<br>3 STATE (BW)<br>4 STATE (L) | #32<br>3 WORD<br>3 STATE |
| | | @(d:32, ER)<br>4 WORD<br>5 STATE (BW)<br>6 STATE (L) | |
| | | @aa:16<br>2 WORD<br>3 STATE (BW)<br>4 STATE (L) | |
| | | @aa:32<br>3 WORD<br>4 STATE (BW)<br>5 STATE (L) | |

FIG. 14

FRONT CODE

DESIGNATE CHANGE OF OPERATION EA2
DESIGNATE CHANGE OF OPERATION EA1
DESIGNATE DESTINATION SIDE MEMORY
DESIGNATE SOURCE SIDE MEMORY
DESIGNATE LONG WORD SIDE

FIG. 16

| SOURCE \ DESTINATION | REGISTER DIRECT | REGISTER INDIRECT | REGISTER INDIRECT WITH 16 BITS DISPLACEMENT | REGISTER INDIRECT WITH 32 BITS DISPLACEMENT | POSTINCREMENT/PREDECREMENT REGISTER INDIRECT | 8 BITS ABSOLUTE ADDRESS | 16 BITS ABSOLUTE ADDRESS | 32 BITS ABSOLUTE ADDRESS |
|---|---|---|---|---|---|---|---|---|
| IMMEDIATE | BWL / BW / BWL | BWL / - / BW | BWL / - / BW | BWL / - / - | BWL / - / BW | B / - / B | BWL / - / BW | BWL / - / - |
| REGISTER DIRECT | BWL / BW / BWL | BWL / BW / BW | BWL / BW / BW | BWL / BW / - | BWL / BW / BW | B / B / B | BWL / BW / BW | BWL / - / - |
| REGISTER INDIRECT | BWL / BW / BW | BWL / - / BW | BWL / - / BW | BWL / - / - | BWL / - / BW | B / - / B | BWL / - / BW | BWL / - / - |
| REGISTER INDIRECT WITH 16 BITS DISPLACEMENT | BWL / BW / BW | BWL / - / BW | BWL / - / BW | BWL / - / - | BWL / - / BW | B / - / B | BWL / - / BW | BWL / - / - |
| REGISTER INDIRECT WITH 32 BITS DISPLACEMENT | BWL / - / - | BWL / - / - | BWL / - / - | BWL / - / - | BWL / - / - | B / - / - | BWL / - / - | BWL / - / - |
| POSTINCREMENT/ PREDECREMENT REGISTER INDIRECT | BWL / BW / BW | BWL / - / BW | BWL / - / BW | BWL / - / - | BWL / - / BW | B / - / B | BWL / - / BW | BWL / - / - |
| 8 BITS ABSOLUTE ADDRESS | B / B / B | B / - / B | B / - / B | B / - / - | B / - / B | B / - / B | B / - / B | BWL / - / - |
| 16 BITS ABSOLUTE ADDRESS | BWL / BW / BW | BWL / - / BW | BWL / - / BW | BWL / - / - | BWL / - / BW | B / - / B | BWL / - / BW | BWL / - / - |
| 32 BITS ABSOLUTE ADDRESS | BWL / - / - | BWL / - / - | BWL / - / - | BWL / - / - | BWL / - / - | B / - / - | BWL / - / - | BWL / - / - |

FIG. 17

| SOURCE \ DESTINATION | REGISTER DIRECT | REGISTER INDIRECT | REGISTER INDIRECT WITH 16 BITS DISPLACEMENT | REGISTER INDIRECT WITH 32 BITS DISPLACEMENT | POSTINCREMENT/PREDECREMENT REGISTER INDIRECT | 8 BITS ABSOLUTE ADDRESS | 16 BITS ABSOLUTE ADDRESS | 32 BITS ABSOLUTE ADDRESS |
|---|---|---|---|---|---|---|---|---|
| IMMEDIATE | BWL<br>BW<br>BWL | BWL<br>–<br>BW | BWL<br>–<br>BW | BWL<br>–<br>– | BWL<br>–<br>BW | B<br>–<br>B | BWL<br>–<br>BW | BWL<br>–<br>– |
| REGISTER DIRECT | BWL<br>BW<br>BWL | BWL<br>–<br>BW | BWL<br>–<br>BW | BWL<br>–<br>– | BWL<br>–<br>BW | B<br>–<br>B | BWL<br>–<br>BW | BWL<br>–<br>– |
| REGISTER INDIRECT | BWL<br>BW<br>BW | BWL<br>–<br>BW | BWL<br>–<br>BW | BWL<br>–<br>– | BWL<br>–<br>BW | B<br>–<br>B | BWL<br>–<br>BW | BWL<br>–<br>– |
| REGISTER INDIRECT WITH 16 BITS DISPLACEMENT | BWL<br>BW<br>BW | BWL<br>–<br>BW | BWL<br>–<br>BW | BWL<br>–<br>– | BWL<br>–<br>BW | B<br>–<br>B | BWL<br>–<br>BW | BWL<br>–<br>– |
| REGISTER INDIRECT WITH 32 BITS DISPLACEMENT | BWL<br>–<br>– | BWL<br>–<br>– | BWL<br>–<br>– | BWL<br>–<br>– | BWL<br>–<br>– | B<br>–<br>– | BWL<br>–<br>– | BWL<br>–<br>– |
| POSTINCREMENT/ PREDECREMENT REGISTER INDIRECT | BWL<br>BW<br>BW | BWL<br>–<br>BW | BWL<br>–<br>BW | BWL<br>–<br>– | BWL<br>–<br>BW | B<br>–<br>B | BWL<br>–<br>BW | BWL<br>–<br>– |
| 8 BITS ABSOLUTE ADDRESS | B<br>–<br>B | B<br>–<br>B | B<br>–<br>B | B<br>–<br>– | B<br>–<br>B | B<br>–<br>B | B<br>–<br>B | B<br>–<br>– |
| 16 BITS ABSOLUTE ADDRESS | BWL<br>–<br>BW | BWL<br>–<br>BW | BWL<br>–<br>BW | BWL<br>–<br>– | BWL<br>–<br>BW | B<br>–<br>B | BWL<br>–<br>BW | BWL<br>–<br>– |
| 32 BITS ABSOLUTE ADDRESS | BWL<br>–<br>– | BWL<br>–<br>– | BWL<br>–<br>– | BWL<br>–<br>– | BWL<br>–<br>– | B<br>–<br>– | BWL<br>–<br>– | BWL<br>–<br>– |

FIG. 19

```
always @(gr1 or r1 or gr2 or r2) begin
    if ((gr1=4'b0001)&(r1=3'b000)) begin
        rs8=1;
    end
    else begin
        rs8=0;
    end
    if ((gr2=4'b0001)&(r2=3'b000)) begin
        rd8=1;
    end
    else begin
        rd8=0;
    end
end
always @(rs8 or rsgb or rsdb or wbrs or rd8 or rdgb or rddb or wbrd) begin
    if (((rs8=1'b1)&(rsgb=1'b1))!((rd8=1'b1)&(rdgb=1'b1))) begin
        r8gb=1;
    end
    else begin
        r8gb=0;
    end
    if (((rs8=1'b1)&(rsdb=1'b1))!((rd8=1'b1)&(rddb=1'b1))) begin
        r8db=1;
    end
    else begin
        r8db=0;
    end
    if (((rs8=1'b1)&(wbrs=1'b1))!((rd8=1'b1)&(wbrd=1'b1))) begin
        wbr8=1;
    end
    else begin
        wbr8=0;
    end
end
always @(wbr8 or r2[3] or byte or word or long) begin
```

FIG. 20

```
if (long=1) begin
    wbr8e=1;
    wbr8h=1;
    wb8l=1;
end
else if (word=1) begin
    if (r2[3]=0) begin
        wbr8e=0;
        wbr8h=1;
        wbr8l=1;
    end
    else begin
        wbr8e=1;
        wbr8h=0;
        wbr8l=0;
    end
end
else begin
    if (r2[3]=0) begin
        wbr8e=0;
        wbr8h=1;
        wbr8l=0;
    end
    else begin
        wbr8e=0;
        wbr8h=0;
        wbr8l=1;
    end
end
end
```

FIG. 21

```
always @(gr1 or r1 or gr2 or r2) begin
        if ((gr1=4'b0000)&(r1=3'b111)) begin
            rs7=1;
        end
        else begin
            rs7=0;
        end
        if ((gr2=4'b0000)&(r2=3'b111)) begin
            rd7=1;
        end
        else begin
            rd7=0;
        end
end
always @(rs7 or rsgb or rsdb or wbrs or rd7 or rdgb or rddb or wbrd or
            sspgr or ispgr or sspgb or wbsspgb or ispgb or wb1spgb) begin
        if (((rs7=1'b1)&(rsgb=1'b1))!((rd7=1'b1)&(rdgb=1'b1))
            !((sspgr=4'b0000)&(sspgb=1'b1))!((ispgr=4'b0000)&(ispgb=1'b1))) begin
            r7gb=1;
        end
        else begin
            r7gb=0;
        end
        if (((rs7=1'b1)&(rsdb=1'b1))!((rd7=1'b1)&(rddb=1'b1))) begin
            r7db=1;
        end
        else begin
            r7db=0;
        end
        if (((rs7=1'b1)&(wbrs=1'b1))!((rd7=1'b1)&(wbrd=1'b1))
            !((sspgr=4'b0000)&(wbssp=1'b1))!((ispgr=4'b0000)&(wbisp=1'b1))) begin
            wbr7=1;
        end
        else begin
            wbr7=0;
        end
end
```

FIG. 22

```
always @(wbr7 or r2[3] or byte or word or long) begin
    if (long=1) begin
        wbr7e=1;
        wbr7h=1;
        wb7l=1;
    end
    else if (word=1) begin
        if (r2[3]=0) begin
            wbr7e=0;
            wbr7h=1;
            wbr7l=1;
        end
        else begin
            wbr7e=1;
            wbr7h=0;
            wbr7l=0;
        end
    end
    else begin
        if (r2[3]=0) begin
            wbr7e=0;
            wbr7h=1;
            wbr7l=0;
        end
        else begin
            wbr7e=0;
            wbr7h=0;
            wbr7l=1;
        end
    end
end
```

FIG. 23

```
(1-1) ⎡ always @(IR or TMG or MODD or MODS or MODSE) begin
       |    casex(IR)
       |    16'b0110_101?_??00_????:begin
       |         casex({TMG,IR[7],MODD,MODS,MODSE)
       |              9'b00001_????:     NEXTTMG=6'b0000//1->2
       |              9'b00010_20??:     NEXTTMG=6'b0000//2->3
       |              9'b00010_1???:     NEXTTMG=6'b0000//2->3
       |              9'b00010_0110:     NEXTTMG=6'b0000//2->3
       |              9'b00010_010?:     NEXTTMG=6'b1xxx//2->1
       |              9'b00010_01?1:     NEXTTMG=6'b1xxx//2->1
       |              9'b00011_????:     NEXTTMG=6'b1xxx//3->1
       |              default:           NEXTTMG=6'bxxxxxx;
       |         endcase
       |    end
       ⎣ endcase
   end (1-2) ⎡ always @(IR or TMG or LNG) begin
       |    assign  { nop, data, byte, long, write }=BCMD;
       |    casex(IR)
       |    16'b0110_101?_??00_????:begin
       |         casex(TMG)
       |              5'b00001:     BCMD=5'b00000;
       |              5'b00010:     BCMD={ 1'b0, 1'b1, ~IR[8], LNG, IR[7] };
       |              5'b00011:     BCMD=5'b00000;
       |              default:      BCMD=5'bxxxxx;
       |         endcase
       |    end
       ⎣ endcase
   end
```

(1-3)
```
always @(IR or TMG) begin
  assign   { rdbext, rdbgb, wbtra, tragb }=EACTL;
  casex( IR )
  16'b0110_1012_??00_????:begin
    casex(TMG)
      5'b00001:                EACTL=4'b0000;
      5'b00010:                EACTL=4'b1110;
      5'b00011:                EACTL=4'b0000;
      default:                 EACTL=4'bxxxx;
    endcase
  end
  endcase
end
```

(1-4)
```
always @(IR or TMG or MODS) begin
  assign   { rddb, trddb, dbwdb, rdbdb, wbrd, wbtrd }=REGCTLM;
  casex( IR )
  16'b0110_1012_??00_????:begin
    casex(TMG, MODS, MODD)
      7'b00001_??:             REGCTLM=6'b000000;
      7'b00010_00:             REGCTLM={ IR[7], 1'b0,  IR[7], 1'b0,  1'b0, 1'b0 };
      7'b00010_10:             REGCTLM={ 1'b0,  IR[7], IR[7], 1'b0,  1'b0, 1'b0 };
      7'b00010_?1:             REGCTLM=6'b011000;
      7'b00011_0?:             REGCTLM={ 1'b0, 1'b0,  1'b0, 1'b1, ~IR[7], 1'b0 };
      7'b00011_1?:             REGCTLM={ 1'b0, 1'b0,  1'b1, 1'b1,  1'b0, 1'b1 };
      default:                 REGCTLM=6'bxxxxxx;
    endcase
  end
  endcase
end
```

```
(1-5)  always @(IR or MODS or MODD) begin
           casex( IR )
             16'b0110_101?_??00_????:begin
                             mskint=MODS ! MODD;
                             modd=MODD
                             mods=MODS
                             modse=MODS & ~IR[7]
                             lng=LNG;
                 end
             endcase
       end
```

FIG. 26

```
(2-1) ⎡ always @(IR or TMG) begin
      |    casex( IR )
      |    16'b0000_100?_????_????:begin
      |        casex(TMG)
      |            5'b00001:    NEXTTMG=6'b1xxx//1->1
      |            default:     NEXTTMG=6'bxxxxxx;
      |        endcase
      |    end
      |    endcase
      ⎣ end (2-2) ⎡ always @(IR or TMG) begin
      |    assign { nop, data, byte, long, write }=BCMD;
      |    casex( IR )
      |    16'b0000_100?_????_????:begin
      |        casex(TMG)
      |            5'b00001:    BCMD=5'b00000;
      |            default:     BCMD=5'bxxxxx;
      |        endcase
      |    end
      |    endcase
      ⎣ end
```

FIG. 27

(2-3)
```
always @(IR or TMG or MODS or MODD) begin
   assign    { rsdb, trddb, rdgb, rdbgb, wbrd, wbtrd }=REGCTLE;
   casex( IR )
   16'b0000_100?_????_????:begin
      casex(TMG)
         5'b00001:           REGCTLE={ ~MODS, MODS, ~MODD, MODD, ~MODD, MODD };
         default:            REGCTLE=6'bxxxxxx;
      endcase
   end
   endcase
end
```

(2-4)
```
always @(IR or MODD) begin
   casex( IR )
   16'b0000_100?_????_????:begin
      mskint=MODD;
      mkmov=MODD;
      lng=LMG;
      byte=~IR[8];
   end
   endcase
end
```

FIG. 28

```
(3-1) ┌ always @(IR or TMG) begin
      │   casex( IR )
      │     16'b0111_1000?_1???_????:begin
      │       casex(TMG)
      │         5'b00001:           NEXTTMG=6'b0000;//1->3
      │         5'b00011:           NEXTTMG=6'b1xxx;//3->1
      │         default:            NEXTTMG=6'bxxxxxx;
      │       endcase
      │     end
      │   endcase
      └ end (3-2) ┌ always @(IR or TMG or LNG) begin
      │   assign { nop, data, byte, long, write }=BCMD;
      │   casex( IR )
      │     16'b0111_1000_1???_????:begin
      │       casex(TMG)
      │         5'b00001:           BCMD={ 1'b0, 1'b1, ~LNG & BYTE, LNG, 1'b1 };
      │         5'b00011:           BCMD=5'b00000;
      │         default:            BCMD=5'bxxxxx;
      │       endcase
      │     end
      │   endcase
      └ end
```

FIG. 29

```
(3-3) ⎡ always @(IR or TMG) begin
      |   assign    { dbrext, dbrgb, wbtra, tragb }=EACTL;
      |   casex( IR )
      |   16'b0111_1000_1???_????:begin
      |     casex(TMG)
      |       5'b00001:                                    EACTL=4'b0001;
      |       5'b00011:                                    EACTL=4'b0000;
      |       default:                                     EACTL=4'bxxxx;
      |     endcase
      |   end
      |   endcase
      ⎣ end (3-4) ⎡ always @(IR or TMG) begin
      |   assign    { rddb, trddb, dbwdb, rdbdb, wbrd, wbtrd }=REGCTLM;
      |   casex( IR )
      |   16'b0111_1000_1???_????:begin
      |     casex(TMG)
      |       5'b00001:                                    REGCTLM=6'b000000;
      |       5'b00011:                                    REGCTLM=6'b011000;
      |       default:                                     REGCTLM=6'bxxxxxx;
      |     endcase
      |   end
      |   endcase
      ⎣ end
```

FIG. 30

```
(3-5)   always @(IR) begin
            casex( IR )
                16'b0111_1000_1???_????:begin
                    mskint=1'b0;
                    modd=1'b0;
                    mods=1'b0;
                    modse=1'b0;
                    lng=1'b0;
                end
            endcase
        end
```

FIG. 39

```
(4-1) ⎡ always @(IR or TMG or MODS) begin
       │    casex(IR)
       │    16'b0111_1001_????_????:begin
       │       casex(TMG,MODS)
       │          6'b00001_0:    NEXTTMG=6'b0000;  //1->3
       │          6'b00001_1:    NEXTTMG=6'b0100;  //1->17
       │          6'b10001_?:    NEXTTMG=6'b0000;  //17->3
       │          6'b00011_?:    NEXTTMG=6'b1xxx;  //3->1
       │          default:       NEXTTMG=6'bxxxxxx;
       │       endcase
       │    end
       │    endcase
       ⎣ end (4-2) ⎡ always @(IR or TMG or LNG) begin
       │    assign { nop, data, byte, long, write }=BCMD;
       │    casex(IR)
       │    16'b0111_1001_????_????:begin
       │       casex(TMG,MODS)
       │          6'b00001_0:    BCMD=5'b00000;
       │          6'b00001_1:    BCMD=5'b01001;
       │          6'b10001_?:    BCMD=5'b00000;
       │          6'b00011_?:    BCMD=5'b00000;
       │          default:       BCMD=5'bxxxxx;
       │       endcase
       │    end
       │    endcase
       ⎣ end
```

FIG. 40

(4-3)
```
always @(IR or TMG) begin
  assign  { dbrext, dbrgb, wbtra, tragb }=EACTL;
  casex( IR )
    16'b0111_1001_????_????:begin
      casex(TMG)
        6'b00001_0:        EACTL=4'b0000;
        6'b00001_1:        EACTL=4'b0001;
        6'b10001_?:        EACTL=4'b0000;
        6'b00011_?:        EACTL=4'b0000;
        default:           EACTL=4'bxxxx;
      endcase
    end
  endcase
end
```

(4-4)
```
always @(IR or TMG) begin
  assign  { rdgb, trdgb, dbdbw, dbrdb, wbrd, wbtrd }=REGCTLMI;
  casex( IR )
    16'b0111_1001_????_????:begin
      casex(TMG)
        6'b00001_0:        REGCTLMI=6'b100110;
        6'b00001_1:        REGCTLMI=6'b010101;
        6'b10001_?:        REGCTLMI=6'b000000;
        6'b00011_?:        REGCTLMI=6'b000000;
        default:           REGCTLMI=6'bxxxxxx;
      endcase
    end
  endcase
end
```

FIG. 41

(4-5)
```
always @(IR) begin
        casex( IR )
            16'b0111_1001_????_????:begin
                            mskint=1'b0
                            modd=1'b0
                            mods=1'b0
                            modse=1'b0
                            lng=1'b0;
                end
        endcase
end
```

FIG. 44(a)

```
 1                           .CPU      CPU-UMAX
 2  000000                   ;         START
 3  000000
 4  000000                   .SECTION  AAA,CODE,ALIGN=2
 5  000000  7A0700000000     MOV.L     #STACK:32,SP
 6  000006  F800             MOV.B     #0:8,AL
 7  000008  7A0100000000     MOV.L     #DATA:32,EBX
 8  00000E  6898             MOV.B     AL,@EBX
 9  000010  0B01             ADDS      #1,EBX
10  00000E  6898             MOV.B     AL,@EBX
 :    :                        :
100 00000000                 .END      START

***** TOTAL ERRORS     0
***** TOTAL WARNINGS   0
```

FIG. 44(b)

```
1                                              .CPU     CPU-L1
2  000000                                      ;        START
3  000000
4  000000                                      .SECTION AAA,CODE,ALIGN=2
5           ***** ERROR (307)  ILLEGAL MNEMONIC   MOV.L  #STACK:32,SP
6  000000  F800                                MOV.B    #0:8,AL
:    :
```

FIG. 46

| BP | AB | DB | MA | R/W | ST | IRQ | NMI | LIR | LID |
|---|---|---|---|---|---|---|---|---|---|
| | | | | | | | | (a) | |
| *−200 | 000100 | 7A07 | ROM | R | MOV.L #FFFFFF0E, ER7 | 11111111 | 1 | 1 | 1 |
| −199 | 000102 | FFFF | ROM | R | PRG | 11111111 | 1 | 1 | 0 |
| −198 | 000104 | FF0E | ROM | R | PRG | 11111111 | 1 | 1 | 0 |
| −197 | 000101 | F800 | ROM | R | PRG | 11111111 | 1 | 1 | 1 |
| : | | | : | : | MOV.B #00:8, R0L | | : | | |
| *−80 | 000200 | 0100 | ROM | R | DATA.L 01106990 | 11111111 | 1 | 1 | 1 |
| −79 | 000202 | 6990 | ROM | R | PRG | 11111111 | 1 | 1 | 0 |
| : | | | : | : | PRG | | : | | |

FIG. 54

(1) ABSOLUTE ADDRESS 8 BITS

| op | aa | op | n | 0 |

EXAMPLE: BTST #0, @FFFFFFFE

| 7E | FE | 73 | 01 | 0 |

(2) ABSOLUTE ADDRESS 16 BITS

| op | aa | op | n | 0 |

EXAMPLE: BTST #3, @FFFF8003

| 6A10 | 8003 | 73 | 02 | 0 |

(3) ABSOLUTE ADDRESS 32 BITS

| op | aa | op | n | 0 |

EXAMPLE: BTST #3, @FF8000FE

| 6A30 | FF8000FE | 73 | 03 | 0 |

(4) REGISTER INDIRECT, DISPLACEMENT 8 BITS

| op | r | 0 | op | n | 0 |

EXAMPLE: BTST #4, @ER3

| 7C | 03 | 0 | 73 | 04 | 0 |

(5) REGISTER DIRECT

| op | n | r |

EXAMPLE: BTST #5, R0L

| 73 | 05 | 8 |

FIG. 55

(1) ABSOLUTE ADDRESS 8 BITS, DISPLACEMENT 8 BITS

| op | aa | op | bc | d |
|----|----|----|----|----|

EXAMPLE: BBS #0, @FFFFFFFE, $+20

| 7E | FE | 4 | 0 | 20 |
|----|----|----|----|----|

(2) ABSOLUTE ADDRESS 8 BITS, DISPLACEMENT 16 BITS

| op | aa | op | bc | 0 | d |
|----|----|----|----|----|----|

EXAMPLE: BBC #1, @FFFFFF80, $+300

| 7E | 80 | 58 | 9 | 0 | 0300 |
|----|----|----|----|----|----|

(3) ABSOLUTE ADDRESS 8 BITS, DISPLACEMENT 16 BITS SUBROUTINE BRANCH

| op | aa | op | bc | 0 | d |
|----|----|----|----|----|----|

EXAMPLE: BCSR #2, @FFFFFF02, $+300

| 7E | 02 | 5C | A | 0 | 0300 |
|----|----|----|----|----|----|

(4) ABSOLUTE ADDRESS 16 BITS, DISPLACEMENT 8 BITS

| op | aa | op | bc | d |
|----|----|----|----|----|

EXAMPLE: BBC #3, @FFFF8003, $+20

| 6A10 | 8003 | 4 | B | 20 |
|------|------|----|----|----|

FIG. 56

(5) ABSOLUTE ADDRESS 16 BITS, DISPLACEMENT 16 BITS

| op | aa | op | bc | d |
|----|----|----|----|----|
| 6A10 | C000 | 58 | 4 | 0 | 0300 |

EXAMPLE: BBS #4, @FFFFC000, $+300

(6) ABSOLUTE ADDRESS 16 BITS, DISPLACEMENT 16 BITS SUBROUTINE BRANCH

| op | aa | op | bc | d |
|----|----|----|----|----|
| 6A10 | FE00 | 5C | 5 | 0 | 0300 |

EXAMPLE: BSSR #5, @FFFFFE00, $+300

(7) ABSOLUTE ADDRESS 32 BITS, DISPLACEMENT 8 BITS

| op | aa | op | bc | d |
|----|----|----|----|----|
| 6A30 | FF8000FE | 4 | 6 | 20 |

EXAMPLE: BBS #6, @FF8000FE, $+20

(8) ABSOLUTE ADDRESS 32 BITS, DISPLACEMENT 16 BITS

| op | aa | op | bc | 0 | d |
|----|----|----|----|---|---|
| 6A30 | FFC00001 | 58 | F | 0 | 0300 |

EXAMPLE: BBC #7, @FFC00001, $+300

FIG. 57

(9) ABSOLUTE ADDRESS 32 BITS, DISPLACEMENT 16 BITS SUBROUTINE BRANCH

| op | aa | op | bc | 0 | d |
|---|---|---|---|---|---|

EXAMPLE: BCSR #0, @FFFE0000, $+300

| 6A30 | FFFE0000 | 5C | 8 | 0 | 0300 |
|---|---|---|---|---|---|

(10) REGISTER INDIRECT, DISPLACEMENT 8 BITS

| op | r | 0 | op | bc | d |
|---|---|---|---|---|---|

EXAMPLE: BBS #0, @ER2, $+20

| 7C | 0 2 | 0 | 4 | 0 | 20 |
|---|---|---|---|---|---|

(11) REGISTER INDIRECT, DISPLACEMENT 16 BITS

| op | r | 0 | op | bc | 0 | d |
|---|---|---|---|---|---|---|

EXAMPLE: BBC #1, @ER3, $-300

| 7C | 0 3 | 0 | 58 | 9 | 0 | FD00 |
|---|---|---|---|---|---|---|

(12) REGISTER INDIRECT, DISPLACEMENT 16 BITS SUBROUTINE BRANCH

| op | r | 0 | op | bc | 0 | d |
|---|---|---|---|---|---|---|

EXAMPLE: BCSR #2, @ER4, $+300

| 7C | 0 4 | 0 | 5C | A | 0 | 0300 |
|---|---|---|---|---|---|---|

1.⟨EA⟩–⟨EA⟩ OPERATION
EXECUTE OPERATION TO MEMORY BY COMBINATION OF CONTROL CODE+EA1+EA2+OPERATION

| CONTROL CODE | EA1 (SOURCE SIDE) | EA2 (DESTINATION SIDE) | OPERATION |
|---|---|---|---|
| 1 WORD<br>1 STATE | R<br>NONE<br>0 WORD<br>0 STATE | R<br>NONE<br>0 WORD<br>0 STATE | OPERATION<br>1 WORD<br>1 STATE |
| | @ER<br>1 WORD<br>2 STATE (BW)<br>3 STATE (L) | @ER<br>1 WORD<br>3 STATE (BW)<br>5 STATE (L) | BIT OPERATION<br>1 WORD<br>1 STATE |
| | @–ER<br>@ER+<br>1 WORD<br>3 STATE (BW)<br>4 STATE (L) | @–ER<br>@ER+<br>1 WORD<br>4 STATE (BW)<br>6 STATE (L) | BRANCH (d:8)<br>1 WORD<br>2 STATE |
| | @(d:16, ER)<br>2 WORD<br>3 STATE (BW)<br>4 STATE (L) | @(d:16, ER)<br>2 WORD<br>4 STATE (BW)<br>6 STATE (L) | BRANCH (d:16)<br>2 WORD<br>3 STATE |
| | @(d:32, ER)<br>2 WORD<br>5 STATE (BW)<br>6 STATE (L) | @(d:32, ER)<br>4 WORD<br>6 STATE (BW)<br>8 STATE (L) | SUBROUTINE BRANCH (d:16)<br>2 WORD<br>3(n)–4(a) STATE |
| | @aa:16<br>2 WORD<br>3 STATE (BW)<br>4 STATE (L) | @aa:16<br>2 WORD<br>4 STATE (BW)<br>6 STATE (L) | |
| | @aa:32<br>3 WORD<br>4 STATE (BW)<br>5 STATE (L) | @aa:32<br>3 WORD<br>5 STATE (BW)<br>7 STATE (L) | |

```
(5-1)  assign    bc1 = bcc1? IR[11:8] : IR[7:4] ;
(5-2)  always @(trd or bc1[2:0]) begin
                casex( bc1[2:0] )
                        3'b000:     trdsel=trd[0];
                        3'b001:     trdsel=trd[1];
                        3'b010:     trdsel=trd[2];
                        3'b011:     trdsel=trd[3];
                        3'b100:     trdsel=trd[4];
                        3'b101:     trdsel=trd[5];
                        3'b110:     trdsel=trd[6];
                        3'b111:     trdsel=trd[7];
                endcase
       end
(5-3)  assign    bout = bc1[3]? trdsel : ~trdsel ;
(5-4)  assign    bcout = ~( bcc1 | bcc2 ) | ( MODS? bout : cout ) ;
```

FIG. 60

```
(6-1)  always @(IR or TMG) begin
            casex( IR )
                16'b0111_1110_????_????:begin
                    casex(TMG)
                        5'b00001:    NEXTTMG=6'b000010;   //1->2
                        5'b00010:    NEXTTMG=6'b000001;   //2->1
                        default:     NEXTTMG=6'bxxxxxx;
                    endcase
                end
            endcase
       end
(6-2)  always @(IR or TMG) begin
            assign   { nop, data, byte, long, write }=BCMD;
            casex( IR )
                16'b0111_1110_????_????:begin
                    casex(TMG)
                        5'b00001:    BCMD=5'b01100;
                        5'b00010:    BCMD=5'b00000;
                        default:     BCMD=5'bxxxxx;
                    endcase
                end
            endcase
       end
```

FIG. 61

```
(6-3)  always @(IR or TMG) begin
           assign   { dbrext, dbrgb, dbragb, wbtra, tragb }=EACTL;
           casex( IR )
           16'b0111_1110_????_????:begin
               casex(TMG)
                   5'b00001:      EACTL=5'b00100;
                   5'b00010:      EACTL=5'b00000;
                   default:       EACTL=5'bxxxxx;
               endcase
           end
           endcase
       end (6-4)  always @(IR or TMG) begin
           assign   { rddb, trddb, dbdbw, dbrdb, wbrd, wbtrd }=REGCTLM;
           casex( IR )
           16'b0111_1110_????_????:begin
               casex(TMG,MODS)
                   5'b00001:      REGCTLM=6'b000000;
                   5'b00010:      REGCTLM=6'b000101;
                   default:       REGCTLM=6'bxxxxxx;
               endcase
           end
           endcase
       end
```

FIG. 62

```
(6-5)  always @(IR or MODS or MODD) begin
           casex( IR )
           16'b0111_1110_????_????:begin
                       mskint=1'b1;
                       modd=1'b0
                       mods=1'b1
                       modse=1'b0
                       lng=1'b0;
           end
           endcase
       end
```

FIG. 63

```
(7-1)  always @(IR or TMG) begin
           casex( IR )
               16'b0100_????_????_????:begin
                   casex(TMG)
                       5'b00001:      NEXTTMG=6'b000010;   //1->2
                       5'b00010:      NEXTTMG=6'b1xxxxx;   //2->1
                       default:       NEXTTMG=6'bxxxxxx;
                   endcase
               end
           endcase
       end (7-2)  always @(IR or TMG) begin
           assign   { nop, data, long, byte, write }=BCMD;
           casex( IR )
               16'b0100_????_????_????:begin
                   casex(TMG)
                       5'b00001:      BCMD=5'b00000;
                       5'b00010:      BCMD=5'b00000;
                       default:       BCMD=5'bxxxxx;
                   endcase
               end
           endcase
       end
```

FIG. 64

```
(7-3)  always @(IR or TMG) begin
           assign   { dbrext, dbrgb, wbtra, tragb, augb, bcc1, bcc2 }=EACTL;
           casex( IR )
               16'b0100_????_????_????:begin
                   casex(TMG)
                       5'b00001:      EACTL=7'b0000110;
                       5'b00010:      EACTL=7'b0000000;
                       default:       EACTL=7'bxxxxxxx;
                   endcase
               end
           endcase
       end (7-4)  always @(IR or TMG) begin
           assign   { rddb, trddb, dbdbw, dbrdb, wbrd, wbtrd }=REGCTLM;
           casex( IR )
               16'b0100_????_????_????:begin
                   casex(TMG)
                       5'b00001:      REGCTLM=6'b000000;
                       5'b00010:      REGCTLM=6'b000000;
                       default:       REGCTLM=6'bxxxxxx;
                   endcase
               end
           endcase
       end
```

FIG. 65

```
(7-5)  always @(IR) begin
           casex( IR )
              16'b0100_????_????_????:begin
                                    mskint=1'b0;
                                    modd=1'b0;
                                    mods=1'b0;
                                    modse=1'b0;
                                    lng=1'b0;
                          end
              endcase
       end
```

FIG. 66

```
(8-1)  always @(IR or TMG or MAX or BCOUT) begin
           casex( IR )
              16'b0101_1100_????_????:begin
                 casex(TMG,MAX)
                    7'b00001_?_?:    NEXTTMG=6'b001110;    //1->14
                    7'b01110_?_1:    NEXTTMG=6'b000010;    //14->2
                    7'b01110_?_0:    NEXTTMG=6'b000011;    //14->3
                    7'b00010_0_?:    NEXTTMG=6'b000011;    //2->3
                    7'b00010_1_?:    NEXTTMG=6'b001011;    //2->11
                    7'b01011_?_?:    NEXTTMG=6'b000011;    //11->3
                    7'b00011_?_?:    NEXTTMG=6'b1xxxxx;    //3->1
                    default:         NEXTTMG=6'bxxxxxx;
                 endcase
              end
           endcase
       end (8-2)  always @(IR or TMG or LNG) begin
           assign   { nop, data, long, byte, write }=BCMD;
           casex( IR )
              16'b0101_1100_????_????:begin
                 casex(TMG)
                    5'b00001:    BCMD=5'b10000;
                    5'b01110:    BCMD=5'b00000;
                    5'b00010:    BCMD={ 1'b0, 1'b1, MAX, 1'b0, 1'b1 };
                    5'b01011:    BCMD=5'b01001;
                    5'b00011:    BCMD=5'b00000;
                    default:     BCMD=5'bxxxxx;
                 endcase
              end
           endcase
       end
```

FIG. 67

```
(8-3)  always @(IR or TMG) begin
           assign    { dbrext, dbrdb, dbrgb, wbtra, tragb, augh, alugb, bcc1, bcc2 }=EACTL;
           casex( IR )
           16'b0101_1100_????_????:begin
               casex(TMG)
                   5'b00001:       EACTL={ 8'b1100000, MODS };
                   5'b01110:       EACTL={ 6'b000000, BUOUT, 2'b00 };
                   5'b00010:       EACTL=9'b0000000;
                   5'b01011:       EACTL=9'b0000000;
                   5'b00011:       EACTL=9'b0000000;
                   default:        EACTL=9'bxxxxxxx;
               endcase
           end
           endcase
       end (8-4)  always @(IR or TMG) begin
           assign    { rdgb, trdgb, dbdbw, dbrdb, wbrd, wbtrd }=REGCTLMI;
           casex( IR )
           16'b0101_1100_????_????:begin
               casex(TMG)
                   5'b00001:       REGCTLMI=6'b000000;
                   5'b01110:       REGCTLMI=6'b000000;
                   5'b00010:       REGCTLMI=6'b000000;
                   5'b01011:       REGCTLMI=6'b000000;
                   5'b00011:       REGCTLMI=6'b000000;
                   default:        REGCTLMI=6'bxxxxxx;
               endcase
           end
           endcase
       end
```

FIG. 68

```
(8-5)  always @(IR) begin
           casex( IR )
           16'b0101_1100_????_????:begin
                           mskint=1'b0
                           modd=1'b0
                           mods=1'b0
                           modse=1'b0
                           lng=1'b0;
               end
           endcase
       end
```

FIG. 69

```
(9-1)  always @(IR or TMG) begin
           casex( IR )
              16'b0111_0011_????_????:begin
                 casex(TMG)
                    5'b00001:     NEXTTMG=6'b1xxxxx;     //1->1
                    default:      NEXTTMG=6'bxxxxxx;
                 endcase
              end
           endcase
       end (9-2)  always @(IR or TMG) begin
           assign   { nop, data, byte, long, write }=BCMD;
           casex( IR )
              16'b0111_0011_????_????:begin
                 casex(TMG)
                    5'b00001:     BCMD=5'b00000;
                    default:      BCMD=5'bxxxxx;
                 endcase
              end
           endcase
       end
```

FIG. 70

```
(9-3)  always @(IR or TMG or MODS) begin
           assign   { rsdb, trddb, rdgb, dbrgb, wbrd, wbtrd }=REGCTLE;
           casex( IR )
              16'b0111_0011_????_????:begin
                 casex(TMG)
                    5'b00001:     REGCTLE={ 1'b0, 1'b0, ~MODS, MODS, 1'b0, 1'b0 };
                    default:      REGCTLE=6'bxxxxxx;
                 endcase
              end
           endcase
       end (9-4)  always @(IR or MODD) begin
           casex( IR )
              16'b0111_0011_????_????:begin
                 mskint=1'b0;
                 mkmov=1'b0;
                 lng=1'b0;
                 byte=1'b0;
              end
           endcase
       end
```

FIG. 71

```
(10-1)  always @(IR or TMG) begin
            casex( IR )
                16'b0111_0000_????_????:begin
                    casex(TMG)
                        5'b00001:    NEXTTMG=6'b1xxxxx;    //1->1
                        default:     NEXTTMG=6'bxxxxxx;
                    endcase
                end
            endcase
        end (10-2)  always @(IR or TMG) begin
            assign   { nop, data, byte, long, write }=BCMD;
            casex( IR )
                16'b0111_0000_????_????:begin
                    casex(TMG)
                        5'b00001:    BCMD=5'b00000;
                        default:     BCMD=5'bxxxxx;
                    endcase
                end
            endcase
        end
```

FIG. 72

```
(10-3)  always @(IR or TMG or MODD) begin
            assign   { rsdb, trddb, rdgb, dbrgb, wbrd, wbtrd }=REGCTLE;
            casex( IR )
                16'b0111_0000_????_????:begin
                    casex(TMG)
                        5'b00001:    REGCTLE={ 1'b0, 1'b0, ~MODD, MODD, 1'b0, 1'b0 };
                        default:     REGCTLE=6'bxxxxxx;
                    endcase
                end
            endcase
        end (10-4)  always @(IR or MODD) begin
            casex( IR )
                16'b0111_0000_????_????:begin
                    mskint=MODD;
                    mkmov=MODD;
                    lng=1'b0;
                    byte=1'b1;
                end
            endcase
        end
```

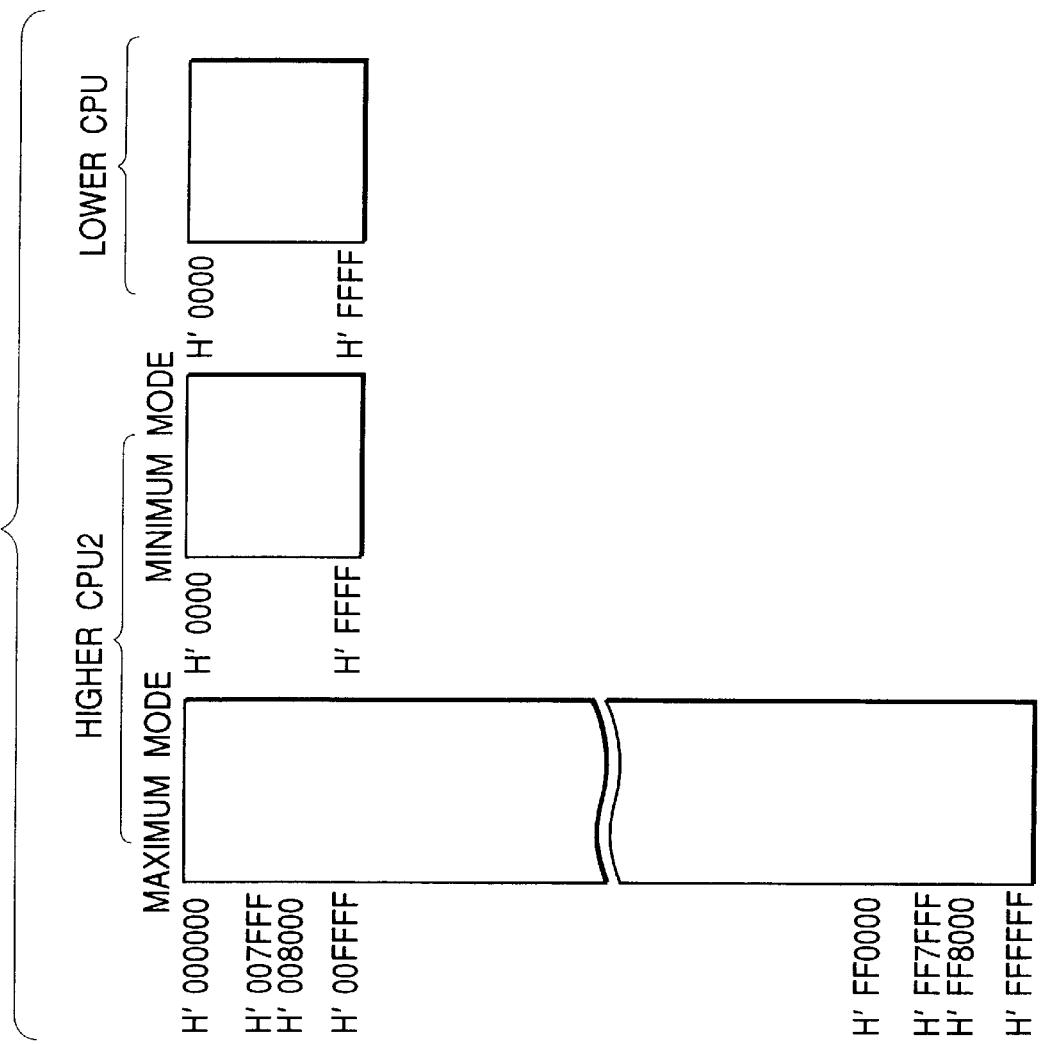

FIG. 81

| INSTRUCTION | SIZE | FUNCTION |
|---|---|---|
| MOVM | W/L | Rns (REGISTER GROUP)→(EAd)<br>DATA IS TRANSFERRED BETWEEN A PLURALITY OF GENERAL PURPOSE REGISTERS AND MEMORY |
| | | Rns (REGISTER GROUP)→Rnd (REGISTER GROUP)<br>DATA IS TRANSFERRED BETWEEN A PLURALITY OF GENERAL PURPOSE REGISTERS OR BETWEEN A PLURALITY OF GENERAL PURPOSE REGISTERS AND MEMORY |
| | | (EAs)→Rnd (REGISTER GROUP)<br>DATA IS TRANSFERRED BETWEEN A PLURALITY OF GENERAL PURPOSE REGISTERS OR BETWEEN A PLURALITY OF GENERAL PURPOSE REGISTERS AND MEMORY |

FIG. 83

FRONT INSTRUCTION CODE

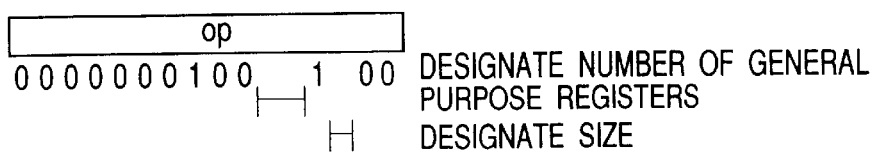

0 0 0 0 0 0 0 1 0 0   1   0 0   DESIGNATE NUMBER OF GENERAL PURPOSE REGISTERS

⊢⊣   DESIGNATE SIZE

| NUMBER OF TRANSFERS | r1, r2 | s1 | s2 | s3 |
|---|---|---|---|---|
| 2 | **0 | **1 | — | — |
| 3 | *00 | *01 | *10 | — |
| 4 | *00 | *01 | *10 | *11 |

FIG. 88

(1)
```
always @(IR or TMG or MOD2 or MOD3 or MOD4) begin
  casex(IR)
    16'b0000_1001_????_????:begin
      casex(TMG,MOD2,MOD3,MOD4)
        8'b00001_000:     NEXTTMG=6'b1xxxxx;
        8'b00001_1??:     NEXTTMG=6'b000101;
        8'b00001_?1?:     NEXTTMG=6'b000101;
        8'b00001_??1:     NEXTTMG=6'b000101;
        8'b00101_?00:     NEXTTMG=6'b1xxxxx;
        8'b00101_?1?:     NEXTTMG=6'b001001;
        8'b00101_??1:     NEXTTMG=6'b001001;
        8'b01001_??0:     NEXTTMG=6'b1xxxxx;
        8'b01001_??1:     NEXTTMG=6'b001101;
        8'b01101_???:     NEXTTMG=6'b1xxxxx;
        default:          NEXTTMG=6'bxxxxxx;
      endcase
    end
  endcase
end
```

FIG. 89

(2)
```
always @(IR or TMG) begin
  assign  { nop, data, long, byte, write }=BCMD;
  casex( IR )
  16'b0000_1001_????_????:begin
    casex(TMG)
      5'b00001:           BCMD=5'b00000;
      5'b00101:           BCMD=5'b1xxxx;
      5'b01001:           BCMD=5'b1xxxx;
      5'b01101:           BCMD=5'b1xxxx;
      default:            BCMD=5'bxxxxx;
    endcase
  end
  endcase
end
```

(3)
```
always @(IR or TMG) begin
  assign  { rsdb, rdgb, wbrd, s1, s2, s3, ccrset }=REGCTL;
  casex( IR )
  16'b0000_1001_????_????:begin
    casex(TMG)
      5'b00001:           REGCTL={ 1'b1, 1'b0, 1'b0, 1'b1, 1'b1, 1'b0, 1'b0, ~(MOD2|MOD3|MOD4) };
      5'b00101:           REGCTL=7'b1010100;
      5'b01001:           REGCTL=7'b1010010;
      5'b01101:           REGCTL=7'b1010000;
      default:            REGCTL=7'bxxxxxxx;
    endcase
  end
  endcase
end
```

FIG. 90

```
(1) ┌ always @(IR or TMG or MOD2 or MOD3 or MOD4 or LNG) begin
    │   casex( IR )
    │   16'b0110_101?_??00_????:begin
    │     casex(TMG,LNG)
    │       6'b00001_?:    NEXTTMG=6'b000010;
    │       6'b00010_1:    NEXTTMG=6'b010010;
    │       6'b00010_0:    NEXTTMG={ 3'b000, MOD2!MOD3!MOD4, 1'b1, ~(MOD2!MOD3!MOD4) };
    │       6'b10010_?:    NEXTTMG={ 3'b000, MOD2!MOD3!MOD4, 1'b1, ~(MOD2!MOD3!MOD4) };
    │       6'b00110_1:    NEXTTMG=6'b010110;
    │       6'b00110_0:    NEXTTMG={ 2'b00, MOD3!MOD4, ~(MOD3!MOD4), 1'b1, ~(MOD3!MOD4) };
    │       6'b10110_?:    NEXTTMG={ 2'b00, MOD3!MOD4, ~(MOD3!MOD4), 1'b1, ~(MOD3!MOD4) };
    │       6'b01010_1:    NEXTTMG=6'b011010;
    │       6'b01010_0:    NEXTTMG={ 2'b00, MOD4, MOD4, 1'b1, ~MOD4 };
    │       6'b11010_?:    NEXTTMG={ 2'b00, MOD4, MOD4, 1'b1, ~MOD4 };
    │       6'b01110_1:    NEXTTMG=6'b011110;
    │       6'b01110_0:    NEXTTMG=6'b000011;
    │       6'b11110_?:    NEXTTMG=6'b000011;
    │       6'b00011_?:    NEXTTMG=6'b1xxxxx;
    │       default:       NEXTTMG=6'bxxxxxx;
    │     endcase
    │   end
    │   endcase
    └ end
```

FIG. 91

```
(2) ┌ always @(IR or TMG or LNG) begin
    │     assign    { nop, data, long, byte, write }=BCMD;
    │     casex( IR )
    │     16'b0110_101?_??00_????:begin
    │         casex(TMG)
    │             5'b00001:    BCMD=5'b00000;
    │             5'b00010     BCMD={ 1'b0, 1'b1, LNG+MOD2+MOD3+MOD4, ~IR[8], IR[7] };
    │             5'b10010:    BCMD={ 1'b0, 1'b1, MOD2+MOD3+MOD4, 1'b0, IR[7] };
    │             5'b00110:    BCMD={ 1'b0, 1'b1, LNG+MOD3+MOD4, 1'b0, IR[7] };
    │             5'b10110:    BCMD={ 1'b0, 1'b1, MOD3+MOD4, 1'b0, IR[7] };
    │             5'b01010:    BCMD={ 1'b0, 1'b1, LNG+MOD4, 1'b0, IR[7] };
    │             5'b11010:    BCMD={ 1'b0, 1'b1, MOD4, 1'b0, IR[7] };
    │             5'b01110:    BCMD={ 1'b0, 1'b1, LNG 1'b0, IR[7] };
    │             5'b11110:    BCMD={ 1'b0, 1'b1, 1'b0, 1'b0, IR[7] };
    │             5'b00011:    BCMD=5'b00000;
    │             default:     BCMD=5'bxxxxx;
    │         endcase
    │     end
    │     endcase
    └ end
(3) ┌ always @(IR or TMG) begin
    │     assign    { dbrext, dbrgb, wbtra, tragb, mabinc }=EACTL;
    │     casex( IR )
    │     16'b0110_101?_??00_????:begin
    │         casex(TMG)
    │             5'b00001:    EACTL=5'b00000;
    │             5'b00010     EACTL=5'b11000;
    │             5'b10010:    EACTL=5'b00001;
    │             5'b00110:    EACTL=5'b00001;
    │             5'b10110:    EACTL=5'b00001;
    │             5'b01010:    EACTL=5'b00001;
    │             5'b11010:    EACTL=5'b00001;
    │             5'b01110:    EACTL=5'b00001;
    │             5'b11110:    EACTL=5'b00001;
    │             5'b00011:    EACTL=5'b00000;
    │             default:     EACTL=5'bxxxxx;
    │         endcase
    │     end
    │     endcase
    └ end
```

FIG. 92

```
(4) always @(IR or TMG) begin
    assign   { rddb, dbdbw, dbrgb, wbrd, s1, s2, s3, rdgb, ccrset }=REGCTLM;
    casex( IR )
    16'b0110_101?_??00_????:begin
        casex(TMG)
            5'b00001:    REGCTLM=9'b000000000;
            5'b00010:    REGCTLM={ IR[7], IR[7], 1'b0, 1'b0, IR[7], 1'b0, 1'b0, 1'b0, 1'b0 };
            5'b10010:    REGCTLM=9'b000000000;
            5'b00110:    REGCTLM={ IR[7], IR[7], ~IR[7], ~IR[7], IR[7], 1'b0, 1'b0, 1'b0, 1'b0 };
            5'b10110:    REGCTLM=9'b000000000;
            5'b01010:    REGCTLM={ IR[7], IR[7], ~IR[7], 1'b0, ~IR[7], IR[7], 1'b0, 1'b0, 1'b0 };
            5'b11010:    REGCTLM=9'b000000000;
            5'b01110:    REGCTLM={ IR[7], IR[7], ~IR[7], 1'b0, 1'b0, ~IR[7], 1'b0, 1'b0, 1'b0 };
            5'b11110:    REGCTLM=9'b000000000;
            5'b00011:    REGCTLM={ 1'b0, 1'b0, ~IR[7], ~IR[7], 1'b0, 1'b0, IR[7], !MOD2&!MOD3&!MOD4 };
            default:     REGCTLM=9'bxxxxxxxxx;
        endcase
    end
    endcase
end
```

DATA PROCESSING APPARATUS

BACKGROUND OF THE INVENTION

1. Field of the Invention

The present invention relates to a data processing apparatus such as microcomputer, microprocessor, data processor, CPU (Central Processing Unit), particularly to register architecture, upper compatibility and expansion of operational function, for example, a technology effective by applying to effective utilization of software resources, expansion of operational function and promotion of usability in a single chip microcomputer.

2. Description of the Related Art

According to a microcomputer in the form of a semiconductor integrated circuit, expansion of an address space, enlargement of an instruction set and high speed formation have been achieved. According to CPU (Central Processing Unit) of a microcomputer, its function is defined by softwares and accordingly, even in a microcomputer achieving expansion of an address space, enlargement of an instruction set and high speed formation, it is preferable to be able to effectively utilize software resources of an existing microcomputer.

Therefore, as an example of realizing the expansion of an address space and the enlargement of an instruction set while maintaining compatibility at an object level, there is provided a microcomputer disclosed in, for example, Japanese Patent Laid-Open No. 51981/1994. The publication discloses that it is effective for achieving expansion of an instruction set to adopt a load store architecture such as a so-to-speak RISC (Reduced Instruction Set Computer) architecture.

According to the load store architecture, an operational processing is executed by using general purpose registers of CPU. That is, there is not executed an operation directly using data on a memory, the data on the memory is temporarily transferred to the general purpose registers, the operation is executed on the transfer data and thereafter, a result of operation on the general purpose registers is rewritten to the memory. Therefore, when there is a general purpose register which is not used in the processing, the data on the memory may be transferred to the general purpose register. However, a number of the general purpose registers is limited and depending on a processing situation at inside of the microcomputer, there also is a case in which all of the general purpose registers are used. When all of the general purpose registers are used, in other words, when contents of all the general purpose registers must be held, before executing an operation with regard to data on the memory, after saving the contents of the general purpose registers to stack areas or the like, a required processing is executed and after finishing the processing, in order to restart an interrupted processing, the saved contents of the general purpose registers must be returned.

SUMMARY OF THE INVENTION (Study Problem A)

As study problem A, the inventors have studied to increase general purpose registers of CPU while enabling to effectively utilize software resources by maintaining compatibility. Further, although matters concerning the study problem A are constituted by a content which has already been disclosed in the specification of Japanese Patent Application No. Hei 11-123450 which is a first Japanese basic application related to the present application, the content is not publicly known yet. A description will be given of the study problem A.

According to CPU adopting the load store architecture, data processing is executed centering on general purpose registers of CPU and accordingly, it is convenient that a number of the general purpose registers is large. Thereby, easiness or high speed formation of program can be achieved.

However, at which of general purpose registers the processing is executed, is generally designated by an instruction code and accordingly, it is necessary to hold a register designating field in correspondence with a number of the general purpose registers at inside of the instruction code. For example, 4 bits of the register designating field are needed for 16 of the general purpose registers. When the general purpose registers are intended to increase, the register designating field is increased. When the general purpose registers are increased to 64 which is 4 times as much as 16, 6 bits of the register designating field are needed. A processing object generally comprises data of 2 (source and destination) and therefore, a doubled bit number is needed in the register designating field.

When a basic unit of instruction is constituted by, for example, 16 bits (hereinafter, referred to as "word"), a rate of the bit number occupied by the register designating field is increased and as a result, a length of an instruction code is obliged to increase. Prolongation of the instruction code amounts to a reduction in the processing speed. The reason is that CPU executes operation after reading instruction and when a number of words (bit number) of instruction to be read becomes large, a number of reading the instruction per se is also increased. Further, enlargement of the register designating field is not compatible with existing instruction of existing CPU and compatibility with existing CPU becomes difficult to maintain.

As a technology of apparently increasing general purpose registers, there is provided a register bank system in which the general purpose registers are classified into groups referred to as bank and any of the banks are exclusively selected. Which bank is selected is designated by a control register or control instruction. Therefore, the instruction code is provided with only a register designating field in correspondence with the general purpose registers in the bank and the increase in the length of the instruction code can be restrained. However, there is needed an instruction for switching the register banks, further, in forming a program, which bank is to be selected must be conscious of and easiness of the program is liable to deteriorate. A number of the general purpose registers capable of being used at the same time is not increased and accordingly, when there is a task having a large amount of data and a task having a small amount of data, it is difficult to circulate each other allocation of the general purpose registers.

It is an object of the invention with regard to the study problem A to provide a data processing apparatus capable of increasing a number of general purpose registers while maintaining upper compatibility.

It is other object of the invention with regard to the study problem A to provide a data processing apparatus capable of increasing a number of general purpose registers without increasing overall instruction codes.

It is still other object of the invention with regard to the study problem A to provide a data processing apparatus capable of realizing easiness of program formation and promotion of processing function of CPU by increasing a number of general purpose registers while maintaining upper compatibility with regard to software resources.

(Study Problem B)

As study problem B, the inventors has studied capability of effectively utilizing software resources by maintaining compatibility with regard to an architecture of a load store type (achieving upper compatibility with regard to software resources) and capability of directly operating data on a memory while maintaining advantages of existing CPU such that a load store architecture or an RISC architecture is advantageous in improving operational speed. Further, although matters with regard to the study problem B have already been disclosed in the specification of Japanese Patent Application No. Hei 11-151890 which is a second Japanese basic application related to the present invention, the content has not been publicly known yet. A description will be given of the study problem B.

Advantages which seem to provide by making data on a memory directly operable are as follows.

When not only an operation is executed by loading data to a general purpose register but also the operation can be executed with regard to data on a memory without loading the data to the general purpose register, the operation can be executed with regard to all of the data which can be used by CPU or a microcomputer, in other words, all the data which a user of the microcomputer can designate on a program and accordingly, the usability, that is, the function of the microcomputer is promoted.

In this case, the instruction executed by CPU designates whereabouts of data and content of processing thereof. A way of designating whereabouts of data is referred to as addressing mode. When operation of data on a memory can be executed only by a specific addressing mode, a restriction in view of programming is brought about and easiness of use cannot sufficiently be promoted. It seems to be preferable that data on the memory can be operated by an arbitrary combination of addressing modes accessing data by existing CPU.

Further, even when data on the memory can directly be operable, it is preferable to process data having a high frequency of use by arranging the data on a general purpose register. A general purpose register is constituted physically as a portion of CPU and accordingly, the general purpose register can be accessed at a speed higher than that of the memory and accordingly, data on the general purpose register can be processed at a speed higher than that of the data on the memory. Data having a low frequency of use may be processed while arranging the data on the memory. A general purpose register having no direct relationship with processing of CPU may not be saved or returned from the general purpose register. Thereby, it seems that the processing speed of CPU can be promoted as a whole.

Normally, an amount of data processed by CPU or microcomputer is larger than a number of general purpose registers of CPU. Further, there are a plurality of tasks and the tasks are executed by time sharing and accordingly, in the case of switching the tasks, when data on the memory can directly be operated, the data is not saved to or returned from the general purpose register and a processing can be executed immediately with regard to the memory. A convenient method can be selected while interweaving a processing method of executing operation at high speed by using general purpose registers although being accompanied by processings of save and return. Similarly, also in the case of an interruption processing, without saving data to general purpose registers, a processing can be executed immediately with regard to a memory and response time until executing a desired processing in response to interruption can also be shortened. By shortening the response time of interruption, temporal accuracy in the case of controlling various apparatus, or so-to-speak real time performance can be promoted.

When a program of looping (repeating) the same processing routine is formed, in order to ensure a general purpose register necessary for an operational processing in the loop, further, reduce an overall program capacity and shorten a processing time period, by ensuring a register allocated with data used outside of the loop, even in the case in which the general purpose register is not provided with allowance, at any time, the operational processing can be executed with regard to the memory. Thereby, formation of the program is facilitated. Further, by shortening the processing in the loop, as a whole, it is anticipated that the processing time period can be shortened in proportion to a number of times of repetition.

Further, in developing a development apparatus such as C compiler, such various conditions need to consider, by enabling operation with regard to the memory, it seems that development time period and resources necessary for achieving a desired function of the C compiler can also be saved.

Further, high speed formation, high function formation and small size formation of apparatus, as described above, are requested also to CPU or microprocessor having comparatively small address space and comparatively small instruction set and accordingly, when there are present CPU having wide address space and CPU having narrow address space disclosed in Japanese Patent Laid-Open No. 51981/1994, it is preferable to add operation with regard to data on a memory to both of CPU's.

However, in achieving upper compatibility with regard to software resources, as mentioned above, and making data on a memory directly operable, the following problem is posed as clarified by the inventors.

Existing instruction set is optimized within the specification and accordingly, there is only small room for allocating new instruction code to processing of various operations for making the data on the memory directly operable. That is, with regard to desired operation of addition or logical product, it is actually difficult to allocate the new instruction code such that the data on the memory can be operated with an arbitrary combination of addressing modes for accessing the data.

Further, alteration of a system of instruction codes by adding new instruction codes or new addressing modes, is incompatible with existing instruction in existing CPU and makes it difficult to maintain compatibility with existing CPU. Further, the merit of existing CPU is deteriorated.

Further, in the case of developing a system using a microcomputer, there is used a development apparatus referred to as an emulator. An emulator is mounted with a processor for emulation incorporating the function of the microcomputer and the processor for emulation outputs a signal for emulation such that an operational state of the microcomputer can be analyzed by the emulator. An emulator and a processor for emulation are disclosed in Japanese Patent Laid-Open No. 263290/1996. There has been clarified the problem in which when the constitution of the microcomputer is modified to make the data on the memory directly operable, in the case in which the signal for emulation is also modified, the hardware per se of the emulator must be modified, the emulator per se must newly be developed and provision of the development apparatus or a development environment of the microcomputer is delayed.

It is an object of the invention with regard to the study problem B to provide a data processing apparatus capable of directly executing operation with regard to data on a memory, apparently, while minimizing an increase in a logical and physical scale of the data processing apparatus and maintaining compatibility with existing CPU or microcomputer having an instruction set of a load store type.

It is other object of the invention with regard to the study problem B to promote a processing function of CPU by facilitating programming and restraining an undesired general purpose register from saving or returning by enabling an operation with regard to data on a memory, apparently.

(Study Problem C)

The inventors have further clarified the following as study problem C in realizing upper compatibility with regard to software resources which have been investigated as the study problem A and capability of directly operating data on a memory which has been investigated as the study problem B as described above. Further, although matters related to the study problem C have already been disclosed in the specification of Japanese Patent Application No. 11-191608 which is a third Japanese basic application related to the present application, the content is not publicly known yet. A description will be given of the study problem C.

An existing instruction set is optimized within the specification and accordingly, there is small room for allocating a new instruction code to processings of various operations for making the data on the memory directly operable. That is, with regard to desired operation of addition or logical product, it is actually difficult to consider to allocate a new instruction code such that the data on the memory can be operated by an arbitrary combination of the addressing modes accessing the data.

Further, alteration of a system of instruction codes by adding new instruction codes or new addressing modes is not compatible with existing instruction in existing CPU and makes difficult to maintain compatibility with existing CPU. Further, the merit of existing CPU is deteriorated.

Hence, the inventors have previously found usefulness in capability of operation on the memory by using a front instruction code combining and coupling a plurality of instruction codes in an existing ones of a single or a plurality of transfer instructions between the memory and a register and operation instructions between the registers. According thereto, instruction codes of the transfer instructions between the memory and the register and the operation instructions between the registers are existing and accordingly, a single one of them is operated similar to the conventional case and execution of the existing instructions is not hampered. Further, when only the existing instructions are used, existing software resources can effectively be utilized. The operational function can be expanded without deteriorating the merit provided to existing CPU such as general purpose register system or load store architecture.

Further, the inventors have also studied various requests with regard to a microcomputer having a wide application field. For example, there are an application field having a wide address space and an application field having a small address field, an application field mainly using programming by high-level language and an application field mainly using program by assembly language, an application field in which data processing is important and an application field in which control of bit operation is needed, or an application field in which processing function is needed and an application field in which a reduction in expense is needed more than the processing function and with regard to these, it is preferable to be able to provide CPU (Central Processing Unit) by an integrated architecture and commonly use a development apparatus of a software development apparatus (cross software) such as assembler or C compiler.

Hence, the inventors have studied with regard to CPU having lower compatibility. As described above, according to the previous proposal by the inventors, even with regard to existing CPU having a small address space, general purpose registers can be added and operation with regard to the memory can be added while maintaining compatibility. In the case of adding function, the inventors have found a necessity of a consideration to meet sufficiently various requests to a microcomputer, described above, such as pursuit of a reduction in expense.

Further, programming by assembly language is much dependent on an instruction set of CPU and there is so-to-speak preference by experience of a user and accordingly, all the requests cannot be met by one instruction set. For example, although it is easy to shift to other CPU or CPU having an instruction set preferred by the user, there is brought about a limit in CPU having the same instruction set.

There is a general purpose register system or an accumulator system in architecture of a microcomputer or CPU and accordingly, when there is provided CPU having an instruction set similar thereto respectively, it seems that a request with regard to instruction sets of most of the users can be met. At least, by preparing CPU having various kinds of instruction sets rather than a single instruction set, a range capable of dealing therewith can significantly be enlarged.

In this case, according to these CPU's, even when a number of independent ones are prepared, in the case in which compatibility or transportability of software are deteriorated, for the user, software cannot be transported, software is modified, an overall development expense is undesirably obliged to increase or development time period is undesirably obliged to increase. On the other hand, for a provider of CPU or a microcomputer, in independent CPU's, technologies used differ from each other, a technology provided by one CPU is difficult to apply to other CPU, development efficiency is deteriorated and promotion of function is difficult to achieve.

Further, when a system using a microcomputer is developed, a software development apparatus and a development apparatus referred to as emulator are used.

With regard to a software development apparatus such as an assembler, a C compiler or a simulator debugger, it has been clarified by the inventors that it is preferable that a plurality of CPU's having compatibility, described above, can commonly be utilized including CPU which is not provided with instruction sets in which one of the instruction sets incorporates other thereof. Also for the user, when a software development apparatus is made common and is applicable to different CPU's, when CPU is changed, undesirable expense is not brought about. Also for the supplier, only one development apparatus may be developed, the development efficiency can be promoted and promotion of function of the development apparatus and promotion of usability are easy to achieve pertinently. While enjoying easiness of programming by assembly language, successive shift to high-level language is made possible.

Although in Japanese Patent Laid-Open No. 198272/1997, there is a description with regard to an emulator and a processor for emulation capable of dealing with a plurality of CPU's in which particularly, one of instruction sets or register constitutions incorporates other thereof, as described above, in the case of such a plurality of CPU's, various requests of application fields cannot sufficiently be met. Although it is conceivable to prepare higher CPU incorporating both functions for a plurality of CPU's in which one of instruction sets does not incorporate other thereof, with regard to a totally different plurality of CPU's, the instruction codes differ, address spaces or methods of calculating effective addresses differ and accordingly, it is difficult to constitute higher CPU incorporating these. Further, even when the constitution is possible, it seems that large development resources are needed and there cannot be achieved an object of saving various resources necessary for development. Further, higher CPU is provided with redundant circuits to incorporate functions of the different plurality of CPU's, which is difficult to use in an actual product and when it is used by being switched to individual CPU, it is not regarded as new CPU and there cannot be achieved an object of meeting various requests of application fields.

It is an object of the invention with regard to the study problem C, firstly, to provide a data processing apparatus capable of meeting wide request of application field or user. Specifically, it is the object of the invention to realize that fabrication expense of a semiconductor integrated circuit is reduced and accordingly, expense of the semiconductor integrated circuit of the user is reduced, request in view of software of an application field is easy to meet or programming by assembly language is also facilitated such that preference of the user to a microcomputer is met or a user is easy to shift from other CPU.

It is the object of the invention with regard to study problem C, secondary, to reduce development expense of a group of products of data processing apparatus such as a general microcomputer and to promote the development efficiency. In other words, the object is to provide a plurality of CPU's suitable for individual application fields or systems, to reduce general development expense of the plurality of CPU's and to promote the development efficiency. Specifically, it is the object to easily realize that compatibility or inheritance of software resources is maintained, the software development efficiency of the user is promoted, request of function or performance is met, request for promotion of the function or performance is made to be easy to meet further continuously, in shifting of CPU, undesirable expense of the user is prevented, an increase in an desirable expense of the user is prevented by enabling to utilize commonly a software development apparatus or a development environment such as an emulator or the development efficiency of the development environment is promoted and pertinently improved.

It is the object of the invention with regard to the study problem C, thirdly, to provide a data processing apparatus such as CPU having an address space preferable to a single chip microcomputer having a comparatively large program capacity and yet having a comparatively small data capacity, that is, a data processing apparatus such as CPU having a wide address space and a reduced logical scale.

(Study Problem D)

The inventors have studied with regard to a composite instruction contributing to shortening of a length of an instruction code and promotion of processing function in view of a branch instruction as new study problem D related to the study problem B. A description will be given of the study problem D.

According to a general microcomputer system, processing of CPU is executed to adapt to an outer input state. The processing is executed by branching a program in accordance with states of input and output ports and based thereon, in accordance with a state of bits held in built-in RAM.

As means for realizing such a processing of CPU in correspondence with outer input state, as described in U.S. Pat. No. 4,334,268, there is a data processor having instruction of so-to-speak bit test and branch. According thereto, a bit to be tested is designated by an absolute address of 8 bits and a bit number of 3 bits and whether a branch condition is brought into a logical value "1" state of the designated bit or a logical value "0" state is designated by 1 bit and an address of branch destination is designated by a displacement of 8 bits. In this case, in the case of an instruction code having a length of 3 bytes, designation of instruction must be executed by 4 bits. In this example, front 4 bits of an instruction code having the logical value "0" constitute bit test and branch. Therefore, in the case of an instruction other than thereof, front 4 bits must be constituted by values 1 through F and an overall instruction code length is liable to increase.

It has been found by the inventors that such an instruction is liable to increase a logical scale since instruction execution control is complicated as in reading and determining the designated bit and forming the branch address, further, promotion of operational frequency is liable to hamper by undesirable delay of a logical circuit.

Further, capability of designating by the 8 bit absolute address is restricted to 256 bytes and accordingly, when inner I/O registers are increased in accordance with high function formation of a microcomputer, a desired bit may not be present in a designatable range or address arrangement thereof becomes difficult in view of specification and design of the microcomputer. That is, although the microcomputer is made generally usable, there are provided a plurality of bits constituting determination objects, which differ from each other according to respective application fields or users and it is difficult to meet all of the requests of desired combinations with regard to the bits constituting the determination objects.

Further, when the control becomes complicated, there is brought about a case in which branch cannot be executed with a relative address of 8 bits. Branch can be executed only in a range of +127 through −128 bytes with an address where the relevant instruction is present or an address where successive instruction is present as a reference and accordingly, at least one of processing programs executed when the bit of the determination object is the logical value "1" and when the bit is the logical value "0" (processing program executed when the branch condition is not established), needs to be smaller than 127 bytes. When this cannot be satisfied, by using also other branch instruction, by executing two stages of branch instruction, branch must be executed to a required address. The inventors have found that this complicates the program and lowers also the processing speed.

When the absolute address or the displacement is constituted by 16 bits to avoid this, there is necessarily brought about an increase in the instruction code length and the processing speed is also lowered and the instruction execution control is further complicated. When there are provided a plurality of combinations of absolute addresses and the bit lengths of the displacement, the instruction execution control is further complicated. These amount to an increase of kinds of instruction to be added and make it difficult to maintain upper compatibility of existing CPU. Advantages of existing CPU (conciseness of logical constitution or high speed performance) is difficult to maintain.

It is an object of the invention with regard to the study matter D that an increase in the logical and physical scale is minimized, while maintaining compatibility with existing CPU, a state of bits of data of an arbitrary address on a memory is determined and branch and branch of subroutine are made possible. Further, it is an object thereof to realize promotion of usability of CPU, shortening of the instruction code length and promotion of the processing function.
(Study Problem E)

As study problem E, the inventors have studied to execute reading/writing with regard to a plurality of general purpose registers by single instruction. Further, although matters with regard to the study problem E have already been disclosed in the specification of Japanese Patent Application No. Hei 11-320518 which is a fourth Japanese basic application related to the present application, the content has not publicly known yet. A description will be given of the study problem E.

Information of packet command in data transfer is a set of a plurality of information and is constituted by, for example, 16 bytes which is larger than that of a data processing unit of CPU. CPU reads and analyzes individual information (command, transfer byte number, transfer location). For example, command is constituted by 8 bits, transfer byte number is constituted by 32 bits and transfer location (address) is constituted by 32 bits and these individual information is provided with a data length operable by CPU in many cases.

Further, print data of a printer is larger than the data length operated by CPU. These are a set of individual bits (dots, pixels). In operating these, not an arithmetic processing but a processing of a bit unit is executed and a logical processing is mainly needed. In processing such data, the processing is executed by being divided in plural times in a unit of data operated by CPU. That is, there are repeated reading data from a memory, processing the data on general purpose registers and writing a result to the memory.

The inventors have further studied a mode of utilizing general purpose registers. The packet command or print data is larger than a data unit of a data processing by CPU such as word. The inventors have found that it is convenient in view of achieving high speed formation of data processing when data of such a data unit larger than the data unit of the data processing by CPU can summarizingly read from a register or can be written to a register. The reason is specifically that according to CPU of a so-to-speak von Newmann type, in executing transfer instruction, it is necessary to read an instruction code, decode the instruction code and read/write data and accordingly, rather than repeating in plural times transfer of such data to a register by a unit of byte or word, reading/writing of a plurality of general purpose registers is executed by single instruction to thereby enable to reduce a number of times of reading instruction codes for data transfer.

Further, it has bee found that when combined with a technology of expanding general purpose registers by the ignorable word, it becomes easy to expand general purpose registers thereby and vacate the registers to summarizingly read/write a plurality of the general purpose registers.

Meanwhile, according to CPU disclosed in Japanese Patent Laid-Open No. 263290/1996 previously proposed by the inventors, there is fixed a combination of a plurality of general purpose registers which can be designated to controlling means for controlling executing means for executing instruction, there is provided save/return instruction with regard to stacks of the plurality of general purpose registers and the plurality of general purpose registers are successively saved/returned. This is limited to a processing having an object of preserving a state of the processing before a break point of the processing such as subroutine or exception processing. Therefore, an addressing mode is also limited to predecrement (save)/postincrement (return) of a stack pointer. Further, address calculation is executed by using an address functional unit at each time of save/return of a general purpose register.

When the technology disclosed in Japanese Patent Laid-Open No. 263290/1996 is intended to apply to other addressing mode, for example, according to transfer instruction between 4 of general purpose registers and a memory, in the case of reading of register indirect, it is necessary to form an effective address in a content of an address register by executing an address operation processing of +4, +8 and +12 for each of the general purpose registers of a second one and thereafter. Conversely, in the case of writing, it is necessary to form the effective address in the content of the address register by executing the operation processing of −12, −8 and −4 for each of the general purpose registers except a final one thereof. Therefore, there is needed the operation of the effective address for each of the registers and accordingly, an undesirable inner operational state is brought about.

Further, according to register indirect with displacement, it is necessary that after holding a result of adding the displacement and the content of the address register at inside thereof, there is a need of executing address calculation to the added result similar to the register in direct. These complicate the inner operation of CPU and is liable to increase the logical scale.

Generally, according to a microcomputer, it is preferable in view of the development efficiency to be able to use generally (to be able to deal with a plurality of application fields by one kind of chip). Particularly, with regard to CPU, a software development apparatus such as an assembler or a C compiler and a hardware development apparatus such as in-circuit emulator are needed and accordingly, it is not easy to modify the architecture of a microcomputer, further, in the case of modification, it is preferable that compatibility with existing CPU is maintained, the software and the hardware development apparatus can commonly be utilized and the development efficiency is promoted.

Further, there also is a microcomputer having instruction of continuously transferring a plurality of units of data on a memory such as block transfer instruction in an instruction set. According to such instruction, transfer data is not stored to general purpose registers of CPU and accordingly, the data cannot be operated directly or, at least, the data cannot be operated so fast as for the general purpose registers.

It is an object of the invention with regard to the study problem E to realize shortening of a CPU processing program and high speed formation of a data processing speed by CPU when it is necessary to process data larger than a length processed by CPU, for example, byte, word or long word while minimizing an increase in the logical scale in a data processing apparatus or a data processing system such as a microcomputer. In details, the invention enables to achieve high speed formation of the data processing by reducing a frequency of reading instruction with regard to reading/writing data.

It is other object of the invention with regard to the study problem E to provide a data processing apparatus capable of effectively utilizing software resources of existing CPU, capable of promoting the development efficiency of a new system, capable of appropriating a system development apparatus of existing CPU and capable of swiftly providing a development environment.

It is still other object of the invention with regard to the study problem E to provide a data processing apparatus capable of designating an increase in a number of general purpose registers by software with regard to existing CPU and capable of promoting processing function of CPU by facilitating program formation and efficient formation of register reading and register writing operation by utilizing thereof.

It is other object of the invention with regard to the study problem E to provide a data processing apparatus capable of achieving objects of shortening the CPU processing program and high speed formation of processing by CPU while maintaining compatibility at an object level or maintaining compatibility at the object level when there are present CPU having a wide address space and CPU having a small address space.

The invention with regard to the study problem A through the study problem E is provided with common problem to be resolved in view of expansion of operation function and promotion of usability of the data processing apparatus.

The above-described as well as other objects and new characteristic of the invention will become apparent from the description and the attached drawings of the specification.

A brief explanation will be given of an outline of representative aspects of the invention disclosed in the application as follows.

(Means for Resolving Study Problem A)

A first through a ninth aspect of the invention provide means for resolving the study problem A. As means for resolving the study problem A, register designating information for designating a register is divided in two portions. The two portions are arranged in separate basic units on a basic unit of an instruction code. When one instruction code is made ignorable and the ignorable instruction code is ignored, there is carried out register selecting operation by implicitly assuming predetermined register designating information.

The ignorable instruction code may be constituted by an instruction code which is provided with a field for holding a portion of the register designating information and which does not designate kind of operation. For example, the ignorable instruction code may be made common to that of existing CPU and the ignorable instruction code may be allocated to an undefined word of existing CPU.

There is provided means for holding information of the register designating field included in the ignorable instruction code and when the ignorable instruction is executed, the information of the register designating field included in the ignorable instruction code is stored to the holding means. Further, after finishing to execute the instruction, the holding means is set to a predetermined value in correspondence with the implicit designation.

According to the above-described means, when only an implicitly designatable general purpose register (existing general purpose register) is used, the ignorable instruction code can be ignored and accordingly, the length of the instruction code is not increased. When at least, a conventionally equivalent general purpose register is used, a conventionally equivalent instruction code may be used. By preventing the instruction code length from increasing, the processing speed is not reduced.

By adding the ignorable instruction code, all of general purpose registers can directly be selected by instruction and accordingly, a number of usable general purpose registers can be increased without deteriorating easiness of program. Further, by ensuring a portion of an arbitrary amount of general purpose registers for a desired task or for a desired interruption processing (the portion is not used in other task or processing), there is no need of saving the general purpose registers in the task and the interruption processing and high speed formation is achieved. Further, a number of the general purpose registers ensured for the task or the interruption processing can be made arbitrary and accordingly, it is easy to circulate the general purpose registers used to each other among the task and the processing.

By adding the ignorable instruction code, access to a designatable general purpose register can generally be made faster than access to a memory such as RAM and accordingly, by increasing the number of the general purpose registers, an amount of data capable of being processed at high speed is increased and accordingly, the processing speed of CPU can be promoted. Further, according to a processor having an instruction set of a so-to-speak load store type and incapable of directly operating with regard to content of a memory, by increasing the general purpose registers, an amount of data capable of being processed directly can be increased, further, an access frequency of the memory can be reduced and the processing speed can be promoted.

In the case in which there are present CPU having a wide address space and CPU having a small address space while maintaining compatibility therebetween at an object level, when the ignorable instruction code can be added by CPU having the wide address space, the word can be added also to CPU having lower compatibility and the small address space and accordingly, while maintaining the compatibility at the object level, general purpose registers can be added to CPU having the wide address space and CPU having the small address space. Both of an advantage of maintaining the compatibility at the object level and an advantage of adding the general purpose registers can be enjoyed.

A further detailed mode of the above-described means will be described. A data processing apparatus operated by reading an instruction code and having a plurality of registers (ER0 through ER31) capable of storing data or addresses, includes first instruction code holding means (IR1) for holding an instruction code and second instruction code holding means (IR2), instruction decoding means (DEC) for decoding the instruction code and selecting means (RSEL) for selecting the register. An output of the first instruction code holding means is coupled to the second instruction code holding means, the instruction decoding means and the register selecting means, an output of the second instruction code holding means is coupled to the register selecting means, an output of the instruction decoding means is coupled to the register selecting means and the second instruction code holding means and the output of the instruction decoding means to the second instruction code holding means includes a latch signal (LGRCL) with regard to the second instruction code holding means and a set signal (RSLGR) to a predetermined value. The latch signal with regard to the second instruction code holding means is generated when the instruction decoding means decodes a predetermined instruction code and the set signal to the predetermined value with regard to the second instruction code holding means is generated such that a set operation is executed after a processing of using a register designated by the predetermined instruction code has been finished.

The set signal to the predetermined value with regard to the second instruction code holding means may be generated by the instruction decoding means in response to finishing to execute the instruction. Or, there may further be included data holding means for holding the predetermined value, an output of the data holding means may be coupled to the second instruction code holding means and the second instruction code holding means may be set to a value in accordance with a value of the data holding means in response to generating the set signal to the predetermined value.

(Means for Resolving Study Problem B)

A tenth through a thirty-ninth aspect of the invention provide means for resolving the study problem B. As means for resolving the study problem B, among transfer instruction between existing ones of a memory and registers and operation instruction between existing ones of registers, a plurality of instruction codes are combined, for example, by using a front instruction code for coupling these, operation on the memory is enabled. In sum, when a predetermined front instruction code is added, a plurality of instruction codes successive thereto are interpreted and executed as one instruction. In this case, the one instruction can be defined such that, for example, a processing is not divided and is not disconnected by a factor other than reset or interruption (exception processing) is not received in the midway except a specific factor of reset or the like. In this case, by utilizing latching means which is not freed in view of a program such as a temporary register in CPU in place of a general purpose register or along with the general purpose register, direct operation with regard to data on the memory (or direct data transfer) is enabled. In this case, the direct operation with regard to the data on the memory is an operational processing executed by loading data from a memory to data latching means which is not made to explicit in the instruction code and using the data loaded to the data latching means. Further, the direct data transfer with the memory is a processing for loading data from the memory to data latching means which is not made to explicit in the instruction code and storing data of the data latching means to the memory.

In details, when a transfer instruction code between memory and registers is executed firstly successive to the front instruction code, data transfer is executed between not the general purpose register but the first latching means which is not freed in view of the program such as a temporary register in CPU and the memory. Further, when an operation instruction code between registers is successively executed secondly, a single or a plurality of data in an operation object is read on the first latching means. In this case, the latching means which is not freed in view of the program signifies latching means which cannot be designated by the user in view of the program, a temporary register or a buffer register which is not seen from the user on CPU or a microcomputer. Such a latching means is not freed in view of the program and accordingly, it is not naturally assumed that stored information thereof is saved, in many cases, it is assumed to use thereof in storing an intermediate result of operation and the state of using thereof is finished in executing one instruction on the premise. Therefore, under the premise, when the latching means is used, the saving operation may not be considered at all. In order to guarantee the premise, a consideration is given such that a front instruction code and a predetermined instruction successive thereto are regarded as one instruction and interruption is prevented from entering in the midway and a necessity of saving with regard to the latching means is excluded.

When the second operation instruction code is an instruction code requesting a processing of storing an operation result to a memory, an address of the memory used for the transfer instruction code is stored to separate latching means (second latching means) of a separate temporary register. The operation result of the operation instruction is stored to the first latching means. Successively, a transfer instruction code between memory and registers is generated by the microcomputer per se and with content of the second latching means stored with the address as an address, the content of the first latching means stored with the operation result as data, writing is executed to the memory.

A further explanation will be given. When instruction regarded as one instruction by the front instruction code is instruction for executing operation with regard to data on the memory and data on the general purpose register and storing the result on the general purpose register, the front instruction code, a memory/register transfer instruction code and an operation instruction code are executed, in executing the memory/register transfer instruction code, transfer data is stored not to the general purpose register but to the latching means and the operation instruction code executes operation with regard to data stored to the latching means and data on the general purpose register and the result is stored to the general purpose register.

When the instruction regarded as one instruction by the front instruction code is instruction for executing operation with regard to data on the general purpose register and the data on the memory and storing the result on the memory, the front instruction code, the memory/register transfer instruction code, the operation instruction code and the memory/register transfer instruction code formed at inside thereof are executed, in executing the memory/register transfer instruction code, transfer data is stored not to the general purpose register but the latching means, the operation instruction code executes operation with regard to data stored to the latching means and data on the general purpose register and stores the result to the latching means. The memory/register transfer instruction code executes writing to the memory with the content of the latching means stored with the address as an address and with the content of the latching means stored with the operation result as data. Also in the case of executing operation with regard to data on one memory as in increment, the operation is executed similarly thereto. Further, in executing the memory/register transfer instruction code, in other words, in the midst of processing by instruction regarded as one instruction, a change in a flag reflecting the operation result is restrained and a state of the flag of an operation result by previous operation instruction is held. The reason is as follows. In executing the operation instruction code, there is a case in which a reference must be given to the state reflected to the flag by executing the previous operation instruction and in that case, there is brought about inconvenience in the case of allowing all of change in the state of the flag even by executing the transfer instruction or the transfer instruction code. In further details, the inconvenience is prevented from being brought about by a difference between the change in the flag as the relevant instruction and a change in the flag of the transfer instruction per se. Specifically, when the operation is arithmetic operation, an overflow flag produced by a result of the arithmetic operation is prevented from being cleared by the transfer instruction code.

When the instruction regarded as one instruction by the front instruction code is instruction for executing operation by using two of data on the memory and storing the operation result on the memory, the front instruction code, the first and the second memory/register transfer instruction codes, the operation instruction code and the memory/register transfer instruction code formed at inside thereof are executed, in executing the first and the second memory/register transfer instruction codes, transfer data is stored not to the general purpose register but to the latching means and the operation instruction code executes operation with regard to data stored to the latching means and stores the result to the latching means. The memory/register transfer instruction code executes writing to the memory with the content of the latching means stored with the address as an address and with the content of the latching means stored with the operation result as data.

Meanwhile, when the instruction regarded as one instruction by the front instruction code is instruction for transferring data on the memory to a separate memory, the front instruction code, the memory/register transfer instruction code and the memory/register transfer instruction code are executed, in executing the memory/register transfer instruction code, transfer data is stored not to the general purpose register but to the latching means and the memory/register transfer instruction code executes writing to the memory with the content of the latching means stored with the operation result as data.

When the instruction regarded as one instruction by the front instruction code is operation with regard to immediate data and data on the memory, the instruction can be made similar to instruction for generally executing operation with regard to data on the general purpose register and data on the memory and storing the result on the memory.

When the instruction regarded as one instruction by the front instruction code is instruction for transferring immediate data to the memory, the front instruction code, the immediate/register transfer instruction code and the memory/register transfer instruction code are executed, in executing the immediate/register transfer instruction code, immediate data is stored not to the general purpose register but to the latching means and the memory/register transfer instruction code executes writing to the memory with the content of the latching means stored with the operation result as data.

When a plurality of instruction codes are combined and executed as a series thereof, an undesirable processing such as interruption is prohibited from being inserted between the respective instruction codes. A control signal therefor may be generated by decoding the front instruction code. The front instruction code can be provided with other information such as data size.

When the memory/register transfer instruction code is executed successive to the front instruction code, the memory/register transfer instruction code is not necessarily an instruction code quite the same as an instruction code of independent memory/register transfer instruction but as described in the eleventh and the twenty-ninth aspect of the invention, only bits signifying a method of designating a memory as in the addressing mode are made common and other bits may pertinently be changed.

According to the above-described means, the instruction codes of the transfer instruction between a memory and registers and the operation instruction between registers are existing ones and accordingly, single ones of the instruction codes are operated conventionally similarly and execution of existing instruction is not hampered. Further, when only existing instruction is used, existing software resources can effectively be utilized.

The above-described operational function can be expanded without deteriorating the merit provided to existing CPU such as the general purpose register system or the load store architecture.

The above-described front instruction code can commonly be used regardless of the addressing mode or the content of operation and accordingly, added instruction codes can be minimized. Further, by providing other information of data size or the like to the front instruction code, the overall instruction code length can be shortened.

In reading data from the memory to the latching means, the operation and writing to the memory based on the content of the latching means, only registers used differ from those of existing instruction and accordingly, existing instruction operation can be utilized without being modified significantly. Thereby, the increase in the logical scale caused by enabling the operation with regard to the data on the memory can be minimized.

By enabling to operate directly with regard to the data on the memory, an amount of data capable of being processed directly can be increased, further, saving/returning of the general purpose registers can be dispensed with and the processing speed can be promoted.

In the case of instruction for executing operation with regard to the data on the memory and the data on the general purpose registers and storing the result on the general purpose registers, since the front instruction code is included, the processing time is larger than total processing time in the case of individually executing the memory/register transfer instruction code and the operation instruction code, however, the total processing time can be improved since saving or returning of the general purpose registers is not executed. Further, in the case of instruction for executing operation with regard to data on the memory and data on the general purpose registers and storing the result on the memory, the register/memory transfer instruction code is generated at inside thereof, reading of the instruction code is not executed, the memory address calculated in reading can be reutilized by utilizing separate latching means (second latching means) and accordingly, the processing time can be shortened more than the total processing time in the case of individually executing the memory/register transfer instruction code, the operation instruction code and the register/memory transfer instruction code.

When there are present CPU having a wide address space and CPU having a small address space while maintaining compatibility at the object level, by adding the front instruction code and combining existing transfer instruction and operation instruction by CPU having the wide address space, direct operation with regard to data on the memory can be executed even by CPU having lower compatibility and the small address space. In other words, the data on the memory can directly be operated even by CPU having the wide address space and CPU having the small address space by the same method while maintaining compatibility at the object level. Both of the advantage by maintaining the compatibility at the object level and the advantage capable of directly operating the data on the memory can be enjoyed.

New instruction function is realized by combining existing instruction and accordingly, in further expansion and further high speed formation of the instruction set, a new problem is hardly posed with regard to existing CPU. In other words, when a technology of executing further expansion of the instruction set or further high speed formation thereof is present (invented) with regard to existing CPU, similar technology can be applied to CPU enlarging the instruction set with regard to existing CPU by applying the invention. The above-technology may be applied to respectives of existing instruction used for realizing new instruction function and may be recombined. Operation of the front instruction code is simple, further, by executing operation similar to existing instruction, alteration is facilitated.

Further, new instruction function is realized by combining existing instruction and accordingly, an interface for emulation can be made common with that of existing CPU and accordingly, the hardware of the same emulator can commonly be utilized. By making common the hardware of the emulator, the development environment can be prepared at an early stage, further, resources necessary for development of the emulator can be minimized.

(Means for Resolving the Study Problem C)

A fortieth to a sixty-second aspect of the invention provide means for resolving the study problem C. As means for resolving the study problem C, (1) with regard to a register constitution or a combination of instruction and an addressing mode or both of them, assume a plurality of data processing apparatus, for example, a plurality of lower CPU's including different instruction sets in which one of them does not incorporate other thereof. In this case, there is constituted and provided higher CPU having an instruction set incorporating any of lower CPU's with regard to the plurality of lower CPU's in which one of them does not incorporate an instruction set of other thereof.

In the development, there is developed higher CPU in which constitutions of general purpose registers are expanded and a combination of instruction and an addressing mode is expanded with regard to existing CPU (one of the above-described lower CPU's). The lower CPU is provided with a constitution of a subset or an instruction set of the higher CPU. A description will be given later of expansion of the general purpose register and expansion of the combination of instruction and an addressing mode.

Further, other of the lower CPU is realized by a mode of a separate subset of the higher CPU.

By providing a plurality of lower CPU's including different instruction sets and pertinent higher CPU as described above, request on a software of an application field can be met, various preferences of the user can be met, further, also in view of a program by assembly language of separate CPU, CPU having a comparatively proximate instruction set can be made selectable and shift to higher CPU can be facilitated.

By preparing higher CPU having an instruction set incorporating any of CPU's with regard to a plurality of lower CPU's in which one of them does not incorporate an instruction set of other thereof, while enabling effective utilization of software resources, there can be prepared CPU promoting performance/function. By the effective utilization of software resources, the development efficiency of software development of the user can be promoted.

In the development, by developing higher CPU expanding general purpose registers as well as a combination of instruction and an addressing mode with regard to existing lower CPU's and developing separate lower CPU having the subset, while minimizing the increase in the logical scale of higher CPU, the performance, the function and the usability can be promoted, development of the separate lower CPU is facilitated and the development efficiency can be promoted. In the case of developing CPU still higher than the higher CPU, when the compatibility with the higher CPU is maintained, the compatibility with the plurality of CPU's can be automatically maintained by maintaining compatibility with the higher CPU and accordingly, while realizing effective utilization of software resources, CPU achieving promotion of future function or performance becomes easy to realize.

A program developed for lower CPU can be utilized by higher CPU according to the invention at least at a level of source program (description level in assembly language). Further, in this case, lower CPU designates CPU in which a register constitution thereof as well as an instruction set thereof are incorporated in a register constitution as well as an instruction set of CPU such as higher CPU according to the invention.

Further, in order to realize upper compatibility at an object program level, there may be prepared operational modes for switching a bit number of an effective address and unit sizes of vectors and stacks in accordance with a mode of utilizing the register, for example, a maximum mode and a minimum mode. In the minimum mode, CPU operates quite similar to at least one of lower CPU's. In the maximum mode, CPU is operated as higher CPU by a maximum function provided thereto.

(2) In order to expand a general purpose register, as described in the means with regard to the study problem A, register designating information for designating registers is divided into two portions. The two portions are arranged to separate basic units on the basic unit of the instruction codes. When one of the instruction codes is made ignorable and when the ignorable instruction code is ignored, the register selection operation is executed by implicitly assuming predetermined register designating information.

(3) In order to expand a combination of instruction and an addressing mode, as described in the means with regard to the study problem B, among existing ones of transfer instruction between a memory and registers and operation instruction between registers, a plurality of the instruction codes are combined, for example, a front instruction code for coupling these is used to thereby enable operation directly using data of a memory. In sum, when the predetermined front instruction code is added, a plurality of instruction codes successive thereto are interpreted and executed as one instruction.

(4) In order to realize CPU having a wide address space and a reduced logical scale, there is provided a program counter having a bit length in correspondence with a total of the address space, the total or at least a large portion of address space is made linearly usable for a program, an addressing mode of data transfer is reduced to a degree capable of dealing with data of a comparatively small scale or a data size of transfer data is limited and in accessing data, usable address space is reduced and such an address space is divided in two.

According to the above-described, by providing a program counter having a bit length in correspondence with a total of the address space, for a program, the total or at least a large portion of the address space is linearly made usable, an addressing mode of data transfer is reduced to a degree dealing with data having a comparatively small scale or the data size of transfer data is limited and the logical scale can be reduced without deteriorating usability in a desired application field.

In accessing data, by reducing usable address space and dividing such an address space in two, compatibility in view of address space with higher CPU can be maintained without deteriorating usability and by previously preparing an operational mode of switching a method of calculating an effective address for upper CPU, compatibility in view of software can be maintained.

By widening an address space for a program, an aptitude with regard to programming using high-level language such as C language can be promoted. Further, by making a stack pointer switchable, undesirable increase in a capacity of a stack in controlling a task such as OS can be prevented. Even in a single chip microcomputer or a microcomputer system operated by using only a built-in memory, high-level language or OS is easily made usable and the development efficiency of software of the user can be promoted.

(5) Further, with regard to a development apparatus, there is prepared a software development apparatus with regard to an instruction set of the higher CPU, further, the software development apparatus is commonly made usable with regard to a plurality of CPU's in which one of them does not incorporate an instruction set of other thereof to thereby enable the user to select CPU.

On the software development apparatus, a plurality of kinds of description of general purpose register having a general function such as assembly language are allowed.

With regard to an emulator, an interface for emulation of a processor for emulation to be mounted is made common. In order to analyze CPU, there is provided means for selecting object CPU on the emulator. Particularly, object CPU of a deassembler is made selectable.

By preparing a software development apparatus with regard to an instruction set of the higher CPU, further, making the software development apparatus commonly usable to a plurality of CPU's in which one of them does not incorporate an instruction set of other thereof and enabling the user to select CPU, the development efficiency of the software developing apparatus can be promoted. For the user, even when a plurality of CPU's as described above are used, since the software development apparatus is common, undesirable expense is not brought about. Shift from one CPU to other CPU in the plurality of CPU's as described above is facilitated and the development efficiency can be promoted.

Further, interface for emulation can be made common for upper CPU and lower CPU, further, by developing a logical circuit for emulation of upper CPU, the logical circuit can also be utilized by lower CPU and development efficiency thereof including a processor for emulation can be promoted. Further, hardware of the same emulator can be made common, thereby a development environment can be prepared swiftly, further, resources necessary for development of the emulator can be minimized. With regard to the deassembler mounted to the emulator, by developing the deassembler for higher CPU and providing means for selecting object CPU on the emulator, substantially one deassembler is used and accordingly, the development efficiency can further be promoted.

(6) The above-described means with regard to the study problem C can be rearranged from view points of compatibility, a processor for emulation, an emulator, a software development apparatus, a data processing apparatus as in higher CPU and a data processing apparatus as in lower CPU.

(6-1) A data processing apparatus from a view point of compatibility executes instruction in accordance with a predetermined procedure, can execute an instruction code the same as an instruction code of a first separate microcomputer by incorporating an instruction executing function of a first separate data processing apparatus and can execute an instruction code the same as an instruction code of a second separate data processing apparatus by incorporating an instruction executing function of the second separate data processing apparatus. There is included instruction executing means by which with regard to both or either one of operand designation and operation designation which are not incorporated in the instruction executing function of the first separate data processing apparatus and which are incorporated in the instruction executing function of the second separate data processing apparatus, instruction combined with a plurality of the designations is executed, and with regard to both or either one of operand designation and operation designation which are not incorporated in the instruction executing function of the second separate data processing apparatus and which are incorporated in the instruction executing function of the first separate data processing apparatus, instruction combined with a plurality of the designations is executed.

The operand designation is a designation with regard to, for example, operation of an effective address, a general purpose register or an address space.

When the data processing apparatus is switchably provided with a first operational mode and a second operational mode having different bit numbers of effective addresses and different bit sizes of vectors and stacks, the bit number of the effective address and the unit sizes of the vector and the stack in the first operational mode are equivalent to those of the first separate data processing apparatus. The bit number of the effective address and the unit sizes of the vector and the stack in the second operational mode are equivalent to those of the second separate data processing apparatus.

A data processing apparatus from still other view point paying attention to the compatibility is a data processing apparatus for executing instruction in accordance with a predetermined procedure, can utilize a total of an area or the area divided in two in holding data information, further, is provided with a plurality of general purpose registers capable of being utilized also in holding address information by a bit number larger than a bit number on the lower side divided in two. The instruction executing means incorporates the instruction executing function of the first separate data processing apparatus such that a code of instruction having a bit number the same as that of a code of instruction of the first separate data processing apparatus having a predetermined plurality of the general purpose registers in correspondence with the bit number on the lower side divided in two can be executed and thereafter executes instruction utilizing the total of the general purpose registers dividable in two, further, incorporates the instruction executing function of the second separate data processing apparatus such that an instruction code having a bit number the same as that of a code of instruction of the second separate data processing apparatus having a number smaller than the predetermined plurality of the general purpose registers dividable in two can be executed.

According to a view point of a method of developing a data processing apparatus paying attention to the compatibility, a code of undefined instruction in the first data processing apparatus is made a front instruction code, the front instruction code changes the definition of the instruction code of the first data processing apparatus successive thereto and with regard to both or either one of operand designation and operation designation which are not defined in the first data processing apparatus, the front instruction code defines instruction combined with a plurality of the designations, to thereby realize instruction of the second data processing apparatus having instruction incorporating instruction of the first data processing apparatus. Instruction of the third data processing apparatus is realized by a portion of instruction of the second data processing apparatus.

The front instruction code makes exchangeable designation of a general purpose register designated by, for example, an instruction code successive thereto. Further, a separate front instruction code defines operation of data on the memory by a transfer instruction code successive thereto and two or more of instruction codes in a code of separate transfer instruction and a code of separate operation instruction.

(6-2)

According to a view point of a processor for emulation, there is constituted a processor for emulation including the data processing apparatus explained in view of the compatibility and emulation interface such that execution of instruction of the first and the second separate data processing apparatus can be replaced by execution of instruction of the data processing apparatus.

(6-3)

According to a view point of an emulator, there is constituted an emulator mounted with the processor for emulation such that the processor for emulation for executing a user program includes an emulation program area capable of storing a control program for controlling an inner state thereof and a control processor for storing the control program in the emulation program area.

The processor for emulation can substitute for execution of instruction of the first and the second separate data processing apparatus in accordance with an inner set state following the control program.

(6-4)

According to a view point of a software development apparatus (cross software), there is constituted a software development apparatus provided with means for selecting a data processing apparatus constituting an object of a program to be formed such that a program of the data processing apparatus, the first separate data processing apparatus or the second separate data processing apparatus explained on the view point of the compatibility can be formed.

(6-5)

According to a view point of higher CPU, a data processing apparatus is provided with a plurality of registers capable of storing data or addresses and is operated by reading an instruction code and decoding the instruction code by controlling means. The instruction code is constituted by a basic unit and register designating information for designating the registers can be held by being divided into a plurality of instruction code basic units. A transfer instruction code for executing data transfer between a memory and the registers and an operation instruction code executing operation with regard to data on the registers are included in an instruction set. The controlling means selects the registers based on a result of decoding the register designating information held by the instruction code and when the front instruction code having a divided one of the register designating information is ignored, the controlling means selects the registers by implicitly assuming predetermined register designating information in place of the ignored register designating information, further, successively reads the front instruction code, the transfer instruction code and the operation instruction code and interprets them as one instruction and executes direct operation with regard to the data on the memory.

The direct operation with regard to the data on the memory is an operation processing executed by, for example, loading data from the memory to a data latching means which is not made to explicit in the instruction code and using the loaded data for the data latching means.

Further, a data processing apparatus from other view point of upper CPU, is provided with a plurality of registers capable of storing data or addresses and is operated by reading an instruction code and decoding the instruction code by controlling means. The instruction code is constituted by a basic unit and register designating information for designating the registers can be held by being divided into a plurality of instruction code base units. A transfer instruction code for executing data transfer between a memory and the registers is included in an instruction set. The controlling means selects the registers based on a result of decoding the register designating information held by the instruction code and when the front instruction code having a divided one of the register designating information is ignored, the controlling means selects registers by implicitly assuming predetermined register designating information in place of the ignored register designating information, further, successively reads the front instruction code, the transfer instruction code and other transfer instruction code, interprets them as one instruction and executes direct data transfer with the memory.

The direct data transfer with the memory is a processing of loading data from the memory to the data latching means which is not made to explicit in the instruction code and storing the data of the data latching means to the memory.

(6-6)

A data processing apparatus according to a view point of lower CPU is provided with program counting means having a bit number in correspondence with a bit number of an address space, a plurality of general purpose registers capable of utilizing a total of an area or the area divided in two in holding data information and capable of being utilized also for holding address information by a bit number larger than a bit number of one of the area divided in two and instruction executing means. The instruction executing means can execute instruction of utilizing a total of the general purpose registers for holding data information and data transfer instruction between the general purpose registers and other storing apparatus, can make a bit number of transfer data of the data transfer instruction equal to or smaller than a bit number of the one of the area divided in two of the general purpose register, further, makes a portion of an addressing mode for designating data on the address space effective at a portion on the address space divided in a plural number.

One of the portions divided in a plural number on the address space, is made to include a vector for designation a starting address of executing instruction and other portion thereof can map an address of readable and writable separate storing apparatus.

(Means for Resolving the Study Problem D)

A sixty-third through a seventy-second aspect of the invention provide means for resolving the study problem D. As means for resolving the study problem D, according to instruction for executing branch in accordance with a state of bits of data on a memory, a field prescribing operation (operation field) is divided in a plural number and is realized by a separate word in view of a basic unit of an instruction code and such a word is made common with an instruction code of separate instruction capable of being used independently or a portion of the instruction code of the separate instruction. A first word of such an instruction code executes data transfer between latching means which is not freed in view of a program such as a temporary register and the memory. A second word executes branch by determining a desired state of bits of the latching means. The latching means such as a temporary register is provided with means for determining a designated state of bits and is made to be able to determine a predetermined state of bits without being read to an ALU. The first word of the instruction code is made to prohibit a change in a condition code and prohibit an interrupted exception processing at a finishing time point thereof.

According to a first example, a transfer instruction code (first word) for executing data transfer between lathing means which is not freed in view of a program such as a temporary register and a memory and a condition branch instruction code (second word), are combined, in executing the condition branch instruction successive to the transfer instruction code, the condition is constituted by a bit number and the state of bits in place of the condition code to thereby enable branch in accordance with the state of bits of the data on the memory. Further, the transfer instruction code may be common to a portion of bit test instruction.

According to other view point of the first example, a transfer instruction code for executing data transfer between latching means which is common to an instruction code such as bit test instruction and is not freed in view of a program such as a temporary register and the memory and an instruction code of the condition branch instruction are combined to thereby realize branch instruction for executing branch by determining a predetermined state of bits of data on an address space.

According to a second example, there is provided a front instruction code for combining an existing instruction code for executing transfer between a memory and registers and condition branch instruction and coupling these to thereby enable to execute branch in accordance with a state of bits of data on the memory. That is, when memory/register instruction is executed successive to the front instruction code, data transfer is executed between not the general purpose register but latching means which is not freed in view of a program such as a temporary register in CPU and the memory.

The second example can be realized by being made common to a method of realizing instruction which is disclosed in previous application by the inventors which has not been publicly known yet and in which a source is made the data on the memory and by replacing an operation instruction code by a branch instruction code.

In details, in the case of instruction for executing operation with regard to data on the memory and data on a general purpose register and storing the result on the general purpose register, a front instruction code, a memory/register transfer instruction code and an operation instruction code are executed, in executing the memory/register transfer instruction code, transfer data is stored not to the general purpose register but to latching means and the operation instruction code executes operation with regard to data stored to the latching means and the data on the general purpose register and stores the result to the general purpose register.

In the case of instruction executing operation with regard to the data on the general purpose register and data on the memory and storing the result on the memory, the front instruction code, the memory/register transfer instruction code, the operation instruction code and a memory/register transfer instruction code formed at inside thereof are executed, in executing the memory/register transfer instruction code, the transfer data is stored not to the general purpose register but to the latching means. The operation instruction code executes operation with regard to data stored to latching means and the data on the general purpose register and stores the operation result to the latching means. The memory/register transfer instruction code executes writing to the memory with the content of the latching means stored with the address as an address and with the content of the latching means stored with the operation result as data. Also in the case of executing operation with regard to data on one memory as in increment, operation similar thereto is executed. Further, in executing the memory/register transfer instruction code, a change in a flag is restrained and a change in the flag of the operation result is held.

In the case of instruction for executing operation with regard to data on two memories and storing the result on the memories, the front instruction code, a first and a second memories/register transfer operation code, the operation instruction code and a memory/register transfer instruction code formed at inside thereof are executed, in executing the first and second memory/register transfer instruction codes, transfer data is stored not to the general purpose register but to the latching means. The operation instruction code executes operation with regard the data stored to latching means and stores the result to the latching means. The memory/register transfer instruction code executes writing to the memory with the content of the latching means stored with the address as an address and the content of the latching means stored with the operation result as data.

Meanwhile, in the case of instruction for transferring the data on the memory to a separate memory, the front instruction code, the memory/register transfer instruction code and the memory/register transfer instruction code are executed, in executing the memory/register transfer instruction code, the transfer data is stored not to the general purpose register but to the latching means and the memory/register transfer instruction code executes writing to the memory with the content of the latching means stored with the operation result as data.

In the case of executing operation with regard to immediate data and the data on the memory, the instruction can be made similar to the instruction of executing generally operation with regard to the data on the general purpose register and the data on the memory and storing the result on the memory.

In the case of instruction for transferring immediate data to the memory, the front instruction code, an immediate/register transfer instruction code and the memory/register transfer instruction code are executed, in executing the immediate/register transfer instruction code, immediate data is stored not to the general purpose register but to the latching means and the memory/register transfer instruction code executes writing to the memory with the content of the latching means stored with the operation result as data.

According to the above-described means, instruction codes of the first word and the second word (condition branch instruction) are existing ones and accordingly, in the case of a single one thereof, operation is executed conventionally similarly and execution of existing instruction is not hampered. Further, when only the existing instruction is used, existing software resources can effectively be utilized. The merit of existing CPU such as general purpose register or the load store architecture is not deteriorated. When there are a plurality of kinds of bit lengths of absolute addresses or bit lengths of displacements respectively in the first word and the second word (condition branch instruction), these can be combined by the same method. By enabling these combinations, restriction in view of a program is dispensed with and the usefulness can be promoted. Further, by the same method, a combination with subroutine branch instruction is made possible and the usefulness can be promoted.

By providing means for determining a designated state of bits to the latching means such as a temporary register and enabling to determine a predetermined state of bits without reading to ALU, the means can be realized without modifying overall operation of the condition branch instruction and accordingly, a portion to be modified is reduced and an increase in the logical scale can be minimized.

The front instruction code can commonly be used regardless of an addressing mode or content of operation and accordingly, added instruction codes can be minimized. Further, by providing other information of data size or the like to the front instruction code, the overall instruction code length can be shortened.

Reading of data from the memory to the latching means, the operation and writing to the memory based on the content of the latching means differ from those of existing instruction only in registers to be used and accordingly, existing instruction operation can be utilized without being changed significantly. Thereby, the increase in the logical scale by enabling operation with regard to the data on the memory can be minimized.

When there are present CPU having a wide address space and CPU having a small address space while maintaining compatibility at the object level, by realizing the instruction in CPU having the wide address space, operation with regard to data on the memory can be executed even by CPU having lower compatibility and the small address space. In other words, the operation with regard to data on the memory can be executed even by CPU having the wide address space and CPU having the small address space by the same method while maintaining the compatibility at the object level. Both of the advantage by maintaining the compatibility at the object level and the advantage of enabling operation with regard to the data on the memory can be enjoyed.

Existing instructions are combined and new instruction function is realized and accordingly, in further expanding an instruction set or further high speed formation, a new problem is hardly posed with regard to existing CPU. In other words, when a technology of expanding further the instruction set or executing further high speed formation is present or newly developed with regard to existing CPU, by applying the invention, similar technology can be applied to CPU enlarging the instruction set compared with existing CPU. Respectives of existing instruction used for realizing new instruction function may be applied with the technology and may be combined again. Operation of the front instruction code is simple and can be modified easily by constitution operation by operation similar to existing instruction.

Further, existing instruction is combined, and new instruction function is realized and accordingly, existing CPU and interface for emulation can be made common and accordingly, hardware of the same emulation can be made common. By making common the hardware of the emulator, the development environment can be prepared swiftly and resources necessary for developing the emulator can be minimized.

(Means for Resolving Study Problem E)

A seventy-third aspect through an eighty-eighth aspect of the invention provides means for resolving the study problem E. As means with regard to the study problem E, (1) a data processing apparatus includes in an instruction set, transfer instruction for fixing a combination of a plurality of general purpose registers which can be designated to controlling means for controlling executing means for executing instruction for executing data transfer between the plurality of general purpose registers having the fixed combination and an address on an address space. Thereby, even data larger than a bit length of a general purpose register can be dealt with easily, the usefulness is promoted and in reading/writing data, a frequency of reading instruction is reduced and high speed formation of data processing can be achieved.

A calculation of an effective address of the transfer instruction by an address functional unit is executed only once and an address buffer is provided with an incrementing or decrementing function and a function of holding an increment result by which instruction operation is simplified, common formation thereof with control of existing transfer instruction can be achieved, the increase in the logical scale of an instruction decoder can be minimized. Further, the means can be utilized commonly to various addressing modes.

(2) In the case in which the general purpose register is dividable and there is a difference in view of function between divided portions thereof, transfer instruction using a total of the general purpose register and transfer instruction using a divided portion thereof may be provided. Thereby, in data processing, transfer with the general purpose register which is easy to use can be realized and accordingly, the processing is facilitated and high speed formation can be provided.

(3) In the case in which a number of states for executing operation instruction with regard to the general purpose registers differ according to respective general purpose registers, there may be provided transfer instruction between a plurality of general purpose registers having a predetermined combination and other plurality of general purpose registers. At this occasion, when the general purpose registers are increased, a register designating field for designating the general purpose registers is divided into two portions, the two portions are arranged to separate words in view of a basic unit of an instruction code, one word is made ignorable and when the ignorable word is ignored, predetermined register designating information may be designated implicitly. The ignorable word is made to be provided with only a portion of the register designating field and kind of operation is not designated thereto. When there is provided means for holding the register designating field included in the ignorable word and the ignorable word is executed, the register designating field included in the ignorable word is stored to the holding means. Further, in finishing to execute instruction, the holding means is set to a predetermined value in correspondence with the implicit designation. A word which cannot be ignored may be made common to existing CPU and the ignorable word may be allocated to undefined word of existing CPU.

When only a general purpose register which can be designated implicitly (for example, general purpose register of existing lower CPU) is used, the ignorable word can be ignored and accordingly, instruction codes are not increased. By preventing the instruction codes from increasing, the processing speed is not reduced.

By adding the ignorable word, all of general purpose registers can directly be selected by instruction and accordingly, a portion of deteriorating easiness of a program is inconsiderable. Further, by ensuring a portion of an arbitrary amount of general purpose registers in respective desired task or desired interruption processing (the portion is not used in other task or processing), there is no need of saving the general purpose registers in the task or the interruption processing and high speed formation is achieved. Further, a number of general purpose registers ensuring the task or the interruption processing can be made arbitrary and accordingly, it is easy to circulate general purpose registers used to each other among the task and the processing.

By adding the word, access to designatable general purpose registers can generally be made faster than access to memory such as RAM and accordingly, a number of general purpose registers is increased and transfer between a plurality of general purpose registers and a memory can be executed at high speed by which the processing speed of CPU can be promoted. Further, according to a processor having an instruction set of a so-to-speak load store type and incapable of executing operation directly with regard to the content of the memory, an amount of data capable of executing direct processing can be increased, further, access to the memory can be made fast and the processing speed can be promoted.

(4) In the case in which there are present CPU having a wide address space and CPU having a small address space while maintaining compatibility at the object level, in CPU having the wide address space, there are provided the transfer instruction with regard to a general purpose register in correspondence with address space and the transfer instruction with regard to a general purpose register having a size in correspondence with the address space of CPU having the small address space (for example, 16 bits ).

In the case in which there are present CPU having the wide address space and CPU having the small address space while maintaining the compatibility at the object level, by providing the transfer instruction with regard to the general purpose register having the size in correspondence with the address space (for example, 32 bits) in CPU having the wide address space and the transfer instruction with regard to the general purpose register having the size in correspondence with the address space (for example, 16 bits) in CPU having the small address space, the transfer instruction having the latter size can easily be realized even by CPU having lower compatibility and the small address space. In other words, there can be realized the transfer instruction of a plurality of general purpose registers even in CPU having the wide address space and CPU having the small address space while maintaining the compatibility at the object level by the same method. Both of the advantage by maintaining the compatibility at object level and the advantage by adding the transfer instruction can be enjoyed.

BRIEF DESCRIPTION OF THE DRAWINGS

FIG. 3 is an explanatory view showing a constitution of general purpose registers and control registers built in CPU;

FIG. 7 is an explanatory view showing a method of calculating an effective address in a maximum mode of higher CPU 2 along with FIG. 8;

FIG. 8 is an explanatory view showing the method of calculating the effective address in the maximum mode of higher CPU 2 along with FIG. 7;

FIG. 9 is a format diagram showing an example of an instruction format of machine language of CPU;

FIG. 10 is an explanatory view exemplifying a detailed instruction format of transfer instruction with regard to a memory of CPU;

FIG. 11 is an explanatory view exemplifying modes of a front instruction code, EA1, EA2 and operation which do not use immediate as an instruction format of direct operation instruction with regard to the memory data;

FIG. 12 is an explanatory view exemplifying modes of a front instruction code, EA1, EA2 which do not use immediate as an instruction format of direct transfer instruction with regard to the memory data;

FIG. 13 is an explanatory view exemplifying modes of a front instruction code, EA2, operation (immediate) which use immediate as an instruction format of direct operation instruction with regard to memory data;

FIG. 14 is an explanatory view exemplifying modes of a front instruction code, EA2, transfer (immediate) which use immediate as an instruction format of direct transfer instruction with regard to memory data;

FIG. 16 is an explanatory view showing a combination of addressing modes of CPU with regard to data transfer instruction;

FIG. 17 is an explanatory view showing a combination of addressing modes of CPU with regard to addition instruction;

FIG. 19 is an explanatory view showing a portion of a selection logic of the register selector by logical description along with FIG. 20;

FIG. 20 is an explanatory view showing a portion of a selection logic of the register selector by logical description along with FIG. 19;

FIG. 21 is an explanatory view showing an example of a selection logic of the register selector with regard to a register capable of being used also for a stack pointer by logical description along with FIG. 22;

FIG. 22 is an explanatory view showing the example of the selection logic of the register selector with regard to the register capable of being used also for a stack pointer by logical description along with FIG. 21;

FIG. 23 is an explanatory view of logical description exemplifying a decode logic of a transfer instruction code (mov) included in an instruction decoder along with FIG. 24 and FIG. 25;

FIG. 24 is an explanatory view of logical description exemplifying the decode logic of the transfer instruction code (mov) included in the instruction decoder along with FIG. 23 and FIG. 25;

FIG. 25 is an explanatory view of logical description exemplifying the decode logic of the transfer instruction code (mov) included in the instruction decoder along with FIG. 23 and FIG. 24;

FIG. 26 is an explanatory view showing a decode logic of an operation instruction code (exe) included in the instruction decoder along with FIG. 27;

FIG. 27 is an explanatory view showing the decode logic of the operation instruction code (exe) included in the instruction decoder along with FIG. 26;

FIG. 28 is an explanatory view showing a decode logic of an instruction code (mov. st) included in the instruction decoder and executing an operation equivalent to write type transfer instruction formed at inside thereof along with FIG. 29 and FIG. 30;

FIG. 29 is an explanatory view showing the decode logic of the instruction code (mov. st) included in the instruction decoder and executing the operation equivalent to the write type transfer instruction formed at inside thereof along with FIG. 28 and FIG. 30;

FIG. 30 is an explanatory view showing the decode logic of the instruction code (mov. st) included in the instruction decoder and executing the operation equivalent to the write type transfer instruction formed at inside thereof along with FIG. 28 and FIG. 29;

FIG. 39 is an explanatory view showing other example of logical description with regard to a portion of a decode logic of an operation instruction code (exe) included in an instruction decoder DEC along with FIG. 40 and FIG. 41;

FIG. 40 is an explanatory view showing the other example of the logical description with regard to the portion of the decode logic of the operation instruction code (exe) included in the instruction decoder DEC along with FIG. 39 and FIG. 41;

FIG. 41 is an explanatory view showing the other example of the logical description with regard to the portion of the decode logic of the operation instruction code (exe) included in the instruction decoder DEC along with FIG. 39 and FIG. 40;

FIGS. 44a,b are an explanatory view showing an example of a list outputted by an assembler of CPU;

FIG. 46 is an explanatory view exemplifying a trace list by an emulator for CPU;

FIG. 54 is an explanatory view exemplifying an instruction format of bit test instruction in CPU of FIG. 53;

FIG. 55 is an explanatory view showing an instruction format of bit condition branch instruction in CPU of FIG. 53 along with FIG. 56 and FIG. 57;

FIG. 56 is an explanatory view showing the instruction format of the bit condition branch instruction in CPU of FIG. 53 along with FIG. 55 and FIG. 57;

FIG. 57 is an explanatory view showing the instruction format of the bit condition branch instruction in CPU of FIG. 53 along with FIG. 55 and FIG. 56;

FIG. 58 is an explanatory view exemplifying a combination of instruction codes in other instruction format in consideration of the bit condition branch instruction in CPU of FIG. 53;

FIG. 59 is an explanatory view exemplifying a logical constitution and a branch control logic of a determining circuit of a temporary data register TRD by logical description;

FIG. 60 is an explanatory view exemplifying a logical constitution of an instruction decoder DEC with regard to bit test instruction and a portion of bit condition branch instruction (first word) by logical description along with FIG. 61 and FIG. 62;

FIG. 61 is an explanatory view exemplifying the logical constitution of the instruction decoder DEC with regard to the bit test instruction and the portion of the bit condition branch instruction (first word) by logical description along with FIG. 60 and FIG. 62;

FIG. 62 is an explanatory view exemplifying the logical constitution of the instruction decoder DEC with regard to the bit test instruction and the portion of the bit condition branch instruction (first word) by logical description along with FIG. 60 and FIG. 61;

FIG. 63 is an explanatory view exemplifying a logical constitution of the instruction decoder DEC with regard to a portion of a condition branch instruction by logical description along with FIG. 64 and FIG. 65;

FIG. 64 is an explanatory view exemplifying the logical constitution of the instruction decoder DEC with regard to the portion of the condition branch instruction by logical description along with FIG. 63 and FIG. 65;

FIG. 65 is an explanatory view exemplifying the logical constitution of the instruction decoder DEC with regard to the portion of the condition branch instruction by logical description along with FIG. 63 and FIG. 64;

FIG. 66 is an explanatory view exemplifying a logical constitution of the instruction decoder DEC with regard to the portion of subroutine branch instruction by logical description along with FIG. 67 and FIG. 68;

FIG. 67 is an explanatory view exemplifying the logical constitution of the instruction decoder DEC with regard to the portion of the subroutine branch instruction by logical description along with FIG. 66 and FIG. 68;

FIG. 68 is an explanatory view exemplifying the logical constitution of the instruction decoder DEC with regard to the portion of the subroutine branch instruction by logical description along with FIG. 66 and FIG. 67;

FIG. 69 is an explanatory view exemplifying a logical constitution of the instruction decoder DEC with regard to other operation instruction by logical description along with FIG. 70;

FIG. 70 is an explanatory view exemplifying a logical constitution of the instruction decoder DEC with regard to the other operation instruction by logical description along with FIG. 69;

FIG. 71 is an explanatory view exemplifying a logical constitution of the instruction decoder DEC with regard to still other operation instruction by logical description along with FIG. 72;

FIG. 72 is an explanatory view exemplifying the logical constitution of the instruction decoder DEC with regard to the still other operation instruction by logical description along with FIG. 71;

FIG. 80 is an explanatory view showing an address space of CPU;

FIG. 81 is an explanatory view exemplifying a function of transfer instruction (MOVM) of a plurality of general purpose registers;

FIG. 83 is an explanatory view exemplifying a front instruction code (front instruction code for instruction expansion) showing instruction such as the transfer instruction (MOVM) of the plurality of general purpose registers;

FIG. 88 is an explanatory view showing a portion of a control logic of a decoder with regard to transfer instruction (MOV&MOVM instruction) of a word size between registers by logical description;

FIG. 89 is an explanatory view showing remaining logical description successive to FIG. 88;

FIG. 90 is an explanatory view showing a portion of a control logic of a decoder with regard to transfer instruction (MOV&MOVM instruction) by 16 bit absolute address by logical description;

FIG. 91 is an explanatory view of remaining logical description successive to FIG. 90;

FIG. 92 is an explanatory view of remaining logical description successive to FIG. 91;

DETAILED DESCRIPTION OF PREFERRED EMBODIMENTS (Embodiments with Regard to Means for Resolving Study Problems A Through C)

Figure 2:
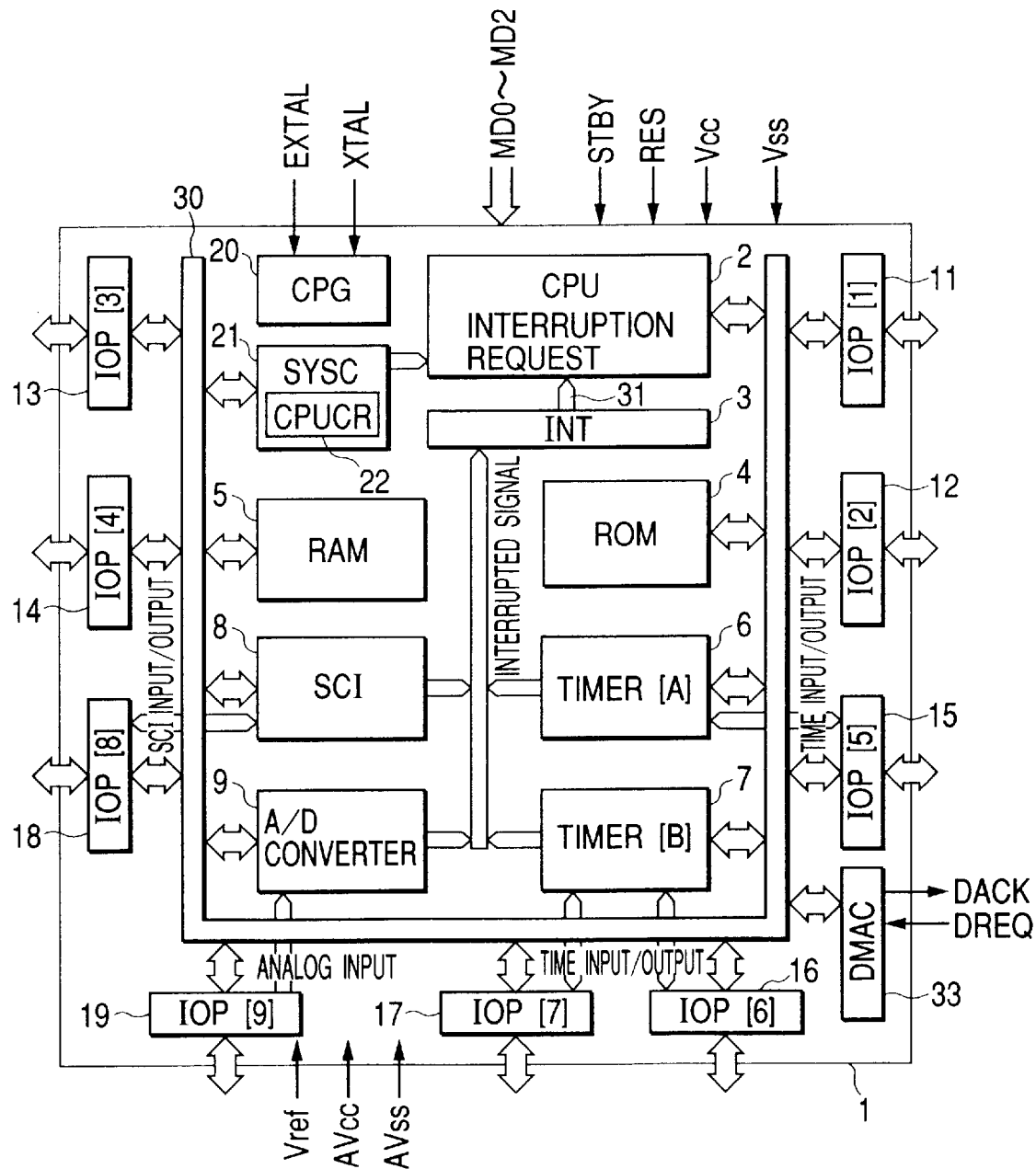
FIG. 2 is a block diagram of the single chip microcomputer constituting an example of a data processing apparatus related to the study problems A, B and C.

First, an explanation will be given of specific examples of the invention with regard to means for resolving the study problems A through C. FIG. 2 shows a single chip microcomputer which is an example of a data processing apparatus according to the invention.

A single chip microcomputer 1 shown by the drawing is constituted by functional blocks or modules of CPU 2 governing total control, an interruption controller (INT) 3, ROM 4 which is a memory for storing processing programs of CPU 2, RAM 5 which is a memory used for an operational area of CPU 2 and temporarily storing data, a timer (A) 6, a timer (B) 7, a serial communication interface (SCI) 8, an A/D converter 9, a first through a ninth input/output port (IOP (1) through IOP (9)) 11 through 19, a clock pulse generator (CPG) 20, a system controller (SYSC) 21 and DMAC (direct memory access controller) 33 and is formed on one semiconductor substrate such as single crystal silicon by a publicly-known semiconductor fabrication technology. CPUCR 22 is a control register arranged to the system controller 21.

CPU 2 fetches instruction mainly from ROM 4, decodes the instruction and executes calculation operation or control operation. DMAC 33 shares a bus 30 along with CPU 2 and can execute data transfer control in place of CPU 2 in accordance with a data transfer control condition set by CPU 2. Notation DREQ designates a data transfer request signal given to DMAC 33 from outside of the microcomputer 1. Upon receiving data transfer request by the data transfer request signal DREQ, DMAC 33 returns a data transfer request acknowledge signal DACK to a request source.

Such a single chip microcomputer 1 is provided with, as power source terminals, input terminals of ground level (Vss), power source voltage level (Vcc), analog ground level (AVss), analog power source voltage level (AVcc), analog reference voltage (Vref). Further, the single chip microcomputer 1 is provided with, as exclusive control terminals, respective terminals of reset (RES), standby (STBY), mode control (MD0, MD1, MD2) and clock inputs (EXTAL, XTAL).

The single chip microcomputer 1 executes operation in synchronism with a reference clock (system clock) generated based on a quartz oscillator connected to the terminals EXTAL, XTAL of CPG 20 or an outside clock inputted to the EXTAL terminal. One period of the reference clock is referred to as state.

The function blocks of the single chip microcomputer 1 are connected to each other by the inner bus 30. The single chip microcomputer 1 incorporates a bus controller, illustration of which is omitted, for executing control of the bus. The inner bus 30 includes a control bus of read signal/write signal other than inner address bus/inner data bus and the control bus may include further a bus size signal or may constitute bus command codified with these. Or, the control bus may include the system clock.

Although not particularly illustrated, there are two kinds of inner address buses of IAB and PAB depending on phases thereof and there are provided inner data buses of IDB and PDB depending on phases thereof. For example, in the case of reading, PAB is delayed from IAB by 0.5 state. PAB and PDB are synchronized with each other. IDB is delayed from PDB by 0.5 state. Interface of IAB and PAB, IDB and PDB is executed by the bus controller.

Such functional blocks or modules are read/written by CPU 2 via the inner bus 30. The data bus width of the inner bus 30 is set to 16 bits. CPU 2 can read/write built-in ROM 4, RAM 5 in 1 state.

Further, control registers provided to the timer (A) 6, the timer (B) 7, SCI 8, the A/D converter 9, IOP (1) 11 through IOP (9) 19 and CPG 20, are generally referred to as inner I/O registers.

The respective input/output ports 11 through 19 also serve as input/output terminals of the address bus, the data bus, the bus control signal or the timers 6, 7, SCI 8, A/D converter 9. That is, the timers 6, 7, SCI 8 and A/D converter 9 are respectively provided input signals which are inputted from and outputted to outside via the terminal which also serve as the input/output ports. For example, IOP (5), IOP (6), IOP (7) serve also as input/output terminals of the timers 6 and 7 and IOP (8) serves also as input/output terminals of SCI 8. Input/output terminal of analog data also serves as IOP (9).

When the reset signal RES is given to the signal chip microcomputer 1, starting from CPU 2, the single chip microcomputer 1 is brought into a reset state. When the reset state is released, CPU 2 reads start address from predetermined address and executes a reset exception processing for starting to read instruction from the start address. Thereafter, CPU 2 successively reads and decodes instruction from ROM 4 and executes processing of data or data transfer with RAM 5 and the timers 6, 7 based on the decoded content. That is, while referring to data inputted from the input/output ports 11 through 19 or designations inputted from SCI 8, CPU 2 executes processing based on instructions stored to ROM 4, outputs signal to outside based on the result of processing by using the input/output ports 11 through 19, the timers 6, 7 and controls various outside connected apparatus.

States of the timers 6, 7, SCI 8 and outside signals can be transmitted to CPU 2 as interrupted signals. The interrupted signals are outputted from the A/D converter 9, the timer (A) 6, the timer (B) 7, SCI 8 and the input/output ports 11 through 19 and the interruption controller 3 inputs these and gives an interruption request signal 31 based on designation of predetermined register. When an interruption factor is produced, CPU interruption request is produced, CPU 2 interrupts executing processing, branches to predetermined processing routine via an exception processing state, executes desired processing and clears the interruption factor. At the end of the predetermined processing routine, normally, return instruction is executed and by executing the instruction, the interrupted processing is restarted.

FIG. 3 shows a programming model of higher CPU 2 as a constitution example (programming model) of general purpose registers and control registers of CPU 2 to which the invention is applied.

CPU 2 is provided with 32 of general purpose registers each having a 32 bit length. The general purpose registers ER0 through ER31 are all provided with the same function and can be used as address registers or data registers.

The data registers can be used as 32 bits (long word), 16 bits (word) and 8 bits registers (byte). The address registers and the 32 bit registers are used summarizingly as general purpose registers ER (ER0 through ER31). The 16 bits registers are used as general purpose registers E (E0 through E31) or general purpose registers R (R0 through R31) by dividing the general purpose registers ER. These are provided with equivalent functions and a maximum of 64 of 16 bit registers can be used. The 8 bit registers are used as general purpose registers RH (R0H through R31H) or general purpose registers RL (R0L through R31L) by dividing the general purpose registers R. These are provided with equivalent functions and a maximum of 64 of the 8 bits registers can be used. A method of using the respective register can be selected independently.

The general purpose registers ER7, ER15, ER23 and ER31 are allocated with stack pointers (SP) in addition to a function as general purpose registers and are implicitly used in exception processing or subroutine processing. The exception processing includes the interruption processing. By setting control registers, not illustrated, a stack pointer for subroutine branch and a stack pointer for exception processing can be selected independently from each other.

Further, in view of an inner logic constitution, ER0 through ER7 are classified to group 0, ER8 through ER15 are classified to group 1, ER16 through ER23 are classified to group 2 and ER24 through ER31 are classified to group 3. Group 0 is made to be same as existing CPU (lower CPU).

These general purpose registers are not different from each other in view of programming specification and are all can be used equivalently. At least in writing by assembly language, the groups are not conscious of, for example, can be described as R0H, E8, R16, ER31 or the like. For example, when described in accordance with an assembler format "H8S/2600 series H8S/2000 series Programming Manual" issued by Hitachi Seisakusho Co., Ltd, March 1995, the description can be given only by register numbers such as "MOV.L ER0,ER31" or "ADD.W E8,R16".

In FIG. 3, notation PC designates a counter (program counter) of 24 bits, showing address of instruction successively executed by CPU 2. Although not particularly restricted, all of instruction of CPU 2 is provided with a unit of 2 bytes (word) and accordingly the lowest bit is ineffective and in reading instruction, the lowest bit is regarded as 0.

Notation CCR designates a register (condition code register) of 8 bits, showing an inner state of CPU 2. CCR is constituted by 8 bits including respective flags of interruption mask bit (I), half carry (H), negative (N), zero (Z), overflow (V) and carry (C).

Notation EXR designates a register of 8 bits for controlling exception processing of interruption or the like. EXR includes respective bits of interruption mask bits (I2 through I0) and trace (T).

Data constitution examples on general purpose registers, data constitutions on memory space, methods of calculating addressing mode and effective address and so on are the same as those of CPU described in "H8S/2600 series H8S/2000 series Programming Manual" issued by Hitachi Seisakusho Co., Ltd, March 1995, and an address space of 16 MB (or 4 GB for data) can be utilized. Maximum mode/minimum mode (advanced/normal mode by description in "H8S/2600 series H8S/2000 series Programming Manual" issued by Hitachi Seisakusho Co., Ltd, March 1995), are provided and the respectives can select address space of 64 k byte/16 M bytes (or 4 G bytes for data).

Figure 4:
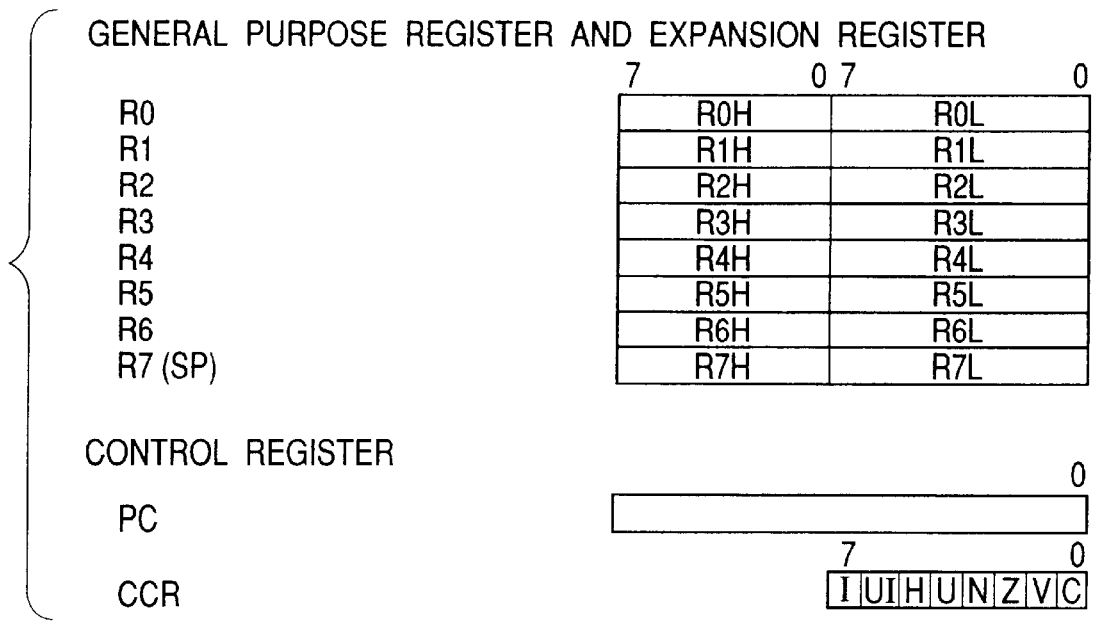
FIG. 4 is an explanatory view showing a constitution of general purpose registers and control registers in CPU of first lower compatibility.

FIG. 4 shows a programming mode of CPU having first lower compatibility with CPU 2. The programming model shown by the drawing is the same as that of CPU described in "H8/300 series Programming Manual" issued by Hitachi Seisakusho Co., Ltd, July, 1988.

CPU having first lower compatibility is provided with 8 of general purpose registers each having 16 bit length. All of the general purpose registers are provided with the same function and can be used as address registers or data registers.

The data registers can be used as 16 bits and 8 bits registers. The address registers and the 16 bits registers are used summarizingly as general purpose registers R (R0 through R7). The 8 bits registers are used as general purpose registers RH (R0H through R7H) or general purpose register RL (R0L through R7L) by dividing the general purpose registers R. These are provided with the equivalent functions and a maximum of 16 of the 8 bits of registers can be used. Methods of using can be selected by the respective registers independently from each other.

The general purpose register R7 is allocated with a function as a stack pointer (SP) in addition to the function as the general purpose register similar to the above-described and is used implicitly in exception processing or subroutine branch.

As address space, address space of 64 k bytes can be utilized a constitution of a vector or a stack constitutes operation equivalent to that of the minimum mode of higher CPU, described above.

Higher CPU 2 having the programming model of FIG. 3, incorporates the general purpose registers and an instruction set of CPU having first lower compatibility of FIG. 4. That is, in order to maintain compatibility between upper CPU 2 and first lower CPU, as described later in details, expansion of the general purpose register and expansion of combinations of instruction sets or addressing modes are executed.

Figure 5:
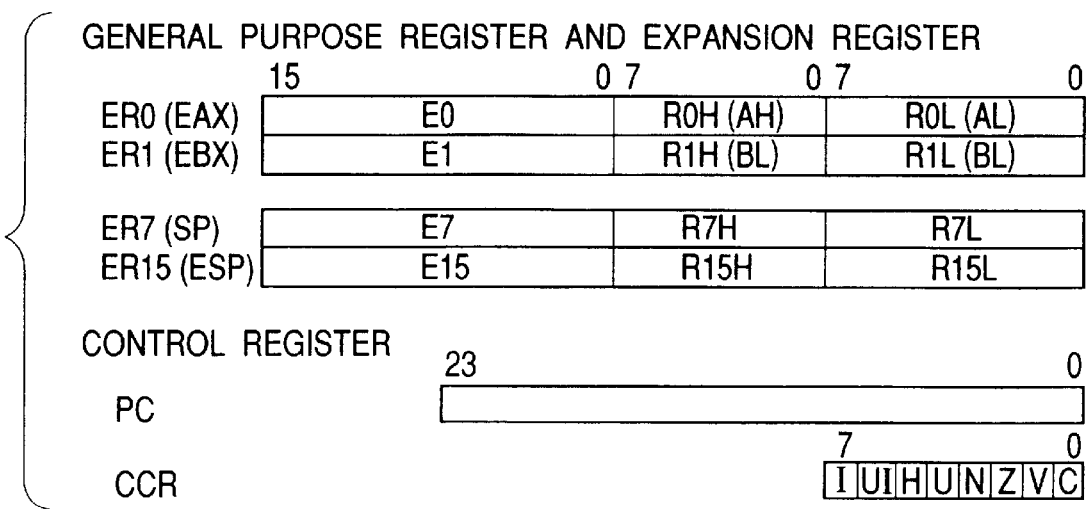
FIG. 5 is an explanatory view showing a constitution of general purpose registers and control registers in CPU of second lower compatibility.

FIG. 5 shows a programming model of CPU having second lower compatibility with CPU 2.

Higher CPU 2 having the programming model of FIG. 3, incorporates the general purpose registers and an instruction set of CPU having second lower compatibility (lower compatibility is simply referred to also as lower level) of FIG. 5. That is, in order to maintain compatibility between higher CPU 2 and first lower CPU, as described later details, expansion of general purpose registers and expansion of combinations of instruction sets or addressing modes is executed. Meanwhile, with regard to first lower CPU of FIG. 4, second lower CPU of FIG. 5 is provided with a relationship therebetween in which general purpose registers or instruction sets are incorporated by either of them. For example, with regard to first lower CPU of FIG. 4, second lower CPU of FIG. 5 is provided with a larger bit length of a general purpose register and with regard to second lower CPU of FIG. 5, a number of general purpose registers of first lower CPU of FIG. 4 is larger.

CPU having second lower compatibility is provided with 4 of the general purpose registers each having a 32 bits length. All of the general purpose registers are provided with the same function and can be used as address registers or as data registers.

The data registers can be used as 32 bits, 16 bits and 8 bits registers. The address registers and 32 bits registers are used summarizingly as general purpose registers ER (ER0, ER1, ER7, ER15). The 16 bits registers are used as general purpose registers E (E0, E1, E7, E15) and general purpose registers R (R0, R1, R7, R15) by dividing general purpose registers R. These are provided with equivalent functions and a maximum of 8 of the 16 bits registers can be used. The 8 bits registers are used as general purpose registers RH (R0H, R1H, R7H, R15) or as general purpose registers RL (R0L, R1L, R7L, R15L) by dividing the general purpose registers R. These are provided with equivalent functions and a maximum of 8 of the 8 bits registers can be used. Methods of independently using the respective registers can be selected.

The general purpose registers ER7, ER15 are allocated with functions as stack pointers (SP) in addition to functions as the general purpose registers and are used implicitly in exception processing or subroutine branch. Similar to the above-described, by setting control registers, not illustrated, a stack pointer for subroutine branch and a stack pointer for exception processing can be selected independently from each other.

A bit length of the general purpose register is equivalent to that of higher CPU 2 and equivalent address space of 16 M bytes (or 4 G bytes for data) can be utilized. Second lower CPU is provided with only a mode in correspondence with the maximum mode.

Further, in view of program, notations ER0, R0, R0H, R0L, ER1, R1, R1H, R1L are respectively designated also as notations EAX, AX, AH, AL, EBX, BX, BH, BL. These do not indicate functions as general purpose registers and are made to comply with description of still other CPU having nothing to do with the invention. Therefore, notations E0, E1 which cannot be used by themselves in still other CPU, are used as they are. In this case, for example, "ADD.W E1,BX" and "ADD.W E1,R1" correspond to the same instruction code.

Figure 6:
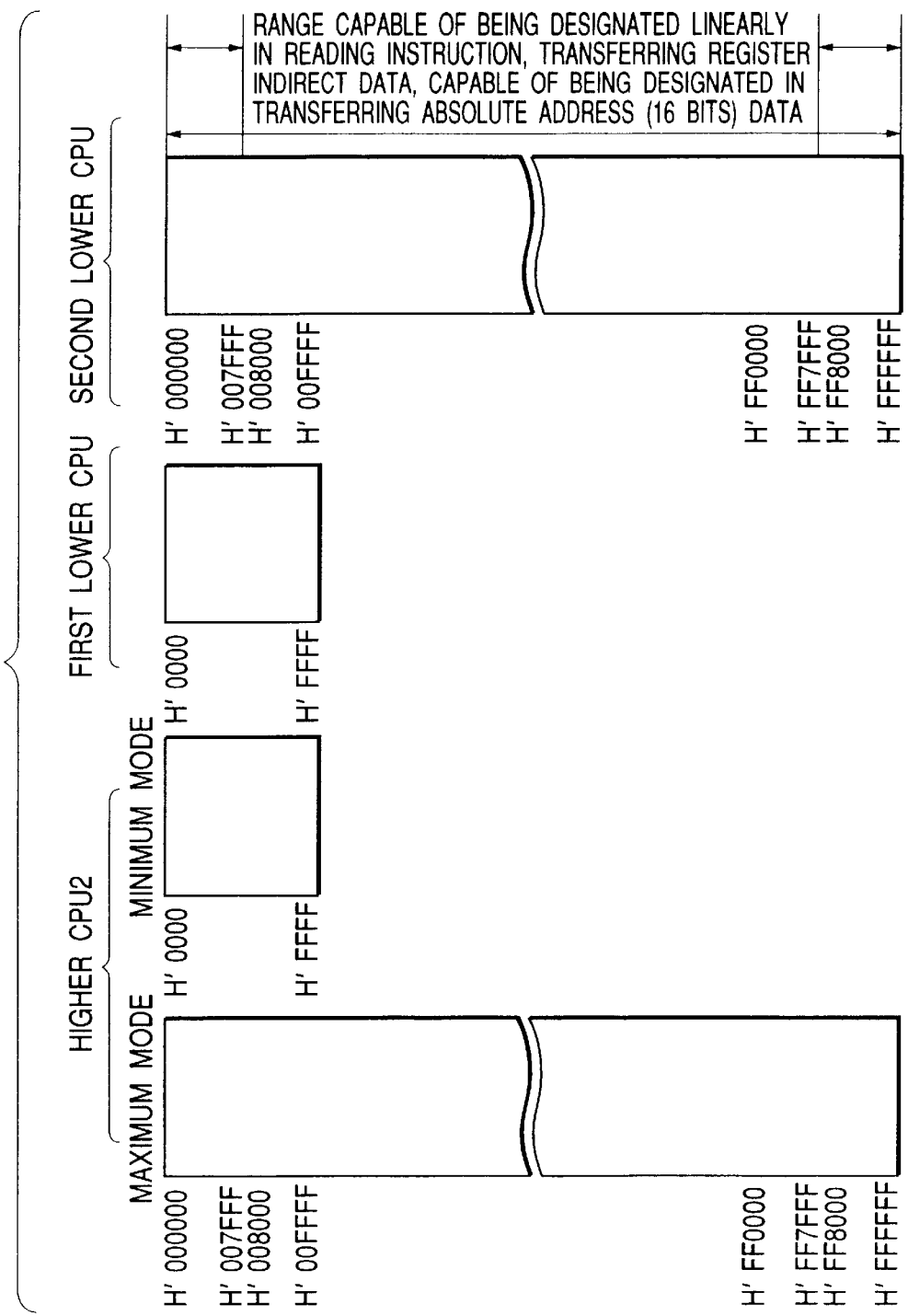
FIG. 6 is an explanatory view with regard to an address space of CPU.

FIG. 6 shows address spaces of CPU's. Further, as an address map of a single chip microcomputer, ROM is arranged from address 0, whereas RAM and inner I/O register are arranged up to address H'FFFF or H'FFFFFF to thereby respectively constitute both ends of an address space.

As described above, upper CPU 2 is provided with the maximum mode of an address space of 16 MB and the minimum mode of an address space of 64 kB. Selection of the maximum mode/minimum mode is determined by states of mode selecting signals MD0 through MD2.

In the maximum mode, all the space is designated by an absolute address of 24 bits (reserved bits of 8 bits are added to the upper portion and 32 bits in instruction code) and 0 through H'7FFF and H'FF8000 through H'FFFFFF are designated by absolute addresses of 16 bits.

Further, a vector in exception processing is constituted by 24 bits (32 bits on memory and higher 8 bits are ignored), and PC saved/returned in subroutine branch is also constituted by 24 bits.

In the minimum mode, either of an absolute address and an addressing mode of register indirect uses only lower 16 bits and upper bits are ignored. A vector in exception processing is constituted by 16 bits and PC saved/returned in subroutine branch is also constituted by 16 bits.

First lower CPU is provided with an address space of 64 kB in correspondence with the minimum mode. An absolute address is provided with only 16 bits, further, in register indirect, all the space is respectively designated by 16 bits register. A vector in exception processing is constituted by 16 bits and PC saved/returned in subroutine branch is also constituted by 16 bits.

Second lower CPU is provided with an address apace of 16 MB in correspondence with the maximum mode. An absolute address is provided with only 16 bits and designates 0 through H'7FFF and H'FF8000 through H'FFFFFF. Meanwhile, in register indirect, all the space is designated by 32 bits register. In the case of 16 bits, an absolute address can designate RAM and inner I/O register combined up to 32 kB and ROM up to 32 kB. A capacity of 32 kB of built-in RAM and inner I/O register combined, may be regarded as a capacity sufficient for the single chip microcomputer in an application field in which bus is not expanded. Further, when exceeding 32 kB of built-in RAM and inner I/O register combined, a logical and physical scale of itself is enlarged and accordingly, there is hardly a necessity of using lower CPU having a small logical scale and it may be regarded as pertinent to use higher CPU. At least, there can be selected either of pursuit of a reduction in the logical and physical scale by using the second lower CPU and providing RAM or I/O register which cannot be designated by an absolute address and pursuit of usability by using higher CPU and enabling to designate all the space by an absolute address.

Although an address of ROM which can be designated by an absolute address of 16 bits is limited, constant allocated to ROM can be rearranged by inter module optimization even in the case of describing by C compiler. Further, the inter module optimization executes optimization depending on a memory arrangement or a call relationship of function in linking respective program modules and is described in "H8S, H8/300 series C Compiler User's Manual" (fourth edition) issued by Hitachi Seisakusho Co., Ltd, August 1997.

Further, the vector in exception processing is constituted by 24 bits (32 bits on memory and upper 8 bits are ignored) and PC saved/returned in subroutine branch is also constituted by 24 bits.

FIG. 7 and FIG. 8 exemplify a method of calculating an effective address in the maximum mode of higher CPU 2 as a method of calculating an effective address.

In register indirect shown by (1) of FIG. 7, a portion of designating a register is included in an instruction code and an address is designated on a memory with a total of 32 bits of content of a general purpose register ER designated by the instruction code as an address. The address may be constituted by 24 bits and accordingly, upper 8 bits are ignored.

In register indirect with displacement shown by (2) and (3) of FIG. 7, an address on the memory is designated with a result of adding displacement included in an instruction code to an address of 32 bits provided similar to the register indirect as an address. The result of addition is used only for designating the address and is not reflected to content of the general purpose register ER. Although not particularly restricted, the displacement is constituted by 32 bits or 16 bits and in the case of adding 16 bits displacement, upper 16 bits is subjected to code expansion. That is, addition is executed such that upper 16 bits of displacement are provided with values the same as that of bit 15 of 16 bit displacement. In this case, upper 8 bits of 32 bits displacement is regarded as a preserved area and ignored.

In postincrement register indirect shown by (4) of FIG. 7, an address on the memory is designated by an address of 32 bits provided similar to the register indirect. Thereafter, the address is added with 1 or 2 or 4 and the result of addition is stored to the general purpose register ER. 1 is added in the case of designating byte data on the memory, 2 is added in the case of designating word data and 4 is added in the case of designating long word, respectively. Upper 8 bits of the result of addition is also stored to an expansion register.

In predecrement register in direct shown by (5) of FIG. 7, an address on the memory is designated by an address of 24 bits as a result of subtracting 1 or 2 or 4 from an address of 32 bits provided similar to the register indirect. Thereafter, the result of subtraction is stored to the general purpose register ER. 1 is subtracted in the case of designating byte data on the memory, 2 is subtracted in the case of designating word data and 4 is subtracted in the case of designating address data, respectively. Similar to the above-described, in the case in which an address may be constituted by 24 bits, although not particularly restricted, upper 8 bits of the result of reduction is also stored to the expansion register.

The absolute address shown by (6), (7) and (8) of FIG. 8, designates an address of the memory with an absolute address of 8 bits, 16 bits or 24 bits as an address. In the case of 8 bit absolute address, upper 16 bits are expanded to 1. That is, all of bits 23 through 8 of an address are set to 1. Therefore, the usable address is constituted by 256 bytes of H'FFFF00 through H'FFFFFF. Further, upper 8 bits of 16 bits absolute address are subjected to code expansion. That is, when bit 15 of 16 bits absolute address is 0, all bits of bit 23 through 16 of address are set to 0 and when the bit 15 is 1, all bits of bit 23 through 16 of address are set to 1. Therefore, usable address is constituted by 64 k bytes of H'000000 through H'007FFF and H'FF8000 through H'FFFFFF.

In program counter relative shown by (9) and (10) of FIG. 8, an address on the memory is designated with a result of adding displacement included in the instruction code to address of 24 bits of content of a program counter as an address. The result of addition is stored to the program counter. Although not particularly restricted, displacement is constituted by 16 bits or 8 bits and when these displacements are added, upper 8 bits or 16 bits are subjected to code expansion. That is, addition is executed by regarding that upper 8 bits of displacement are provided with values the same as bit 15 of 16 bits displacement or upper 16 bits are provided with values the same as that of bit 7 of 8 bit displacement. The program counter relative is used only in branch instruction.

Further, in the minimum mode, upper 8 bits of an effective address are ignored. Other than the above-described, there are executed addressing modes of immediate, register direct and memory indirect, a detailed explanation thereof will be omitted thereof since these have nothing to do directly with the invention.

In data transfer instruction of first lower CPU, register indirect, register indirect with 16 bits displacement, postincrement/predecrement register indirect and 8/16 bits absolute address can be used. Although the method of calculating an effect address is similar to that of higher CPU 2, upper 8 bits are ignored and lower 16 bits are effective.

In data transfer instruction of second lower CPU, register indirect, register indirect with 16 bits displacement, postincrement/predecrement register indirect and 8/16 bits absolute address can be used. Further, absolute address 24 bits can be used in branch instruction.

FIG. 9 exemplifies an instruction format of machine language of CPU 2 according to the invention. Instruction sets of first lower CPU and second lower CPU are regarded as substrates of instruction sets of higher CPU 2.

Instruction of CPU 2 is constituted by a unit of 2 bytes (word). Respective instruction includes an operation field (op), a register field (r, gr), an EA expansion portion (EA) and a condition field (cc). Although not particularly restricted, there is constituted instruction format the same as that of CPU described in "H8S/2600 series H8S/2000 series Programming Manual" issued by Hitachi Seisakusho Co., Ltd., March 1995.

The operation field (op) represents function of instruction and designates content of processing a designated operand of an addressing mode. Front 4 bits of instruction are necessarily included. There is a case of having two operation fields.

The register field (r, gr) designates a general purpose register. The register field (r) is constituted by 3 bits in the case of an address register and 3 bits (32 bits) register or 4 bits (8 or 16 bits) register in the case of a data register. There is a case of having two register fields or a case having no register field.

The register field (gr) holds information of designating which of register sets of group 0 through group 3 is to be selected. Although there are present 4 bits of the register field (gr), according to the register constitution of FIG. 3, although not particularly restricted, lower 2 bits are made effective. A word including the register field (gr) is made ignorable and when the word is ignored, it is assumed that 0 is provided, it is regarded that the register set of group 0 is designated, register number of registers designated by the register field (r) are set to 0 through 7 and the general purpose registers ER0 through ER7 can be selected.

For example, it is calculated by register number n=gr[1:0] <<3+r[2:0] (<<3 designates 3 bits left shift). That is, there is designated a register having a number designated by 5 bits with gr at upper position and lower 3 bits [2:0] of r at lower position. For example, in the case of gr=0, r=1, the register number becomes n=1, in the case of gr=2, r=3, the register number becomes n=19. Register E, register R, register RH and the register RL are designated by a portion of designating a size of an instruction code or content of r[3] of general purpose register ERn in correspondence with the register number n. For example, which of long word, word and byte the data size is, is designated by predetermined bit of an operation field of an instruction code. When the data size is word or byte, the position of a utilized register is designated by r[3]. r[3] signifies bit data at a fourth bit from lower position of r. In the case in which the data size is word, when r[3]=1, register E is designated, when r[3] =0, register R is signified. In the case in which the data size is byte, when r[3]=1, register RL is designated, when r[3]=0, register RH is signified.

Further, gr1 or r1 signifies a register designating field of a source register or an address register and gr2 or r2 signifies a register designating field of a destination register or a data register. gr1 (bit 7 through 4 in basic word of instruction cord) corresponds to r1 (bit 7 through 4 or bit 6 through 4 in basic word of instruction code) and gr2 (bit 3 through 0 in basic word of instruction code) corresponds to r2 (bit 11 through 8 or 3 through 0 in basic word of instruction code).

The EA expansion portion (EA) designates immediate data, absolute address or displacement. The EA expansion portion is constituted by 8 bits, 16 bits or 32 bits.

The condition field (cc) designates branch condition of condition branch instruction (Bcc instruction).

FIG. 9 shows instruction format of machine language of CPU 2. When a front instruction code (front instruction code for register expansion) having the register field (gr) is omitted, an existing instruction code is constituted. The register field (gr) is also described as a group designating field (gr). For example, when an instruction code "H'0901" is used by itself, there is constituted ADD. W R0,R1, as exemplified in (3) of FIG. 9, when a front instruction code "H'0012" having a group designating field is added thereto, the operation code "H'00120901" becomes ADD.W R8,R17.

Further, a front instruction code "H'0000" for designating a register set of group 0 implicitly used, is regarded as NOP (nonoperation) instruction although not particularly restricted. An instruction code "H'00xx" (xx designates 01 through FF), designates a group of a register set and executes a continuous successive instruction code (interruption is prohibited), otherwise, increment of PC is executed similar to the NOP instruction and the instruction code is executed by a minimum state number.

The group designating field (gr) is provided with 4 bits and accordingly, can expand logically a general purpose register group to 16. In this case, 128 of 32 bits general purpose registers (or 256 of 16 bits general purpose registers) can be utilized.

There may be a plurality of kinds of operation fields in correspondence with the group designating field (gr). For example, there may be prepared an operation code having both of a function of simply designating register and a function of switching other function (data size).

First lower CPU and second lower CPU are provided with subsets of the operation codes of higher CPU 2. Specifically, first lower CPU is not provided with the register designating field (gr). Second lower CPU uses the register designating field (gr) only when a stack pointer ER 15 is designated.

FIG. 10 exemplifies detailed instruction format of transfer instruction with regard to memory of CPU 2.

In this case, there are shown those for register indirect, postincrement/predecrement register indirect, register indirect with 16 bits displacement and 16 bits absolute address. Although there are provided other addressing modes, a detailed explanation thereof will be omitted.

In register indirect (@ERn), an operand on the memory is designated with content of address register (ERn) designated by the register field (r) of an instruction code as an address.

In register indirect with displacement (@(d:16, ERn)), an operand on the memory is designated with content of adding 16 bits displacement (d) included in the instruction code to content of address register (ERn) designated by the register field (r) of the operation code as an address. In addition, 16 bits displacement is subjected to code expansion.

In postincrement register indirect (@ERn+), an operand on the memory is designated with content of address register (ERn) designated by the register field of the instruction code as an address. Thereafter, 1, 2 or 4 is added to the content of the address register and the result of addition is stored to an address register. 1 is added in the case of byte size, 2 is added in the case of word size and 4 is added in the case of long word size, respectively.

In decrement register indirect (@-ERn), an operand on the memory is designated with content subtracted by 1, 2 or 4 from content of the address register (ERn) designated by the register field of the instruction code as an address.

Thereafter, the result of subtraction is stored to the address register. 1 is subtracted in the case of byte size, 2 is subtracted in the case of word size and 4 is subtracted in the case of long word size, respectively.

In absolute address (@aa:16), an operand on the memory is designated by an absolute address (aa) included in the instruction code. Although not particularly restricted, in the case of 16 bits absolute address, upper 16 bits are subjected to code expansion. In this case, bit 8 through 16 constitute a field of designating an address mode.

FIG. 11 through FIG. 14 exemplify combinations of instruction codes in instruction formats of direct operation instruction with regard to memory by upper CPU 2. The direct operation instruction to memory is operation instruction expanded with regard to existing instruction set. The instruction format shown by the drawings is a format of instruction to be processed as one instruction with front instruction for instruction expansion at front and added with a code of transfer instruction and a code of operation instruction. Further, although not illustrated, first lower CPU and second lower CPU are provided with instruction sets of subsets of instruction sets of higher CPU 2.

The direct operation instruction to memory is constituted by a control code (front instruction code for instruction expansion), an EA1 code, an EA2 code and an operation code.

EA1 and EA2 are made the same as an instruction code of transfer instruction of respective addressing mode shown by FIG. 10. The transfer direction is set to read direction and the register field (r2) which is not used is set to 0, although not particularly restricted.

The operation code is made the same as an instruction code of operation instruction between general purpose registers. A combination of the EA1 code, EA2 code and the operation code having significance can be made arbitrary. That is, necessary ones of the EA1 code, EA2 code and the operation code are combined in accordance with content of desired processing.

For example, in the case of increment processing, only data on the destination side is necessary and accordingly, the EA1 code only for reading data on the source side is not necessary. Therefore, the format of the increment processing is constituted by combining the front instruction code, the EA2 code and the operation code.

In addition processing, EA1, EA2 on the source side and on the destination side using memory may be combined. When only the source side constitutes data on the memory (for example, ADD.W @ER1,R0) the EA1 code (same as MOV.W @ER1,Rx, although Rx does not have significance, Rx is set to R0 as described above) and the operation code (same as ADD.W Rx,R0) are combined. When only the designation side constitutes data on memory (ADD.W R1,@ER0) the front instruction code for instruction expansion, the EA2 code and the operation code are combined. When both of the source side and the destination side constitute data on the memory (ADD.W @ER1, @ER0), as exemplified in FIG. 11, the front instruction code for instruction expansion, the EA1 and EA2 codes and the operation code are combined. Further, when both of the source side and the designation side constitute data on general purpose register (ADD.W R1,R0) this is existing instruction and only the operation code is used. In other words, front instruction code is not necessary.

Similarly, in operation of immediate data and data on the memory (for example, ADD.W#xx,@ER1), the immediate data is regarded to be the source side and accordingly, as exemplified in FIG. 13, the EA1 code is not necessary, further, an operation code (same as ADD.W #xx,@Rx) between immediate and registers is used in place of operation between registers.

In transfer instruction between memories (for example, MOV.W @ER1,@aa:16) although similar to operation between memories, the front instruction code for instruction expansion, the EA1 code, the EA2 code and the transfer instruction code between registers may be combined, according to the example, as exemplified in FIG. 12, the front instruction code for instruction expansion, the EA1 code (same as MOV.W@ER1, Rx), the EA2 code (same as MOV.W Rx,@aa:16) are combined. The operation code is dispensed and the transfer direction of the EA1 code is set to reading direction and the transfer direction of EA2 code is set to write direction. Thereby, the instruction code length can be shortened (by amount of operation code) and a number of execution states (reading operation code, reading destination side data) can also be shortened.

In transfer of immediate data to memory (for example, MOV.W #xx,@ER1), although similar to the operation with regard to immediate data and the data on the memory, the front instruction code for instruction expansion, the EA2 code and the operation code may be combined, according to the example, as exemplified in FIG. 14, the front instruction code for instruction expansion, the transfer instruction code between immediate and registers (same as MOV.W #xx,Rx) and the EA2 code (same as MOV.W Rx,@aa:16) are combined. Thereby, the number of execution states (reading destination side data) can also be shortened.

Figure 15:
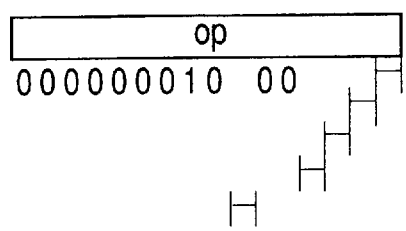
FIG. 15 is a format diagram exemplifying a format of a front instruction code.

FIG. 15 exemplifies the format of the front instruction code for instruction expansion (control code). The front instruction code for instruction expansion shown by the drawing is provided with bits for respectively indicating whether the source side or the destination side constitutes memory. When a corresponding bit is, for example, logical value "1", the corresponding bit designates memory and when the corresponding bit is logical value "0", the corresponding bit designates general purpose register. Transfer instruction codes of EA1 and EA2 are made the same as each other and accordingly, when the source side is the memory, it is determined a code successive to the front instruction code for instruction expansion is the EA1 code regardless of the destination side. Meanwhile, when the source side is regarded as the general purpose register and the destination side is the memory, the code is determined to be the EA2 code, otherwise, there is provided information designating long word size.

Further, there is provided information for changing operation of the transfer instruction codes of EA1 and EA2. For example, when postincrement/predecrement register indirect is designated uniquely by direction of reading/writing the memory, that is, in the case of an instruction set in which postincrement is fixedly executed in writing and predecrement is fixed in reading, the postincrement operation can be executed in reading and the predecrement operation can be executed in writing by changing information.

FIG. 16 and FIG. 17 are shown with regard to combinations of addressing modes. FIG. 16 is shown with regard to data transfer instruction and FIG. 17 is shown with regard to addition instruction. Operation instruction other than addition is made similar to addition instruction.

At upper column, middle column and lower column of respective columns of "source" of FIG. 16 and FIG. 17, there are shown executable data sizes respectively of higher CPU 2, first lower CPU and second lower CPU. Notation B designates byte (8 bits), notation W designates word (16 bits) and notation L designates long word (32 bits).

Although addressing modes include program counter relative and memory indirect which are used only for branch instruction other than those shown by FIG. 16 and FIG. 17, illustration thereof is omitted here.

According to higher CPU 2, combinations of source/destination and addressing modes of data sizes can be made arbitrary along with data transfer instruction and addition instruction. However, with regard to absolute address of 8 bits, in view of the characteristic as shortened form, further, in view of characteristic of instruction code of 16 bits unit, only byte size can be executed.

According to first lower CPU, addressing modes are limited in correspondence with the address space of 64 kB and register indirect with 32 bits displacement and 32 bits absolute address cannot be executed. The data sizes are byte and word. Data transfer instruction can be executed only when one of the source side and the destination side is register direct. Further, addition instruction is limited to immediate or general purpose register on the source and limited to general purpose register on the destination side. That is, there is provided an instruction set of a so-to-speak load store type in which reading/writing memory is executed by data transfer instruction and processing of data is executed on general purpose register.

According to second lower CPU, despite the address space of 16 MB, the main object is corresponding to large capacity formation of program, an application field in which high speed processing of large scale data is not made necessary is considered, with regard to addressing modes, register in direct is 32 bits displacement and 32 bits absolute address cannot be executed. The data sizes are byte and word in the case of designating data on memory. Long word is possible only in the case in which the source side is immediate or general purpose register and the destination side is general purpose register.

According to second lower CPU, although a number of general purpose registers is small, combinations of source/destination of addressing modes can be made arbitrary along with data transfer instruction and addition instruction. According to the data size of the transfer instruction between general purpose register and memory, data sizes of functional blocks of a microcomputer is 8 bits or 16 bits length, an inner data bus is constituted by 16 bits, in view of characteristic of resolution necessary for a microcomputer system to which the single chip microcomputer is applied, an application field in which 16 bits (word) or 8 bits (byte) can be used, is considered and accordingly, 32 bits (long word) are not provided. Naturally, with regard to data of 32 bits (long word) by twice executing the transfer of 16 bits (word), the operation can be realized.

Meanwhile, according to second lower CPU, a general purpose register is constituted by 32 bits, an inner constitution of CPU comprises 32 bits and accordingly, with regard to immediate and register direct in which there is no need of reading/writing data on the memory, operation by 32 bits (long word) can be executed.

Higher CPU, first lower CPU 2, second lower CPU, mentioned above, can be selected in conformity with request of an application field of a microcomputer system, for example, as follows.

According to a microcomputer system operated by using only function modules incorporated in a single chip microcomputer, that is, ROM, RAM, timer A, timer B, SCI, A/D converter, input and output ports, when a program capacity is equal to or smaller than about 60 kB (64 kB by combining RAM, inner I/O register), it is convenient to incorporate first lower CPU.

Further, when the program capacity is equal to or larger than about 60 kB (64 kB by combining RAM, inner I/O register) it is convenient to incorporate second lower CPU. Data is dealt with by RAM, inner I/O register and a portion of ROM, even when there is a restriction in access by data transfer/operation instruction to a portion of an address space (H'8000 through H'FF7FFF), the portion is constituted by ROM and unused area and therefore, there poses no problem. Rather, it is preferable to eliminate unnecessary function of CPU, reduce the logical scale and reduce expense.

With regard to a microcomputer system operated by using only functional modules incorporated in such a single chip microcomputer, there is pointed out a camera, for example, there is a description in "Shashin Kogyo" pp58–71 issued by Shashin Kogyosha, November, 1994. Further, large program capacity is regarded to indicate high function of the microcomputer system.

Or, in addition to functional modules incorporated in a single chip microcomputer, the same goes with a microcomputer system operated by connecting an exclusive semiconductor integrated circuit having comparatively small address to outer bus of a single chip microcomputer, as such an example, there is pointed out an optical disk drive, that is, for example, there is a description in "Hitachi Microcomputer Technical Report" pp38–39 issued by Hitachi Microcomputer System Co. Ltd., February 1996.

Meanwhile, in the case in which operation is executed by connecting ROM for storing program, DRAM for storing data, character generator ROM (CGROM), input/output circuits and control circuit other than functional modules incorporated in a single chip microcomputer, that is, ROM, RAM, timer A, timer B, SCI, A/D converter and input/output ports, large scale data is dealt with, for example, processing of arrangement is also conceivable and accordingly, it is convenient to incorporate higher CPU 2 capable of using all the address space with no restriction. Further, there are needed a bus control having high function for efficiently utilizing outside memory and a DMA controller for executing high speed data transfer and accordingly, it seems that even when upper CPU 2 having relatively large logical scale is used, influence on the total logical scale is inconsiderable. As such a microcomputer system, there is pointed out a printer.

Figure 1:
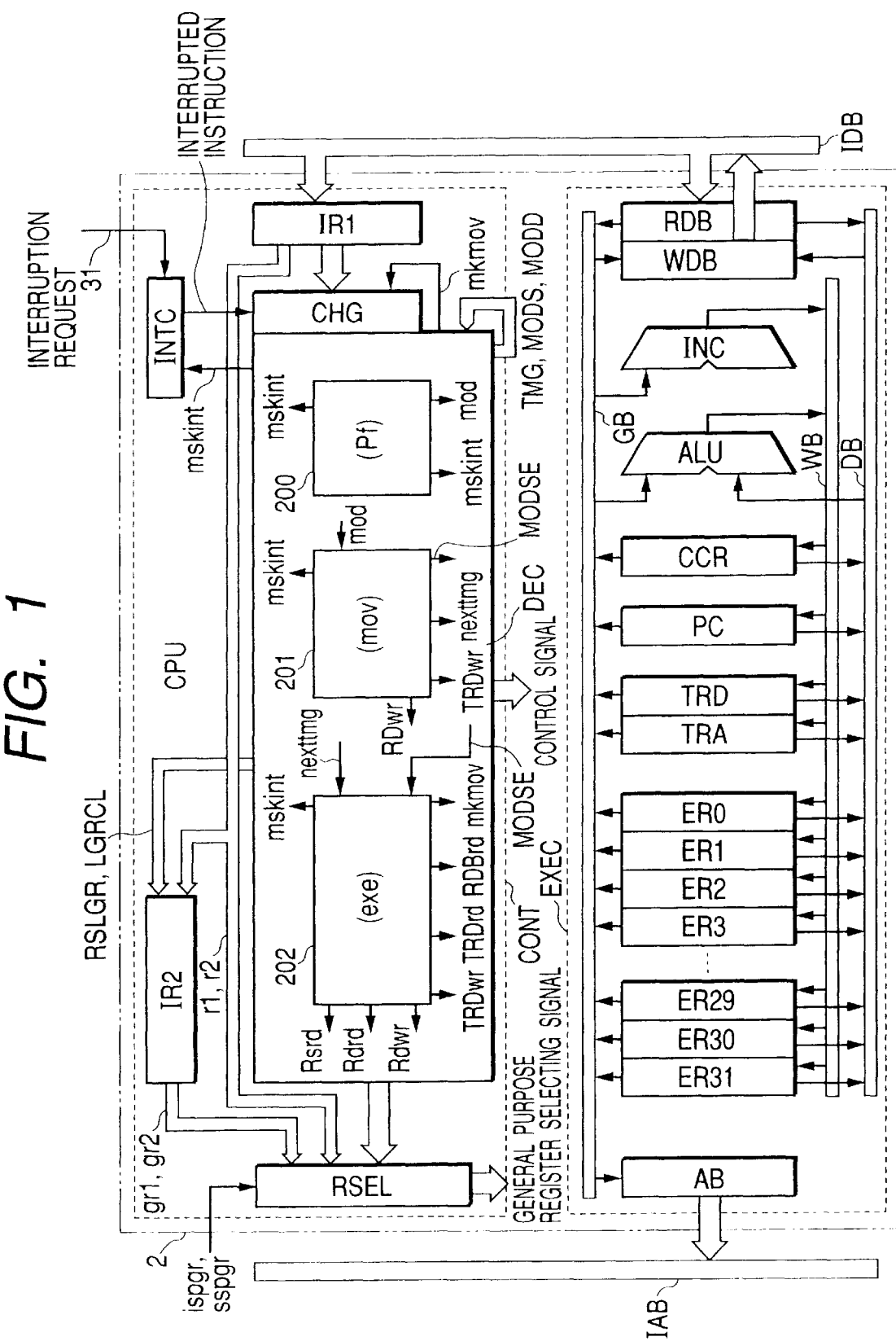
FIG. 1 is a block diagram for exemplifying CPU of a single chip microcomputer related to the invention with regard to study problems A, B and C in details.

FIG. 1 shows a detailed example of upper CPU 2. CPU 2 is constituted by a control unit CONT and an executing unit EXEC. Notations IDB and IAB designate the inner data bus and the inner address bus included in the inner bus 30.

The control unit CONT is provided with an instruction register IR1, an instruction register IR2, an instruction changing unit CHG, an instruction decoder DEC, a register selector RSEL and an interruption control unit INTC. Particularly, the control unit CONT executes first control in accordance with presence or absence of the front instruction code for instruction expansion and executes second control in accordance with presence or absence of the front instruction code for register expansion. The first control is direct operation processing control of memory data and executes control of enabling to operate directly data on the memory by processing a plurality of instruction codes such as data transfer instruction successive to the front instruction code for instruction expansion as one instruction. The second control is the register designation control in consideration of upper compatibility and executes control of designating an expanded general purpose register by using the front instruction code for register expansion on one hand and implicitly regarding register designation by an unignorable register designating field r (r1, r2) as register designation included in register group 0 when the ignorable register designating field gr (gr1, gr2) is ignored on the other hand.

The instruction decoder DEC is constituted by, for example, micro ROM or PLA (Programmable Logic Array) or a hard-wired logic. A portion of an output from the instruction decoder DEC is fed back to the instruction decoder DEC. Such a feedback signal includes a stage code (TMG) used in transition among respective instruction codes and control signals (MODS, MODD) used among the instruction codes. When a description is generally given to total function of the first control in the instruction decoder, the front instruction code for instruction expansion generates the control signals (MODS, MODD) and the EA1 code and the EA2 code operate while referring to the control signals and generates a further control signal. The operation code executes operation processing by switching output source/destination of data by referring to control signals. The instruction code is also generated at inside thereof in accordance with the control signals.

A further detailed description will be given of such first control function of the instruction decoder DEC. FIG. 1 generally shows a portion of the function of the instruction decoder DEC and decode logic 200 of the front instruction code for instruction expansion (pf) outputs a control signal (mod: including MODS, MODD) and an interruption mask signal (mskint). Otherwise, similar to NOP (no operation) instruction, no substantial operation is executed. In sum, the control signal MOD is positioned as a signal explicitly indicating that a successive instruction code is an instruction code added to the front instruction code for instruction expansion.

Decode logic 201 of the transfer instruction code (mov) outputs a state code signal (nxttmg), an interruption mask signal (mskint), a general purpose register write signal (Rdwr) and a temporary register write signal (TRDwr). States of these signals are made to differ by the control signals (mod:MODS, MODD). For example, when MODS=1, the temporary register write signal (TRDwr) is selected and when MODS=0, the general purpose register write signal (Rdwr) is selected respectively. Other operation is made similar to that in the case of transfer instruction between memory and general purpose register.

Decode logic 202 of the operation instruction code (exe) outputs the interruption mask signal (mskint), a source general purpose register read signal (Rsrd), a destination general purpose register read signal (Rdrd), a destination general purpose register write signal (Rdwr), a read data buffer read signal (RDBrd), a temporary register read signal (TRDrd), and a temporary register write signal (TRDwr). The signal Rsrd designates reading a general purpose register as a source register, the signal Rdrd designates reading a general purpose register as a destination register and the signal Rdwr designates writing a general purpose register as a destination register. The signal RDBrd designates reading a read data buffer, mentioned later, of the executing unit EXEC, the signal TRDrd designates reading a temporary register, mentioned later, of the executing unit EXEC and the signal TRDwr designates writing of a temporary registers, mentioned later. The states of these signals are made to differ by the control signals (mod:MODS, MODD). That is, the source general purpose register read signal (Rsrd) and the temporary register read signal (TRDrd), the destination general purpose register signal (Rdrd) and the read data buffer read signal (RDBrd), the destination general purpose register write signal (Rdwr) and the temporary register write signal (TRDwr) are selected exclusively to each other and selects whether the general purpose register is used or latching means of temporary register is used. Further, in the case of the destination side memory, there is outputted a signal (mkmov) for generating an instruction code for executing operation equivalent to that for executing write type transfer instruction at inside of CPU. Other operation is made similar to the operation instruction with regard to the general purpose register.

The instruction registers IR1 and IR2 temporarily store write instruction. The instruction decoder DEC is supplied with an instruction code stored to the instruction register IR1. The instruction changing unit CHG is operated in the case of giving an instruction code other than the read instruction to the instruction decoder DEC and gives content of the instruction register IR1 to the instruction decoder DEC in other cases. The instruction code other than the read instruction is used in executing an exception processing such as interruption by designation of the interruption control unit INTC or in generating the instruction code for executing the operation equivalent to that in the write type transfer instruction at the inside by the designation by control signal mkmov from the instruction decoder DEC. That is, when the destination side constitutes data on the memory, the instruction code for executing memory write operation at an address generated by the EA2 code is automatically generated at inside of CPU and supplied to the instruction decoder DEC by which an instruction code length of instruction according to the invention can be shortened and a number of execution states can be shortened.

The interruption control unit INTC receives the interruption request signal 31 outputted from the interruption controller (INT) 3 of FIG. 2. Further, the interruption control unit INTC refers to the interruption mask signal mskint outputted from the instruction decoder DEC and designates interruption to the instruction changing unit CHG when interruption is not masked. In this case, the instruction changing unit CHG generates a predetermined instruction code for the interruption exception processing in accordance with hardware thereof.

When a series of a plurality of instruction codes are executed as explained in reference to FIG. 11 through FIG. 14, the respective instruction codes designate interruption masks via the control signal mskint to thereby prevent execution of instruction codes having a predetermined combination from being interrupted.

The register selector RSEL selects the general purpose registers based on the signals Rsrd, Rdrd, Rdwr from the instruction decoder DEC and information of the register fields r1, r2, gr1, gr2 included in the operation codes.

The executing unit EXEC includes general purpose registers ER0 through ER7, a program counter PC, a condition code register CCR, temporary registers TRA and TRD, an arithmetic and logic functional unit ALU, an incrementer INC, a read data buffer RDB, a write data buffer WDB and an address buffer AB. These blocks are connected to each other by inner buses of GB, DB and WB.

Among the registers included in executing unit EXEC, those other than the general purpose registers ER0 through ER31 also shown by FIG. 3, the program counter PC, the condition code register CCR, cannot be referred to in view of programming and are used only operation at inside of CPU 2. That is, the read data buffer RDB, the write data buffer WDB and the address buffer AB latch temporary data for taking interface with the inner buses IAB and IDB. The temporary registers TRA and TRD are pertinently used in operation at inside of the microcomputer and temporarily store, for example, an intermediate result of operation.

The read data buffer RDB temporarily stores read instruction code or data from ROM 4, RAM 5, inner I/O register or outside memory, not illustrated. The write data buffer WDB temporarily stores write data to ROM 4, RAM 5, inner I/O register or outside memory.

The address buffer AB is provided with an increment function with regard to stored content other than temporarily storing an address which CPU 2 reads/writes. An address buffer having the increment function is disclosed in Japanese Patent Laid-Open No. 333153/1992.

The arithmetic and logic functional unit ALU is used for various operation or calculation of effective address designated by instruction. The incrementer INC is used mainly for addition of the program counter PC. Further, although in FIG. 1, the executing unit EXEC is illustrated to be provided with the arithmetic and logic functional unit ALU or the incrementer INC with the general purpose registers ER0 through ER31 as one unit, actually, these are provided by being divided to respective divided portions of E (16 bits), H (8 bits) and L (8 bits) of the general purpose registers.

In executing operation directly with regard to data on the memory by using the instruction code successive to the front instruction code for instruction expansion, the temporary registers TRA and TAD and the read data buffer RDB are used. In the case of operation instruction in which the destination side data constitutes memory, the temporary register TRA stores read address (effective address) in reading the destination address and outputs the destination address (address same as read address) in writing data to the destination side memory.

The temporary register TRD temporarily stores the source side data in the case of operation instruction in which the source side data constitutes memory and outputs the source side data in executing the operation instruction code. Further, the temporary register TRD temporarily stores the operation result in the case of operation instruction in which the destination side data constitutes memory and outputs write data in writing data to the destination side memory.

Further, the read data buffer RDB temporarily stores the destination side data in the case of operation instruction in which the destination side data constitutes memory and outputs the source side data in executing the operation code.

Although the registers TRA, TRD and RDB are pertinently utilized also in executing existing instruction, an explanation thereof will be omitted since the detailed content has nothing to do directly with the invention.

In order to realize the second control, as described above, CPU 2 is provided with two of the instruction registers IR1 and IR2. The register selector RSEL is supplied with an output signal of the instruction decoder DEC, output signals of the instruction registers IR1 and IR2 and an output signal of the inner I/O register (CPUCR) 22 included in SYSC 21.

The instruction register IR1 is supplied with instruction from the inner data bus IDB. An output signal of the instruction register IR1 is coupled to another of the instruction register IR2, the instruction decoder DEC via the instruction changing unit CHG and the register selector RSEL. Output of the instruction register IR2 is coupled to the register selector RSEL. The output of the instruction decoder DEC is coupled to the register selector RSEL and the instruction register IR2. The instruction decoder DEC decodes an operation code of an operation field of instruction fetched to the instruction register IR1. When the instruction code fetched to the instruction register IR1 is the front instruction code for register expansion, by decoding the code by the instruction decoder DEC, register designating information of the register group designating field (gr) of the front instruction for register expansion is latched to the instruction register IR2. A latching signal at that occasion is outputted from the instruction decoder DEC. The register field designating information latched to the instruction register IR2 and register designating information of the register field (r) included in successive instruction successively fetched to the instruction register IR1, are decoded by the register selector RSEL, a register in a register group directly designated by these information is selected and the successive instruction is executed by utilizing the selected register. After executing instruction, the instruction decoder DEC supplies the instruction register IR2 with a set signal for clearing all of latched information of the instruction register IR2 to a bit value "0" (information designating register group 0). Accordingly, even when instruction dispensing with the front instruction code for register expansion is fetched to the instruction register IR1, the output of the instruction register IR2 maintains the information designating register group 0, as a result, the register selector RSEL regards that the register group 0 is implicitly designated and selects from the register group 0, the register in accordance with the register designating information from the instruction register 31.

Second lower CPU can be developed by eliminating functional blocks or logical circuits which are not necessary for the instruction set from the constitution of FIG. 1. General purpose registers may be limited to ER0, ER1, ER7 and ER15 and the register selector RSEL may be eliminated in correspondence therewith. The increment function of the address buffer can be eliminated in correspondence with eliminating data transfer instruction of long word size to memory.

The instruction decoder DEC can eliminate register indirect with 32 bits displacement, 32 bits absolute address and memory indirect and can eliminate logical circuits necessary therefor. Instruction by such addressing modes is provided with a long instruction code, necessarily, a number of execution states becomes large, further, with regard to data transfer instruction of long word size, in correspondence with the inner data bus of 16 bits, twice word size data transfer is executed, control logic is liable to become complicated and therefore, when the addressing mode and long word size data transfer instruction can be eliminated, the reduction in the logical scale can be achieved.

In eliminating the logical circuits, unnecessary functional blocks such as general purpose registers may be eliminated, signals outputted from the eliminated functional blocks may be fixed to an inactive level, further, signals inputted to the eliminated blocks may be disconnected or released. When remaining logical circuits are fixed to the inactive level as described above or subjected to logical resynthesis in the disconnected or released state, the reduction in the logical scale can automatically be realized. Regardless of adopting any method, by constituting subsets of higher CPU, the development efficiency can be promoted rather than executing new development.

Figure 18:
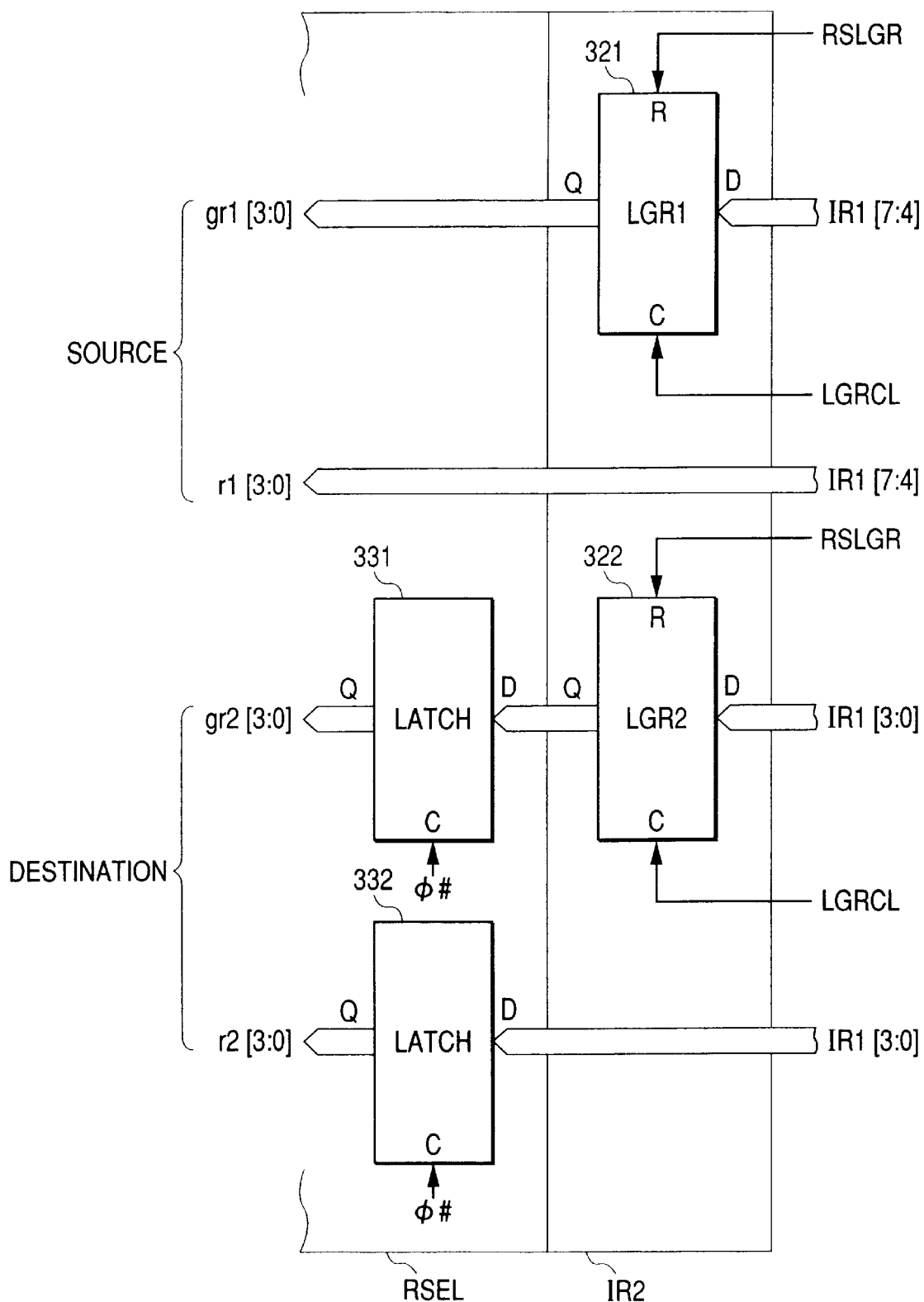
FIG. 18 is a block diagram showing a portion of a register selector and details of an instruction register.

FIG. 18 shows a detailed block diagram of a portion of the register selector RSEL and the instruction register IR2.

The instruction register IR2 is provided with a latch circuit (LGR1) 321 and a latch circuit (LGR2) 322 as holding means. These latch circuits (LGR1, LGR2) 321, 322 latch the register group designating information of the register group designating fields gr1, gr2 as mentioned above.

In reference to FIG. 18, each of the latch circuits 321, 322 is constituted by so-to-speak D type flip-flop with reset. As a reset signal RSLGR, an instruction execution finish signal RSLGR designated by the instruction decoder DEC is inputted. As latch clock, LGRCL designated by the instruction decoder DEC is inputted, further, as data, bits 7 through 4, 3 through 0 (may be bits 5, 4, 1, 0 in the case of four of groups) held by the instruction register IR1 are inputted. The latch clock LGRCL is brought into an active state when instruction code (ignorable front instruction code for register expansion) for designating a register group is executed and latches bits 7 through 4, 3 through 0 which constitute the register field (gr) at that occasion. The latch circuits 321, 322 are set with predetermined values based on control signals (control signal RSLGR) from the instruction decoder DEC at time point of finishing to execute instruction. According to the embodiment, all is cleared to a bit value "0".

With regard to instruction which is not provided with the front instruction code for register expansion of designating a general purpose register group, since the latch circuits (LGR1, LGR2) 321, 322 stay to be cleared to the value "0", when instruction execution is carried out, general purpose registers of register group 0 are designated.

The destination register designating side of the register selector RSEL is provided with a latch circuit 331 for holding information of the register group designating field (gr2) outputted from the latch circuit (LGR2) 322 and a latch circuit 332 for latching information of the register designating field (r2) outputted from the output register IR1. The latch circuits 331, 332 are latched by inverted clock f# of system clock f and execute operation of selecting destination registers while being delayed from operation of selecting source registers. Thereby, a timing of latching register designating information on the destination side, that is, a timing of selecting the destination registers, is delayed from the timing of selecting the source registers by 0.5 state. The source registers are selected precedingly as address registers and the designation registers can be selected to delay for writing data.

In FIG. 19 and FIG. 20, a part of a logical description of a register selector RSEL corresponding to the general purpose register ER8 is exemplified. The description of FIG. 20 is a remaining logical description following FIG. 19.

A logical description shown by FIG. 19 and FIG. 20 is referred to as RTL (Register Transfer Level) or HDL (Hardware Description Language) description and can logically be developed in a logical circuit by publicly-known logic synthesizing tool. HDL is standardized as IEEE1364. Syntax of logical description shown here is in conformity to case statement and it is constituted by description content in which when there causes a change in a value or a signal defined in ( ) successive to always@, a processing of description lines therebelow is executed. Further, symbol "!" designates logical sum and symbol "&" designates logical product, "3'b001" signifies 001 of 3 bit length.

The logical description is grossly classified to a register selection description portion starting from always@(gr1 or r1 or gr2 or r2)begin, a bus selection description portion starting from always@(rs8 or rsgb or rsdb or wbrs or rd8 or rdgb or rddb or wbrd)begin and a register size designation description portion starting from always@(Wbr8 or r2[3] or byte or word or long)begin.

At the register selection description portion, there is constructed a description of selecting the general purpose register ER8 when the register field r[2:0]=0 and the register field gr[1:0]=1.

That is, when the group field of the source register gr1=1 (gr1=4'b0001) and the register field of the source register r1=0 (r1=3'b000), a signal rs8 for selecting the register ER8 as a source register is activated (rs8=1). Otherwise, the signal rs8 maintains an inactive state (rs8=0).

Further, when the group field of the destination register gr2=1 (gr2=4'b0001) and the register field of the destination register r2=0 (r2=3'b000), a signal rd8 for selecting the register ER8 as a destination register is activated (rd8=1). Otherwise, the signal rd8 maintains the inactive state (rd8=0).

In always statement of the bus selection description portion, rsgb designates a signal of designating to output content of a source register to the bus GB, rsdb designates a signal of designating to output content of a source register to the bus DB, wbrs designates a signal of designating to output content of the bus WB to a source register, rdgb designates a signal of designating content of designation register to the bus GB, rddb designates a signal of designating to output content of a destination register to the bus DB and wbrd designates a signal of designating to output content of the bus WB to a destination register.

In the case in which the signal rs8 is activated when content of a register of the register designating field (gr1, r1) of designating a source register is designated to output to the inner bus GB (rsgb=1) by the instruction decoder (DEC) 33 or in the case in which the signal rd8 is activated when content of a register of the register designating field (gr2,r2) for designating a destination register is designated to output to the inner bus GB (rdgb=1), a signal r8gb for designating data output from the general purpose register ER8 to the inner bus GB is activated (r8gb=1).

Similarly, in the case in which the signal rs8 is activated when content of a register of the register designating field (gr1, r1) for designating a source register is designated to output to the inner bus DB by the instruction decoder DEC (rsdb=1), or in the case in which the signal rs8 is activated when content of a register of the register designating field (gr2, r2) for designating a destination register is designated to output to the inner bus DB, the signal r8db for designating output from the general purpose register ER8 to the inner bus DB is activated (r8db=1).

Further, in the case in which the signal rs8 is activated when data is designated to input from the inner bus WB to a register of the register designating field (gr1, r1) for designating a source register by the instruction decoder DEC (wbrs=1), or in the case in which the signal rd8 is activated when data is designated to input from the inner bus WB to a register of the register designating field (gr2, r2) for designating a destination register (wbrd=1), a signal wbr8 for designating input from the inner bus WB to the general purpose register ER8 is activated (wbr8=1).

In always statement of a logical description portion of the register size reflection, r2[3] signifies a value of 4-th bit from bottom of the register field r2.

In the case in which input of data is designated from the inner bus WB to the general purpose register ER8, when the data size is long word size (long=1), data is written to the general purpose register ER in 32 bits (wb8e=wb8h=wb8l=1). A signal wb8e designates an input gate signal of a register E portion of 16 bits in FIG. 3, a signal wb8h designates an input gate signal of a register RH portion of 8 bits in FIG. 3 and a signal wb8l designates an input gate signal of a register RL portion of 8 bits in FIG. 3.

Further, in the case of word size (word=1), in correspondence with a value of bit 3 of r2, it is designated whether data is written in 16 bits to the general purpose register E (wb8e=1, wb8h=wb8l=0) or data is written in 16 bits to the general purpose register R (RH, RL) (wb8e=0, wb8h=wb8l=1). Further, in the case of byte size, in correspondence with a value of bit 3 of r2, it is designated whether data is written in 8 bits to the general purpose register RH (wb8e=0, wb8h=1, wb8l=0) or whether data is written in 8 bits to the general purpose register RL (wb8e=wb8h=0, wb8l=1).

With regard to other register numbers, only a portion of gr, r in the logical description differs and the other is made similar. With regard to an existing register selector of lower CPU, a register selector 34 is added with decode logic of gr and added with decode logic of portions in correspondence with new ones of the general purpose registers ER8 through ER31.

Output destinations of the register selector 34 are cut to divide by a unit of 8 of general purpose registers in accordance with the content of gr and accordingly, a number of designatable general purpose registers can be increased with regard to arbitrary instruction by similar method.

FIG. 21 and FIG. 22 show an example of selection logic of a logical selector with regard to the register ER7 which can be used also as a stack pointer by logical description. Description of FIG. 22 is remaining logical description successive to FIG. 21. Description mode thereof is the same as those in FIG. 19 and FIG. 20. Although not particularly restricted, sspgr designates information for designating a group for registers used as a stack pointer for subroutine branch instruction and ispgr designates information for designating a group of registers used as a stack pointer for exception processing. These information sspgr, ispgr are supplied from the control register (CPUCR) 22 included in the system controller (SYSC) 21 to the register selector RSEL.

A register select signal is generated by control signals from the instruction decoder (sspgb, wbssp, ispgb, wbisp) and stack pointer designation control bits sspgr, ispgr other than logical description for register selection similar to that in FIG. 19. The signal sspgb designates to output a value of a register utilized for the subroutine stack pointer to the bus GB, the signal wbssp designates to supply data from the bus WB to a register utilized in the subroutine stack pointer, the signal ispgb designates to output a value of a register utilized in the exception processing stack pointer to the bus GB, the signal wbisp designates to supply data from the bus WB to a register utilized for the exception processing stack pointer. Conventionally, it is necessary that when stack pointers of subroutine branch and interruption exception processing are independently provided, the stack pointers are separated into that for the subroutine branch (sspgb, wbssp) and that for interruption exception processing (ispgb, wbisp) to thereby constitute the instruction decoder. In this case, a summarized functions inherently for separate processings, is separated and therefore, the logical scale is hardly increased.

The registers ER15, ER23 and ER31 capable of constituting stack pointers of exception processing other than the above-described can similarly be constituted. That is, the register ER15 is selected when sspgr=1 or ispgr=1. Similarly, the register ER23 is selected when sspgr=2 or ispgr=2, the register ER31 is selected when sspgr=3 or ispgr=3.

The constitution of the control register (CPUCR) 22 is publicly-known technology and accordingly, detailed explanation thereof will be omitted. The control register (CPUCR) 22 may be constituted to select register group 0 in resetting (sspgr=ispgr=0).

Further, there may be provided current group selection bits. That is, when the front instruction code for register expansion is not added, the register group 0 may not be constituted, the current group selection bits may be provided to control registers similar to those of stack pointer group selection bits and content of the current group selection bits may be loaded to the instruction registers IR2 (LGR1, LGR2) by the RSLGR signal.

When the current group selecting bits are set with other than 0, NOP instruction (H'0000) is made to constitute the front instruction code of register group 0. After executing the instruction code, interruption may not be received and a successive instruction code may be executed.

To designate register group 0, there is used H'0000 which is a code the same as that of existing NOP instruction and the NOP instruction may be not used. In place of the NOP instruction, BRA $+2 may be used ("$+2" designates frontward from an address where the instruction is present by 2 addresses, that is, an address of successive instruction).

Objects of mainly used general purpose registers differ by content of executing a program at respective time point and accordingly, processing of a mainly used group can be made to execute at high speed and accordingly, processing speed of CPU can be promoted. For example, general purpose registers of register group 3 are allocated to predetermined interruption processing and are not used in other processing, when the interruption is generated, the current group is changed to 3 and processing with regard to the general purpose register 3 can be executed at high speed without a front instruction code for register expansion.

For example, when interruption priorities are at 4 levels, normally, nests of interruption constitute 4 hierarchies. That is, when the priorities of interruption are set to 3 (high) through 0 (low), interruptions at the same priority are not simultaneously received and accordingly, at first, interruption of priority 0 is masked, interruption of priority 1 is generated in the midst of executing a main program, interruption of priority 2 is generated in the midst of the processing and when interruption of priority 3 is generated in the midst of the processing, maximum nest 4 is constituted.

For example, when a program is composed such that group 3 is ensured for processing of interruption of priority 3, group 2 is ensured for processing of interruption of priority 2 and groups 0 and 1 are used in other processing and general processing, when interruption of priority 3 is generated, the general purpose register group 3 can be used without saving general purpose registers and accordingly, interruption response speed can be promoted. Similar processing can be executed also in generating interruption of priority 2 and interruption processing of higher priority can be processed at high speed.

When processing of CPU is controlled by an operating system (OS), the processing of CPU is divided into so-to-speak tasks and the respective tasks are independently controlled. For example, stack area is controlled independently for respective task.

When the task is switched, the stack area is also switched and conventionally, content of a stack pointer which is being used must be saved and content of the stack pointer must be updated. In the case of updating the content, the task needs to return the content of the stack pointer which has been saved at a preceding time.

In such a case of switching the task, according to the above-described example, only content of the register (CPUCR) 22 may be rewritten. A content of a stack pointer before switching can be held and accordingly, the content needs not to save or return. By dispensing with processing which is provided with no direct influence on the processing of CPU, substantial processing function can be promoted.

Further, interruption is generated independently from execution of task and cannot be anticipated by the task. When interruption is permitted in respective task, a stack region must be ensured by an amount of a number of multiple interruption which can be generated (generally, in correspondence with a number of interruption priorities). Conventionally, this operation must be carried out for respective task and an amount of using stacks undesirably increased. According to the embodiment, the stack pointer for exception processing can be used and the stack for the exception processing can independently be controlled and accordingly, the respective task needs not ensure a stack area for interruption. Thereby, the amount to be using stacks can be restrained. The stack is constituted by RAM and the capacity of RAM which can be incorporated in a single chip microcomputer is restricted by the chip size and accordingly, by enabling to use the stack pointer for exception processing, application of OS is facilitated even in the single chip microcomputer.

Further, by making an initial value of the control register (CPUCR) 22 correspond to register group 0 and at an initial state, by enabling to use a method of using a stack pointer the same as that of existing lower CPU, existing software resources can effectively be utilized.

When ER7, ER15, ER23, ER31 are not used as stack pointers, these can be used as other general purpose registers and accordingly, utilization efficiency or usability can be promoted.

FIG. 23 through FIG. 25 exemplify the decode logic 201 of transfer instruction code (mov) included in the instruction decoder DEC by logical description. The logical description shown by FIG. 23 through FIG. 25 is described by RTL (Register Transfer Level) or HDL (Hardware Description Language) the same as that in FIG. 19. Further, symbol "!" designates logical sum and "&" designates logical product. "3'b001" signifies binary data 001 having 3 bit length. IR[8] signifies a logical value of 9-th bit from bottom of the instruction register IR.

The logical description of FIG. 23 through FIG. 25 corresponds to a logic for decoding a code of transfer instruction (MOV.W@aa:16,Rn) of word size by 16 bits absolute address. In the logical description of FIG. 23 through FIG. 25, 16'b0110_101?_??00_???? signifies the code of the transfer instruction described on a next line of casex (IR). When IR[8]=0, it signifies byte size, when IR[8]=1, it signifies word size and when IR[7]=0, it signifies transfer of memory® general purpose register (read type) and when IR[7]=1, it signifies transfer of general purpose register® memory (write type). It is designated by the value of signal MODS, MODD whether the instruction is executed as independent transfer instruction or the transfer instruction is executed as a portion of direct processing instruction with regard to data on memory. That is, according to the logical description of FIG. 23 through FIG. 25, a control signal is generated in accordance with the state code TMG and a value of a nest state code NEXTTMG is determined in accordance with a value of the state code TMG at current time point and the value of MODS, MODD at that time. A control is grossly classified by whether instruction is executed as independent transfer instruction by MODS, MODD signal or the instruction is executed as a portion of direct processing instruction with regard to data on memory. Specifically, when MODS=MODD=0, instruction is executed as independent transfer instruction. The instruction is operated similar to existing transfer instruction. The instruction can be executed similar to the independent transfer instruction at a portion not particularly illustrated.

In the case of MODS=1, the instruction is executed as operation of reading a source side data. The read data is not written to a general purpose register but written to the temporary register TRD.

In the case of MODD=1 and MODS=0 or MODSE=1, the instruction is executed as operation of reading destination side data. Read address is written to the temporary register TRA. Execution of read data is finished earlier by 1 state after having been inputted to the read data buffer RDB. Further, MODSE signifies a signal indicating that execution of a read type transfer instruction code on the source side have been finished and is generated by the decode logic 201.

Writing data to the temporary register TRD and writing read address to the temporary register TRA may be executed without differentiating any of the cases (operation is not influenced even when not utilized, logical waste can be saved by not differentiating).

Therefore, in comparison with independent transfer instruction (existing transfer instruction), there can be provided only a difference that when a MODS=1, writing to general purpose register is prohibited and when MODD=1, 1 state is shortened. The increase in the logical scale can be minimized.

Further, as shown by FIG. 15, by designating long word size of the front instruction code for instruction expansion, similar to MODS, MODD, long word size is designated by the LNG signal.

Further, in the drawings, a signal of a small letter designates a signal generated by and outputted from the instruction decoder DEC and a signal of a capital letter designates a signal inputted to the instruction decoder DEC.

At a first portion (1-1) of the logical description shown by FIG. 23, the state code TMG is generated. The state code TMG progresses such that 1®2®3 and operation of reading destination side data (MODD=1 and MODS=0 or MODSE= 1), TMG is finished such that 1®2.

Further, the next state code in the case of NEXTTMG [5]=0 constitutes simply a value of lower bit. The next state code in the case of NEXTTMG[5]=1 is constituted to be 5'b00001.

Bus control is executed by a second portion (1-2) of the logical description shown by FIG. 23. nop=0 designates bus access commencement, and nop=1 designates bus access prohibition. data=0 designates instruction read and data=1 designates data access. long=1 designates long word size, when long=0, byte=0 designates word size and byte=1 designates byte size. write=0 designates read and write=1 designates write.

In the case of the transfer instruction, instruction read is executed at state codes 1, 3 and data access is executed at the state code 2. Read/write of data access is designated by IR[7]. In the case of instruction read, content of the inner data bus IDB is stored to the instruction register IR and the read data buffer RDB at predetermined timing. In the case of data read, content of the inner data bus IDB is stored to the read data buffer RDB at predetermined timing. In the case of data write, content of the data write buffer WDB is outputted to the inner data bus IDB at predetermined timing.

An effective address is calculated by third portion (1-3) of the logical description shown by FIG. 24. In the case of the transfer instruction, at the state code 2 (=5'b00010), 16 bits of the EA expansion portion of the instruction code held in the read data buffer RDB are subjected to code expansion to 32 bits by dbrext signal and thereafter, outputted to the inner bus GB. The content of the bus GB is stored to the address buffer AB at respective states and control is not particularly needed therefor.

At a fourth portion (1-4) of the logical description shown by FIG. 24, transfer data is controlled. In the case of read type (IR[7]=0), at state code 3, read data is outputted from the read data buffer RDB to the bus DB, and stored to general purpose register in the case of MODS=0 and stored to the temporary register TRD in the case of MODS=1.

In the case of write type (IR[7]=1), at state code 2, read data is outputted from the general purpose register to the inner bus DB in the case of memory MODS=0 and outputted from the temporary register TRD thereto in the case of MODS=1 and in either of the cases, read data is outputted to the inner data bus IDB via the write data buffer WDB.

At a fifth portion (1-5) of the logical description shown by FIG. 25, the interruption mask signal is controlled. Further, when read of data of the source side is finished, the control signal MODSE is generated.

In FIG. 23 and FIG. 25, in the case of MODS=1 or MODD=1, a portion of the inputted operation code may differ from the transfer instruction. For example, bit 15 of the operation code may be used for other definition.

bits (bit 8 through 10 of operation code) for determining a method of designating memory such as the addressing mode for reducing the logical scale are made common.

FIG. 26 and FIG. 27 exemplify the decode logic 202 the operation instruction code (exe) included in the instruction decoder DEC by logical description. The logical description shown by both of FIG. 26 and FIG. 27 corresponds to logical description for decoding the addition instruction between registers (ADD.W Rm,Rn).

Similar to the above-described, it is designated by MODS, MODD signal whether the instruction is executed as independent transfer instruction or the instruction is executed as a portion of processing instruction with regard to data on memory. Particularly, with regard to a portion not illustrated (such as control of ALU), the instruction can be executed similar to independent operation instruction.

At a first portion (2-1) of the logical description shown by FIG. 26, the state code TMG is generated. The state code TMG is finished by 1 (=5'b00001). At a second portion (2-2) of the logical description shown by FIG. 26, bus control is executed. Instruction read is finished by state code 1.

At a third portion (2-3) of the logical description shown by FIG. 27, operation data is controlled. In the case of MODS=0, source side data is made to constitute general purpose register and content of the general purpose register is read to DB (rsdb). In the case of MODS=1, the source side data is made to constitute memory and content of the temporary register TRD is read to DB (trddb).

In the case of MODD=0, the destination side data is made to constitute general purpose register and content of the general purpose register is read to GB (rdgb) and operation result is written to the general purpose register (wbrd). IN the case of MODD=1, the destination side made is made to constitute memory and content of the read data buffer is read to the bus DB (rdbdb) and the operation result is written to the temporary register TRD (wbtrd).

At a fourth portion (2-4) of the logical description shown by FIG. 27, an interruption mask signal is controlled. Further, in the case in which the destination side constitutes memory, the control signal mkmov is generated and generation of an instruction code for executing operation similar to that of the write type transfer instruction is designated to the instruction changing unit CHG. Further, the long word size signal LNG and the byte size signal BYTE are continued.

FIG. 28 through FIG. 30 exemplify logical description of a logic for generating an instruction code for executing operation equivalent to that of write type transfer instruction generated at inside thereof in the decode logic 202 of the operation instruction code (exe) included in the instruction decoder DEC.

The instruction code for executing operation equivalent to that of the write type transfer instruction generated at inside thereof, executes always the same operation and the control signal of MODS or MODD is not referred.

At a first portions (3-1) of the logical description shown by FIG. 28, the state code TMG is generated. The state code TMG progresses such that 1 ⓑ 3. At a second portion (3-2) of the logical description shown by FIG. 28, the bus control is executed. At state code 1 (=5'b00001), data write is executed, at state code 3 (=5'b00011), instruction read is executed. The data size is designated by the control signal LNG, BYTE generated by the operation instruction code.

At a third portion (3-3) of the logical description shown by FIG. 29, the effective address is reutilized. At state code 1, the effective address held in the temporary register TRA is outputted to the inner bus GB. At a fourth portion (3-4) of the logical description shown by FIG. 29, transfer data is controlled. At state code 3, the transfer data is outputted from the temporary register TRD to the inner bus DB and is outputted to the inner data bus IDB via the write data buffer WDB.

At a fifth portion of the logical description shown by FIG. 30, all of the control signals are initialized. When interruption is also permitted and interruption is requested, interruption exception processing can be executed successively.

Although logical description of the logical circuit for decoding the front instruction code for instruction expansion (pf) is not particularly illustrated, the control signals of mod and mskint in accordance with decoded result of the front instruction code for instruction expansion of FIG. 15 are generated, the logical operation exemplified in FIG. 23 through FIG. 30 is controlled by MODS, MODD and direct operation control with regard to data of memory can be executed as a total of the instruction decoder DEC.

Figure 31:
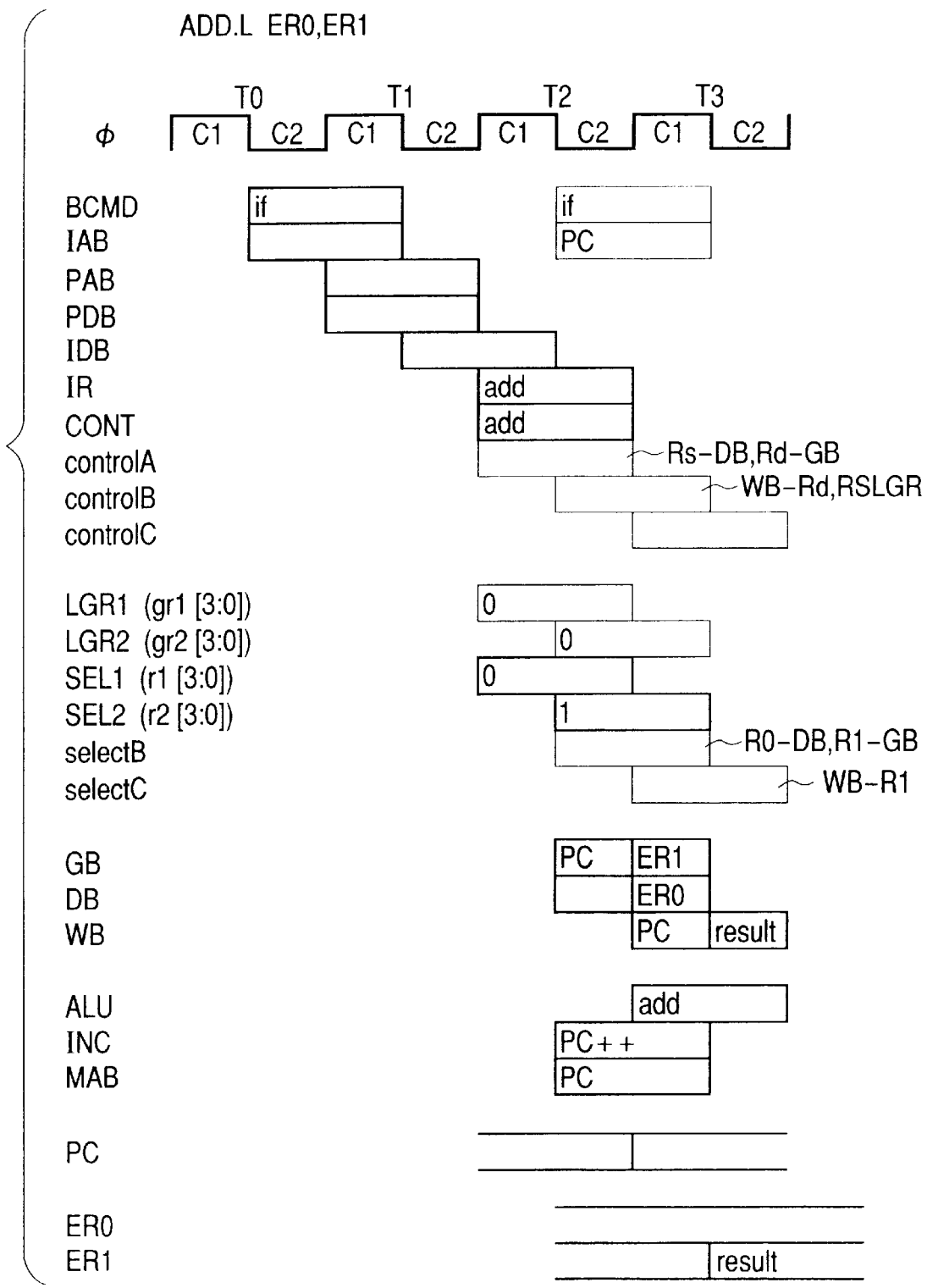
FIG. 31 is an operation timing diagram exemplifying execution timings of addition instruction which is not accompanied by a front instruction code.

FIG. 31 shows execution timings of the first addition instruction (ADD.LER0,ER1) which is not accompanied by the front instruction code for register expansion.

ADD.L ER0,ER1 uses only the general purpose registers of group 0 and accordingly, does not need the front instruction code for register expansion for designating a general purpose register group and is made to constitute instruction of 1 word similar to CPU described in, for example, "H8S/2600 series H8S/2000 series Programming Manual" issued by Hitachi Seisakusho Co. Ltd., March 1995, mentioned above.

Although not particularly restricted, an explanation will be given such that the inner data bus (IDB) is constituted by 16 bits and read/write of built-in ROM 4 and RAM 5 can be executed by 1 state. Further, CPU executes instruction by 3 stages pipeline of instruction fetch, decode and execute.

At slot C2 of cycle T0 (in synchronism with f#: in synchronism with f# which is inverted clock of clock signal f), an address is outputted from the address buffer AB to the bus IAB. Further, bus command (BCMD) indicating instruction fetch (if) is outputted from the instruction decoder DEC.

At slot C1 of cycle T1 (in synchronism with f), content of the address bus IAB is outputted to peripheral address bus (PAB), based on the bus command, read cycle is started and data is outputted to the peripheral data bus (PDB). At slot C2, read data of the peripheral data bus (PDB) is provided to the inner data bus IDB, and read data is latched to instruction register IR1 at slot C1 of cycle T2. The above-described operation is executed by control of executing prior instruction. The peripheral data bus (PDB) and the peripheral address bus (PDB) are buses, not illustrated, for a peripheral circuit connected to the inner data bus (IDB) and the inner address bus (IAB). Built-in ROM 4 and RAM 5 executes operation in correspondence with the peripheral address bus and the peripheral data bus in the modules.

When execution of immediate instruction has been finished, in the case in which execution of instruction is started most fastly, at slot C1 of cycle T2, an instruction code is inputted to the instruction decoder DEC of the control unit CONT and content of the instruction is decoded. The instruction decoder DEC outputs a control signal in accordance with decode result and executes control of respective portions. A portion of instruction (information of register designating field: SEL1) is given to the register selector RSEL. In the drawing, information of the source side register designating field SEL1=0 and information of the destination side register designating field SEL2=1. SEL1 corresponds to r1[3:0] of RSEL of FIG. 18 and SEL2 corresponds to r2[3:0].

According to the operation instruction between registers, at slot C2 of cycle T2, content of the program counter PC is read to the inner bus GB and is inputted to the address buffer AB and incrementer INC. The address signal is outputted from the address buffer AB to the address IAB. The control signal is given to the register selector 34. At this occasion, both of the latch circuits (LGR1, LGR2) 321 and 322 are cleared to 0 and accordingly, register selecting signal B (R0-DB, R1-GB) is generated based on signals from the register fields SEL1 and SEL2 and control signal A (Rs-DB, Rd-GB) outputted from the control unit CONT.

From cycle T3, next next instruction is read. At slot signal C1 of cycle T3, a result incremented (+2) by the incrementer INC is written to the program counter PC via the inner bus WB. The register selecting signal C (select C:WB-R1) is generated based on the input signal SEL2 and control signal B (WB-Rd). The register selecting signal B selects a register and inputs data of registers (Rs, Rd) on the source side and on the destination side to the arithmetic and logic functional unit ALU. Operation content of the arithmetic and logic functional unit ALU is designated by the control signal C (controlC). Operation can be executed in 1 clock for addition, logical operation or shift. For example, according to the instruction, addition of 32 bits is executed. Loading to next instruction to the control unit CONT is designated.

By the control signal B (RSLGR), clear of the latch circuits (LGR1, LGR2) 321, 322 is designated. Cleared result is transmitted at slot C1 of cycle T3 in the latch circuit (LGR1) 321 and at slot C2 of cycle T3 in the latch circuit (LGR2) 322.

At slot C2 of cycle T3, operation result of the arithmetic and logic functional unit ALU is written to the register (ER1) on the destination side selected by the register selecting signal via the inner bus WB. Although not illustrated, the condition register CCR is updated by the control signal C.

According to the example of FIG. 31, operation among registers in the register group 0 is executed substantially in 1 state.

Figure 32:
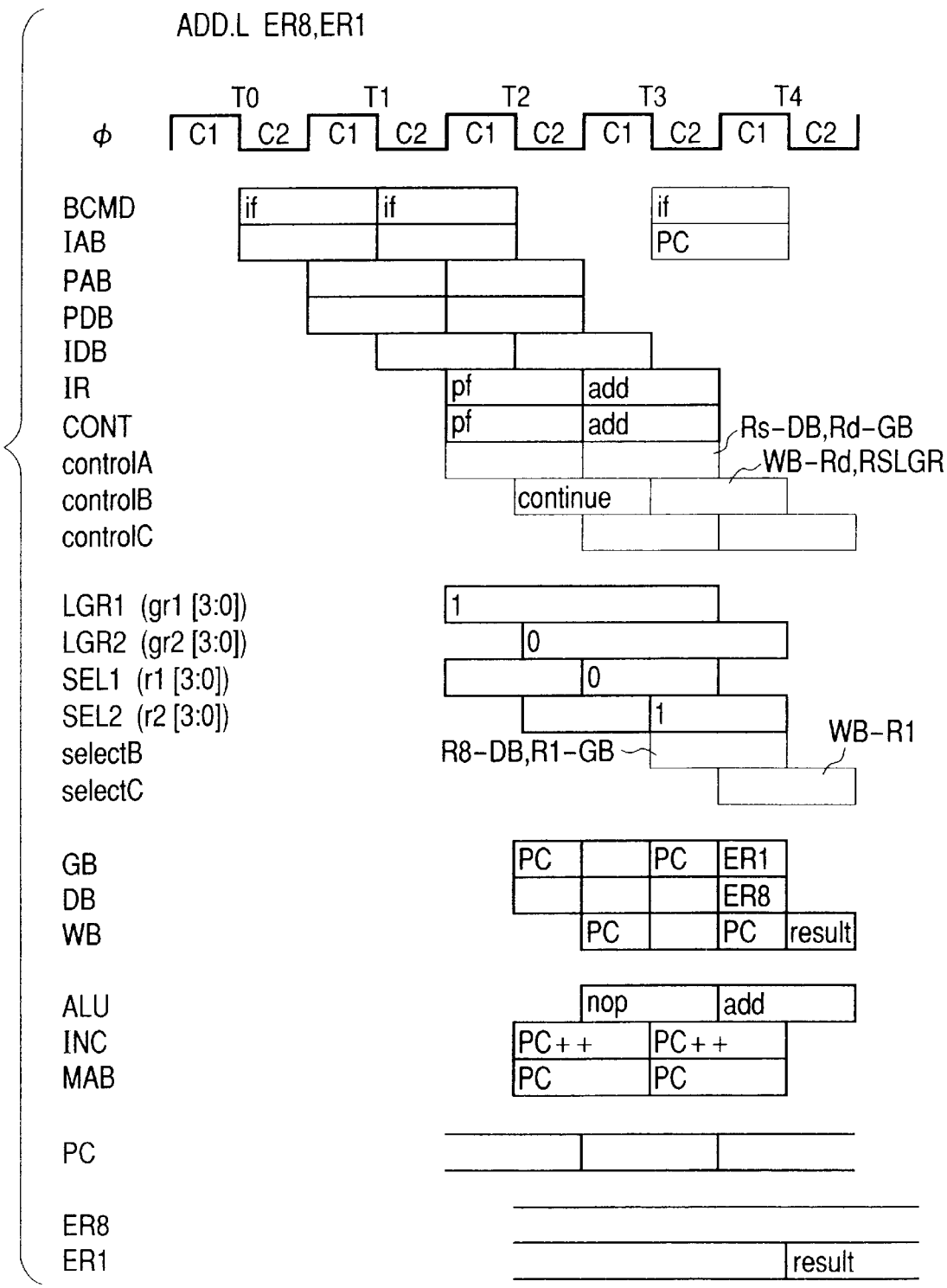
FIG. 32 is an operation timing diagram exemplifying execution timings of addition instruction added with a front instruction code for expanding a register.

FIG. 32 shows execution timings of second addition instruction (ADD.L ER8,ER1) added with the front instruction code for register expansion.

2 word instruction is constituted by adding the front instruction code for register expansion for designating a general purpose register group. The second word is the same as ADD.L R0,R1, mentioned above. That is, since gr1=1, with regard to same r1=0, it is interpreted that register number n=8.

At slot C2 of cycle T0, an address is outputted from the address buffer AB of CPU 2 to the address bus IAB.

At slot C1 of cycle T1 (in synchronism with f), content of the address bus IAB is outputted to the peripheral address bus (PAB) and read cycle is started. At slot C2, read data is provided to the inner data bus IDB and the read data is latched to the instruction register IR1 at slot C1 of cycle T2. This is word of the front instruction code for register expansion which is provided with the register group field and is ignorable.

Successively at slot C2 of cycle T2, next address (content incremented by +2) is outputted to address bus IAB and the read data is latched to the instruction register IR at slot C1 of cycle T3. The above-described operation is executed by control of executing prior data and there also is a case in which a relative relationship therebetween differs.

When execution of immediate instruction has been finished, in the case in which execution of instruction is started most fastly, at slot C1 of cycle T2, an instruction code (front instruction code for register expansion) is inputted to the control unit CONT and content of the instruction is decoded. A control signal is outputted in accordance with decode result and control of respective portion is executed. A group field latch signal (LGRCL) is generated and the register group designating field (bits 7 through 0 of IR1) is latched to latch circuits (LGR1, LGR2) 321, 322.

At slot C2 of cycle T2, content of the program counter PC is read to the inner bus GB and is inputted to the address buffer AB and the incrementer INC. An address signal is outputted from the address buffer AB to the address bus IAB.

From cycle T3, next next instruction is read. At slot C1 of cycle T3, a result incremented (+2) by the incrementer INC is written to the program counter PC via the inner bus WB. Since the first word and the second word and thereafter are not divided, a continuous instruction signal (interruption prohibition signal: continue=mskint) is outputted to an interruption receiving circuit by the control signal B (controlB). Execution of instruction can be continued by the signal even when interruption request is generated. Further, content of the latch circuits (LGR1, LGR) 321 and 322 is maintained.

Meanwhile, at slot C1 of cycle T2, an instruction code (designating addition instruction) is inputted to the instruction decoder (DEC) 33 and content of the instruction is decoded. In accordance with decode result, the control signal is outputted and control of respective portions is executed. Since LGR1=1 and LGR2=0 and accordingly, the register selecting signal B (R8-DB, R1-GB) is generated based on SEL1 (and SEL2) and the control signal A (Rs-DB, Rd-GB) outputted by the instruction decoder DEC. Operation by the second word other than the above-described can be made the same as that of the first addition instruction (ADD.L ER0,ER1). Similar to the first addition instruction, by the control signal B (RSLGR), clear of the latch circuits (LGR1, LGR2) 321, 322 is designated. At slot C1 of cycle T4, the latch circuit (LGR1) 321 transmits result cleared at slot C2 of cycle T4 to the latch circuit (LGR2) 322.

Other than outputting the latch signal of the latch circuit (LGR1, LGR2) 321, 322 in correspondence with the first word (front instruction code for register expansion) and continuous instruction signal, the content of the instruction decoder DEC can be made equivalent to that of an instruction decoder of existing CPU. A portion of the instruction decoder DEC in correspondence with the front instruction code for register expansion is naturally small relatively. That is, addition of the logical scale can be minimized. Further, a large portion of the instruction decoder DEC can be made equivalent to an instruction decoder of existing CPU and therefore, conventional design resources can effectively be utilized.

Further, with regard to other instruction, by adding similar front register code for register expansion, any of the general purpose registers can be designated. The instruction code can be applied to instruction of an instruction code having the register designating field.

Figure 33:
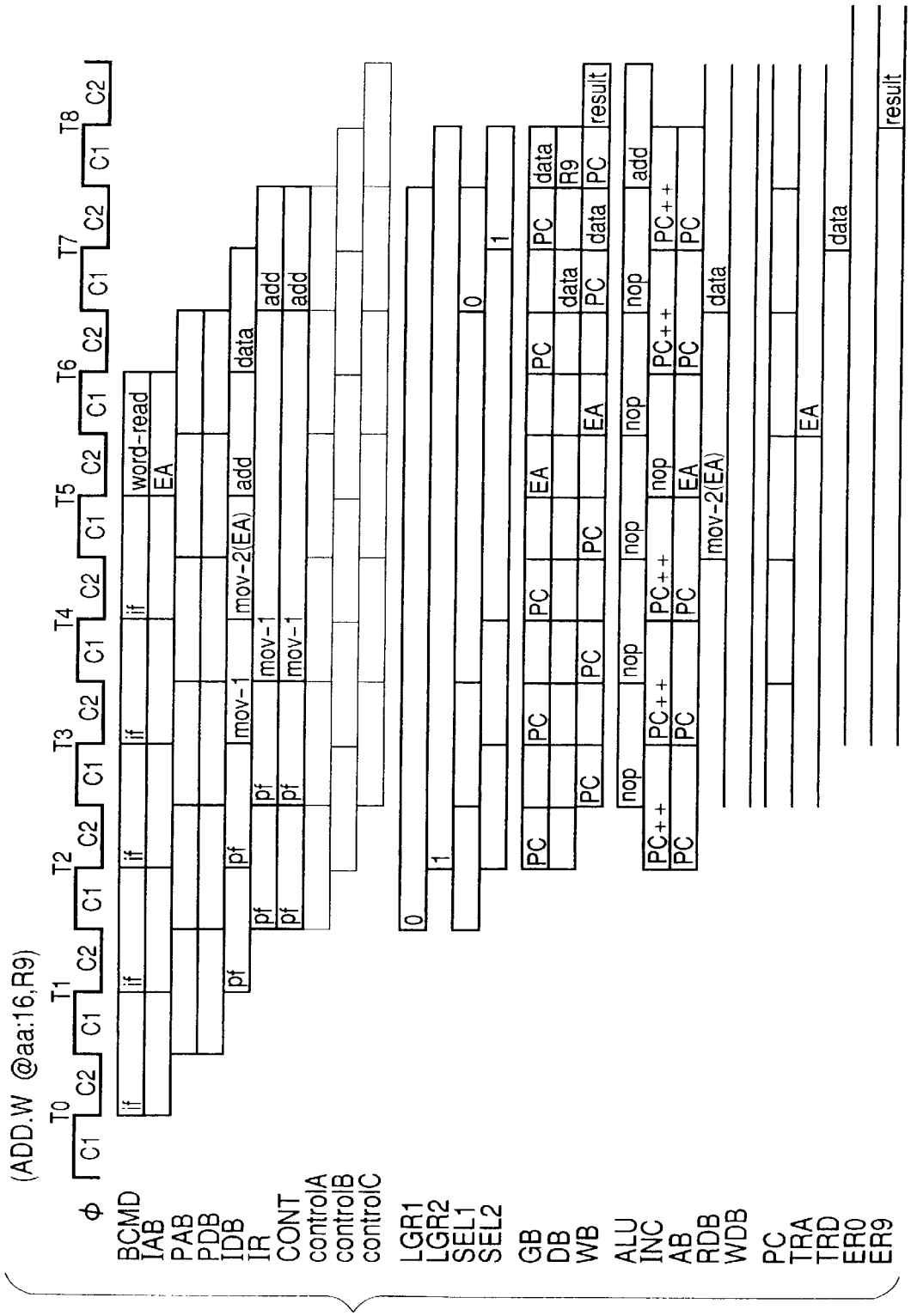
FIG. 33 is a timing diagram exemplifying operation timings in executing instruction regarded as one instruction by combining a front instruction code having a register group field, a front instruction code of memory/register type operation, an instruction code in correspondence with MOV.W@aa:16, R0 and an instruction code in correspondence with ADD.W R0, R1.

FIG. 33 shows execution timings of addition instruction (ADD.W @aa:16,R9) of memory/register type. That is, there are shown timings in executing instruction regarded as one instruction by combining the front instruction of the front instruction code for register expansion having the register group field, the front instruction code for instruction expansion of the memory/register type operation, the instruction code corresponding with MOV.W @aa:16,R0 and the instruction code in correspondence with ADD.W R0,R1.

The front instruction code for register expansion having the register group field is set to H'0001 to designate the general purpose register of group 1. That is, since gr2=1, with regard to same r2=1, it is interpreted that the register number n=9.

Further, the front instruction code for instruction expansion of the memory/register type is made to constitute H'0108 in accordance with FIG. 15 and designates that the source side constitutes memory. According to the instruction, the general purpose register is selected by combining gr1 and r1 in executing the EA1 instruction code although not directly related thereto. Further, the general purpose register is selected by combining gr2 and r2 in executing the operation instruction code.

The transfer instruction code executes read of memory similar to existing transfer instruction and stores read data to the temporary register TRD based on designation in which the source side constitutes memory by the front instruction code. The designation of constituting memory by the source side is continued.

In accordance with designation of constituting memory by the source side, the operation instruction code reads the source side data not from the general purpose register but from the temporary register (TRD). Other operation is made similar to that of existing operation instruction.

At slot C2 of cycle T0 (in synchronism with f#, # designates inverted logic), an address is outputted from the address buffer AB of CPU 2 to IAB.

At slot C1 of cycle T1 (in synchronism with f), content of IAB is outputted to PAB and read cycle is started. At slot C2 of cycle T1, read data is provided to the inner data bus and the read data bus is latched to IR (IR1) at slot C1 of cycle T2. This is instruction word (front instruction code for register expansion) which is provided with the register group field and is ignorable.

Successively, at slot C2 of cycle T2, next address (content incremented by +2) is outputted to IAB and the read data is latched to IR (IR1) at slot C1 of cycle T3. The above-described operation is executed by control of executing prior instruction and there also is the case in which a relative relationship therebetween differs.

When execution of immediate instruction has been finished, in the case in which execution of instruction is started most fastly, at slot C1 of cycle T2, an operation code (front instruction for register expansion) is inputted to the instruction decoder DEC and content of the instruction is decoded. In accordance with decode result, a control signal is outputted and control of respective portions is carried out. The group field latch signal LGRCL is generated and the register group designating field (bits 7 through 0 of IR1) is latched to the latches LGR1, LGR2.

At slot C2 of cycle T2, content of the program counter PC is read to the inner bus GB and is inputted to the address buffer AB and the incrementer INC. Address information is outputted from the address buffer AB to the address bus IAB.

At slot C2 of cycle T1, address information is outputted from the address buffer AB of CPU 2 to the address bus IAB.

At slot C1 of cycle T2 (in synchronism with f), content of the address bus IAB is outputted to PAB and read cycle is started. At slot C2 of cycle T2, the read data is provided to the inner data bus and the read data is latched to IR at slot C1 of cycle T2. This is the front instruction code for instruction expansion (pf) indicating operation with regard to memory.

At slot C2 of cycle T3, next address (content incremented by +2) is outputted to the address bus IAB and the read data is latched to the instruction register IR (IR1) at slot C1 of cycle T4 (first word (mov-1) of MOV instruction).

At slot C1 of cycle T3, the instruction code (front instruction code for instruction expansion pf) is inputted to the decoder DEC, content of the instruction is decoded and in the case of such front instruction code for instruction expansion, the instruction code designates that the source side data is present on the memory. That is, the MODS signal is set to 1 as control signal C and is fed back to the decoder DEC.

At slot C2 of cycle T3, content of the program counter PC is read to the inner bus GB and is inputted to the address buffer AB and the incrementer INC. The address information is outputted from the address buffer AB to the address bus IAB.

At slot C1 of cycle T4, the instruction code (first word (mov-1) of MOV instruction) is inputted to the instruction decoder DEC and content of the instruction is decoded. In accordance with decode result, a control signal is outputted and control of respective portions is executed. Owing to the addressing mode of absolute address, successively, the absolute address which is the EA expansion portion is read and thereafter, based on the absolute address, read of source data is executed and read result is stored to the temporary register TRD.

At slot C1 of cycle T4, a result incremented (+2) by the incrementer INC is written to the program counter PC via the inner bus WB. At slot C2 of cycle T4, content of the program counter PC is read to the inner bus GB and is inputted to the address buffer AB and the incrementer INC. Address information is outputted from the address buffer AB to the address bus IAB.

From cycle T4, read cycle is started and the read data is latched to the read data buffer RDB at slot C1 of cycle T5 (second word (mov-2) of MOV instruction, that is, absolute address which is EA expansion portion).

At slot C1 of cycle T5, the result incremented (+2) by the incrementer INC is written to the program counter PC via the inner bus WB. At slot C2 of cycle T5, content (absolute address) of the read data buffer RDB is read to the inner bus GB and is inputted to the address buffer AB. The address information is outputted from the address buffer AB to the address bus IAB.

From cycle T6, source data is read. Further, at slot C2 of cycle T5, content of the program counter PC is read to the inner bus GB and is inputted to the address buffer AB and the incrementer INC. The address information is outputted from the address buffer AB to the address bus IAB. At slot C1 of cycle T7, the read data (source data) is stored to the read data buffer RDB. Further, the read data is outputted from the read data buffer RDB to the inner bus DB and is inputted to the arithmetic and logic functional unit ALU. Operation of the arithmetic and logic functional unit ALU is made nonoperational.

At slot C2 of cycle T7, read data is outputted from the arithmetic and logic functional unit ALU to the inner bus WB and is stored not to the general purpose register but to the temporary register TRD since the signal MODS is set to 1.

At slot C1 of cycle T7, an instruction code (ADD instruction (add)) is inputted to the instruction decoder DEC and content of the instruction is decoded. In accordance with decode result, a control signal is outputted and control of respective portions is executed. Since the signal MODS is set to 1, source side data is read not from the general purpose register but from the temporary register TRD. The designation side reads data from the general purpose register and stores the operation result to the general purpose register.

At slot C2 of cycle T7, content of the program counter PC is read to the inner bus GB and is inputted to the address buffer AB and the incrementer INC. Address information is outputted from the address bus AB to the address bus IAB.

At slot C1 of cycle T8, a result incremented (+2) by the incrementer INC is written to the program counter PC via the inner bus WB. Further, the destination side is not changed, in accordance with the register group field (gr2=1) and the register field (r2=1), the destination data is outputted from the general purpose register (ER9) to the inner bus GB, source side data is outputted from the temporary register TRD to the inner bus DB in accordance with the signal MODS and both of them are inputted to the arithmetic and logic functional unit ALU. The arithmetic and logic functional unit ALU executes addition operation.

At slot C2 of cycle T8, the operation result of outputted from the arithmetic and logic functional unit ALU to the inner bus WB and is stored to the general purpose register (ER9).

Further, since the first word and the second word and thereafter are not divided, the control signal B outputs a continuous instruction signal. By the signal, even when interruption request is generated, execution of instruction can be continued.

That is, other than output of the signal MODS and the output of the continuous instruction signal in correspondence with the front instruction code for instruction expansion, selection of data store destination and output of the continuous instruction signal in accordance with the signal MODS in correspondence with the transfer instruction code and selection of data read source in accordance with the signal MODS with regard to the addition instruction code, the logical constitution of the instruction decoder DEC can be made equivalent to that of an instruction decoder of lower CPU. Portions in correspondence therewith are naturally small relatively. That is, addition and change of the logical scale can be minimized. Further, a large portion of the instruction decoder DEC can be made equivalent to the instruction decoder of existing lower CPU and accordingly, conventional design resources can effectively utilized.

Further, with regard to other operation instruction (addition, subtraction, multiplication, division, comparison, logical product, logical sum or exclusive OR), by adding similar front instruction code for instruction expansion and transfer instruction code, operation of memory and the general purpose register can be realized.

Further, when the addressing mode on the source side is made register indirect, by adding a front instruction code for register expansion having a register group field to front of the instruction, and constituting the code of any of gr1=1 through 3, general purpose registers on the source side may constitute group 1 through 3. That is, gr1 of a front instruction code for register expansion having the register group field is made to correspond to the source side and gr2 is made to correspond to the destination side.

Figure 34:
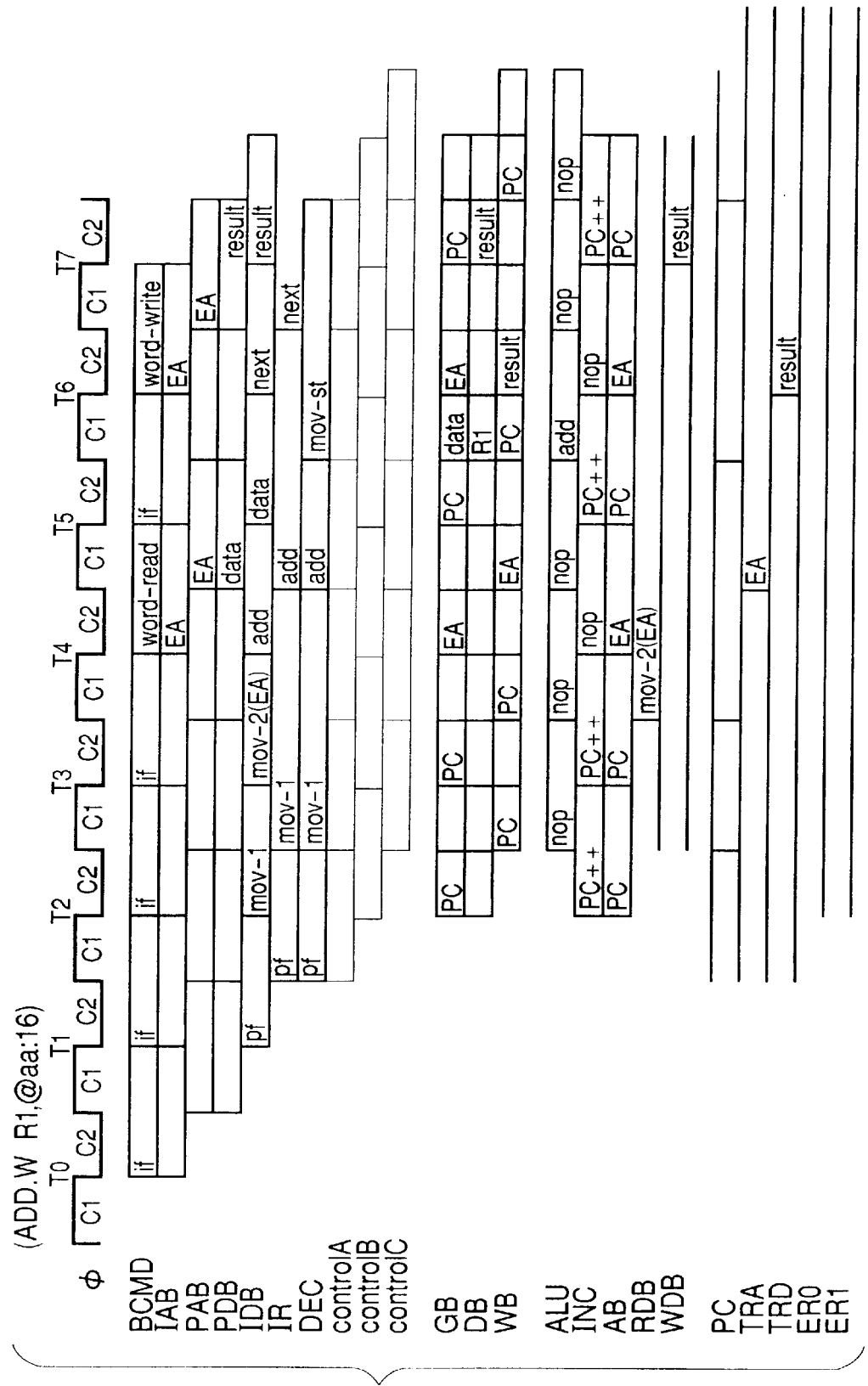
FIG. 34 is a timing diagram showing execution timings of addition instruction of a register/memory type (ADD.W R1,@aa:16)

FIG. 34 shows execution timings of addition instruction (ADD.W R1,@aa:16) of the register/memory type. That is, there are shown timings in executing instruction regarded as one instruction by combining the front instruction cord for instruction expansion, an instruction cord in correspondence with MOV.W @aa:16,R0 and an instruction code in correspondence with ADD.W R1,R0. The front instruction code for instruction expansion at this occasion is made to constitute H'0104 in accordance with FIG. 15 and by the signal MODD, it is designated that the source side constitutes the general purpose register and the designation side constitutes memory.

Similar to existing transfer instruction, the transfer instruction code executes read of memory from slot C2 of cycle T4 and stores the effective address (memory address) generated based on the designation (MODD) in which the destination side by the front instruction code for instruction expansion is made to constitute memory to the temporary register TRA. Further, at slot C1 of cycle T6, at time point of storing read data to read data buffer DBR, execution is finished earlier than by 1 state than in the case of read of existing transfer instruction or data on the source side. Therefore, instruction fetch and increment of PC are not executed. Designation of constituting memory by the destination side is continued. The operation instruction code (add) is inputted to the instruction decoder DEC from slot C1 of cycle T5.

In accordance with the designation (MODD) constituting memory by the destination side, the operation instruction code reads the destination side data not from the general purpose register but from the read data buffer RDB and inputs the destination side data to the arithmetic and logic functional unit ALU. Since on the source side, the general purpose register is implicitly designated, content of the general purpose register R1 is read to the bus DB and is inputted to the arithmetic and logic functional unit ALU. At slot C2 of cycle T6, the operation result is stored to the temporary register TRD. Further, by the control signal mkmov, an instruction code (mov-st:16'b0111_1000_ 1???_????, bits of? may be arbitrary) similar to MOV.W R0,@ER0 is generated by CHG and is inputted to the instruction decoder DEC from slot C1 of cycle T6.

The generated instruction code (mov-st) constitutes the address register by the temporary register TRA and executes operation similar to the transfer instruction constituting the data register by the temporary register TRD. That is, at slot C2 of cycle T6, the effective address stored to the temporary register TRA is read to the bus GB via the address bus AB and outputted to the inner address bus IAB and bus command of word data write is generated. At slot C2 of cycle T7, the operation result stored to the temporary register TRD is read to the bus DB and outputted to the inner bus IDB via the write data buffer WDB and the operation result is written to the memory address of the destination. From slot C2 of cycle T7, instruction fetch is executed and increment of the program counter PC is executed. Thereby, execution of the transfer instruction code (mov-1) is shortened and an amount of not executing instruction fetch and increment of the program counter PC is restored.

In executing write to the destination side memory, by generating the instruction code (mov-st) at inside of CPU 2, the instruction code can be shortened and processing time can be shortened. By referring to the content of the temporary register TRA, there is no need of executing again calculation of the effective address, further, the processing time can be shortened. By using the instruction code similar to MOV.W R0,@ER0, design can be facilitated and the increase in the logical scale can be restrained.

In the case of the comparison instruction, there is no need of executing write to the destination side memory. Also in this case, only the operation is executed similar to the above-described and only bus command at slot C2 of cycle T6 may be changed to be nonoperational. That is, in the case of executing the instruction code of the comparison instruction, the control signal is generated and write operation is prohibited in the instruction code of executing write to the destination side memory. The control system can be made common and the increase in the logical scale can be restrained. Or, the instruction code generated at inside thereof may correspond to the instruction code of nonoperation (NOP) instruction. In this case, the processing time can further be shortened.

Further, also with regard to other operation instruction (addition, subtraction, multiplication, division, comparison, logical product, logical sum, exclusive OR) for two data, by adding similar front instruction code for instruction expansion and transfer instruction code, operation of memory and general purpose register can be realized. Further, also with regard to operation instruction (sign inversion, logic inversion, shift, rotate) for one data, by adding similar front instruction code for instruction expansion and transfer instruction code, operation of data on memory can be realized.

Further, also in executing instruction explained in reference to FIG. 34, control of restraining change of the condition code register CCR by operation result in the midway until execution of operation instruction is reached and control of restraining interruption by the control signal mskint are executed similar to the above-described.

Figure 35:
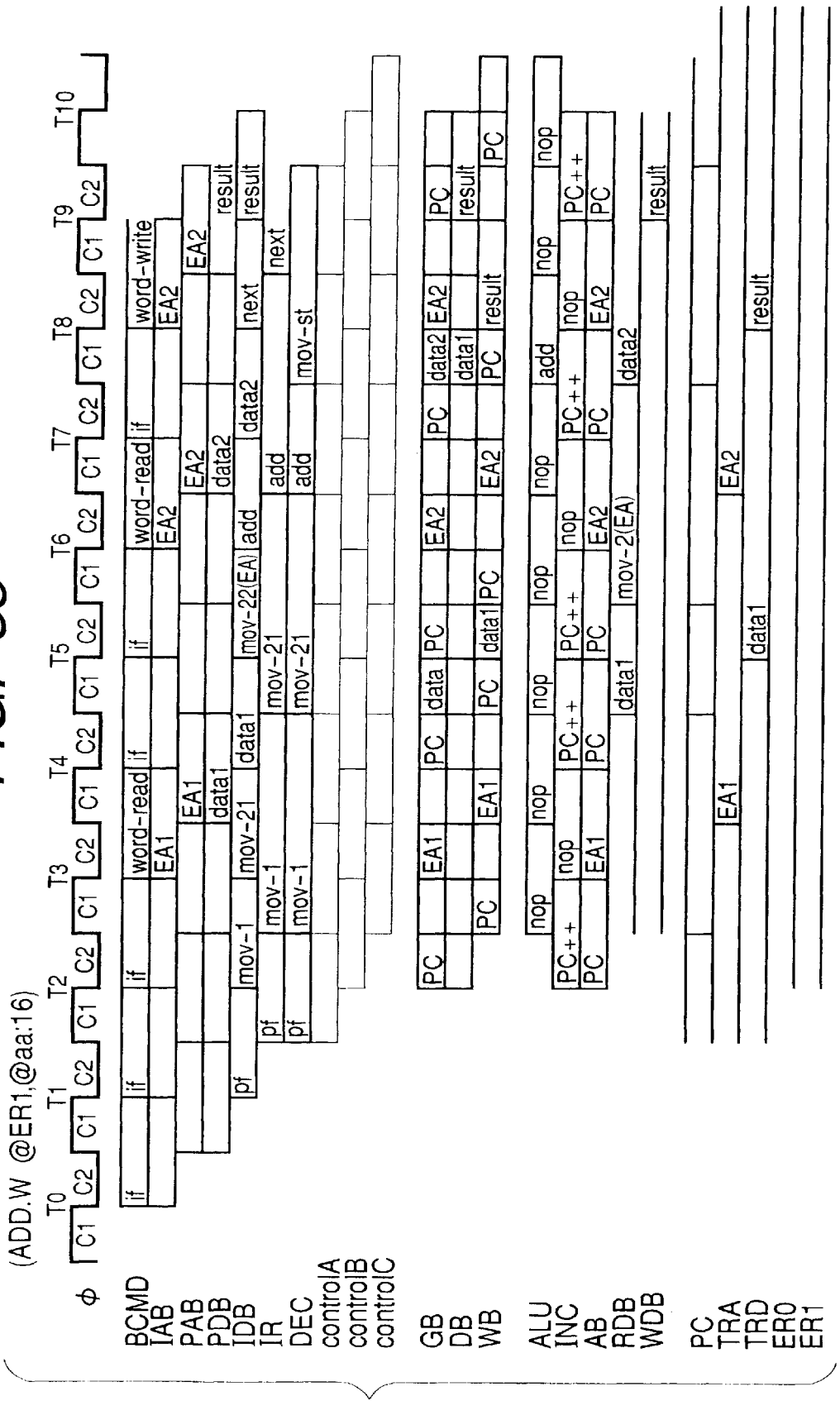
FIG. 35 is a timing diagram showing execution timings of addition instruction of a memory/memory type (ADD.W @ER1,@aa:16)

FIG. 35 shows execution timings of addition instruction (ADD.W @ER1,@aa:16) of the memory/memory type. That is, there are shown timings in executing instruction regarded as one instruction by combining the front instruction code for instruction expansion (pf), the instruction code (mov-1) in correspondence with MOV.W@ER1,R0 and the instruction (mov-2) in correspondence with MOV.W@aa:16,R0 and the instruction code (add) in correspondence with ADD.W R0,R1.

In the case of FIG. 35, in accordance with FIG. 15, the front instruction code for instruction expansion is made to constitute H'010C and it is designated that both of the source side and the destination side constitute memory by MODS, MODD signals.

The transfer instruction code (mov-1) executes read of memory from slot C2 of cycle T3 and stores the generated effective address (memory address) to the temporary register TRA based on the designation (MODS) for constituting memory by the source side by the front instruction code for instruction expansion. Further, at slot C1 of cycle T5, read data (data1) is outputted to the buss GB via the read data buffer RDB. The read data is outputted to the bus WB via the arithmetic and the logic functional unit ALU and is stored to the temporary register at slot C2 of cycle T5. The designation of constituting memory by the source side and the destination side is continued and finish of the source side data is designated (MODSE).

From slot C2 of cycle T6, similar to the transfer instruction code of FIG. 34, the transfer instruction code (mov-2) executes read of memory and stores generated effective address (memory address) to the temporary register TRA based on the designation (MODD) of constituting memory by the destination side by the front instruction code for instruction expansion and the finish designation (MODSE) of the source side data. Further, at slot C1 of cycle T8, at time point of storing read data to the read data buffer RDB, the execution is finished earlier by 1 state than in the case of existing transfer instruction or read of data of the data side. The designation of constituting memory by the source and the destination side is continued.

At slot C1 of cycle T8, the operation instruction code reads the destination side data from the read data buffer RDB to the bus GB in accordance with the designation (MODS, MODD) constituting memory by the source and the destination side and inputs the destination side data to the arithmetic and logic functional unit ALU. The operation instruction code reads the source side data from the temporary register TRD to the buss DB and inputs the source side data to the arithmetic and logic functional unit ALU. At slot C2 of cycle T8, the operation result is stored to the temporary register TRD. Further, the instruction code (mov-st) similar to MOV.W R0,@ER0 is generated and inputted to the instruction decoder DEC from slot C1 of cycle T6.

The generated instruction code (mov-st) constitutes the address register by the temporary register TRA and executes operation similar to that of the transfer instruction constituting the data register by the temporary register TRD.

At this occasion, in the case of executing the designation (MODS, MODD) of constituting memory by the source side and the destination side, with regard to the transfer instruction code, MODSE signal is cleared to 0 at a first time, read of data on the source side is executed, at a second time, MODSE signal is se to 1 and read of the destination side is executed.

Further, also in executing instruction explained in reference to FIG. 35, control of restraining change of the condition code register CCR by the operation result at a midway until execution of the operation instruction is reached and control of restraining interruption by the control signal mskint are executed similar to the above-described.

Figure 36:
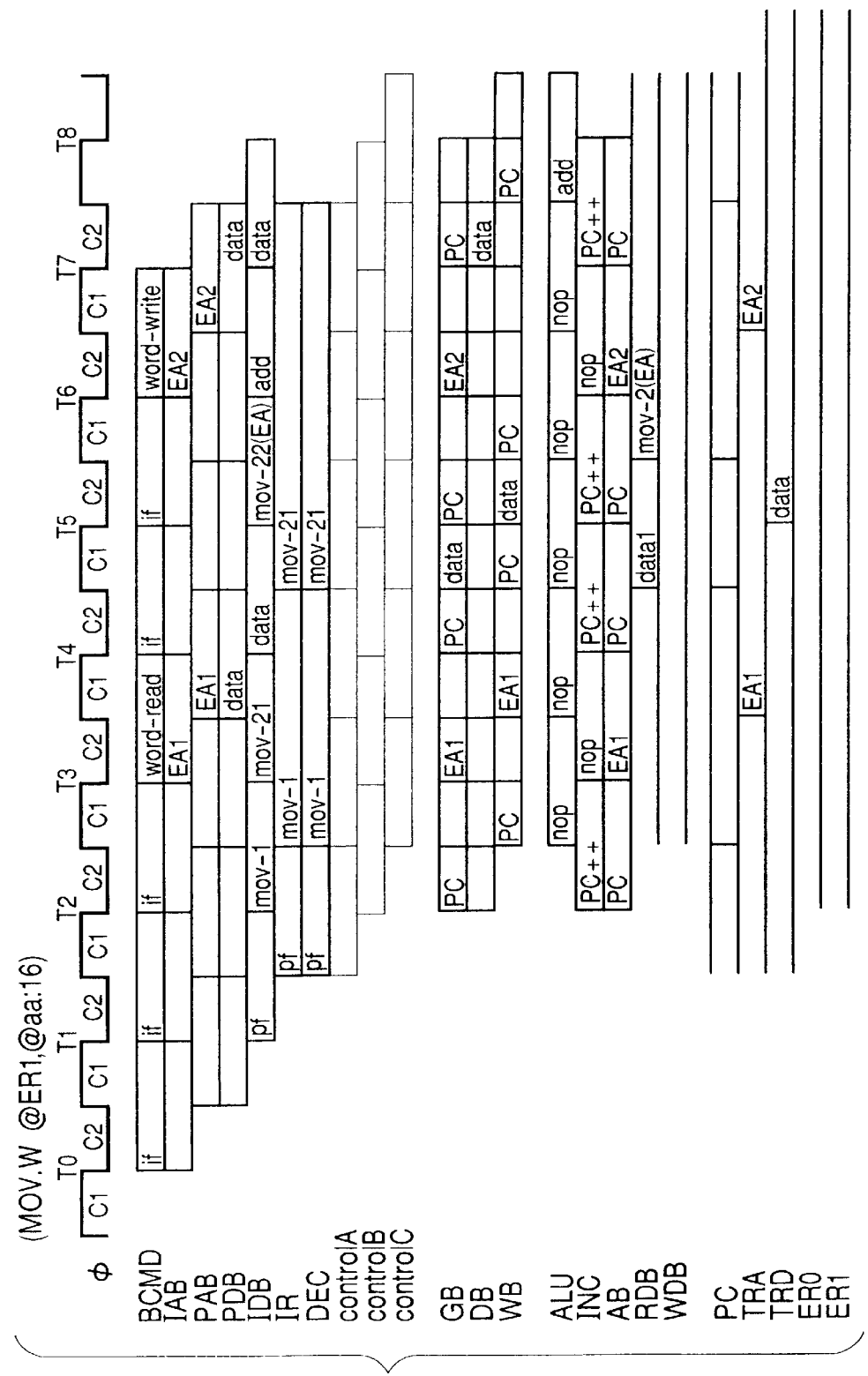
FIG. 36 is a timing diagram showing execution timings of transfer instruction of a memory/memory type (MOV.W @ER1,@aa:16)

FIG. 36 shows execution timings of the transfer instruction of the memory/memory type (MOV.W @ER1,@aa:16). That is, there are shown timings of executing instruction regarded as one instruction by combining the front instruction code for instruction expansion, the instruction code in correspondence with MOV.W @ER1,R0 and the instruction code in correspondence with MOV.W R0,@aa:16. The front instruction code for instruction expansion at this occasion is made to constitute H'0108 in accordance with FIG. 15.

The transfer between memories are made similar to the addition instruction and in place of the instruction code in correspondence with ADD.W R0,R1, the instruction code in correspondence with MOV.W R0,R1 is used to thereby enable to realize the instruction. In this case, read on the destination side is executed, however, in view of property of the transfer instruction, read of the destination side is not necessary and the processing time is wasted.

In this example, it is designated that the front instruction code for instruction expansion, the transfer instruction code of the read type and the transfer instruction code of the write type are combined and with regard to the front instruction for instruction expansion, the source side constitutes memory.

The read type transfer instruction code executes read of memory and stores read data to the temporary register TRD based on designation of the front instruction code for instruction expansion. The designation constituting memory by the source side is continued.

Similar to existing transfer instruction, the write type transfer instruction code executes write of memory, in accordance with the designation (MODS) constituting memory by the source side, write data is outputted not from the general purpose register but from the temporary register TRD.

In comparison with the case in which a realizing method equivalent to the addition instruction is adopted, the operation instruction code can be omitted. As a result, the instruction code length can be shortened by 1 word and a number of execution states can be shortened by 3 states.

Figure 37:
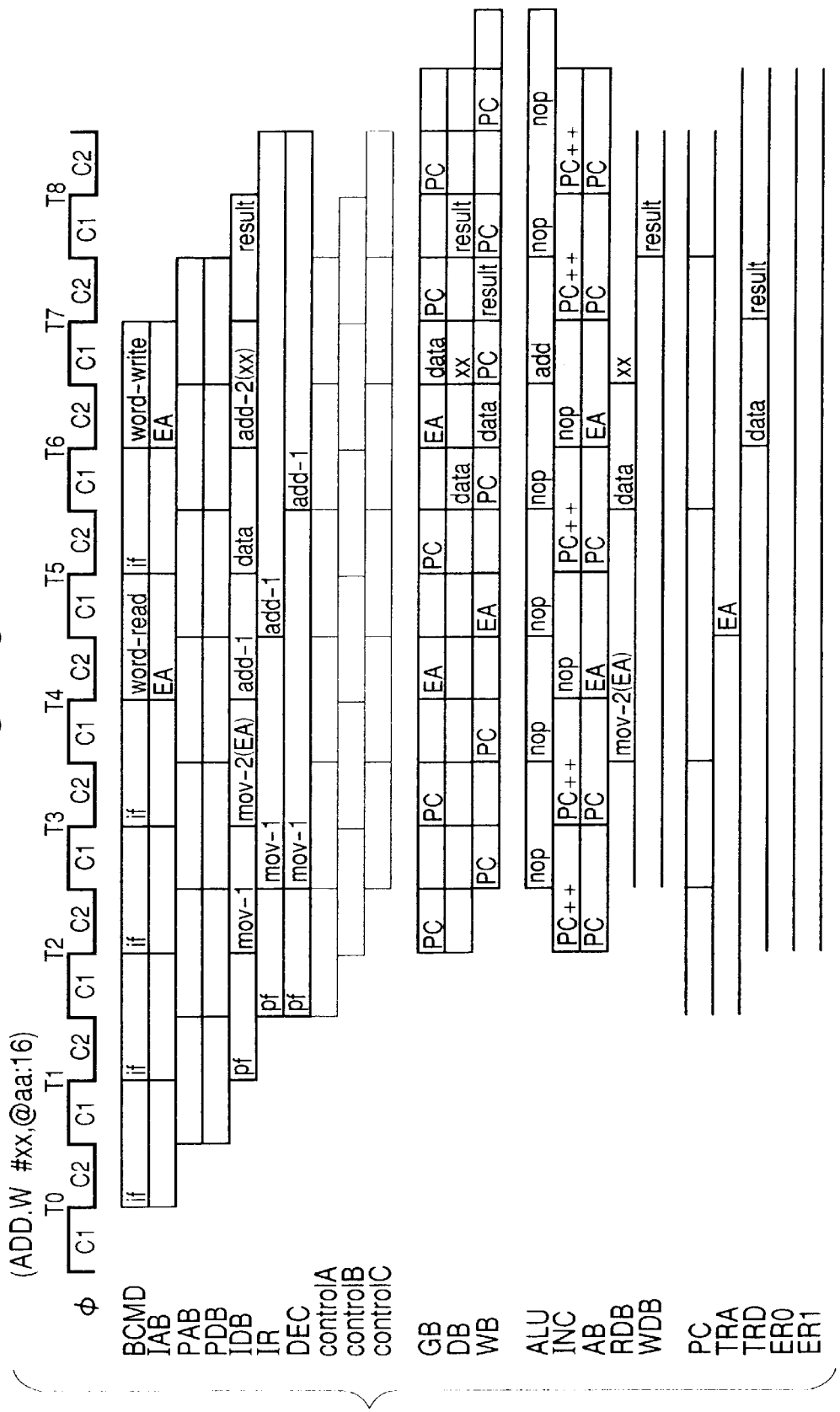
FIG. 37 is a timing diagram showing execution timings of addition instruction of an immediate/memory type (ADD.W#xx,@aa:16)

FIG. 37 shows execution timings of the addition instruction of immediate/memory type (ADD.W #xx,@aa:16). Similar to FIG. 34, content of the drawing shows timings in executing instruction regarded as one instruction by defining by combining the front instruction code for instruction expansion, an instruction code in correspondence with MOV.W @aa:16,R0 and an instruction code in correspondence with ADD.W #xx,R0. Although the destination side constitutes memory, in the case of immediate data, read data is temporarily stored to the temporary register TRD. Therefore, in accordance with FIG. 15, the front instruction code for instruction expansion is made to constitute H'0108 and the control signal (MODS) constituting memory by the source side is generated.

According to operation of the front instruction code for instruction expansion and the transfer instruction code, at slot C1 of cycle T6, read data is read from the read data buffer RDB to the bus GB. The read data is outputted to the bus WB via the arithmetic and logic functional unit ALU and is stored to the temporary register TRD at slot C2 of cycle T6.

With regard to the designation (MODS) of the front instruction code for instruction expansion, the operation instruction code of the immediate data reads the designation side data not from the general purpose register but from the temporary register TRD to the bus GB and inputs the destination side data to the arithmetic and logic function unit ALU at slot C1 of cycle T8. On the source side, the immediate data is read from the read data buffer RDB to the inner bus DB and is inputted to the arithmetic and logic functional unit ALU. At slot C2 of cycle T8, the operation result is stored to the temporary register TRD. Further, based on the designation (MODS) of the front instruction code for instruction expansion, from slot C2 of cycle T6, word size write is started. At slot C2 of cycle T6, the address is read from the temporary register TRA and is outputted to the inner address bus IAB via the bus GB and the address buffer AB. With regard to data, at slot C1 of cycle T8, the operation result is read from the temporary register TRD and is outputted to the inner data bus IDB via the bus DB and the write data buffer WDB. In accordance with the designation (MODS) of the front instruction code for instruction expansion, write operation is added to that of the operation instruction of the immediate data.

In the case of ADD.W #xx,@aa:16, since the operation instruction code is constituted by 2 words, the operation instruction code differs from that in FIG. 34, however, in the case of immediate of byte size, operational timings similar to those in FIG. 34 may be constituted.

Further, also in executing instruction explained in reference to FIG. 37, control of restraining change of the condition code register CCR by the operation result at a midway until execution of the operation instruction is reached and control of restraining interruption by the control signal mskint, are executed similar to the above-described.

Figure 38:
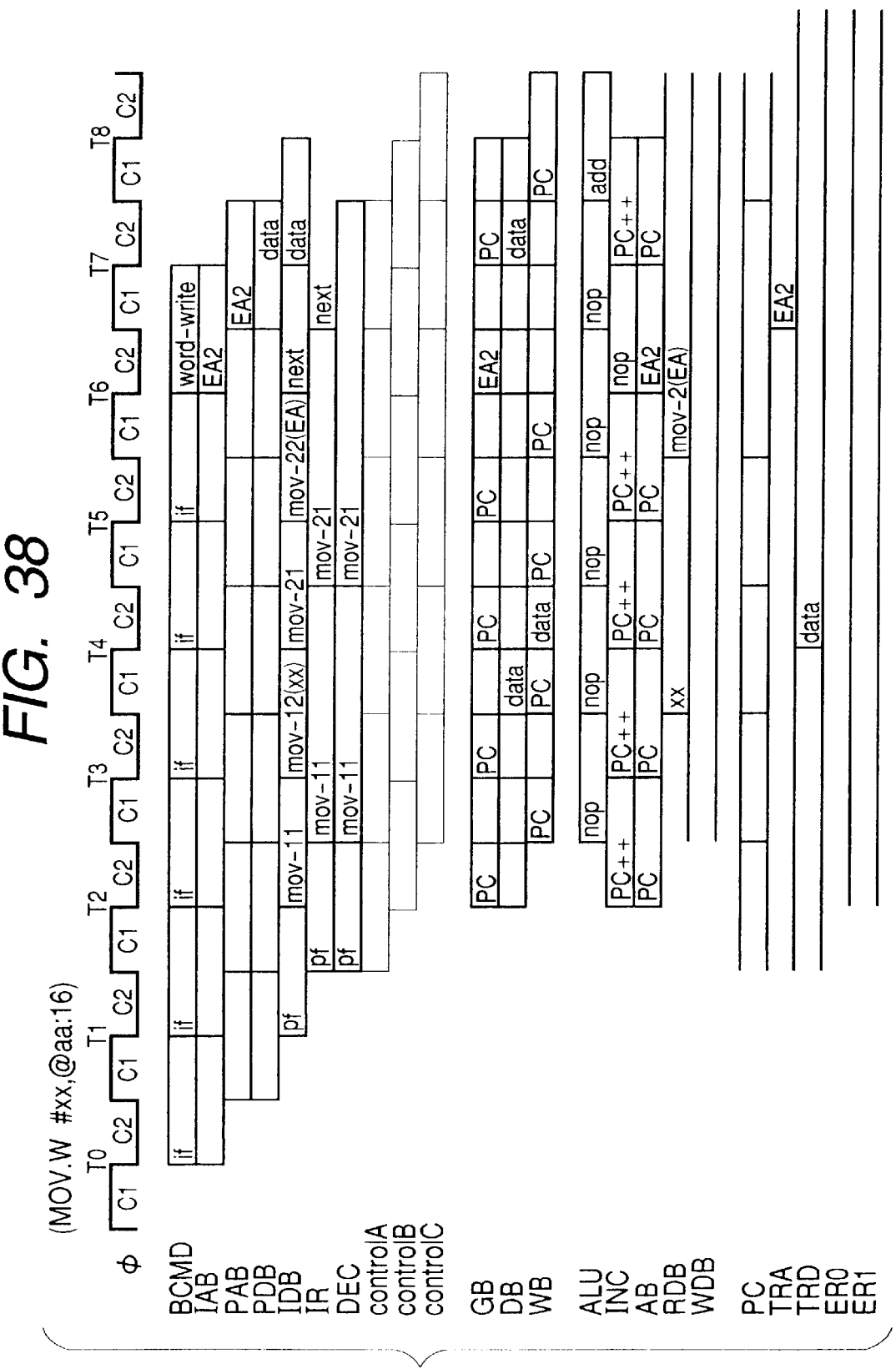
FIG. 38 is a timing diagram showing execution timings of transfer instruction of an immediate/memory type (MOV.W#xx,@aa:16)

FIG. 38 shows execution timings of the transfer instruction of the immediate/memory type (MOV.W #xx,@aa:16). That is, there are shown timings in executing instruction regarded as one instruction by combining the front instruction code for instruction expansion, the instruction code in correspondence with MOV.W #xx,R0 and an instruction code (write type transfer instruction code) in correspondence with MOV.W R0,@aa:16. At this occasion, the front instruction code for instruction expansion is made to constitute H'0104 in accordance with FIG. 15.

At slot C1 of cycle T4 in FIG. 38, the immediate data is read from the read data buffer RDB to the bus DB and is outputted to the bus WB via the arithmetic and logic functional unit ALU at slot C2 of cycle T4. The immediate data is stored to the temporary register TRD based on the designation (MODD) of the front instruction code for instruction expansion.

The write type transfer instruction code executes write of memory similar to existing transfer instruction and at slot C2 of cycle T7, in accordance with the designation (MODD) of the front instruction code for instruction expansion, write data is outputted not from the general purpose register but from the temporary register TRD.

Setting the immediate data to the memory including the inner I/O register is regarded such that an appearance frequency is comparatively high and accordingly, it is preferable to shorten the instruction code length and shorten the processing time.

FIG. 39 through FIG. 41 show other example of logical description with regard to a portion of the decode logic 201 of the operation instruction code (exe) included in the instruction decoder DEC. The logical description shown by the drawings corresponds to the addition instruction (ADD.W #xx:16,Rn) of 16 bits immediate data.

In correspondence with the MODS signal, execution states are extended and write operation is inserted. At a first portion (4-1) of the logical description shown by FIG. 39, state code TMG is generated. As single instruction, the state code TMG progresses such that 1 ⑬ 3. In executing operation with regard to immediate data and data on memory, MODS=1 and the state code TMG progresses such that 1 ⑬ 17 ⑬ 3.

At a second portion (4-2) of the logical description shown by FIG. 39, bus control is executed. In the case of MODS=0, twice instruction read is executed. In the case of MODS=1, at state code 1, data write is executed, at state codes 17, 3 instruction read is executed. The data size is word size of data size of the instruction (ADD.W #xx:16,Rn) by which an operation instruction code is generated.

At a third portion (4-3) of the logical description shown by FIG. 40, the effective address is calculated. In the case of MODS=1, at state code 1, the effective address held in the temporary register TRA is outputted to the inner bus GB.

At a fourth portion (4-4) of the logical description shown by FIG. 40, transfer data is controlled. Operation is executed at state code 1. In the case of MODS=0, data is read from the general purpose register and the read data buffer RDB and the operation result is stored to the general purpose register. In the case of MODS=1, data is read from the temporary register TRD and the read data buffer RDB and the operation result is stored to the temporary register TRD.

At a fifth portion (4-5) of the logical description shown by FIG. 41, all of the control signals are initialized. Interruption is also permitted, and when interruption is requested, the interruption exception processing can be carried out successively.

At this occasion, an explanation will be given of composite instruction in which even the front instruction code for instruction expansion is omitted, instruction can be expanded similar thereto. For example, when there is allowance in the instruction code of MOV.W #xx,R0 explained in reference to FIG. 38 and when there can be provided destination information of whether the transfer is transfer to memory or transfer to general purpose register, the front instruction code for instruction expansion may not be provided. In sum, when there is a substantially vacant area in the instruction code and even when the information of whether the transfer is transfer to memory or transfer to the general purpose register is integrated to the vacant area, it is permitted so far as the instruction can be differentiated from other instruction. Based on such destination information, the immediate data may be stored to the temporary register TRD and a control signal of making the destination side as memory may be generated. When there is adopted executable composite instruction by coupling a transfer instruction code added with such destination information and an operation instruction code to thereby constitute one instruction, there can be realized function similar to that in the case of providing the front instruction code for instruction expansion, further, the instruction code length can be shortened and the instruction execution time can be shortened by an amount of not providing the front instruction code for instruction expansion.

Figure 52:
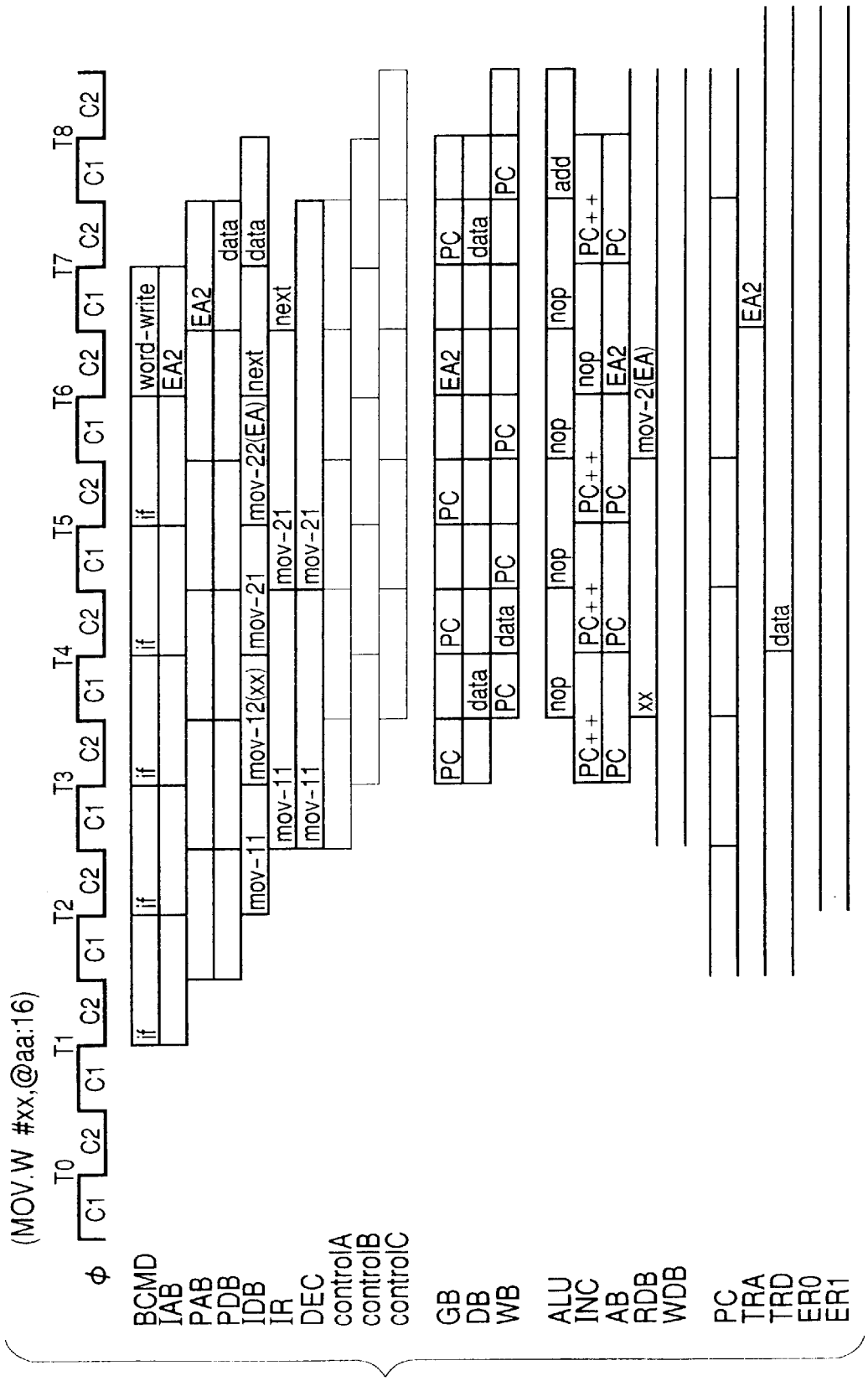
FIG. 52 is a timing diagram in executing instruction regarded as one instruction by combining a front instruction code for instruction expansion and an instruction code produced by adding the destination information to an instruction code in correspondence with MOV.W#xx, R0.

FIG. 52 shows timings when there is executed instruction which can be regarded as one instruction by combining the front instruction code for instruction expansion, one instruction code added with the destination information to an instruction code in correspondence with MOV.W #xx,R0. As is apparent by comparing with FIG. 38, there is no processing with regard to the front instruction code for instruction expansion (pf=H'0104).

Figure 42:
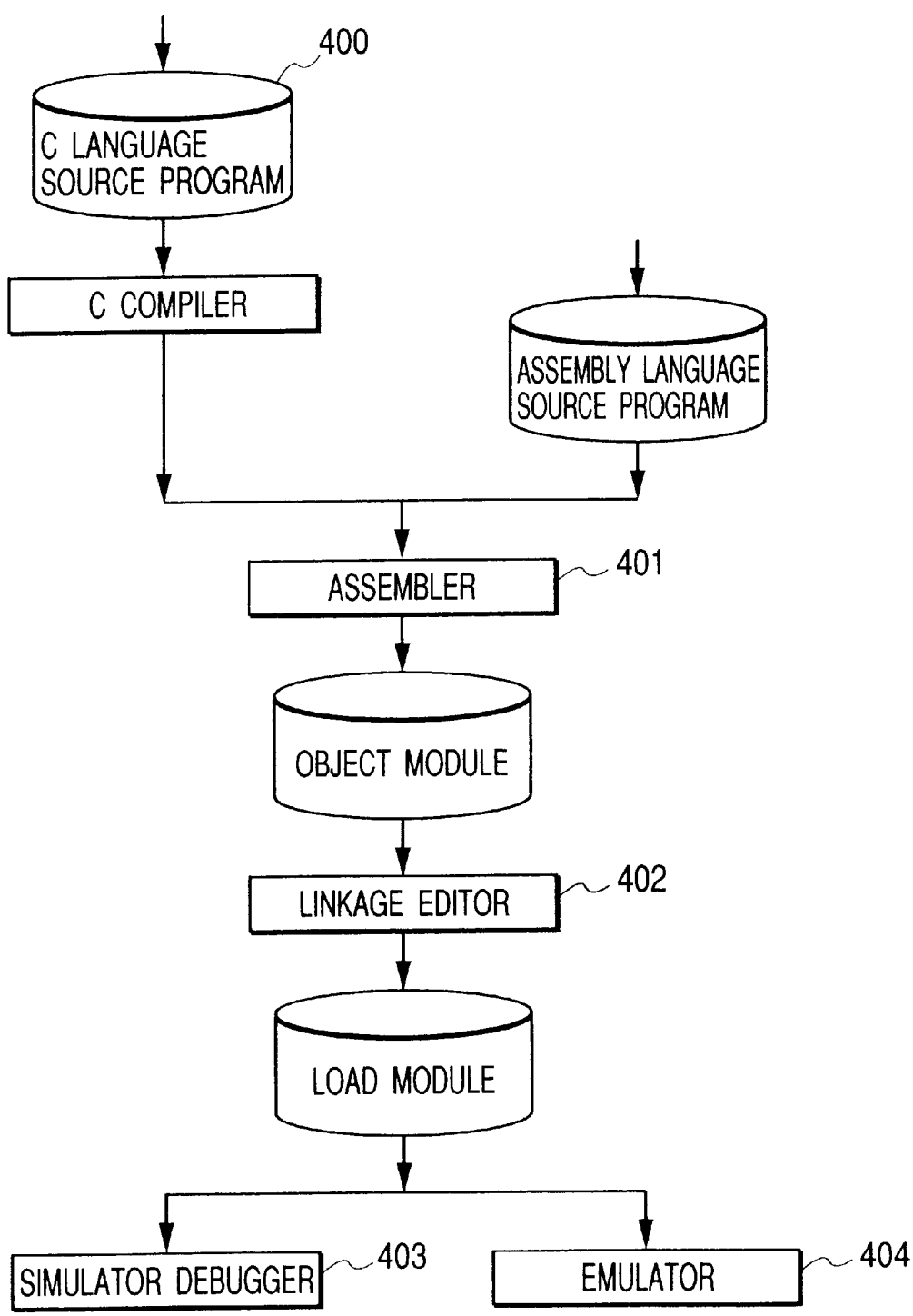
FIG. 42 is an explanatory view showing an outline of a development environment of CPU.

FIG. 42 shows an outline of development environment of CPU according to the invention. The user of the development environment forms programs in C language or assembly language by using various editors. This is normally formed by being divided into a plurality of modules.

C compiler 400 inputs respective C language source program formed by the user and outputs assembly language source programs or object modules.

An assembler 401 inputs the assembly language source programs and outputs the object modules.

A linkage editor 402 inputs a plurality of the object modules formed by the C compiler 400 and the assembler 401 and resolves outside reference and relative address of the respective modules, couples the respective modules into one program and outputs a load module.

The load module is inputted to a simulator debugger 403, simulates operation of CPU 2 and displays execution result to thereby enable to analyze by evaluate programs on a system development apparatus of a personal computer. Further, load module is inputted to an emulator 404 and subjected to so-to-speak in-circuit emulation operating on an actual application system to thereby enable to analyze and evaluate actual operation as a total of a microcomputer having CPU 2.

Otherwise, general subroutines can also be provided as a librarian.

Figure 43A:
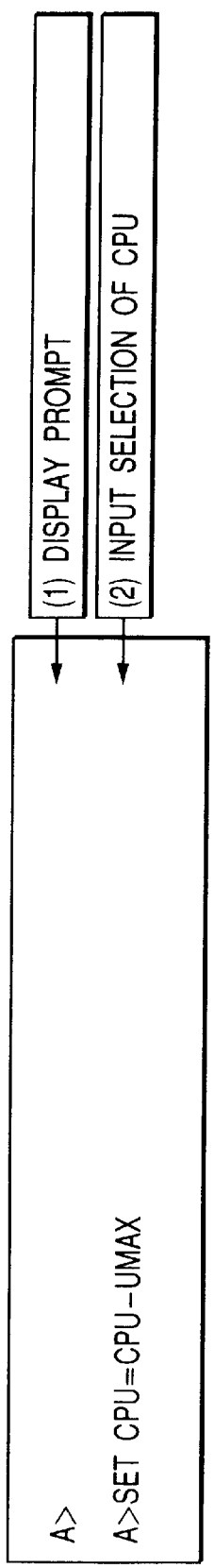
FIGS. 43a,b are an explanatory view exemplifying a method of selecting CPU in a system development apparatus of CPU.
Figure 43B:
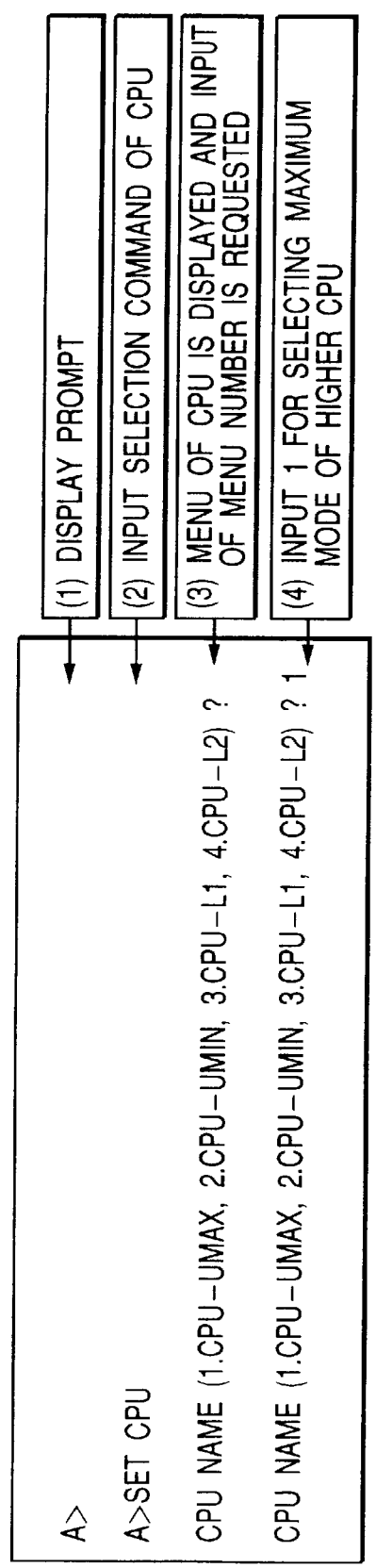

FIG. 43 shows a method of selecting CPU in a system development apparatus of CPU 2 according to the invention.

In this case, there is exemplified a case of selecting the maximum mode of higher CPU 2.

In the case of (a), in a state in which prompt is displayed on a display of a system development apparatus such as a personal computer, "SET CPU=CPU-UMAX" may be inputted. In the case of (b), in the state in which prompt is displayed, command of "SET CPU" is inputted, in response thereto, menu of kind and operation of CPU, for example, "CPU NAME (1.CPU-UMAX, 2.CPU-UMIN,3.CPU-L1, 4.CPUL2)" is displayed, input of a menu number is requested and the user inputs any of numbers 1 through 4 of menu. In this case, CPU-UMAX designates the maximum mode of higher CPU 2, CPU-UMIN designates the minimum mode of higher CPU, CPU-L1 designates first lower CPU and CPUL2 designates second lower CPU.

Otherwise, the kind and operation mode may be made selectable by drop down menu of window or may be inputted as C shell command in the case a work station.

Further, the kind and operation mode of CPU may be inputted as control instruction of source program of the assembler 401 or the C compiler 400.

The assembler 401 interprets an inputted assembly language source program in accordance with the selected kind and operational mode of CPU, forms an object module and displays error when the error is present. When lower CPU is selected and instruction which is present in higher CPU and not present in lower CPU is described, it amounts to error. An instruction code per se is incorporated by higher CPU and therefore, an assembler therefor is developed and with regard to lower CPU, addition of detecting instruction which is present in higher CPU and not present in lower CPU is executed by which development can be executed easily.

In accordance with the selected kind and operational mode of CPU, the C compiler 400 utilizes instruction designated by the usable combination of operation, data size and addressing mode, general purpose registers, address spaces, converts programs by C language into instruction of CPU and outputs it as assembly language programs or object modules.

In the case in which programs in C language are converted into an instruction of CPU, the C compiler 400 per se is provided with steps optimizing to analyze the programs per se and realizing the result by instruction of the CPU. Further, there is achieved promotion of functions which have nothing to do directly with instruction sets of CPU such as compiling programs by C++ language and optimizing modules. With regard to individual compilers for respective CPU's, promotion of these functions which are not dependent on CPU's must be applied to all of the individual compilers. When there is provided a common C compiler including CPU's having no compatibility with each other as in the invention, promotion of the functions which have nothing to do directly with instruction sets of CPU can easily be achieved and the development efficiency can be promoted.

The simulator debugger 403 interprets the program of the inputted load module, simulates operation of CPU and displays error when the error is present therein. For example, when lower CPU is selected and instruction which is present in higher CPU and not present in lower CPU is described, it amounts to error. Instruction codes and instruction execution functions per se are incorporated by higher CPU and therefore, a simulator debugger therefor is developed, with regard to lower CPU, addition of detecting instruction which is present in higher CPU and not present in lower CPU is executed by which the development can easily be carried out.

FIG. 44 exemplifies a list outputted by an assembler of CPU 2 according to the invention. There are displayed in the list, line number, location counter, object code, source line number and source statement.

In a program shown by (a) of FIG. 44, CPU-UMAX, that is, the maximum mode of higher CPU is designated by control instruction (.CPU). Further, instruction starting from "." on a source program is control instruction and has nothing to do directly with programs of the microcomputer.

Notation SP designates ER7. This designates a function as a stack pointer. Further, according to the invention, as shown by FIG. 5, ROL may be designated by AL and ER1 may be designated by EBX. Even when any of the designations is used, the designation is not regarded as error and is converted into the same object code.

Further, label such as STACK cannot be resolved only by the program and accordingly, a corresponding field in view of object code is set to 0. These can be resolved by the linkage editor as described above.

In a program shown by (b) of FIG. 44, there is shown an example of assembling the same program by designating first lower CPU (CPU-L1). MOV.L instruction is not present in first lower CPU and accordingly, error is displayed and the object code is not generated. A further detailed content with regard to the list of FIG. 44 has nothing to do directly with the invention and accordingly, an explanation thereof will be omitted.

Figure 45:
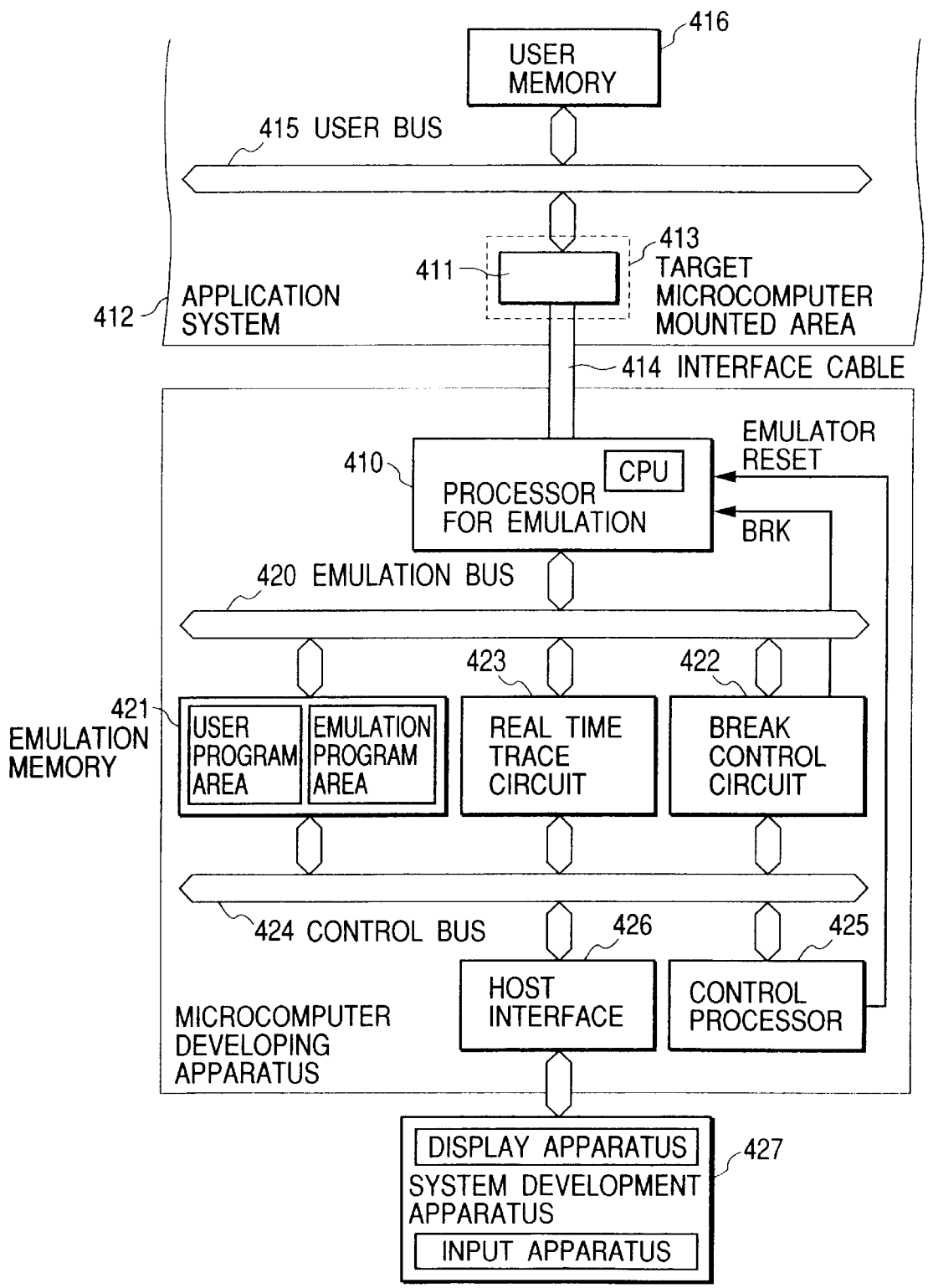
FIG. 45 is a block diagram of an emulator for a microcomputer.

FIG. 45 shows an emulator for a microcomputer having CPU 2 according to the invention.

A processor for emulation 410 is constituted by adding interface for emulation to the microcomputer portion. The microcomputer portion corresponds to, for example, the constitution of the microcomputer 1 of FIG. 2.

A connector portion 411 is mounted to a target microcomputer mounted area 413 of an application system (also referred to as target system or user system) 412 in place of a single chip microcomputer. The processor for emulation 410 inputs and outputs signals from and to the application system by using the target system interface via the connector portion 411 and an interface cable 414.

Although not particularly restricted, the application system 412 may be provided with a user bus 415 and connected with a user memory 416. In this case, in accordance with user strobe signals outputted by the processor emulation unit 410 and supplied via the interface cable 414, the user memory 416 is read/written.

Meanwhile, the processor for emulation 410 is connected to an emulation bus 420 by using the emulation interface. The emulation bus 420 includes state signals/control signals, not illustrated. By using the emulation bus 420, from the processor for emulation 410, information in accordance with inner states of the application system 412 and the processor for emulation 410 is outputted, further, to the processor for emulation 410, various signals for emulation are inputted. Emulate mode terminals, not illustrated, of the processor for emulation 410 are fixed to power source levels and an emulator mode is set at inside of the processor for emulation 410.

Further, the emulation bus 420 is connected with an emulation memory 421, a break control circuit 422 and a real time trace circuit 423. Although not particularly restricted, the emulation memory 421 is constituted by RAM and is provided with an area for storing the user program and an area for storing programs for emulation. The break control circuit 422 monitors control states by the processor for emulation 410 or states of the emulation bus 420, inputs the emulator exclusive interruption when the states reach previously set states, stops executing the user program by CPU (designated as CPU 2 for convenience) of the processor for emulation 410 and-make the states transit (break) to the state of executing program for emulation. The real time trace circuit 423 successively stores signals indicating read operation or write operation of CPU 2, signals indicating instruction read operation (CPU status signal) address, data and control signals given to the emulation bus.

The emulation memory 421, the break control circuit 422 and the real time trace circuit 423 are also connected to a control bus 424 and are controlled by a control processor 425 via the control bus 424. The control bus 424 is connected to the control processor 425 and connected to a system development apparatus 427 of a personal computer via an interface circuit 426, although not particularly restricted.

For example, when a program (load module) inputted from the system development apparatus 427 is transferred to the user program storing area of the emulation memory 421 and CPU 2 reads such program to be arranged on built-in ROM, a program on the emulation memory 421 is read and executed. Further, break conditions or real time trace conditions can be given from the system development apparatus 427.

The control processor 425 stores a program for executing selection of kind of CPU which is originally used by the application system 412 in the emulation program storing area of the emulation memory 421. CPU 2 executes such program in a state broken by a predetermined condition and sets a control register 449 in an emulation interface 442 to thereby execute necessary setting in view of emulation. In this case, it is convenient to make writable only in the execution mode of the program for emulation or so-to-speak break mode. There can be prevented erroneous setting by erroneous operation of software of the user in the middle of development. Further, by using the control register, even when a selection object of kind of CPU which is originally used in the application system 412 is increased, only the constitution of the control register may be changed, it is not necessary to change the interface for emulation and hardware of the emulator may not be changed.

By enabling the processor for emulation 410 and the emulator to support a plurality of CPU's, only an actual microcomputer may be developed and the development efficiency can be promoted.

Also in the case of emulator, kind of CPU is made selectable similar to the above-described. The selection method may be executed similar to FIG. 42 on a system development apparatus of a personal computer. The selected content is stored to the emulation program storing area of the emulation memory 421 as a predetermined program via the control processor 425, CPU 2 executes such program and sets the control register in the emulation interface to thereby execute the selection.

At this occasion, simultaneously, an operational mode of a single chip microcomputer may simultaneously be designated. The operational mode of the single chip microcomputer includes, for example, single chip mode, a built-in ROM effective expanding mode and a built-in ROM nullify expanding mode and can be designated by combining the operational mode of CPU 2 thereto. In deassembling operation on a trace list, display of ER0 and display of EAX are switched.

By making designatable kind of CPU which is originally used in the application system 412, by the same processor for emulation or the same emulator, a number of kinds of single chip microcomputers can be emulated by a combination of capacities of built-in function modules and built-in memories. Even after having developed the processor for emulation or the emulator, there can be developed only a single chip microcomputer in compliance with tendency of application field without developing a processor for emulation or an emulator when the processor for emulation or the emulator can be realized by a combination of built-in functions. The development efficiency can be promoted.

Expense of a processor for emulation occupied in that of an emulator is small and therefore, function modules as many as possible may be incorporated in the processor for emulation.

FIG. 46 exemplifies a trace list by an emulator for CPU according to the invention.

The trace list displays line number (BP), address bus (AB), data bus (DB), address decode (MA), read/write (R/W), status (ST) and interruption signals (NMI, IRQ) and shows a list of executed instruction by assembly language. This is displayed by the deassembler by analyzing states of data buses and signals of CPU instruction executing states, not illustrated. Further, the line number becomes 0 at the bottom of the trace list. Further ROM of the address decode (MA) designates access to built-in ROM, R of read/write (R/W) designates read cycle and PRG of the status (ST) designates instruction.

Further, LIR and LID signals shown by (a) are trace results of signals for analyzing instruction included in the interface for emulation. Although normally, such signals are not displayed on the trace list, the signals are stored to the trace memory and are used in analysis of the deassembler. Further, the signals can be displayed to the user by command which is not normally publicated.

The LIR signal shows that the bus cycle is instruction read. The LID signal shows start of instruction execution.

For example, 200-th line shows that the instruction read is executed from address 100 and an instruction code H'7A07 is read. The 200-th line displays that MOV.L #FFFFFF0E:32,ER7 is executed along with 199 and 198-th lines. The deassembler determines the first word of instruction by the LID signal and displays to interpret H'7A07FFFFFF0E as MOV.L #FFFFFF0E:32,ER7.

When the deassembler executes instruction which is provided to higher CPU and is not provided to lower CPU in emulating lower CPU, the instruction is displayed as undefined instruction. When the instruction is displayed as the undefined instruction, an instruction code is displayed as data.

In FIG. 46, there is shown an example of executing instruction read of an instruction code in correspondence with "MOV.LER0,@ER1" of higher CPU at 80 and 79-th lines from address 200 and displaying the instruction as undefined instruction (DATA.L H'01006990) in second lower CPU.

Figure 47:
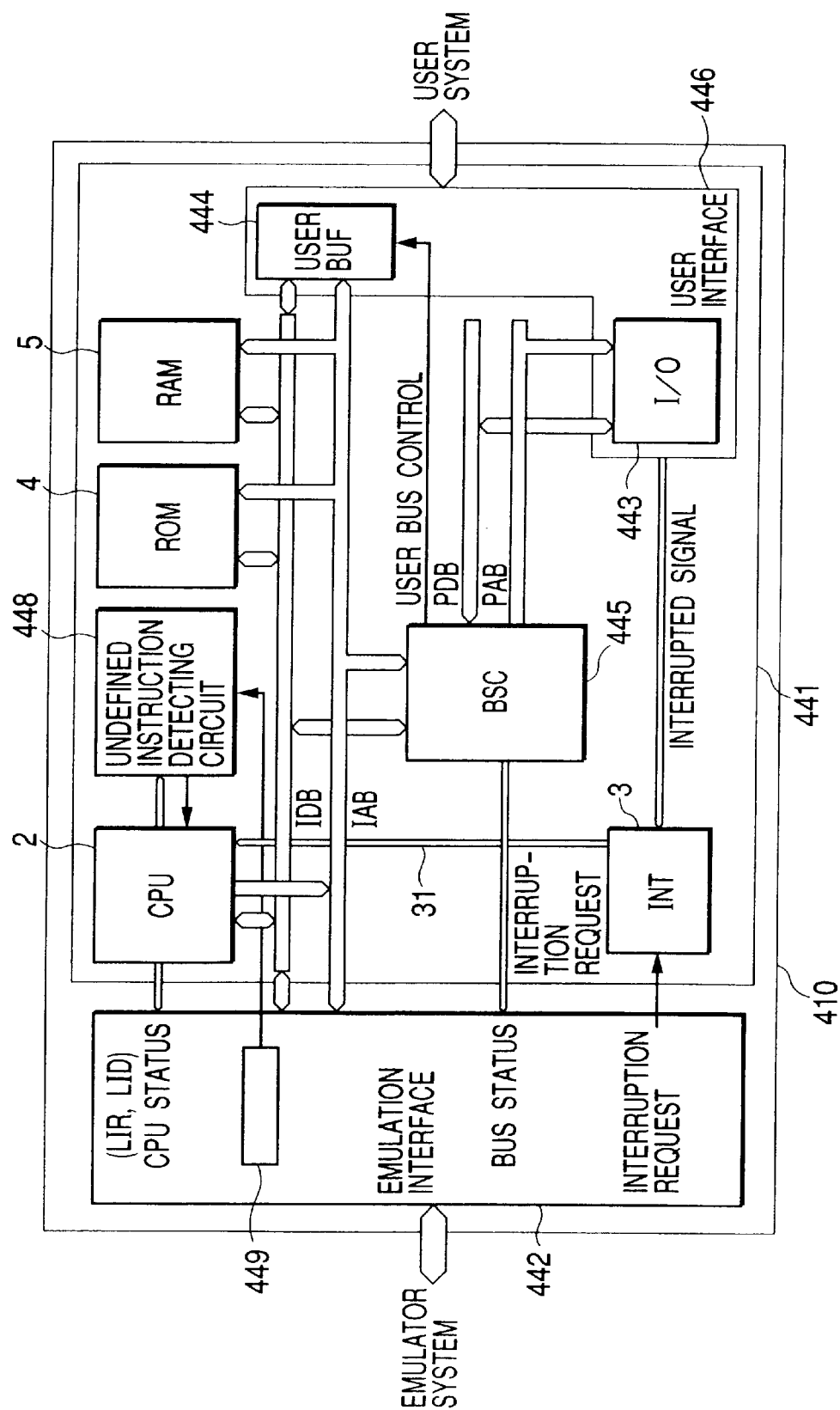
FIG. 47 is a block diagram showing an example of a processor for emulation of a microcomputer.

FIG. 47 shows a block diagram of a processor for emulation of a microcomputer to which the invention is applied.

The processor for emulation 410 is constituted by a portion of the single chip microcomputer 1 of FIG. 2 (microcomputer core 441) and an emulation interface 442. Further, the timers and the input/output ports of FIG. 2 are represented by I/O, further, details of the inner buses and the bus controller are illustrated. Further, the timers 6, 7 and the input/output ports 11 through 19 of FIG. 2 are represented as I/O 443 and user buffer (userBUF) 444, further, details of the inner buses IDB, IAB, PDB, PAB and the bus controller (BSC) 445, detailed illustration of which is omitted in FIG. 2, are illustrated. The user interface 446 generally designates the interface circuit connected to the user system (target system which is the emulation object system) including the I/O 443, the user buffer 444 and input/output buffers, not illustrated.

According to the microcomputer core 441, an undefined instruction detecting circuit 448 is added to the microcomputer 1 of FIG. 2. The emulation interface 440 includes a control register 449. The control register 449 is made writable only in the break mode. Signals inputted or outputted from or to the emulation interface 440 include bus status signals displaying states of buses such as address bus, data bus, read signal, write signal, data size signal, instruction fetch signal and CPU status signals indicating execution states of CPU 2 such as signals indicating execution start of instruction and signals indicating execution start of interruption processings and are used in analyzing operation of the microcomputer by the emulator.

The undefined instruction detecting circuit 448 analyzes instruction codes inputted to CPU 2 and requests break interruption to CPU 2 when the circuit detects that instruction which is not present in selected CPU 2 starts executing. Which function is selected to CPU 2 is indicated from the control register 449. For example, in the case in which first lower CPU is selected, when a front instruction code having a register group field is executed, the instruction is detected as undefined instruction. Specifically, in the case in which an instruction code is latched by the LIR signal, analyzed and decoded as undefined, the break interruption may be requested, which is easy.

As described above, the processor for emulation 410 incorporates higher CPU 2 (CPU-U) and substitutes for first lower CPU and second lower CPU having functions of subsets by using higher CPU 2. Thereby, there is no need of providing a function for emulation to the lower CPU and the development efficiency is promoted and lower CPU does not need to include logical circuits for emulation and the logical scale can be reduced. Also with regard to higher CPU 2, by providing the undefined instruction detecting circuit 448 as an independent functional block, there is no need of changing CPU 2 and the development efficiency is not deteriorated.

At any rate, when interface for emulation is made common, even in the case in which CPU or other functional blocks are changed, there is no need of changing hardware on the emulator side, only the processor for emulation 410 is changed, the deassembler in analyzing and displaying operation of instruction may indicate which CPU constitutes an object. Designation to the deassembler can be designated from the system development apparatus by the user or may automatically be selected by input information from the assembler. Thereby, the development efficiency of the emulator is promoted and the development environment of the emulator can swiftly be provided.

Figure 48:
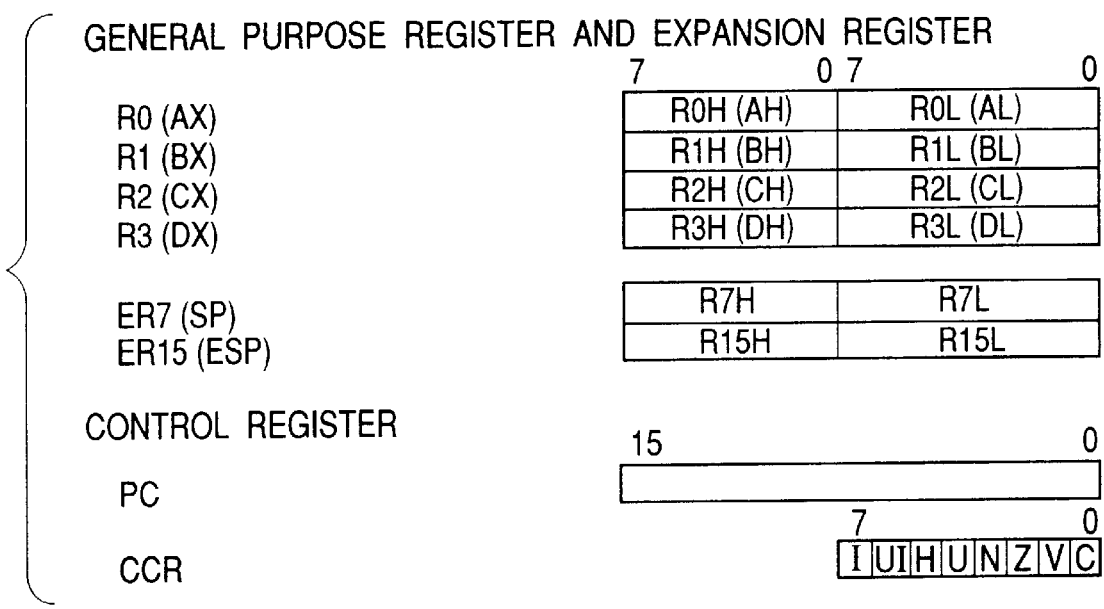
FIG. 48 is an explanatory view showing other programming model of second lower CPU.

FIG. 48 shows other programming model of second lower CPU. Also in the programming model, a total number of bits of a general purpose register is made equivalent, however, only a number of the general purpose registers is 4. The function per se of the general purpose register is similar to the above-described. Similar to FIG. 5, R0, R1, R2 and R3 can be designated as AX, BX, CX and DX. Further, PC is equivalently constituted by 24 bits. Although not illustrated, including register direct or immediate, data of long word size is not dealt with. By constituting the general purpose register by 16 bits, the constitution of the effective portion of CPU such as the arithmetic and logical functional unit ALU, can be constituted by 16 bits except the program counter PC and the incrementer and the logical scale can further be reduced.

Figure 49:
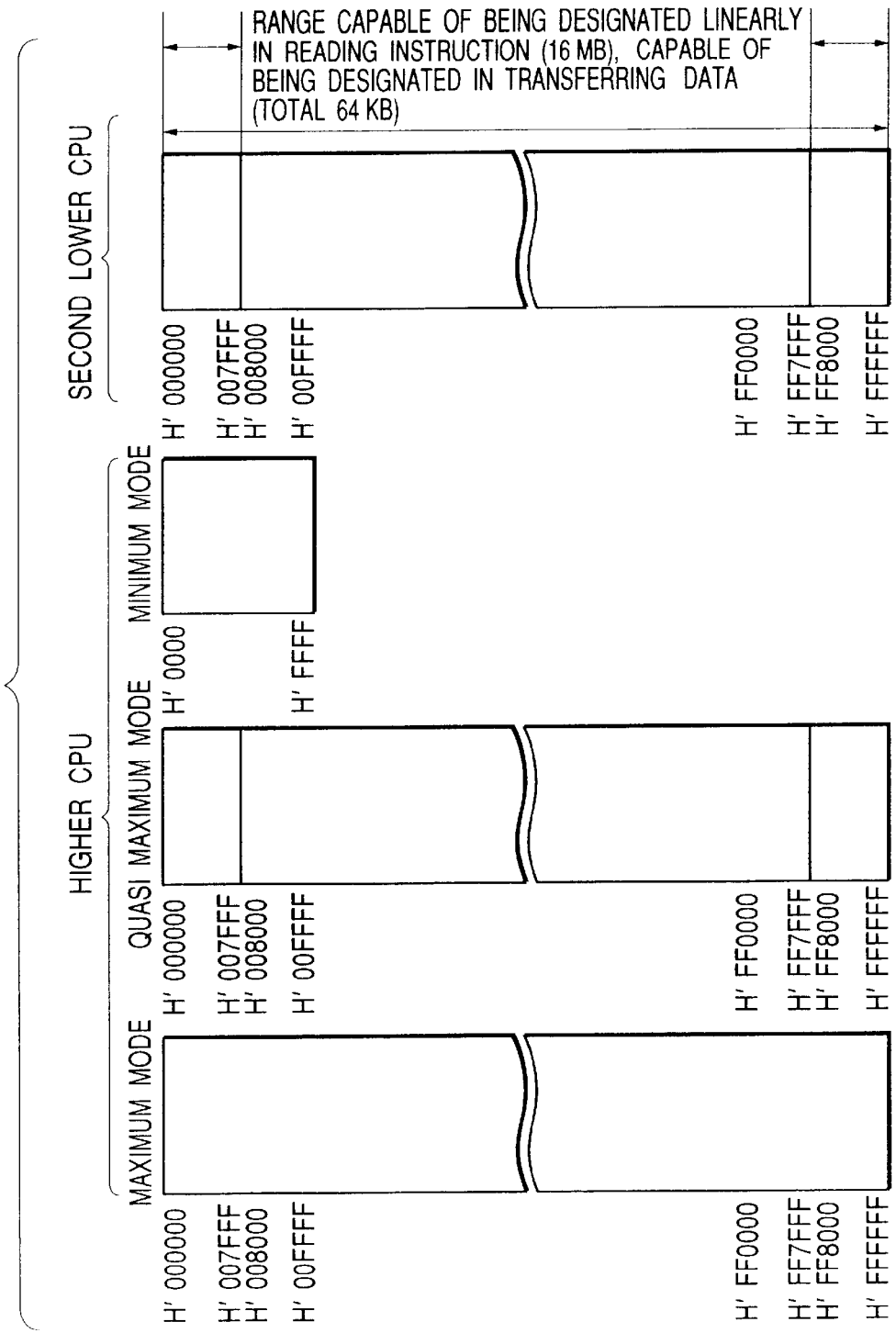
FIG. 49 is an explanatory view showing other example of an address map of CPU.

FIG. 49 exemplifies other example of the address map of CPU. In the address map of second lower CPU, there is provided address space of 16 MB in correspondence with the maximum mode. In data access, the effective address is generated by 16 bits and 0 through H' 7FFF and H' FF 8000 to H' FFFFFF are designated. Therefore, up to 32 kB can be designated to RAM and inner I/O register combined and up to 32 kB can be designated to ROM. As mentioned above, the capacity of 32 kB of RAM and inner I/O register combined can be regarded as a capacity sufficient for a single chip microcomputer or a microcomputer system which is operated only by built-in functional modules.

Although address of ROM which can be designated in data access is limited, as mentioned above, constant allocated to ROM can be rearranged by optimization among modules even when described by C compiler.

The program counter PC is constituted by 24 bits, generates address by 24 bits in instruction read and can utilize address space of 16 MB. With regard to branch instruction, program counter relative, memory indirect or absolute address 24 bits may be made executable. The branch instruction is not provided with a register field and accordingly, absolute address 24 bits can be provided by an instruction length of 2 words. Address space of 16 MB can continuously be utilized without load of software.

Further, a vector in exception processing is constituted by 24 bits (32 bits on memory and upper 8 bits are ignored) and the program counter PC which is saved/returned in subroutine branch is constituted by 24 bits.

Meanwhile, higher CPU is added with a quasi maximum mode and can execute operation equivalent to that of second lower CPU having the address map in correspondence with the maximum mode.

Figure 50:
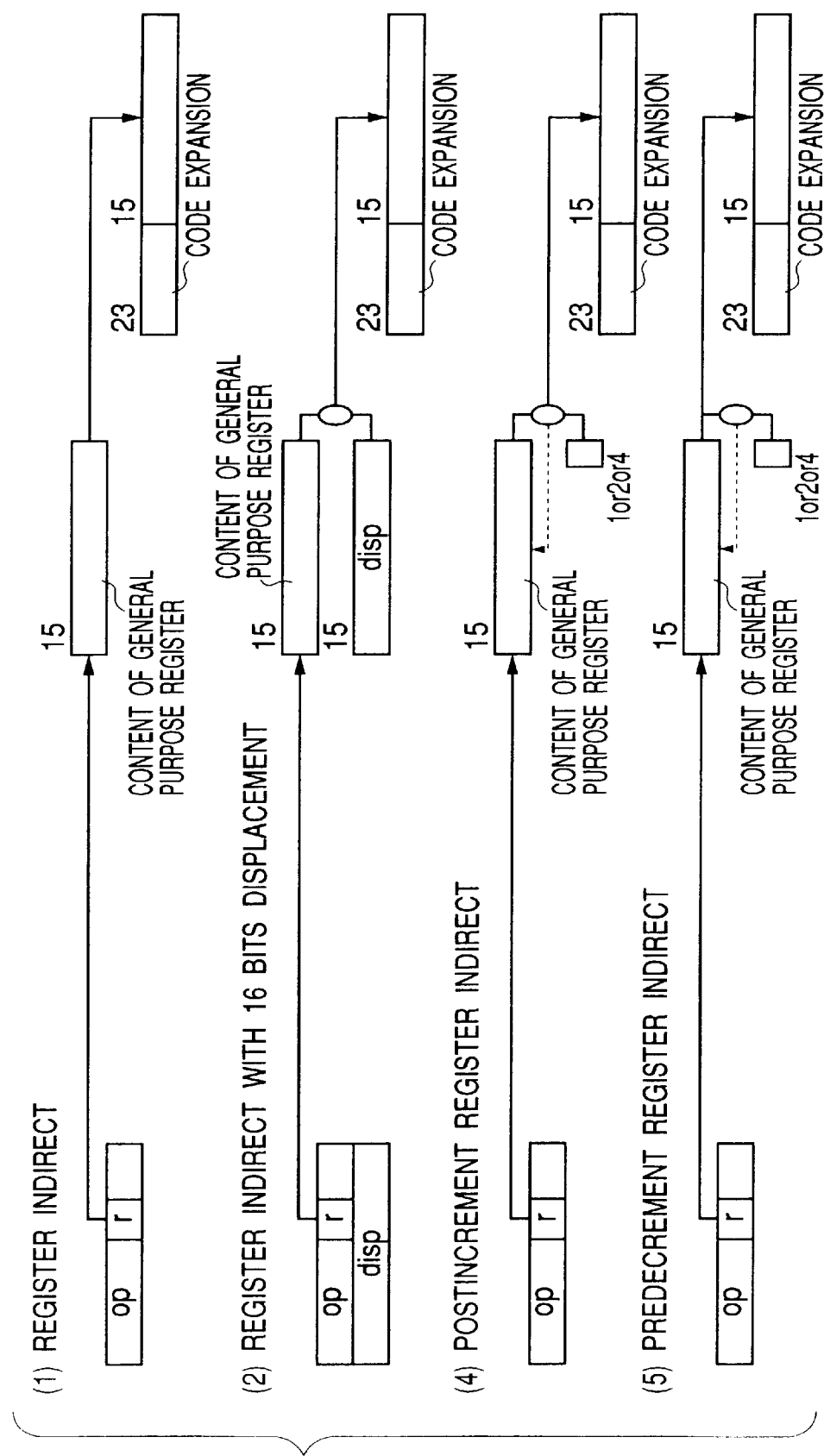
FIG. 50 is an explanatory view exemplifying a method of calculating an effective address in an address map of the second lower CPU shown By FIG. 49 along with FIG. 51.
Figure 51:
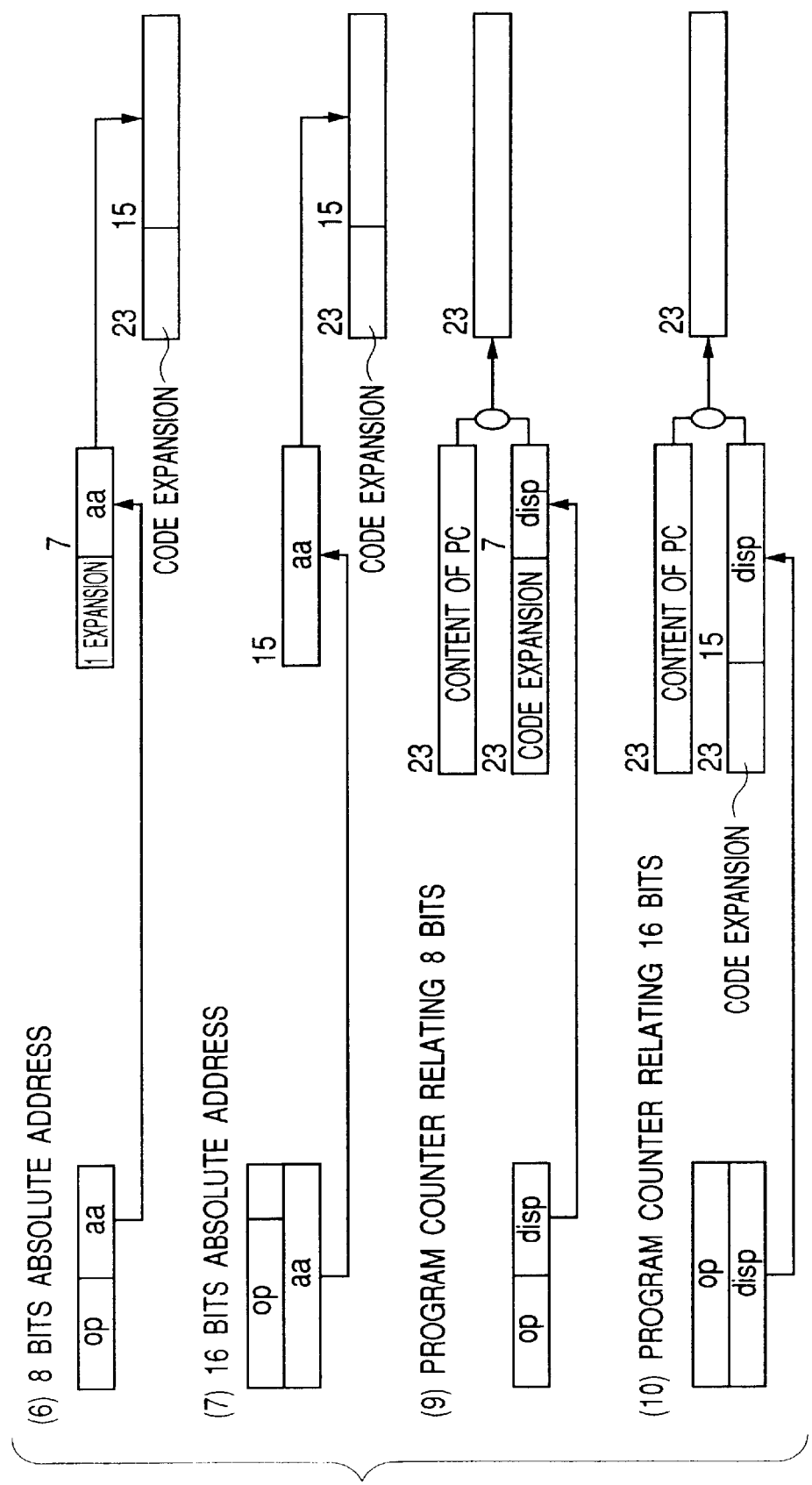
FIG. 51 is an explanatory view exemplifying the method of calculating the effective address in the address map of the second lower CPU shown by FIG. 49 along with FIG. 50.

FIG. 50 and FIG. 51 exemplify a method of calculating the effective address in the address map of second lower CPU shown by FIG. 49.

Although the method of calculating the effective address is substantially similar to that shown by FIG. 7 and FIG. 8, in data access, all of the effective addresses are calculated by 16 bits and thereafter upper 8 bits are subjected code expansion and 0 through H' 7FFF and H' FF8000 through H'FFFFFF are designated.

The program counter relative is used in branch instruction and is calculated by 24 bits similar to the above-described. Further, although not illustrated, when memory indirect or absolute address 24 bits can be used for branch instruction, the effective address is calculated by 24 bits.

In quasi maximum mode of higher CPU, the address map is made similar to address map of second lower CPU of FIG. 49. Actually, the calculation per se of the effective address is made similar to that in FIG. 7 and FIG. 8, postincrement/predecrement register indirect are restrained from writing to the general purpose register E and when the effective address is utilized, upper 8 bits may be subjected to code expansion. Regardless of individual addressing modes unified control is enabled and the logical scale can be reduced. Meanwhile, in calculating the effective address, in view of the specification, only the general purpose register R is used and accordingly, the general purpose register E is used for data and the general purpose registers are substantially increased.

In the case of second lower CPU, in comparison with higher CPU, the number of the general purpose registers is limited and accordingly, the merit of not reducing the address space for program and increasing substantially the general purpose registers is relatively considerable.

By providing first lower CPU and second lower CPU as well as higher CPU 2 explained above, the following operation and effect is achieved.

(1-1) A plurality of CPU's having different instruction sets can meet various requests of application field or user by characteristic inherent respectively thereto while reducing respectively the logical scale.

(1-2) By incorporating register constitution, instruction sets of lower CPU as well as instruction execution functions of lower CPU, a program developed for lower CPU can be utilized by higher CPU at least at a level of a source program and at least, upper compatibility at the source program level can be realized.

(1-3) By previously preparing operational modes for switching bit numbers of effective addresses and unit sizes of stacks, also upper compatibility at the object program level can simply be realized.

(1-4) By providing higher CPU realizing upper compatibility at the source program level or the object program level with both of first and second lower CPU, in comparison with developing CPU having upper compatibility with each of first and second lower CPU, the development efficiency can be promoted. Further, also in the case in which function or performance is promoted, when compatibility to higher CPU is maintained, the higher compatibility can be maintained also to first and second lower CPU automatically, and accordingly, future expansion performance can be maintained and the development efficiency can also be promoted. For example, high speed formation of higher CPU can be realized by constituting inner data bus by 32 bits, the high speed formation can be enjoyed while effectively utilizing software resources of first and second lower CPU.

(1-5) By making common the inner constitution, there can be easily provided CPU having various compatibilities such as CPU having upper compatibility with first lower CPU and lower compatibility with higher CPU or CPU having further lower compatibility with second lower CPU.

(1-6) By constituting instruction sets of second lower CPU as subsets of higher CPU and eliminating logical circuits in correspondence with eliminated instruction sets from higher CPU and developing second lower CPU, the development efficiency can be promoted.

(1-7) By inheriting a portion of instruction sets added to first lower CPU by higher CPU, by second lower CPU, instruction sets of first and second lower CPU which are not incorporated to each other are constituted to thereby able to meet various requests generally.

(1-8) By realizing upper compatibility at the source program level or the object program level, software resources can effectively be utilized and software development efficiency of the user can be promoted.

(1-9) By providing means for enabling to commonly utilize a software development apparatus including a plurality of CPU's having different instruction sets and selecting CPU, software development expense can be reduced. Further, an assembler may be developed for higher CPU and with regard to other CPU, undefined instruction may be detected and accordingly, the development efficiency of the software development apparatus can be promoted. By promoting the development efficiency, resources necessary for the development are eliminated and by the eliminated resources, a frequency of promoting functions can also be promoted.

(1-10) A software development apparatus and a description format in assembly language is made usable commonly by first and second lower CPU and transplantation of software resources between first and second lower CPU can comparatively be facilitated. By using either of lower CPU's, expense is not so increased as in shifting to higher CPU.

(1-11) By enabling to use plural times description of a general purpose register having only a general purpose function on a software development apparatus, transplantation of programs from other CPU can be executed comparatively easily.

(1-12) By making common interface for emulation of a processor for emulation in correspondence with a plurality of CPU's, hardware of the same emulator can be shared. By making common the interface for emulation or making common the hardware of the emulator, the development environment can swiftly be prepared, further, resource necessary for developing an emulator can be minimized.

(1-13) Logic for emulation with regard to higher CPU is provided, by such logic for emulation with regard to higher CPU, a processor for emulation of first and second lower CPU can be constituted and the development efficiency of a processor for emulation can be promoted.

According to higher CPU 2 explained above, the following operation and effect is achieved.

(2-1) By designating a register group by a front instruction code for register expansion, enabling to ignore the front instruction code for register expansion and making an instruction code in the case of not adding the front instruction code for register expansion the same as an instruction code of existing CPU, the general purpose registers can be increased without deteriorating compatibility. Software resources can effectively be utilized, the usability is promoted and the processing speed can be promoted. By using the front instruction code for register expansion, all of the general purpose registers can simultaneously be designated and accordingly, arrangement of data on the general purpose registers needs not to consider and formation of a program can be facilitated.

(2-2) By arranging a group designating field in front of an existing instruction code, with regard to all of instruction using general purpose registers, the general purpose registers can be increased. By making common the method of designation, the increase in the necessary logical and physical scale can be restrained and accordingly, the increase in the fabrication expense can also be restrained. A large portion of existing logics can be made common and accordingly, design resource can effectively be utilized, design quality can be promoted and the development period can be shortened. Further, in the case of CPU having wide address space and CPU having narrow address space maintaining compatibility therebetween, general purpose registers can also be added to both while maintaining compatibility.

(2-3) By making an operation code (front instruction code for register expansion) in correspondence with that for designating existing register group in lower CPU, same as that of NOP (no operation) instruction, an operation code map can effectively be utilized, the logical constitution can be made common and the increase in the logical scale can be restrained.

(2-4) By providing allowance to a group designating field, in correspondence with progress of a semiconductor fabrication process, while maintaining compatibility, general purpose registers can be increased. The usability can further be promoted and the processing speed can be promoted. The system can be made the same and accordingly, the development efficiency can be promoted. By designing in consideration of the expansion or corresponding previously to the expansion, software tools of assembler, C compiler, simulator and deassembler, the development efficiency can be promoted.

(2-5) By providing a control register such as CPUCR and designating a group of a stack pointer used implicitly thereby, the stack pointer can be changed and rearrangement of stacks can easily be carried out. Also with regard to interruption exception processing in which the front instruction code for register expansion cannot be added, the stack pointer can be changed. Stack pointers for subroutine branch and exception processing such as interruption can be separated. A stack area for subroutine and a stack area for interruption can separately be provided. Thereby, there is no need of ensuring stacks in correspondence with interruption exception processing which cannot be anticipated by the respective tasks realized by subroutine branch and an amount of using stacks can be restrained.

(2-6) Higher CPU combines a transfer instruction code and an operation instruction code which are existing at lower CPU with the front instruction code for instruction expansion to thereby execute operation as one instruction and existing operation is executed by singles of the respective instruction codes and accordingly, existing instruction execution is not hampered. Existing software resources using only existing instruction formed by first lower CPU can be utilized as they are. In other words, without deteriorating compatibility with first lower CPU, direct operation with regard to data on memory can be executed. Not only operation between memory and register but also direct data transfer between memories can be executed. Software resources are effectively made usable, save/return operation of undesirable general purpose register is restrained, the usability can be promoted, the program capacity can be reduced and the processing speed can be promoted. By reducing the program capacity, as a result, the memory capacity of ROM for storing program can be reduced and expense can be saved.

(2-7) An instruction code for transfer instruction and an instruction code of operation instruction existing in first lower CPU are combined with the front instruction code for instruction expansion and operation is executed and accordingly, conventional design resources of an instruction decoder can effectively be utilized, addition and change of logical scale can be minimized and increase in the logical and physical scale can be minimized. Further, a time period necessary for development can be shortened and resources can be saved. All of existing addressing modes for data access can be supported and therefore, arbitrary combinations of addressing modes are enabled and formation of program can be facilitated.

(2-8) Instruction codes added to the instruction sets of first lower CPU can be limited to the front instruction codes for register expansion and instruction expansion and accordingly, instruction sets of higher CPU 2 can be constituted by minimizing change of the instruction sets.

(2-9) When destination is a memory, an effective address in reading destination data is ensured to a temporary register, calculation of the effective address in writing the destination data of the result of operation is dispensed with, writing operation is made immediately executable and the execution time can be shortened. Further, by automatically generating an instruction code for writing the destination data at inside of CPU, shortening the instruction length and designating data size to such instruction code, necessary instruction code is saved and by making such instruction code similar to that of operation of transfer instruction, design can be facilitated and the logical scale of a control circuit can be reduced. In the case of instruction which does not need of operation of wiring the destination data as in comparison instruction, by making write cycle vacant cycle, operation with other instruction can be made common, design can be facilitated and the logical scale of the control circuit can be reduced. By facilitating design, as a result, the development time period can be shortened.

(2-10) By combining the front instruction code for instruction expansion, an instruction code of transfer instruction for reading a memory and an instruction code of transfer instruction to the memory, transfer between memories can be realized.

(2-11) By combining an instruction code of transfer instruction of immediate data and the instruction code of transfer instruction to the memory, transfer between immediate and memory can be realized.

(2-12) By including other information to the front instruction code for instruction expansion, the instruction code length can be shortened and the execution time can be shortened. For example, when in existing CPU, when there are present a front instruction code for executing designation other than operation with regard to a memory and instruction realized by combining the front instruction code and an operation code, by including the designation other than operation with regard to the memory to the front instruction code for instruction expansion for designating the operation with regard to the memory, the instruction code length can be shortened and execution time can be shortened.

(2-13) Existing instruction is combined and new instruction function is realized and accordingly, in comparison with existing CPU, future expansion allowance can be held to an equivalent degree. For example, in the case in which with regard to existing CPU, expansion of further instruction set and further high speed formation are enabled, such a technology can be applied to CPU to which the invention is applied. By using the technology in the existing instruction realizing the new instruction function and combining the technology, the new instruction function can be realized.

According to second lower CPU explained above, the following operation and effect is achieved.

(3-1) By making address space and program counter of second lower CPU equivalent to those of higher CPU, meeting large capacity formation of program, reducing addressing modes of data transfer to a degree by which comparatively small scale data can be dealt with or limiting data size of transfer data, the logical scale of CPU can be reduced.

(3-2) By reducing address space which can be used in data access, the logical scale can further be reduced. Further, by dividing in two, the address space which can be used in data access, without deteriorating the usability, compatibility in view of address space with higher CPU can be maintained and by previously preparing an operational mode of switching the method of calculating the effective address to higher CPU, compatibility in view of software can be maintained.

(3-3) By enlarging address space for program as equivalent to that of higher CPU, aptitude with regard to programming using high-level language such as C language can be promoted. Further, by enabling to switch stack pointers, undesirable increase in the capacity of stacks in controlling stacks such as OS can be restrained.

(3-4) By executing calculation of the effective address for data access by a bit length (16 bits) shorter than a bit length in correspondence with address space and providing the effective address by executing code expansion, upper side (general register E) of the general purpose register can be used as data register and the number of the general purpose registers can substantially be increased.

Although an explanation has been given of specific examples of the invention with regard to means for resolving the study problems A through C, the invention is not limited thereto but can naturally be modified variously within the range not deviated from the gist.

For example, object CPU's are not limited to higher CPU and first and second lower CPU. There may be provided CPU constituting lower compatibility with higher CPU by upper compatibility with first lower CPU. Or, there may be provided CPU having further lower compatibility with second lower CPU. Two embodiments of second lower CPU are not exclusive to each other but may be provided at the same time. Further, there can be provided CPU's having various compatibilities.

Register constitution (programming model), that is, bit numbers of general purpose registers or a number of registers can arbitrarily be selected. The method of calculating addressing mode and effective address can be modified variously. The specific example of the logical circuit of CPU is not limited. The EA1 code may not be quite the same as the transfer instruction code. At least, equivalent operation may be executed in execution at inside of CPU. The EA1 code may be constituted by changing significance of a portion of bits of the transfer instruction code. It is not necessary that the general purpose register must be usable commonly to address and data but a portion or a total thereof may be exclusive for address or exclusive for data.

The kind of the front instruction code is not particularly limited. The front instruction code for instruction expansion may include information combined with the transfer instruction and the operation instruction or other control information other than the information combined with the transfer instruction and the transfer instruction. For example, information for designating data size may be included. Further, it is not necessary to limit the code to the basic units of 16 bits of the instruction code but can be constituted by an arbitrary bit width such as 8 bits or 32 bits. With regard to combination of instruction codes, there can be constructed a constitution of combining the operation instruction code and the write type transfer instruction code, inputting and operating data of two different addresses on memory and storing the result to an address of other memory designated by the write type transfer instruction code. The first and the second read type transfer instruction codes can be omitted and data on the general purpose register can be inputted. The front instruction code for instruction expansion, the first read type transfer instruction code and a second read type transfer instruction code can be combined and data read by the first read type transfer instruction can also be used in address calculation of the second read type transfer instruction code.

Further, only the general purpose register of group 0 may be made usable to operation instruction with regard to data on memory. Other functional blocks of the single chip microcomputer are not restricted at all.

(Embodiments with Regard to Means for Resolving the Study Problem D)

Next, an explanation will be given of specific examples of the invention with regard to means for resolving the study problem D. A microcomputer explained here is provided with CPU 2A exemplified in FIG. 53 although not particularly restricted. The module constitution of the microcomputer is similar to that in FIG. 2, although not particularly restricted. CPU 2A is provided with the register constitution of FIG. 3, an address space of CPU 2A is similar to that in FIG. 6 and the method of calculating the effective address by CPU 2A is as shown by FIG. 7 and FIG. 8. The instruction format of machine language of CPU 2A is in conformity with that shown by FIG. 9.

FIG. 54 exemplifies the instruction format of bit test instruction of CPU 2A. The bit test instruction inspects predetermined bits of data on the general purpose register or on the address space and reflects the inspection result to Z flag of CCR.

In the bit test instruction, as shown by (5) of FIG. 54, data on the general purpose register is designated by register direct. The bit test instruction at that occasion becomes an instruction code having the operation field (op), the register field (r) and the bit field (n) designating the bit number.

In the bit test instruction, as exemplified in (1), (2), (3), (4) of FIG. 54, in designating data on the address space, absolute address 8 bits, 16 bits, 32 bits and register indirect can be used. That is, in the case of the absolute addresses, there is provided the instruction format in which there is provided word having the operation field (op) and the EA expansion portion (EA) and in the case of the register indirect, there is provided word having the operation field (op) and the register field (r) and word in correspondence with the bit test instruction of register direct is successive thereto.

FIG. 55 through FIG. 57 shows the instruction format of condition branch instruction (bit condition branch instruction) with regard to predetermined bits of data on address space as an instruction format of composite instruction for reading data from the address space and executing a processing in accordance with the state of predetermined bits of the data. The instruction format shown here is an example different from an example, mentioned later, using the front instruction code for instruction expansion. Further, in single condition branch instruction, the condition code field (cc) designates branch condition. In bit condition branch instruction combined with branch instruction as composite instruction, branch condition is designated by the bit condition field (bc).

In designating data on address space, as shown by FIG. 55 through FIG. 57, absolute address 8 bits, 16 bits, 32 bits and register indirect can be used. This is provided with a common code although the common code is not the same as the instruction code (word) for designating data in the case of the bit test instruction. That is, the instruction code for designating data is, for example, data transfer instruction as in "MOV instruction" and can be differentiated from other instruction code in view of instruction set even when a single or a plurality of extra bits are present in an instruction code and pertinent information is set to the extra bits. Such an instruction code for designating data loads data referred on the memory space to a register which is not released in view of program, for example, the temporary register TRD.

On the rear side of the instruction code for designating data, in place of instruction code in correspondence with the bit test instruction of register direct, words in correspondence with the condition branch instruction and subroutine branch instruction follow. In designating the branch address, program counter relative of displacement 8 bits, 16 bits can be used. This is the instruction code common to that of existing condition branch instruction and the condition field (cc) becomes the bit condition field (bc). Further, in subroutine branch, only program counter relative of displacement 16 bits can be used.

Further, in CPU having small address space or lower CPU, when there is no absolute address 32 bits in bit test instruction, only combination of possible ranges may be provided.

In the bit condition field (bc), lower 3 bits bc[2:0] designate the bit number of the temporary data register TRD and upper 1 bit bc[3] designates the branch condition (set/clear). That is, the bit number with regard to data which is referred on the address space by the initial instruction code of the bit condition branch instruction and loaded to the temporary register TRD, is designated by the lower 3 bits [2:0], the upper 1 bit bc[3] designates a true value (True) of a value of the designated bit number and branch is designated when the referred value is the true value.

According to the bit condition branch instruction as the composite instruction of FIG. 55 through FIG. 57, instruction branched in the case in which the bit n of the address aa is set to 1, may be described as BBS #n,@aa,d, instruction branched in the case in which the bit n of the address aa is cleared to 0, may be described as BBC #n,@aa,d, instruction executing the subroutine branch in the case in which the bit n of the address aa is set to 1, may be described as BSSR #n,@aa,d and instruction executing subroutine branch in the case in which the bit n of the address aa is cleared to 0, may be described as BCSR #n,@aa,d. As mentioned above, n=bc[2:0]. The displacement d may be described with a label in assembly language and calculation of the relative value is carried out by an assembler.

In CPU which does not support the bit condition branch instruction, it is necessary to describe the bit test instruction (BTST) and the instruction (BNT) branched in accordance with the result of executing the instruction such that for example, BBS #n,@aa,d becomes BTST #n,@aa BNE d.

Further, it is necessary to describe the bit test instruction (BTST), the instruction (BEQ) branched in accordance with a result of executing the instruction and the subroutine branch instruction (BSR) by PC relative such that, for example, BSSR #n,@aa,d becomes BTST #n,@aa

BEQ NEXT

BSR d

NEXT:

The same goes with using the bit transfer instruction (BLD) and the instruction (BCS or BCC) branched in accordance with a result of executing the instruction in place of the bit test instruction.

According to the bit condition branch instruction shown by FIG. 55 through FIG. 57, data referred in the address space is loaded not to the general purpose register but to the temporary register TRD and whether branch can be executed or not can be controlled in accordance with values of the predetermined bits. Therefore, the instruction code can be shortened by 1 word, a number of execution states can be shortened by 1 state. Further, according to the bit condition subroutine branch instruction, the instruction code can be shortened by 2 words, the number of execution states can be shortened by 3 states.

As mentioned above, in the case of apparatus control, these condition branch instructions are often combined (constituted in a tree-like shape) and the branch destination is often determined from among a number of branch conditions and accordingly, the above-described shortening effect is further enhanced as a whole.

FIG. 58 exemplifies a combination of instruction codes in other instruction format in consideration of the bit condition branch instruction in CPU 2A. The example shown here is an example of realizing functions by instruction of the instruction format explained in reference to FIG. 55 through FIG. 57 by using the front instruction code for instruction expansion. That is, by making an instruction code used for designating data on the address space the same as the instruction code (word) for designating data in the case of the bit test instruction and adding a front instruction code as a prefix code in front of the word, similar to the above-described, the composite instruction can be made executable by constituting single instruction by using the temporary data register TRD.

When combined with FIG. 12 through FIG. 14, FIG. 58 expresses to include the combination of instruction codes in the instruction format of the direct operation instruction composed along with the front instruction cord for instruction expansion and the transfer instruction explained in reference to FIG. 11 through FIG. 14. Further, an instruction format of an example of transfer instruction to memory of CPU 2A is the same as the instruction format explained in reference to FIG. 11.

In the instruction format of FIG. 58, the bit condition branch instruction is realized by combining the front instruction code for instruction expansion, the EA1 code and the branch code. In the drawing, although a combination with the EA2 code is possible, the EA2 code signifies the code for constituting the destination address by the memory address and accordingly, the code is actually meaningless.

In the instruction format of FIG. 58, the bit test instruction as the composite instruction can be realized by using the front instruction code for instruction expansion, EA1 code and the bit test instruction code. In this case, the bit test instruction code is made an instruction code in correspondence with the bit test instruction with regard to desired bits on the general purpose register, that is, the addressing mode of register direct of (5) of FIG. 54. Further, in the case of providing operation instruction of the desired bit and carry, the instruction can be realized similar to the bit test instruction. Although in the drawing, there can be constituted a combination with the EA2 code, the combination is actually meaningless as mentioned above.

In the instruction format of FIG. 58, the function of the bit set instruction can be expanded. Single bit set instruction is an instruction of setting designated bits of designated data to 1. In the instruction format of FIG. 58, the bit set instruction as the composite instruction is constituted by combining the front instruction code for instruction expansion, the EA2 code and the bit test instruction code. At this occasion, similar to the above-described, the bit set instruction code is made the instruction code in correspondence with the bit set instruction with regard to the desired bits on the general purpose register. Although in the drawing, a combination with the EA1 code is possible, the EA1 code signifies the code constituting the source address by the memory address and accordingly, the combination is actually meaningless.

The format of the front instruction code for instruction expansion (control code) in CPU 2A is the same as the format explained in reference to FIG. 15. According to the format, there are provided bits indicating information that the source side and the destination side are memories. In the case of the bit condition branch instruction or the bit operation instruction, it is designated that the source side becomes a memory. The transfer instruction codes of EA1 and EA2 are made the same and therefore, when the source side is a memory, regardless of the destination side, a code successive to the front instruction code for instruction expansion is determined to be EA1. Meanwhile, when the source side is the general purpose register and the destination side is a memory, it is determined as EA2. When one instruction having the instruction format of FIG. 58 is executed, the temporary register TRD is utilized for delivery of data between the instruction codes similar to the embodiment explained in reference to FIG. 55 through FIG. 57.

For designating an address where the desired bits are present by the combination of instruction codes of FIG. 58, an addressing mode equivalent to that of the transfer instruction can be used. An arbitrary addressing mode can be used in the instruction set and accordingly, programming can be facilitated. For example, in the case of operating and referring bits present in a plurality of addresses by adding register indirect with displacement or predecrement/postincrement register indirect, to existing CPU having only register direct, register indirect and absolute address, the program step number can be reduced and the processing speed can be promoted. At this occasion, by combining existing ones of the instruction code of the transfer instruction and the instruction code of the bit operation instruction, the operation is executed and accordingly, conventional design resources of the instruction decoder can effectively be utilized, addition and change of the logical scale can be minimized and the increase in the logical and physical scale can be minimized.

With regard to the bit condition branch instruction, the instruction having the format of FIG. 55 through FIG. 57 and the instruction having the format of FIG. 58 can be prepared. With regard to the instruction capable of realizing equivalent function by both of them (combination of addressing modes of data and branch destination), the instruction having shorter instruction code length and smaller number of execution states may be adopted.

Figure 53:
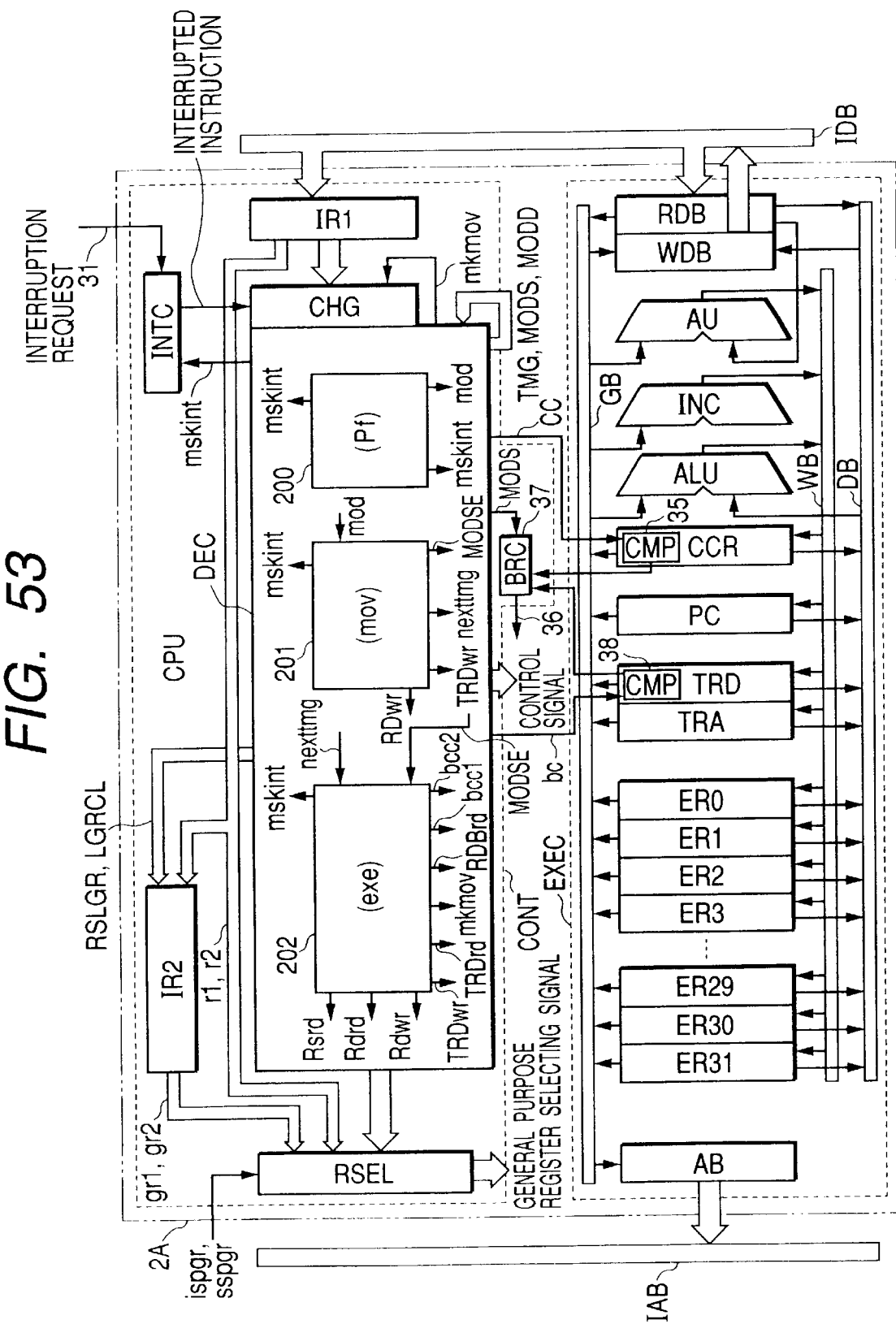
FIG. 53 is a block diagram showing an example of CPU provided to a microcomputer according to the invention with regard to study problem D.

FIG. 53 shows a detailed example of CPU 2A. Although not particularly illustrated in CPU 2 of FIG. 1, the condition code register CCR is inputted with the value of the condition field (cc) and is provided with a determining circuit (CMP) 35 for determining whether values of predetermined bits of the condition code register CCR coincides with value thereof in the condition field (cc) and is provided with a branch control logic (BRC) 37 for generating a branch control signal 36 by receiving a determination result thereby.

In the bit condition branch instruction as the composite instruction explained in reference to the instruction format of FIG. 55 through FIG. 58, the temporary data register TRD is provided with a determining circuit (CMP) 38 inputted with the value of the bit condition field (bc) for determining whether the values of the bit positions designated thereby coincide with the branch condition and a determination result thereby is supplied to the branch control logic 37. The branch control logic 37 makes effective input from the determining circuit 35 or the determining circuit 38 in accordance with the logical value of the control signal MODS. That is, in referring to data from the address space by executing the bit condition branch instruction as the composite instruction, the instruction decoder DEC sets MODS=1, when MODS=1, the temporary register write signal TRDwr is made effective and reference data is written to the temporary data register TRD in place of the general purpose register. The instruction decoder DEC sets MODS=0 other than the composite instruction and when MODS=0, the general register write signal Rdwr is made effective and the flag of CCR is operated in accordance with an operation result written to the general purpose register. The branch control logic 37 adopts information outputted from the determining circuit 38 of the temporary data register TRD when MODS=1 and executes branch control in accordance therewith. When MODS=0, the branch control circuit 37 adopts information outputted from the determining circuit 35 of the condition code register CCR.

As shown by FIG. 55 through FIG. 58, in the case of executing a series of a plurality of instruction codes (word having operation field), the interruption control INTC designates interruption masks by the respective instruction codes such that execution of the instruction codes having the predetermined combination is not interrupted.

The arithmetic and logical functional unit AU is used in generating branch address of the branch instruction/subroutine branch instruction of program counter relative. Specifically, the arithmetic and logic functional unit AU inputs output from the program counter PC used for immediate instruction and inputs displacement held by the read data buffer RDB and adds these. In starting to execute the branch instruction/subroutine branch instruction of program counter relative of 8 bits displacement, the branch address is provided.

The incrementer INC is used in incrementing the program counter PC. As mentioned above, the temporary data register TRD and the determining circuit 38 are used in the condition branch instruction.

Further, other than these, circuit blocks having functions the same as those in FIG. 1 are attached with the same notations. A detailed explanation thereof will be omitted.

FIG. 59 exemplifies logical constitution of the determining circuit 38 of the temporary data register TRD and the branch control logic 37 by logical description.

At a portion of (5-1) of FIG. 59, the bit condition field (bc) is constituted by either of bit 11 through 8 and bit 7 through 4 in accordance with the operation code. A result of selecting it by a control signal bcc1 is made an inner signal bc1. The uppermost bit bac1[3] of the inner signal bc1 designates a state (set/clear) of bits and lower bit bc1[2:0] designates the bit number.

At a portion of (5-2), of FIG. 59, desired bits of TRD are selected (trdsel) by the selector of bc1[2:0].

At a portion of (5-3) of FIG. 59, when bc[3]=0, inversion of selected bits is outputted and when bc[3]=1, selected bits are outputted as they are (bout). This is the result of determining the bit condition.

At a portion of (5-4) of FIG. 59, a determination result (cout) of the condition code CCR of existing condition branch instruction and the output (bout) are selected by the MODS signal and a result of branch/nonbranch is provided (bcout). When the result is 1, the branch is established and when the result is 0, the branch is not established. Further, although not particularly restricted, the result may be set to 1 when a branch condition determining signal (logical sum of bcc1 and bcc2) is not brought into an active state.

FIG. 60 through FIG. 62 show the logical constitution of the instruction decoder DEC with regard to a portion of the bit test instruction and the bit condition branch instruction (first ford) by logical description. According to the logical description of the decoder DEC, a signal of small letter is made a signal generated by and outputted from the instruction decoder DEC and a signal in capital letter is made a signal inputted to the instruction decoder DEC. The logical description of the drawings exemplifies a case in which data read is executed by 8 bits absolute address and read data is stored to the temporary data register TRD.

At a portion of (6-1) of FIG. 60, the state code TMG is generated. The state code TMG progresses such that 1 ® 2. Further, when NEXTTMG[5]=0, a successive TMG is NEXTTMG[4:0]. When NEXTTMG[5]=1, a successive TMG is made 5'b00001.

At a second portion (6-2) of FIG. 60, bus control is executed. When nop=0, start of bus access is designated and when nop=1, prohibition of bus access is designated. data=0 designates instruction read and data=1 designates data access. long=1 designates long word size and when long=0, byte=0 designates word size and byte=1 designates byte size. write=0 designates read and write=1 designates write. In the case of instruction read, content of the bus IDB is stored to IR1 and the read data buffer RDB at a predetermined timing. In the case of data read, content of the bus IDB is stored to the read data buffer RDB at a predetermined timing. In the case of data write, content of the write data buffer WDB is outputted to the bus IDB at a predetermining timing. In the case of the instruction, data access is executed at state code 1 and read of data access and byte access are designated. At state code 2, the instruction read is executed.

At a portion of (6-3) of FIG. 61, the effective address is calculated. In the case of the transfer instruction, at state code 1, dbragb=1, the EA expansion portions of 8 bits of the instruction code held by DBRA is expanded by 1 to 32 bits (all of upper 24 bits are set to 1) and thereafter, outputted to the inner bus GB. Content of GB is stored to the address buffer AB at each state and needs not to control particularly.

At a portion of (6-4) of FIG. 61, transfer data is controlled. At state code 2, dbrdb=1, the read data is outputted from DBR to DB and is stored to the temporary data register TRD via the arithmetic and logic functional unit ALU by setting wbtrd=1.

At a portion of (6-5) of FIG. 62, the instruction mask signal is controlled. Further, control signal MODS is generated.

FIG. 63 through FIG. 65 shows the logical constitution of the instruction decoder DEC with regard to a portion of the condition branch instruction by logical description. The logical description corresponds to condition branch instruction (Bcc d:8) of 8 bits displacement.

At a portion of (7-1) of FIG. 63, the state code TMG is generated. The state code TMG progresses such that 1 ® 2.

At a portion of (7-2) of FIG. 63, bus control is executed. In the case of the instruction, at state codes 1 and 2, instruction read is executed, at state code 1, instruction read of branch address is executed based on the branch address calculated by the arithmetic and logic functional unit ALU. As mentioned later, before finishing to read, a determination of whether branched or not is executed, in the case of no branch, read instruction is not inputted. At state code 2, in accordance with the determination result, instruction read is executed for address next to the branch address or address next next to the branch instruction.

At a portion of (7-3) of FIG. 64, the effective address is calculated. At state code 1, augb=1, a result of the arithmetic and logic functional unit ALU (effective address of branch address) is outputted to the inner bus GB. Further, bcc1=1 and branch determination is designated. Actual determination is executed in accordance with content of the condition code register CCR when MODS=0 and content of the temporary data register TRD when MODS=1. Further, with regard to bcc1 and bcc2, bit positions thereof of operation codes used as condition fields (cc/bc) differ. In the case of bcc1, bit 11 through 8 are used and in the case of bcc2, bit 7 through 4 are used.

At a portion of (7-4) of FIG. 64, the transfer data is controlled, however, according to the instruction, the operation is not executed. At a portion of (7-5) of FIG. 64, all of control signals are initialized. Interruption is permitted and when interruption is requested, interruption exception processing can be carried out successively.

FIG. 66 through FIG. 68 show the logical constitution of the instruction decoder DEC with regard to a portion of the subroutine branch instruction by logical description. The logical description corresponds to the subroutine instruction (BSR d:16) of 16 bits displacement. MAX signal designates the maximum mode. Actually, there is executed control of decrement and output to GB of the stack pointer (ER7), however, the control has nothing to do directly to the invention and accordingly, illustration thereof will be omitted.

The operation differs in accordance with establishment/nonestablishment of condition. Further, by maximum/minimum mode, bit length of the program counter PC for stacking differs.

At a logical description portion of (8-1) of FIG. 66, the state code TMG is generated. In establishing the condition of the minimum mode, the state code TMG progresses such that 1 ® 14 ® 2 ® 3. When the condition of the maximum mode is established, the state code TMG progresses such that 1 ® 14 ® 2 ® 11 ® 3. In the case of nonestablishment, the state code TMG progresses such that 1 ® 14 ® 3.

At a logical description portion of (8-2) of FIG. 66, bus control is executed. In the case of the instruction, instruction read is executed at state code 14, 3 and at state code 2, 11, write to stack is executed. At state code 1, bus access is not executed. Instruction read at state code 14 is executed based on the result of determining the branch condition.

At a logical description portion of (8-3) of FIG. 68, the effective address is calculated. bcc2=1, branch determination is designated. Actual determination is executed in accordance with content of temporary data register TRD when MODS=1. Further, at state code 1, the EA expansion portions of 16 bits of the instruction code held by the read data buffer RDB is subjected to code expansion to 32 bits by dbrext signal and is outputted to the inner bus DB. Although not illustrated, after outputting content of the program counter PC to the inner bus BG, addition is executed by the arithmetic and logic functional unit ALU. At state code 2, in accordance with the determination result (BCOUT), when BCOUT=1, output is executed from ALU to the inner bus GB. Further, although not illustrated, when BCOUT=0, output is executed from PC to the inner bus GB.

At a logical description portion of (8-4) of FIG. 67, transfer data is controlled, however, according to the instruction, operation is not executed. At a logical description portion of (8-5) of FIG. 68, all of control signals are initialized. Interruption is also permitted and when interruption is requested, interruption exception processing can be carried out successively.

By combining the logical description explained in reference to FIG. 60 through FIG. 68, the instruction decoder DEC can control the bit condition branch instruction.

The logical description of a portion of the transfer instruction in the instruction decoder DEC is the same as that in the example of FIG. 23 through FIG. 25. Further, the logical description of a portion of the operation instruction by the instruction decoder DEC is the same as that in FIG. 26 and FIG. 27.

FIG. 69 and FIG. 70 exemplify logical description of logical constitution of the instruction decoder DEC with regard to other operation instruction. The logical description corresponds to the bit test instruction (BTST #n, Rn). Similar to the above-described, whether the instruction is executed as independent bit test instruction or the instruction is executed as a portion of processing instruction with regard to data on the memory, is designated by the MODS signal. With regard to a portion not particularly illustrated (control of arithmetic and logic function unit ALU), the instruction can be made similar to the independent bit test instruction.

At a logical description portion of (9-1) in FIG. 69, the state code TMG is generated. The state code TMG finishes by 1. At a logical description portion of (9-2) in the drawing, bus control is executed. At state code 1, instruction read is finished.

At a logical description portion of (9-3) in FIG. 70, operation data is controlled. In the case of MODS=0, data is made that of the general purpose register and content of the general purpose register is read to DB (rsdb). In the case of MODS=1, data is made that of memory and content of the temporary register TRD is read to DB (trddb). In a logical description portion of (9-4) in the drawing, all of control signals are initialized. Interruption is also permitted, when interruption is requested, interruption exception processing can be executed successively.

FIG. 71 and FIG. 72 exemplify the logical constitution of the instruction decoder DEC with regard to still other operation instruction by logical description. The logical description corresponds to the bit set instruction (BSET #n,Rn). Similar to the above-described, whether the instruction is executed as independent bit set instruction or the instruction is executed as a portion of processing instruction with regard to data on memory is designated by the MODD signal. With regard to a portion not particularly illustrated (control of arithmetic and logic functional unit ALU), the instruction can be made similar to independent bit set instruction.

At a logical description portion of (10-1) in FIG. 71, the state code TMG is generated. The state code TMG finishes by 1. At a logical description portion (10-2) in the drawing, bus control is executed. At state code 1, instruction read is finished.

At a logical description portion of (10-3) in FIG. 72, operation data is controlled. In the case of MODD=0, data is made that of general purpose register and content of the general purpose register is read to GB (rdgb) and the operation result is written to the general purpose register (wbrd). In the case of MODD=1, data is made that of memory and content of read data buffer is read to the bus DB (DBRdb) and the calculation result is written to the temporary data register TRD (wbtrd).

In a logical description portion of (10-4) in FIG. 72, the interruption mask signal is controlled. Further, in the case in which the destination side is a memory, the control signal MKMOV is generated and generation of an instruction code for executing operation equivalent to that of the write type transfer instruction is designated to the instruction changing unit CHG. Further, the long word size signal LNG and the byte size signal BYTE are continued.

Next, an explanation will be given of an example of execution timings of the composite instruction of the bit condition branch instruction. Although not particularly restricted, the inner data bus is constituted by 16 bits and makes read/write of built-in ROM, RAM, readable/writable by 1 state. The built-in ROM, RAM makes the bus IAB address bus and makes the bus IDB data bus. Although PAB, PDB, mentioned later, are connected, understanding is requested such that these are generated at inside thereof at similar timings.

Figure 73:
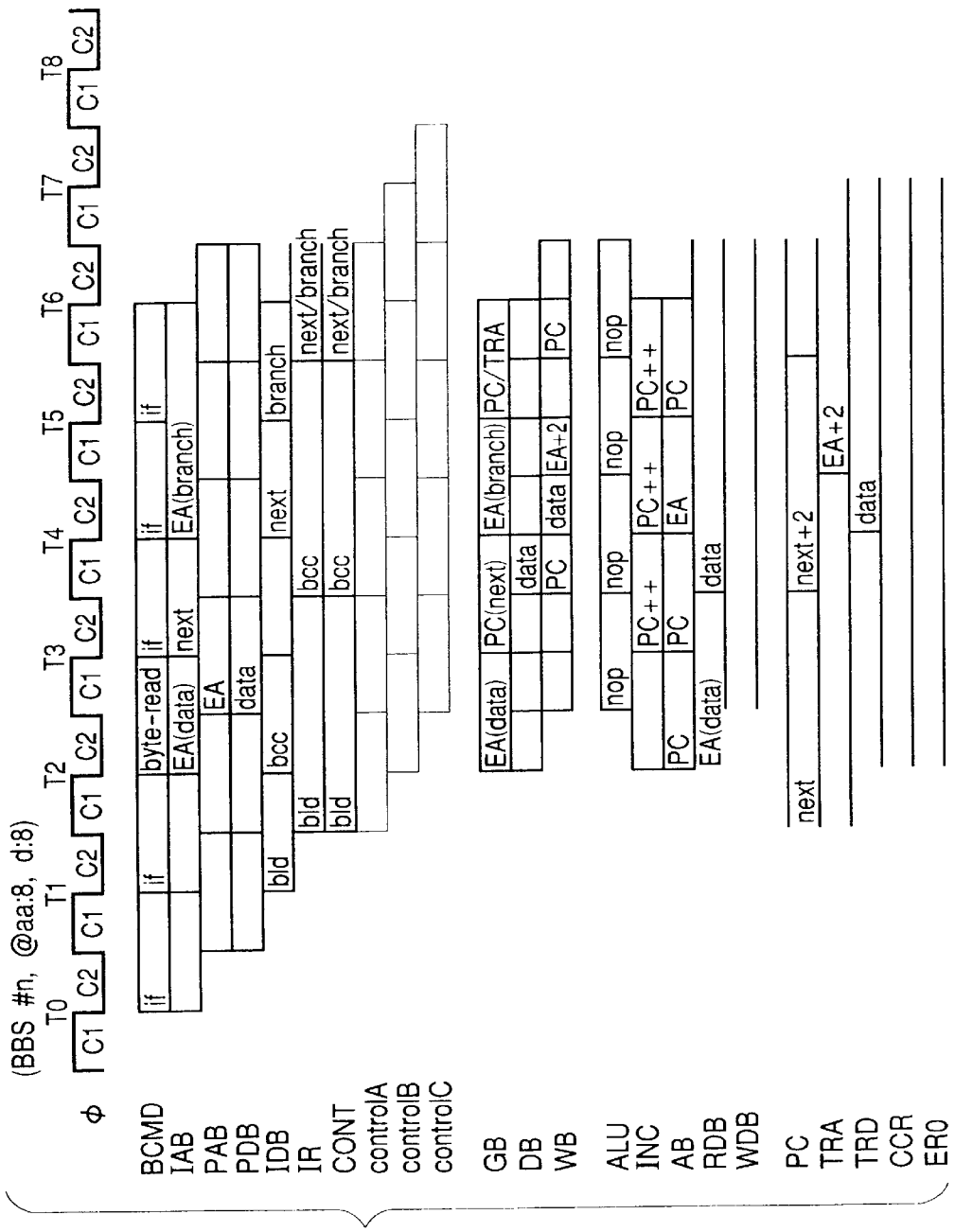
FIG. 73 illustrates timing charts exemplifying execution timings of a first example of bit condition branch instruction (BBS#0,@FFFFFE,$+20)

FIG. 73 exemplifies execution timings of first example of the bit condition branch instruction (BBS #0, @FFFFFE,$+20). At slot C2 of cycle T0, address is outputted from the address buffer (AB) to the bus IAB.

At slot C1 of cycle T1, content of the bus IAB is outputted to the bus PAB and read cycle is started. At slot C2, read data is provided to the inner data bus and the read data is latched to the register IR1 at slot C1 of cycle T2. This is word common to the first word of the bit test instruction (bld) and stores data of the designated address to the temporary register.

Successively, at slot C2 of cycle T2, next address (content incremented by +2) is outputted to the bus IAB and the read data is latched to the register IR1 at slot C1 of cycle T3 (instruction code (bcc) of condition branch instruction)). The above-described operation is executed by control of executing prior instruction and also is a case in which relative relationship therebetween differs.

When execution of immediate instruction has been finished, in the case in which execution of instruction is started most fastly, at slot C1 of cycle T2, the instruction code (bld) is inputted to the instruction decoder DEC and the content of instruction is decoded. In accordance with decoded result, as has been explained in reference to FIG. 60 through FIG. 62, the control signal is outputted and control of respective portions is executed. That is, this mode is the addressing mode of 8 bit absolute address and accordingly, based on the absolute address, read of source data is executed and read result is stored to the temporary register TRD. Further, the absolute signal MODS=1.

At slot C2 of cycle T2, content of the read data buffer RDB (absolute address) is read to the inner bus BG and is inputted to the address buffer AB. Address is outputted from the address buffer AB to the address bus IAB.

From cycle T3, data is read. Further, at slot C2 of cycle T3, content of the program counter PC is read to the inner bus GB and is inputted to the address buffer AB and the incrementer INC. Address is outputted from the address buffer AB to the address IAB. The arithmetic functional unit AU inputs content of the bus GB and executes calculation of branch address from slot C1 of cycle T4.

At slot C1 of cycle T4, the read data is stored to the read data buffer RDB. Further, the read data is outputted from the read data buffer RDB to the inner bus DB and is inputted to the arithmetic and logic functional unit ALU. Operation of the arithmetic and logic functional unit ALU is made nonoperational.

At slot C2 of cycle T4, the read data is outputted from the arithmetic and logic functional unit ALU to the inner bus WB and is stored to the temporary data register TRD.

At slot C1 of cycle T4, the operation code (condition branch instruction (bcc)) is inputted to the instruction decode DEC and content of the instruction is decoded. In accordance with the decoded result, as has been explained in reference to FIG. 63 through FIG. 65, the control signal is outputted and control of respective portions is executed. Since MODS signal is set to 1, test is executed for predetermined bits not of the condition code register CCR but of the temporary data register TRD.

At slot C2 of cycle T4, as described above, content of the branch address calculated by the arithmetic functional unit AU is read to the inner bus GB and is inputted to the address buffer AB and the incrementer INC. Address is outputted from the address buffer AB to the address bus IAB.

At slot C1 of the cycle T5, a result incremented (+2) by the incrementer INC is written to the temporary register TRA via the inner bus WB. Test of the branch condition is designated.

At slot C2 of cycle T5, in the case in which the branch condition is established, content of the temporary address register TRA is read to the inner bus GB and in the case of nonestablishment, content of the program counter PC is read to the inner bus GB and is inputted to the address buffer AB and the incrementer INC. Address is outputted from the address buffer AB to the address bus IAB. Thereby, address of next next instruction code is switched.

Meanwhile, at slot C1 of cycle T6, in the case in which the branch condition is established, content of the bus IDB is latched to the register IR1 (instruction code of branch destination). In the case of nonestablishment, content of the register IR1 is held and next instruction code of the bit condition branch instruction is reserved. Thereby, the next instruction code is switched.

Further, there is outputted the continuous instruction signal (mskint) since the first word and the second word and thereafter are not divided from each other. By the signal, even when interruption request is generated, execution of instruction can be continued.

Figure 74:
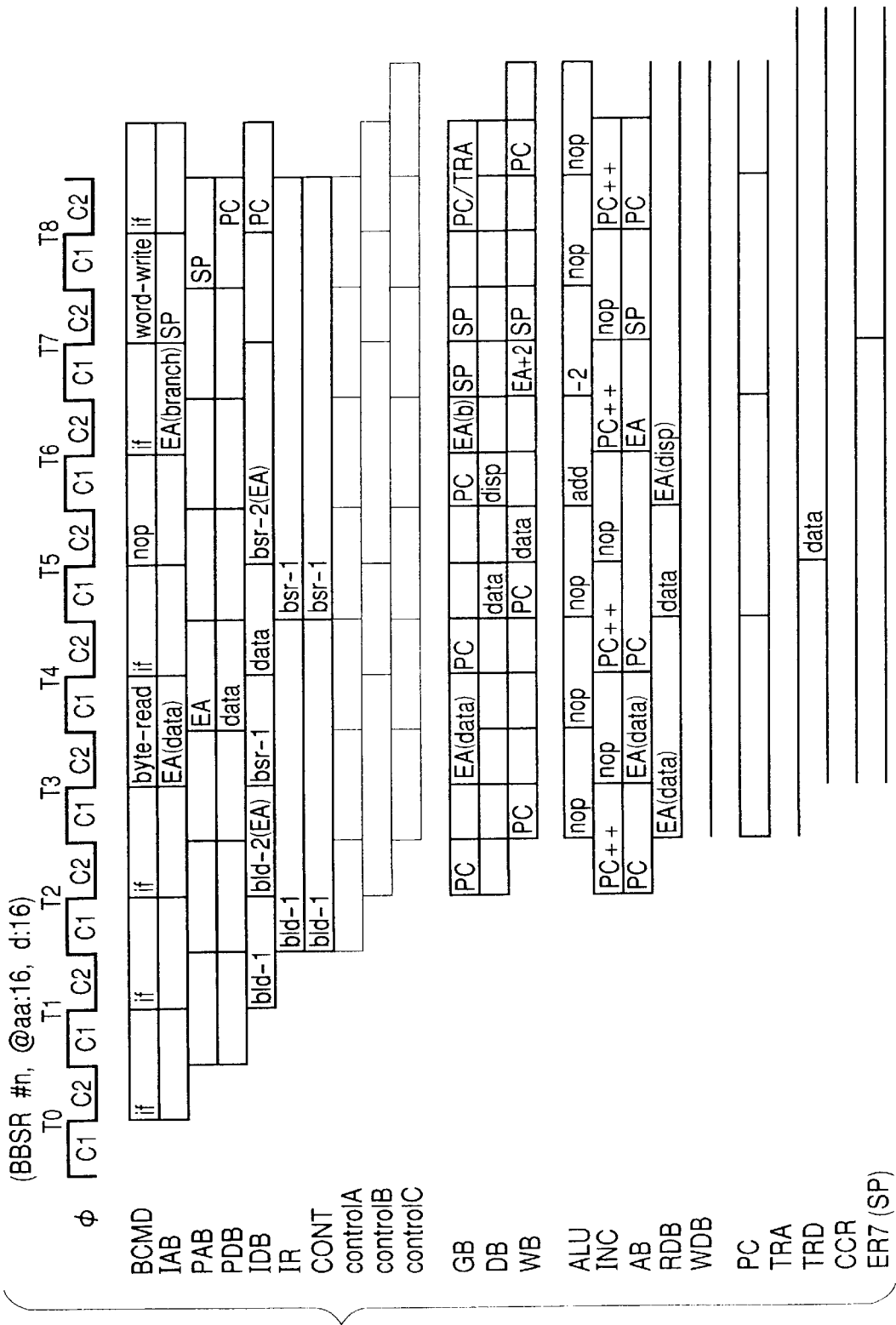
FIG. 74 illustrates timing charts exemplifying execution timings of an example of bit condition subroutine branch instruction (BBSR #5,@FFFE00,$+300)

FIG. 74 shows execution timings of an example of bit condition subroutine branch instruction (BBSR#5, @FFFE00,$+300).

At slot C1 of cycle T2, an instruction code (bld-1) is inputted to the instruction decoder DEC and content of instruction decoded. In accordance with the decoded result, a control signal is inputted and control of various portions is executed. That is, owing to an addressing mode of 16 bits absolute address, successively, after reading an absolute address which is the EA expansion portion, based on the absolute address, read of source data is executed and read result is stored to the temporary data register TRD. Further, the control signal MODS=1.

At slot C2 of cycle T1, content of the program counter PC is read to the inner bus GB and is inputted to the address buffer AB and the incrementer INC. An address is outputted from the address buffer AB to the address bus IAB. From cycle T2, read cycle is started and the read data is latched to the read data buffer RDB at slot C1 of cycle T3 (absolute address (bld-2) which is EA expansion portion).

At slot C2 of cycle T2, content of the program counter PC is read to the inner bus GB and is inputted to the address buffer AB and the incrementer INC. The address is outputted from the address buffer AB to the address bus IAB. From cycle T3, read cycle is started and the read data is latched to the read data buffer RDB at slot C1 of cycle T4 (subroutine branch instruction (bsr-1)).

At slot C of cycle T3, content of the read data buffer RDB (absolute address) is read to the inner bus GB and is inputted to the address buffer AB. The address is outputted from the address buffer AB to the address bus IAB. From cycle T4, data is read and at slot C1 of cycle T6, the read data is stored to the read data buffer RDB. Further, the read data is outputted from the read data buffer RDB to the inner bus DB and is inputted to the arithmetic and logic functional unit ALU. Operation of the arithmetic and logic functional unit ALU is made nonoperational.

At slot C2 of cycle T6, the read data is outputted from the arithmetic and logic functional unit ALU to the inner bus WB and is stored to the temporary data register TRD.

At slot C1 of cycle T5, an instruction code (subroutine branch instruction (bsr-1)) is inputted to the instruction decoder DEC and content of the instruction is decoded. In accordance with the decoded result, as has been explained in reference to FIG. 66 through FIG. 68, the control signal is outputted and control of respective portions is executed. Since the MODS signal is set to 1, test of predetermined bits of the temporary register TRD is executed.

At cycle T5, test of branch condition is designated. At state C1 of cycle T6, content of the program counter PC is read to the inner bus GB and content of the read data buffer RDB (displacement) is read to the inner bus DB, respectively, and addition is executed by the arithmetic and logic functional unit. At slot C2 of cycle T6, in the case of establishing the branch condition, content of the arithmetic and logic functional unit ALU is read to the inner bus GB and in the case of nonestablishment, content of the program counter PC is read to the inner bus GB and is inputted to the address buffer AB and the incrementer INC. The address is outputted from the address buffer AB to the address bus IAB. Thereby, an address of a successive instruction code is switched. At slot C1 of cycle T7, a result incremented (+2) by the incrementer INC is written to the program counter PC via the inner bus WB.

At slot C1 of cycle T7, content of the stack pointer SP (ER7) is read to the inner bus GB and the arithmetic and logic functional unit ALU executes decrement (in maximum mode, 4 is subtracted and in minimum mode, 2 is subtracted). At slot C2 of cycle T7, content of the arithmetic and logic functional unit ALU is read to the inner bus GB, inputted to the address buffer AB and the address is outputted from the address buffer AB to the address bus IAB. Bus command of word size write is generated. At slot C2 of cycle T8, content of the program counter PC is outputted to the inner bus DB and to the inner bus IDB via the write data buffer WDB. In the case of maximum mode, further, another time of word size write is executed. In the case of nonestablishment of condition, the stack operation is not executed.

At slot C2 of cycle T8, in the case of nonestablishment of condition, at slot C2 of cycle T8, content of the program counter PC is read to the inner bus GB and is inputted to the address buffer AB and the incrementer INC. Address is outputted from the address buffer AB from the address buffer AB. From next state, read cycle is started.

Figure 75:
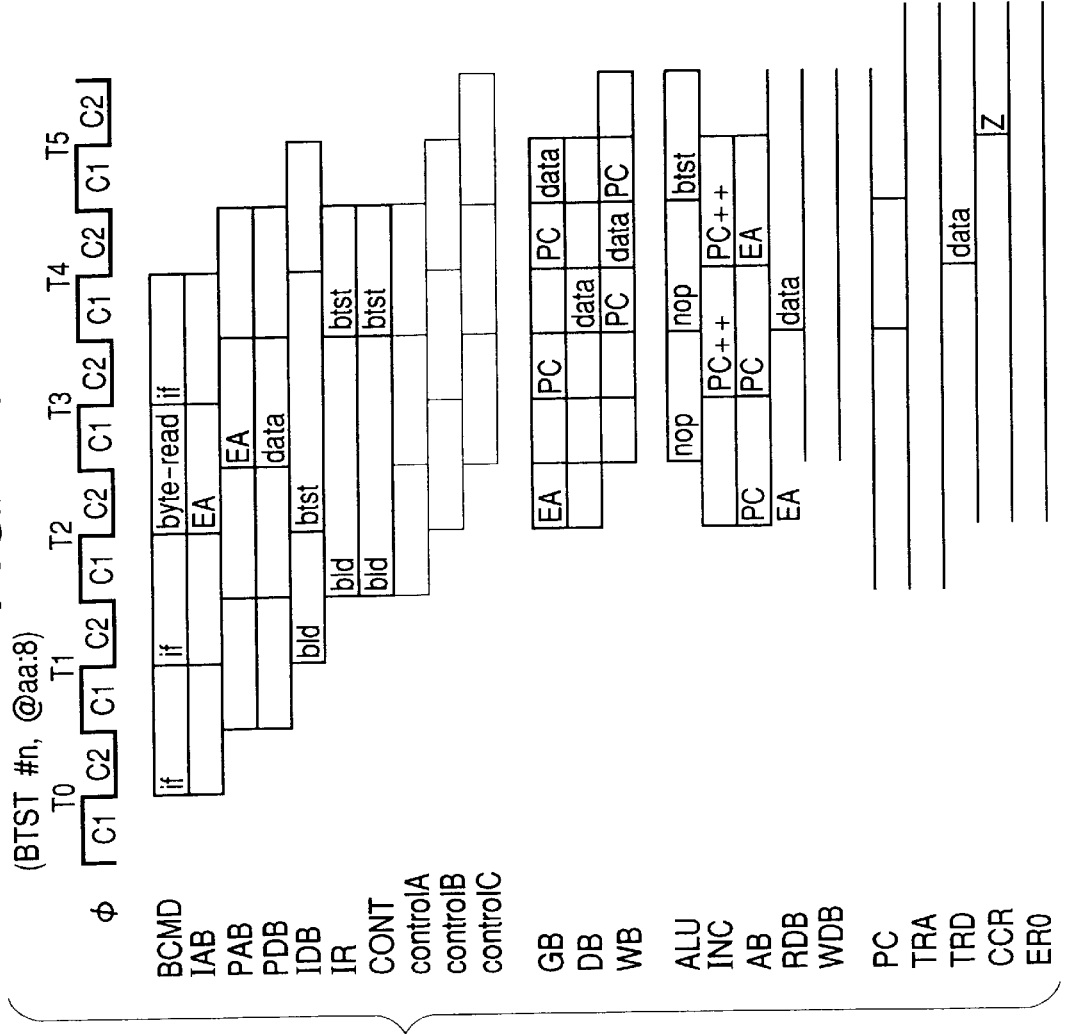
FIG. 75 illustrates timing charts exemplifying execution timings of a first example of bit test instruction (BTST#0, @FFFFFE)

FIG. 75 shows execution timings of first example of bit test instruction (BTST #0,@FFFFFE). This is the case of existing single instruction.

At slot C1 of cycle T2, an instruction code (b1d) is inputted to the instruction decoder DEC and content of instruction is decoded. In accordance with decoded result, as has been explained in reference to FIG. 60 through FIG. 62, control signal is outputted and control of respective portions is executed. That is, owing to the addressing mode of 8 bits absolute address, based on the absolute address, read of source data is executed and read result is stored to the temporary register TRD. Further, the control signal MODS= 1.

At slot C2 of cycle T2, content of the read data buffer RDB (absolute address) is read to the inner bus GB and inputted to the address buffer AB. The address is outputted from the address buffer AB to the address bus IAB.

From cycle T3, data is read. Further, at slot C2 of cycle T3, content of the program counter PC is read to the inner bus GB and is inputted to the address buffer AB and the incrementer INC. Address is outputted from the address buffer AB to the address bus IAB. The arithmetic functional unit AU inputs content of the bus GB and executes calculation of branch address from slot C1 of cycle T4.

At slot C1 of cycle T4, the read data is stored to the read data buffer DBR. Further, read data is outputted from the read data buffer DBR to the inner bus DB and inputted to the arithmetic and logic functional unit ALU. Operation of the arithmetic and logic functional unit ALU is made nonoperational.

At slot C2 of cycle T4, read data is outputted from the arithmetic and logic functional unit ALU to the inner bus AB and is stored to the temporary register TRD.

At slot C1 of cycle T4, an instruction code (bit test instruction (btst)) is inputted to the instruction decoder DEC and content of the instruction is decoded. In accordance with decoded result, the control signal is outputted and control of respective portions is executed. Since the MODS signal is set to 1, data is read not from the general purpose register but from the temporary data register TRD.

At slot C2 of cycle T4, content of the program counter PC is read to the inner bus GB and is inputted to the address buffer AB and the incrementer INC. The address IAB is outputted from the address buffer AB. At slot C1 of cycle T5, a result incremented (+2) by the incrementer INC is written to the program counter PC via the inner bus WB.

At slot C1 of cycle T5, in accordance with the MODS signal, data is outputted from the temporary register TRD to the inner bus GB and is inputted to the arithmetic and logic functional unit ALU. Selection of designated bits is executed.

At slot C2 of cycle T7, the bit test result is stored to Z flag of the condition code register CCR. When the selected bit is 0, Z=1, when the selected bit is 1, Z=0.

Figure 76:
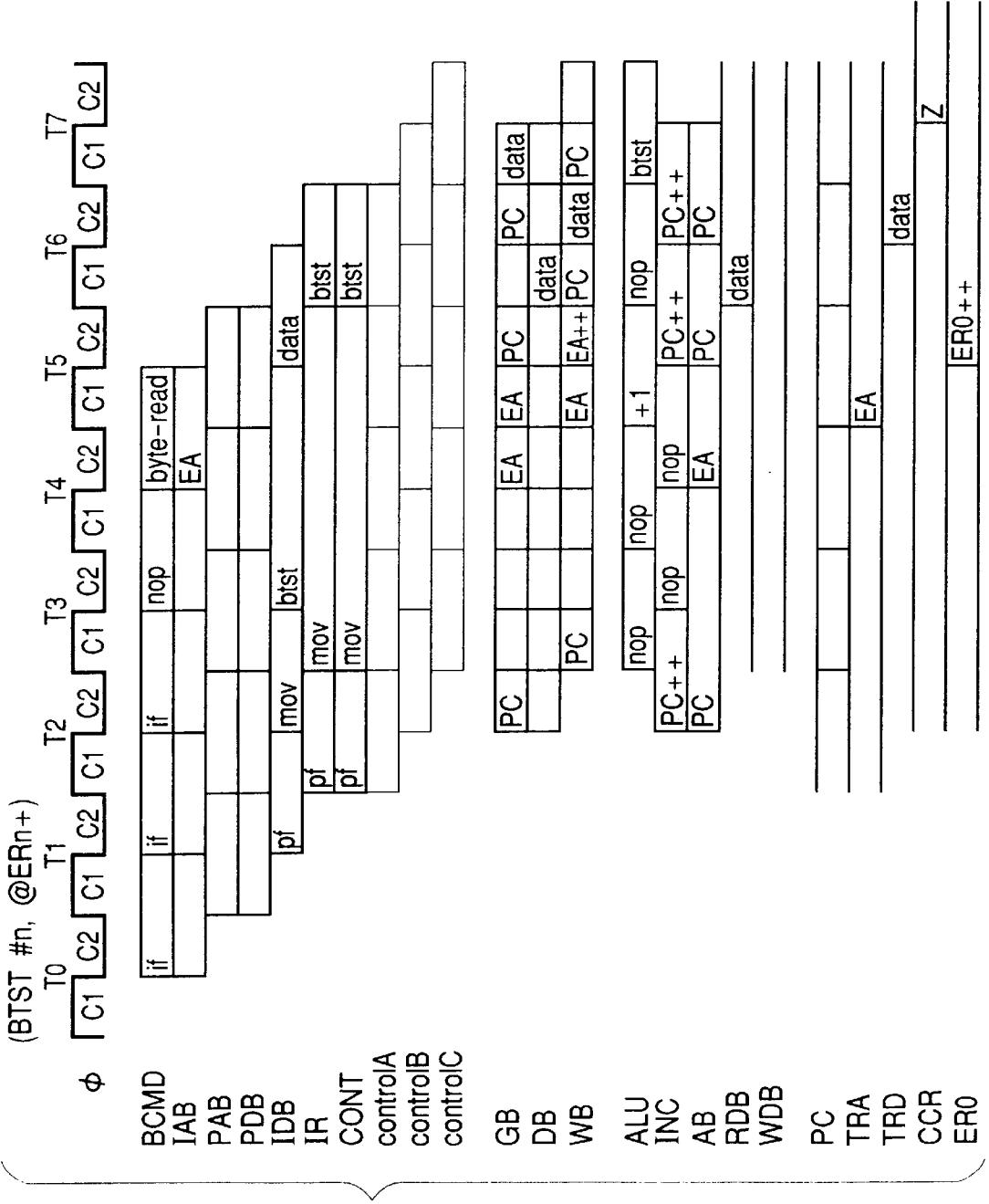
FIG. 76 illustrates timing charts exemplifying execution timings of a second example of bit test instruction (BTST#1, @ER0+)

FIG. 76 shows execution timings of a second example of bit test instruction (BTST #1,@ER0+). This is an example of expanding the addressing mode. The example is executed by combining a front instruction code, an instruction code in correspondence with MOV.B @ER0+,R0 and an instruction code in correspondence with BTST #1,R0H. In accordance with FIG. 15, the front instruction code is set to H' 0108 and by the MODS signal, it is designated that the source side is a memory.

The transfer instruction code executes read of memory similar to existing transfer instruction and stores read data to the temporary data register TRD based on the designation that the source side constitutes memory by the front instruction code. The designation that the source side constitutes memory is continued. In accordance with the designation that the source side constitutes memory, the operation instruction code reads the source side data not from the general purpose register but from the temporary register TRD. Other operation is similar to that of existing operation instruction.

At slot C1 of cycle T2, the instruction code (front instruction code pf) is inputted to the instruction decoder DEC and content of instruction is decoded. In accordance with decoded result, a control signal is outputted and control of respective portions is executed. In such a front instruction code, it is designated that the source side data is present on the memory. That is, as a control signal controlC, the MODS signal is set to 1 and is fed back to the instruction decoder DEC.

At slot C2 of cycle T2, content of the program counter PC is read to the inner bus GB and is inputted to the address buffer AB and the incrementer INC. The address is outputted from the address buffer AB to the address bus IAB. Read of successive instruction is executed.

At slot C1 of cycle T3, the instruction code (MOV instruction (mov)) is inputted to the instruction decoder DEC and content of instruction is decoded. In accordance with the decoded result, the control signal is outputted and control of respective portions is executed. Owing to the addressing mode of postincrement register indirect, based on the address register ER0, read of source data is executed and read result is stored to the temporary data register TRD.

At slot C1 of cycle T3, a result incremented (+2) by the incrementer INC is written to the program counter PC via the inner bus WB. At slot C2 of cycle T3, content of the program counter PC is read to the inner bus GB and is inputted to the address buffer AB and the incrementer INC. The address is outputted from the address buffer AB to the address bus TAB.

From cycle T3, read cycle is started and the read data is latched to the read data buffer RDB at slot C1 of cycle T4 (bit test instruction (btst)). Further, the result incremented (+2) by the incrementer INC is written to the program counter via the inner bus WB.

At slot C2 of cycle T4, content of the address register ER0 (EA) is read to the inner bus GB and is inputted to the address buffer AB. The address is outputted from the address buffer AB to the address bus IAB. At slot C1 of cycle T5, again, the content (EA) of the address register ER0 is read to the inner bus GB and inputted to the arithmetic and logic functional unit ALU and increment processing is executed. The result is stored to the address register ER0 at slot C2 of cycle T5.

From cycle T5, data is read. At slot C1 of cycle T6, read data is stored to the read data buffer RDB. Further, the read data is outputted from the read data buffer RDB to the inner bus DB and is inputted to the arithmetic and logic functional unit ALU. Operation of the arithmetic and logic functional unit ALU is made nonoperational. At slot C2 of cycle T6, the read data is outputted from the arithmetic and logic functional unit ALU to the inner bus WB and is stored not to the general purpose register but to the temporary data register TRD since the MODS signal is set to 1.

Further, at slot C2 of cycle T5, content of the program counter PC is read to the inner bus GB and is inputted to the address buffer AB and the incrementer INC. Address is outputted from the address buffer AB to the address bus IAB. Read of successive instruction is executed.

At slot C1 of cycle T6, an instruction code (BTST instruction (btst)) is inputted to the instruction decoder DEC and content of instruction is decoded. In accordance with decoded result, the control signal is outputted and control of respective portions is executed. Since the MODS signal is set to 1, data is read not from the general purpose register but from the temporary data register TRD.

At slot C2 of cycle T6, content of the program counter PC is read to the inner bus GB and is inputted to the address buffer IAB and the incrementer INC. Address is outputted from the address buffer AB to the address bus IAB. At slot C1 of cycle T7, a result incremented (+2) by the incrementer TNC is written to the program counter PC via the inner bus WB.

Further, at slot C1 of cycle T7, in accordance with the MODS signal, data is outputted from the temporary data register TRD to the inner bus GB and is inputted to the arithmetic and logic functional unit ALU. Selection of designated bits is executed.

At slot C2 of cycle T7, the bit test result is stored to Z flag of the condition code register CCR. When the selected bit is 0, Z=1 and when the selected bit is 1, Z=0.

Figure 77:
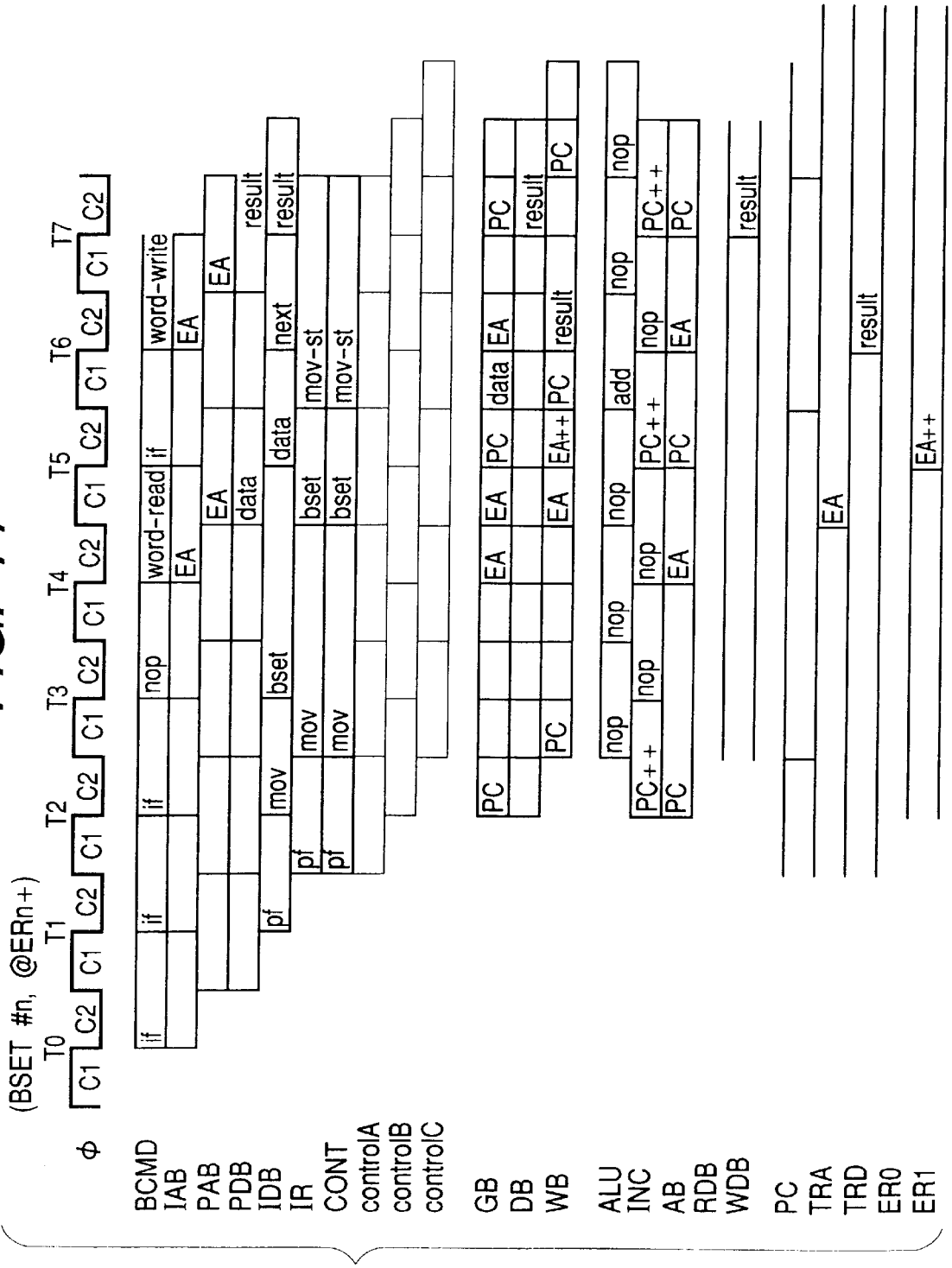
FIG. 77 illustrates timing charts exemplifying execution timings of an example of bit set instruction (BSET #2,@ER0+)

FIG. 77 shows execution timings of an example of bit set instruction (BSET #2, @ER0+). This is an example of expanding the addressing mode. The example is executed by combining a front instruction code, an instruction code in correspondence with MOV. B @ER0+,R0 and an instruction code in correspondence with BSET#2, R0H. In accordance with FIG. 15, it is set to H' 0104 and by the MODD signal, it is designated that the destination side is memory.

Similar to existing transfer instruction, the transfer instruction code executes read of memory from slot C2 of cycle T4 and stores the generated effective address (memory address) to the temporary address register TRA based on the designation (MODD) that the designation side constitutes memory. Further, at slot C1 of cycle T6, at time point of storing read data to the read data buffer DBR, execution is finished earlier by 1 state than in the case of reading existing transfer instruction or data on the source side. Therefore, instruction fetch and increment of the program counter PC are not executed. The designation that the destination side constitutes memory is continued. The bit set instruction code (bset) is inputted to the instruction decoder DEC from slot C1 of cycle T5.

In accordance with the designation (MODD) that the destination side constitutes memory, at slot C1 of cycle T6, the operation instruction code reads the destination side data to the bus GB not from the general purpose register but from the read data buffer DBR and inputs the destination side data to the arithmetic and logic functional unit ALU. At slot C2 of cycle T6, the bit set result is stored to the temporary data register TRD. Further, an instruction code (mov-st) similar to MOV.W R0,@ER0 is generated and is inputted to the instruction decoder DEC from slot C1 of cycle T6.

The generated instruction code (mov-st) executes operation similar to that of the transfer instruction for making the temporary address register TRA an address register and making the temporary data register TRD a data register. That is, at slot C2 of cycle T6, the effective address stored to the temporary register TRA is read to the bus GB and outputted to the bus 7IAB via the address buffer AB and generates bus command of byte data write. At slot C2 of cycle T7, operation result stored to the temporary data register TRD is read to the bus DB and outputted to the bus IDB via the write data buffer and the operation result is written to a memory address of the destination. From slot C2 of cycle T7, instruction fetch is executed and increment of the program counter PC is executed. Thereby, execution of the transfer instruction code (mov-1) is shortened and an amount of not executing the instruction fetch and the program counter PC increment is restored.

In the case of executing write to the destination side memory, by generating the instruction code (mov-st) at inside of CPU 2A, the instruction code can be shortened and the processing time can be shortened. By referring to content of the temporary register TRA, it is not necessary to execute calculation of the effective address again, further, the processing time can be shortened. By using the instruction code similar to MOV.W R0,@ER0, design can be facilitated and the increase in the logical scale can be restrained.

Figure 78:
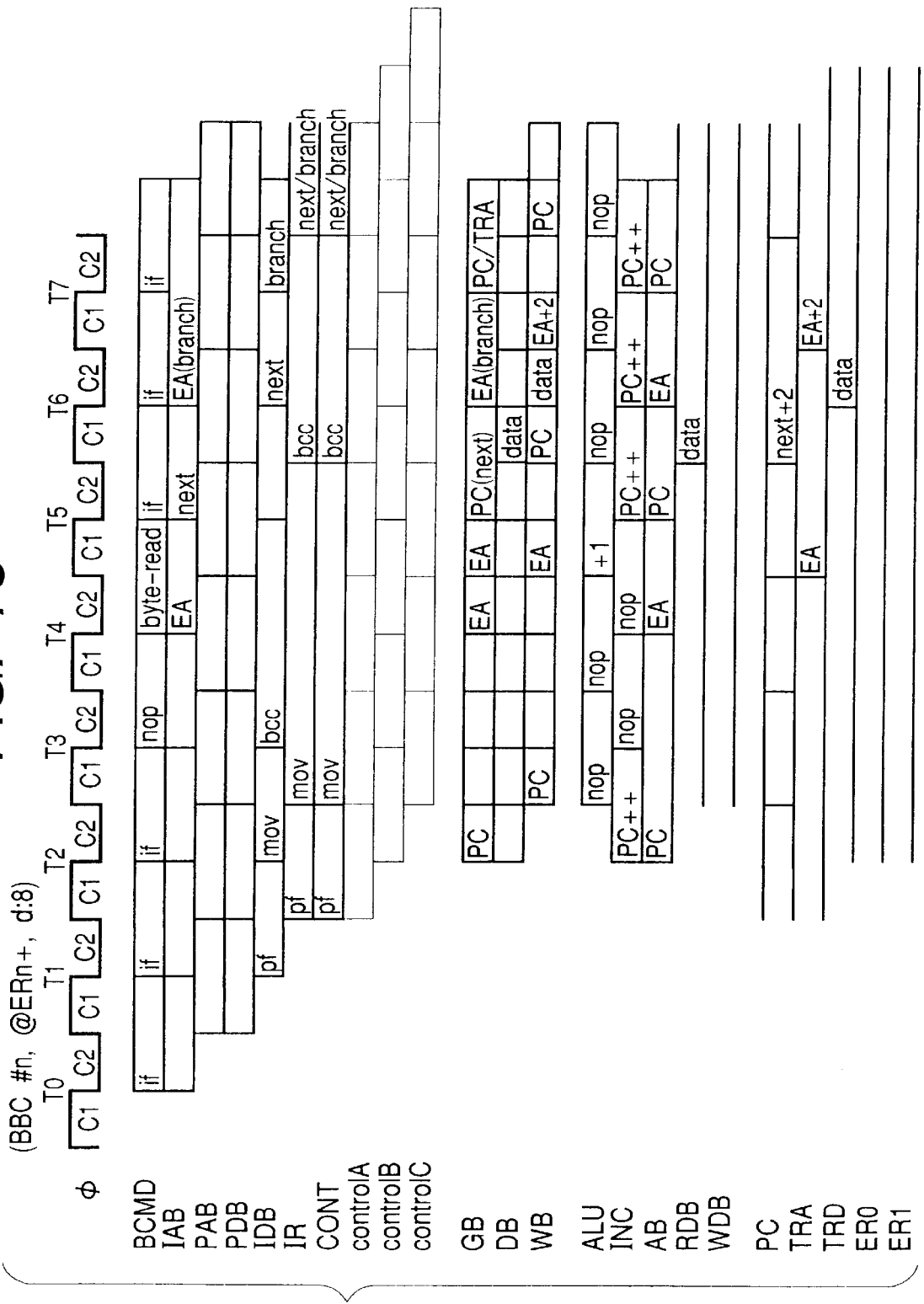
FIG. 78 illustrates timing charts exemplifying execution timings of a second example of bit condition branch instruction (BBC#0,@ER0+,$+20)

FIG. 78 shows execution timings of a second example of the bit condition branch instruction (BBC#0,@ER0+,$+20).

The example is executed by combining a front instruction code, an instruction code in correspondence with MOV.B@ER0+,R0 and an instruction code in correspondence with BRA $+20. In accordance with FIG. 15, the front instruction code is set to H' 0108 and by the MODS signal, it is designated that the source side is memory. Similar to existing transfer instruction, the transfer instruction code executes read of memory and stores read data to the temporary data register TRD based on the designation that the source side constitutes memory by the front instruction code. The designation that the source side constitutes memory is continued.

At slot C1 of cycle T3, an instruction code (condition branch instruction (bcc)) is inputted to the instruction decoder DEC and content of instruction is decoded. In accordance with decoded result, a control signal is outputted and control of respective portions is executed. Owing to the addressing mode of postincrement register indirect, based on the address register ER0, read of source data is executed and read result is stored to the temporary register TRD.

At slot C1 of cycle T3, a result incremented (+2) by the incrementer INC is written to the program counter PC via the inner bus WB. At slot C2 of cycle T3, content of the program counter PC is read to the inner bus GB and is inputted to the address buffer AB and the incrementer INC. The address is outputted from the address buffer AB to the address bus IAB.

From cycle T3, read cycle is started and read data is latched to the read data buffer RDB at slot C1 of cycle T4 (condition branch instruction (bcc)). Further, the result incremented (+2) by the incrementer INC is written to the program counter PC via the inner bus WB.

At slot C2 of cycle T4, content (EA) of the address register ER0 is read to the inner bus GB and is inputted to the address buffer AB. The address is outputted from the address buffer AB to the address bus IAB. At slot C1 of cycle T5, again, the content (EA) of the address register ER0 is read to the inner bus GB and is inputted to the arithmetic and logic functional unit ALU and increment processing is executed. The result is stored to the address register ER0 at slot C2 of cycle T5.

From cycle T5, data is read. At slot C1 of cycle T6, the read data is stored to the read data buffer RDB. Further, the read data is outputted from the read data buffer RDB to the inner bus DB and is inputted to the arithmetic and logic functional unit ALU. Operation of the arithmetic and logic functional unit ALU is made nonoperational. At slot C2 of cycle T6, read data is outputted from the arithmetic and logic functional unit ALU to the inner bus WB and is stored not to the general purpose register but to the temporary data register TRD since the MODS signal is set to 1.

Further, at slot C2 of cycle T5, content of the program counter PC is read to the inner bus GB and is inputted to the address buffer AB and the incrementer INC. The address is outputted from the address buffer AB to the address bus IAB. Read of successive instruction is executed.

At slot C1 of cycle T6, an instruction code (condition branch instruction (bcc)) is inputted to the instruction decoder DEC and similar to FIG. 74, content of instruction is decoded, a control signal is outputted and control of respective portions is executed. Since the MODS signal is set to 1, test is executed on predetermined bits not of the condition code register CCR but of the temporary data register TRD.

At slot C2 of cycle T6, as described above, content of branch address calculated by the arithmetic functional unit AU is read to the inner bus GB and is inputted to the address buffer AB and the incrementer INC. The address is outputted from the address buffer AB to the address bus IAB.

At slot C1 of cycle T8, the result incremented (+2) by the incrementer INC is written to the temporary address register TRA via the inner bus WB. Test of branch condition is designated.

At slot C2 of cycle T7, content of the temporary address register TRA is read to the inner bus GB in the case of establishing the branch condition and content of the program counter PC is read to the inner bus GB in the case of nonestablishment and is inputted to the address buffer AB and the incrementer INC. The address is outputted from the address buffer AB to the address bus IAB. Thereby, address of next next instruction code is switched.

Meanwhile, at slot C1 of cycle T8, in the case of establishing the branch condition, content of the bus IDB is latched to the instruction register IR1 (instruction code of branch destination). In the case of nonestablishment, content of the instruction register IR1 is held and next instruction code of the bit condition branch instruction is preserved. Thereby, next instruction code is switched.

The addressing mode which can be used by the transfer instruction can be used for designation of address where bits of test object are present, of bit test instruction, bit condition branch instruction and bit condition subroutine branch instruction.

Further, in executing the addition instruction or the data transfer instruction, CPU 2A realizes execution timings of FIG. 31 through FIG. 41 similar to CPU 2 of FIG. 1. Further, the instruction decoder DEC of CPU 2A realizes control logic of logical description exemplified in FIG. 39 through FIG. 41 similar to CPU 2 of FIG. 1. Further, development environment of CPU 2A can be constituted as shown by FIG. 42. Also with regard to a method of selecting CPU in a system development apparatus at this occasion, the method explained in reference to FIG. 43 can be applied as it is. Further, as a list outputted by an assembler of CPU 2A, FIG. 44 can be exemplified. Further, as an emulator of CPU 2A, a constitution the same as that of FIG. 45 may be adopted. A microcomputer for emulation of a microcomputer using CPU 2A can be constituted as explained in reference to FIG. 47.

According to specific embodiments of the invention with regard to the means for resolving the study problem D, the following operation and effect is achieved.

(1) The instruction code of the first word or the second word (condition branch instruction) is existing one and accordingly, operation is executed similar to conventional case by a single of the instruction code and existing instruction execution is not hampered. Further, when only existing instruction is used, existing software resources can effectively be utilized. The merit of existing CPU of the general purpose register or the load store architecture is not deteriorated. When there are pluralities of kinds of bit lengths of absolute addresses, and bit lengths of displacements in the first word and the second word (condition branch instruction), these can be combined by the same method. In other words, the addressing mode for existing data access and the addressing mode for the condition branch instruction can all be supported and accordingly, combinations with arbitrary addressing modes are made possible. By enabling these combinations, restriction in view of program can be dispensed with and the usability can be promoted. Further, by the same method, combination with the subroutine branch instruction is made feasible and the usability can be promoted. By combining existing independent bit test instruction and condition branch instruction, the combination can contribute to shortening of the instruction code length and promotion of the processing speed.

Also with regard to the addressing mode of bit operation instruction such as bit test instruction or bit set instruction, the addressing mode equivalent to that of the transfer instruction can be designated and the usability can be promoted. By enabling to designate various addressing modes, in the case in which in accordance with a state of the plurality of bits, the processing is branched to a plurality of processings, or, a plurality of bits are set, the optimum addressing mode can be used, which contributes to the reduction in the total program capacity and promotion of the addressing speed.

(2) Operation is executed by combining existing ones of the instruction code of the transfer instruction and the instruction code of the operation instruction and accordingly, conventional design resources of the instruction decoder can effectively be utilized, addition and change of the logical scale can be minimized and the increase in the logical and physical scale can be minimized. Further, a time period necessary for development can be shortened and resources can be saved. The MOD signal which is the control signal for changing operation content of the operation code can be made common. That is, the instruction code for transferring data may be made common, successively, the instruction code may be combined with the operation instruction code or the branch instruction code. The instruction set can be optimized and the increase in the logical scale can be restrained.

(3) By providing latching means such as a temporary register with means for determining a state of designated bits and enabling to determine the state of predetermined bits without reading to ALU, without changing total operation of the condition branch instruction, the means can be realized and accordingly, a change for modification can be reduced and the increase in the logical scale can be minimized.

(4) By limiting an added instruction code to a front instruction code, change of the instruction set can be minimized and the instruction set can be applied to general CPU or instruction sets. The front instruction code can be used commonly regardless of the addressing mode or content of operation and accordingly, the added instruction code can be minimized. Further, by providing other information of data size to the front instruction code, the total instruction code length can be shortened. By including other information to the front instruction code, the instruction code length can be shortened and the execution time can be shortened. For example, in the case in which in existing CPU, there is present instruction in which the front instruction code and the operation code for executing designation other than operation with regard to the memory are combined and realized, by including the designation other than the operation with regard to memory to the front instruction code for designating the operation with regard to memory, the execution time can be shortened.

Write of memory based on data reading from memory to latching means, operation and content of latching means, differs from existing instruction only in registers used and accordingly, can be utilized without changing significantly existing instruction operation. Thereby, increase in the logical scale by enabling operation with regard to data on memory can be minimized.

(5) In the case in which there are present CPU having wide address space and CPU having small address space while maintaining compatibility with each other at the object level, by realizing the instruction by CPU having the wide address space, operation with regard to data on memory can be executed even by CPU having lower compatibility and small address space. In other words, by the same method, while maintaining the compatibility at the object level, the operation with regard to data on memory can be executed by CPU having the wide address space and CPU having the small address space. Both of the merit by making the compatibility at the object level and the merit of enabling the operation with regard to data on the memory can be enjoyed.

(6) Existing instructions are combined, new instruction function is realized and therefore, in further expanding instruction sets and further high speed formation, there is hardly posed new problem with regard to existing CPU. In other words, with regard to existing CPU, in the case in which there is provided (invented) a technology of executing further expansion of instruction sets and further high speed formation, by applying the invention, similar technology is applicable also to CPU enlarging instruction sets of existing CPU. Respectives of existing instructions used for realizing new instruction function may be applied with the technology and may be combined again. Operation of the front instruction code is simple, further, by executing operation similar to that of existing instruction, modification is facilitated.

(7) Further, existing instructions are combined and new instruction function is realized and therefore, existing CPU and interface for emulation can be made common and accordingly, hardware of the same emulator can be made common. By making common the hardware of the emulator, the development environment can be prepared swiftly, further, resources necessary for developing the emulator can be minimized.

The embodiment of the invention with regard to the means for resolving the study problem D is only an example and can be modified variously in the range not deviated from the gist.

For example, combined instruction codes are not limited to those of the bit test instruction and the condition branch instruction. In the case of considering a new instruction set, pertinent instruction codes may pertinently be combined as in the case of constituting upper compatibility with existing instruction sets. At least there is not executed complicated operation as in executing the bit condition branch instruction by one operation field or one time instruction decoding but individual operation of read of address where bits are present, test, branch determination, branch of the bits may be made common to similar instruction.

The addressing modes of the bit condition branch instruction are not limited to those in the embodiment. Designation of branch address is not limited to program counter relative but absolute address or register indirect may be used. This may be adapted to a total instruction set.

It is not necessary that architecture of CPU is the load store type architecture. It is not necessary that the general purpose register can be utilized commonly to address and data and a portion or a total thereof may be exclusive for address or exclusive for data. The data size of the general purpose register can be made arbitrary.

The kind of the front instruction code is not particularly limited. Further, the front instruction code may include other control information other than information for combining the transfer instruction with the condition branch instruction or the operation instruction. For example, information for designating the data size may be included.

Further, it is not necessary that the basic unit of the instruction code is limited to 16 bits but an arbitrary bit width of 8 bits or 32 bits can be constituted. Although the control signal uses MODS, MODD, the control signal can be divided into other control signals.

By combining the front instruction code, the first read type transfer instruction code, the second read type transfer instruction code, the operation instruction code and the write type transfer instruction code, data of two different addresses on memory can be inputted, operated and the result can be stored to address of other memory capable of designating the write type transfer instruction code. By omitting the first and the second read type transfer instruction codes, data on the general purpose register can be inputted.

(Embodiment with Regard to Means for Resolving Study Problem E)

Next, an explanation will be given of a specific example of the invention with regard to means for resolving the study problem E. A microcomputer explained here is provided with a constitution explained in reference to FIG. 2 and accordingly, a detailed explanation thereof will be omitted to avoid repetition. Therefore, the CPU 2 incorporated in the microcomputer 1 is provided with the constitution of general purpose registers and control registers as shown by FIG. 3. Naturally, CPU 2 incorporates general purpose registers and instruction sets of lower CPU having the programming model of FIG. 4. Further, CPU 2 as higher CPU is provided with the address space of FIG. 5. In calculating the effective address of CPU 2, the method explained in reference to FIG. 7 and FIG. 8 is adopted.

Figure 79:
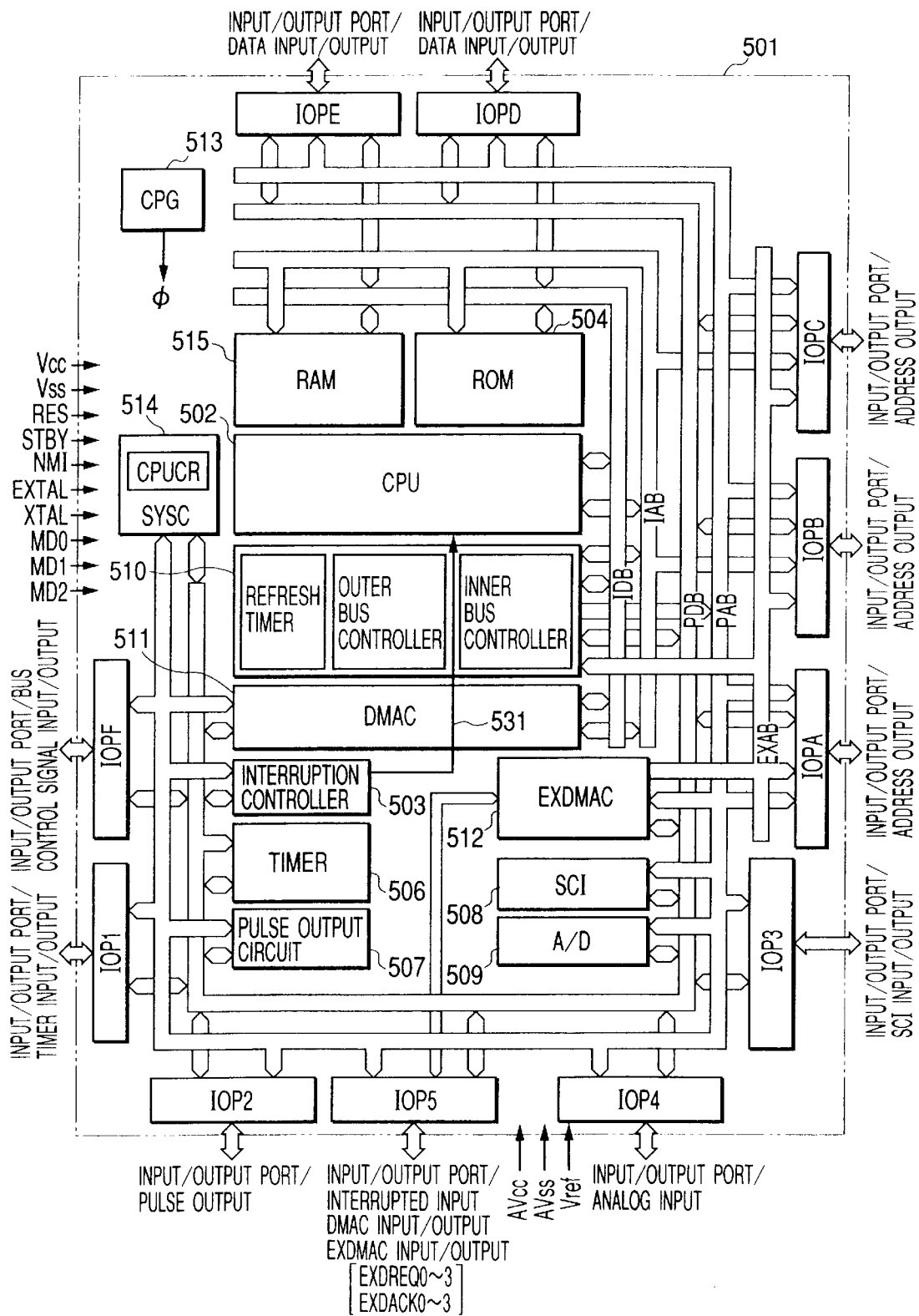
FIG. 79 is a block diagram of a microcomputer constituting an example of a data processing apparatus according to the invention with regard to study problem E.

An example of a microcomputer explained here is shown by FIG. 79. A microcomputer 501 is provided with functional blocks or circuit modules of a central processing unit (CPU) 502 for executing instruction and governing total control of the microcomputer 501, a system controller (SYSC) 514 for controlling an operational mode of a single chip microcomputer, an interruption controller (INT) 503, a bus controller 510, a DMA controller (DMAC) 511, an outer bus DMAC (EXDMAC) 512, read only memory (ROM) 504 which is a memory for storing processing programs, a random access memory (RAM) 505 which is a memory for an operational area of CPU 502 and for temporarily storing data, a timer 506, a pulse generating circuit 507, a serial communication interface (SCI) 508, an A/D converter (A/D) 509, input/output ports IOPA through IOPF, input/output ports IOP1 through IOP5 and a clock pulse generator (CPG) 513 and is formed into one semiconductor substrate (semiconductor chip) by a publicly-known semiconductor integrated circuit fabrication technology.

CPU 502 fetches instruction mainly from ROM 504 decodes the instruction and executes calculation operation or control operation. DMAC 511 shares bus with CPU 502 and executes data transfer control in place of CPU 502. EXD-MAC 512 is a transfer control apparatus specialized in data transfer control on the outer bus by which data transfer control on the outer bus can be executed in parallel with access operation on the inner bus by CPU 502 or DMAC 511.

The bus controller 510 is provided with an inner bus controller, an outer bus controller and a refresh timer. The inner bus controller executes bus right arbitration between CPU 502 and DMAC 511. The outer address is divided into, for example, 8 of areas and the outer bus controller can set bus width and access state numbers for the respective areas and can realize shortened bus cycle in continuous access such as high speed page mode of DRAM or ROM. For example, in the case of external DRAM, with regard to normal 4 state access, high speed page 2 state is constituted. The outer bus controller executes arbitration with regard to bus right request from the respectives of CPU 502, DMAC 511 and EXDMAC 512 and bus right request from outside.

Various functional blocks of the microcomputer 501 are connected to each other by the inner bus. The inner bus includes, other than address bus and data bus, bus right request signal, bus acknowledge signal, bus command, outer bus command, ready signal, outer bus ready signal, read signal/write signal, bus size signal, system cross signal. IAB, PAB, EXAB are present in the inner address bus. IDB and PDB are present in the inner data bus.

These buses are interfaced by the bus controller 510. The inner buses IAB, IDB are connected to CPU 2, DMAC 11, ROM 504, RAM 505 and the bus controller 510, further, the address bus IAB is connected to the input/output ports IOPA through IOPC to interface with address bus of outer bus and the data bus IDB is connected to the input/output port IOPD, IOPE to interface with data bus of outer bus.

Peripheral buses PAB, PDB are connected to the bus controller 510, EXDMAC 512, the timer 506, the pulse outputting circuit 507, SC518, the A/D converter 509, the interruption controller 503, the input/output ports IOPA through IOPF and the input/output ports IOP1 through IOP5. Control registers provided to the functional blocks are generally referred to as inner I/O register.

The address bus EXAB connects EXDMAC 512, the bus controller 510 and the input/output ports IOPA through IOPC. Further, the bus controller 510 refers to determine address of the address bus EXAB and execute operation in accordance with bus specification. Therefore, the bus controller 510 may be inputted with upper bits to the degree of determining area and determining lower address of DRAM.

CPU 502 and DMAC 511 can use inner bus as inner bus master and in accordance with respective bus right request signal, the bus controller (inner bus arbitrator) 510 arbitrates. Further, with regard to outer bus, in accordance with a bus right request signal of outer bus access by the inner bus master, EXDMAC 512, outer bus right release request and refresh request, the bus controller (outer bus arbitrator) 510 arbitrates.

CPU 502 or DMAC 511 can read/write operation control information from and to respective functional blocks of ROM 504, RAM 505, the timer 506, the pulse outputting circuit 507, SCI 508, the A/D converter 509, the input/output ports IOPA through IOPF and IOP1 through IOP5 and the interruption controller 503 and EXDMAC 512 as inner bus slaves.

The interruption controller 503 inputs interruption signals outputted from the timer 506, SCI 508, the A/D converter 509 and the input/output port IOP5 and outputs an interruption request signal 531 to CPU 502 and a start request signal (not illustrated) to DMAC 511. Further, the interruption controller 503 inputs clear signal (not illustrated) outputted from DMAC 511 and outputs an interruption clear signal (not illustrated).

The input/output ports serve also as those for an outer bus signal, input/output signals of input/output circuits. The input/output ports IOPA through IOPC serve also as those for address bus output, the input/output ports IOPD, IOPE also serve as those for data bus input/output and the input/output port IOPF also serve as signal for inputting/outputting bus control signal. Outside address and outside data are respectively connected to buses IAB and IDB via buffer circuits included in the input/output ports. Buses PAB and PDB are used for reading/writing registers of input/output ports and have nothing to do directly with the outer bus. Bus control signal output includes signals of address strobe, high/low data strobe, read strobe, write strobe and bus acknowledge signal. Bus control input signals include a weight signal, a bus request signal. These input/output signals are not illustrated. Expansion of outer bus is selected by an operational mode and functions of these input/output ports are also selected.

Further, the input/output port IOP1 serves also as that of timer input/output, the input/output port IOP2 serves also as that of pulse output, the input/output port IOP3 serves also as that of input of SCI 508, the input/output port IOP4 serves also as that for analog input, the input/output port IOP5 serves also as that for EXDMAC 512 and input/output of DMAC 511. With regard to EXDMAC 512, DMAC 511, the timer 506, SCI 508, the pulse outputting circuit 507, the A/D converter 509, the input/output ports IOP1 through IOP5, illustration of input/output signals and an inner interruption request signal therewith is omitted.

When interruption factor is generated, the instruction control 503 determines to which of CPU 502 and DMAC 511 the request is given and determines priorities. When interruption factor is generated in CPU 502, CPU 502 interrupts executing processing, branches to a predetermined processing routine via an exception processing state, executes a desired processing and clears the interruption factor. At a final portion of the predetermined processing routine, normally, returning (RTE instruction) is provided and by executing the instruction, the interrupted processing is restarted.

The microcomputer 501 is provided with, as power source terminals, input terminals of ground level (Vss), power source voltage level (Vcc), analog ground level (AVss), analog power source voltage level (AVcc) and analog reference voltage (Vref), as well as, as exclusive control terminals, respective terminals of reset (RES), standby (STBY), mode control (MD0, MD1, MD2) and clock input (EXTAL, XTAL).

Via the terminals EXTAL, XTAL, an oscillation signal by a quartz oscillator or outside clock signal is inputted to CPG 513 and CPG 513 generates a reference clock signal (system clock) f. The microcomputer is operated in synchronism with the reference clock signal f. One period of the reference clock signal f is referred to as state.

When a reset signal is applied to RES terminal, SYSC 514 inputs an operational mode given by the mode terminals MD0 through MD2 and the microcomputer 501 is brought into a reset state. As operational modes set by the mode terminals, there are selected single chip/expansion, address space, effective/ineffective of built-in ROM and initial value 8 bits/16 bits of data bus width.

When the reset is released, CPU 502 reads start address from predetermined address and executes reset exception processing for starting to read instruction from the start address. Thereafter, CPU 502 successively reads instruction from ROM 504, decodes the instruction and executes processing of data or data transfer of RAM 505, timer 506, SCI 508, the input/output ports, or memories or I/O connected to the outer bus based on the decoded content. That is, CPU 502 executes processings based on instruction stored to ROM 504 while referring to data inputted from the input/output ports or the A/D converter 509 or designations inputted from SCI 508, outputs signals to outside based on the result by using the input/output ports or the timer 506 and controls various apparatus.

FIG. 3 is a drawing showing a programming model of higher CPU 502 as a constitution example (programming model) of general purpose registers and control registers incorporated in CPU 502.

CPU 502 is provided with 32 of general purpose registers each having 32 bits length. All of general purpose registers ER0 through ER31 are provided with equivalent functions and can be used as address registers and as data registers.

32 bits, 16 bits and 8 bits registers can be used as the data registers. As the address registers and 32 bits registers, the general purpose registers ER (ER0 through ER31) are summarizingly used. General purpose registers E (E0 through E31) and general purpose register R (R0 through R31) are used by dividing the general purpose registers ER as 16 bits registers. These are provided with equivalent functions and a maximum of 64 of 16 bits registers can be used. Further, there is a case in which the general purpose registers E (E0 through E31) are particularly referred to as expansion registers. As 8 bits registers, general purpose registers RH (R0H through R31H) and general purpose registers RL (R0L through R31L) are used by dividing the general purpose registers R. These are provided with equivalent functions and a maximum of 64 of 8 bits registers can be used. The respective registers can select independently methods of using thereof.

The general purpose registers ER7, ER15, ER23 and ER31 are allocated with functions as stack pointers (SP) in addition to the functions as the general purpose registers and are implicitly used in exception processing or subroutine branch. The exception processing includes the interruption exception processing.

Further, in view of inner logical constitution, ER0 through ER7 is classified to group 0, ER8 through ER15 are classified to group 1, ER16 through ER23 are classified to group 2 and ER14 through ER31 are classified as group 3. Group 0 is made the same as that of the general purpose registers of existing CPU (lower CPU with regard to CPU 502).

These general purpose registers are not different from each other in view of programming specification and all can be used equivalently. At least, in the case of writing in assembly language, groups are not made conscious of, for example, these can be described as R0H, E8, R16, ER31. For example, when described in accordance with an assembler format of "H8S/2600 series H8S/2000 series Programming Manual" issued by Hitachi Seisakusho Co. Ltd., March 1995, these can be described only by register numbers such as "MOV.L ER0,ER31" or "ADD.W E8,R16".

CPU 502 further includes, as control registers, a program counter PC of 24 bits, an extend register EXR of 8 bits and a condition code register CCR of 8 bits exemplified in FIG. 3.

The program counter PC designates an address of instruction successively executed by CPU 502. Although not particularly restricted, all of instruction of CPU 502 is constituted by 2 bytes (word) as a unit and accordingly, the lowest bit of an address signal designated with byte as a minimum unit is ineffective and in reading instruction, the lowest bit of instruction address is regarded as 0.

The condition code register CCR is a register of 8 bits, indicating an inner state of CPU 502. The condition code register CCR is constituted by 8 bits including respective flags of interruption mask bit (I) and half carry (H), negative (N), zero (Z), overflow (V) and carry (C).

The extend register EXR is a register of 8 bits for executing control of exception processing such as interruption. The extend register EXR includes respective bits of interruption mask bits (I2 through I0) and trace (T).

FIG. 4 is a drawing showing a programming model of CPU having lower compatibility with CPU 502. Higher CPU 502 having the programming model of FIG. 3 incorporates general purpose registers and instruction sets of lower CPU having the programming model of FIG. 4.

CPU having lower compatibility is provided with 8 of general purpose registers of 16 bits length. The general purpose registers R0 through R7 are all provided with equivalent functions and can be used as address registers and as data registers.

16 bits and 8 bits registers can be used as data registers. As address registers and 16 bits registers, the general purpose registers R (R0 through R7) are summarizingly used. As 8 bits registers, general purpose registers RH (R0H through R7H) and general purpose registers RL (R0l through R7L) are used by dividing the general purpose registers R. These are provided with equivalent functions and a maximum of 16 of 8 bits registers can be used. The respective registers can independently select methods of using thereof.

Similar to the above-described, the general purpose register R7 is allocated with a function as a stack pointer (SP) in addition to a function as the general purpose register and is used implicitly for exception processing or subroutine branch.

FIG. 80 shows an address space of CPU 502. As an address map of the microcomputer 501, ROM 504 is arranged from address 0, meanwhile, RAM 505 and inner I/O register is arranged up to address H' FFFF or H' FFFFFF, respectively constituting both ends of the address space.

Higher CPU 502 is provided with a maximum mode of an address space of 16 MB and a minimum mode of an address space of 64 kB. Selection of such maximum mode and minimum mode is executed depending on states of mode control input terminals MD0 through MD2 of the microcomputer 501.

In the maximum mode, the total space is designated by absolute addresses 24 bits (upper 8 bits are reserved and 32 bits in instruction code) and 0 through H' 7FFF and H' FF8000 through H' FFFFFF are designated by absolute addresses of 16 bits. Further, a vector in exception processing is constituted by 24 bits (32 bits in view of memory and upper 8 bits are ignored) and the program counter PC which is saved/returned in subroutine branch is constituted by 24 bits.

In the minimum mode, either of addressing modes of absolute address and register indirect, uses only lower 16 bits and ignores upper bits. The vector in exception processing is constituted by 16 bits and the program counter PC which is saved/returned in subroutine branch is constituted by 16 bits.

Lower CPU is provided with an address space of 64 kB in correspondence with the minimum mode. Only 16 bits of absolute addresses are provided, further, in register indirect, all the space is designated by 16 bits registers, respectively. Operation is executed with structures of vector and stack equivalent to those of the minimum mode of higher CPU 502 and the vector in exception processing is constituted by 16 bits and the program counter PC which is saved/returned in subroutine branch is constituted by 16 bits.

FIG. 7 and FIG. 8 are also drawings exemplifying a method of calculating effective address in the maximum mode of higher CPU 502.

According to register indirect shown by (1) of FIG. 7, an instruction code includes a portion of designating a register (register field) and an address on a memory is designated as a total of 32 bits of content of the general purpose register ER designated by the instruction code as the address. The address may be constituted by 24 bits and accordingly, the upper 8 bits are ignored.

According to register indirect with displacement shown by (2), (3) of FIG. 7, an address on the memory is designated with a result of adding displacement included in the operation code as the address to an address of 32 bits provided similar to the register indirect. A result of addition is used only for designating the address and is not reflected to content of the general purpose register ER. Although not particularly restricted, the displacement is constituted by 32 bits or 16 bits and in adding 16 bits displacement, upper 16 bits are subjected to code expansion. That is, addition is executed such that upper 16 bits of displacement are provided with values the same as that of bit 15 of 16 bits displacement. Also in this case, upper 8 bits are ignored.

According to postincrement register indirect shown by (4) of FIG. 7, an address on the memory is designated by an address of 32 bits provided similar to the register indirect. Thereafter, the address is added with 1, 2 or 4 and the addition result is stored to the general purpose register ER. In the case of designating byte data on the memory, 1 is added, in the case of designating word data, 2 is added and in the case of designating address data, 4 is added, respectively. Further, in transfer instruction of a plurality of registers, a result multiplied by a number of the registers is used. Upper 8 bits of the addition result are also stored to expansion registers. In the case of transfer instruction of a plurality of general purpose registers, mentioned later, there is used a value produced by multiplying 2 (word size) or 4 (long word size) by number of registers.

According to predecrement register indirect shown by (5) of FIG. 7, there is designated address on the memory by an address of 24 bits of a result of subtracting 1, 2 or 4 from an address of 32 bits provided similar to the register indirect. Thereafter, the subtraction result is stored to the general purpose register ER. In the case of designating byte data on the memory, 1 is subtracted, in the case of designating word data, 2 is subtracted and in the case of designating address data, 4 is subtracted, respectively. Further, according to transfer instruction of a plurality of registers, a result produced by multiplying the number of registers is used. Similar to the above-described, in the case in which an address may be constituted by 24 bits, although not particularly restricted, upper 8 bits of subtraction result are stored to the expansion register. Similar to (4), in the case of transfer instruction of a plurality of general purpose registers, mentioned later, there is used a value produced by multiplying 2 (word size) or 4 (long word size) by the number of registers.

According to absolute address indicated in (6), (7) and (8) of FIG. 8, an address on the memory is designated with absolute address of 8 bits, 16 bits or 32 bits as an address. According to 8 bit absolute address, upper 16 bits are expanded to a logical value 1 (1 expansion). That is, all of bit 23 through 8 of address is made 1. Therefore, usable address is 256 bytes of H' FFFF00 through H' FFFFFF. Further, according to 16 bits absolute address, upper 8 bits are subjected to code expansion. That is, when bit 15 of 16 bits of absolute address is 0, bit 23 through 16 of address are all made bit 0 and when bit 15 is 1, all of bit 23 through 16 of address is made bit 1. Therefore, usable addresses are 64 k bytes of H' 000000 through H' 007FFF and H' FF8000 through H' FFFFFF.

According to program counter relative shown by (9) and (10) of FIG. 8, an address on the memory is designated with a result of adding displacement included in an instruction code to address of 24 bits of content of the program counter as an address. The addition result is stored to the program counter. Although not particularly restricted, the displacement is 16 bits or 8 bits and in a case of adding these displacements, upper 8 bits or 16 bits are subjected to code expansion. That is, addition is executed by regarding values of upper 8 bits of displacement the same as that of bit 15 of 16 bits displacement or regarding values of upper 16 bits the same as that of bit 7 of 8 bits displacement. Program counter indirect is used only in branch instruction.

Further, according to the minimum mode of higher CPU 502, upper 8 bits of the effective address is ignored and lower 16 bits are made effective. Other than these, there are executed addressing modes of immediate, register direct and memory indirect, however, these have nothing to do directly with the invention and therefore, a detailed explanation thereof will be omitted.

According to data transfer instruction of CPU with lower compatibility having the programming model of FIG. 4, register indirect, register indirect with 16 bits displacement, postincrement/predecrement register indirect and 8/16 bits absolute address can be used. The method of calculating the effective address is similar to the above-described.

FIG. 81 shows a function of transfer instruction (MOVM) of a plurality of general purpose registers as plural number registers transfer instruction (transfer instruction between plural registers and memory, transfer instruction between plural registers). As data size, word (W) and long word (L) can be used, data transfer can be executed between general purpose registers and between general purpose register and memory. Further, the addressing mode is similar to that of conventional transfer instruction except immediate.

In selecting the general purpose registers, 2, 3, 4 thereof can be selected and in the case of long word size, combinations of 2 of ER0–ER1, ER2–ER3, ER4–ER5, ER6–ER7, aaa, ER30–ER31, combinations of 3 of ER0–ER2, ER4–ER6, aaa, ER28–ER30 and combinations of 4 of ER0–ER3, ER4–ER7, aaa, ER28–ER31 are possible. In the case of word size, only corresponding the general purpose register R or only general purpose register E is selected.

In FIG. 81, Rns signifies a number of general purpose register constituting source, Rnd signifies a number of general purpose register constituting destination, EAs signifies an effective address constituting source and EAd signifies an effective address constituting destination.

Figure 82:
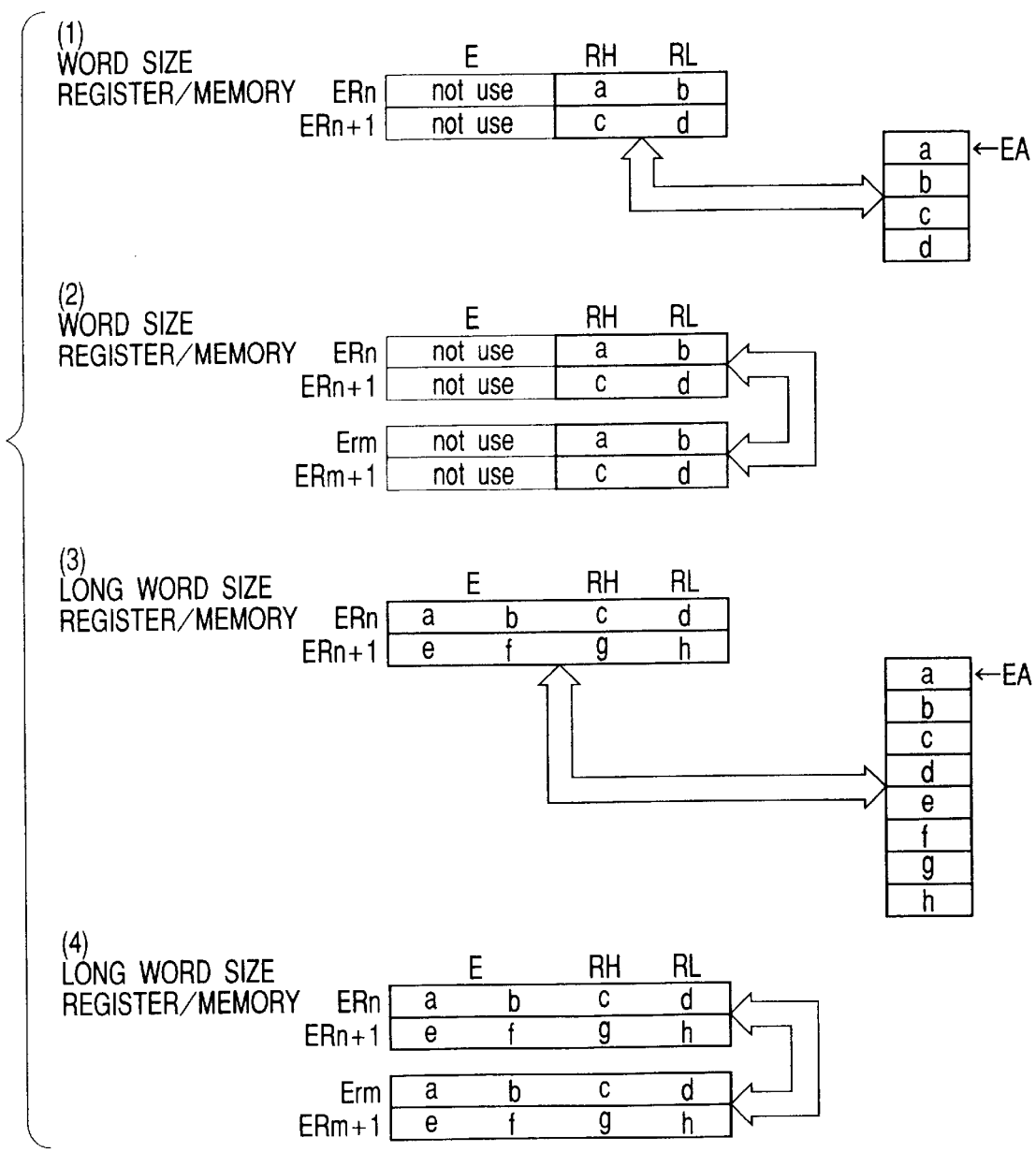
FIGS. 82(1), 82(2), 82(3) and 82(4) are explanatory views exemplifying data arrangements of data transfer by the transfer instruction (MOVM) of the plurality of general purpose registers.

FIG. 82 shows data arrangement of data transfer by the transfer instruction (MOVM) for plural general purpose registers. (1) indicates register/memory transfer of 2 of data of word size, (2) indicates register/register transfer of 2 of data of word size, (3) indicates register/memory transfer of 2 of data of long word size, (4) indicates register/register transfer of 2 of data of long word size.

For example, in (3) of FIG. 82, uppermost data of first general purpose register ERn, for example, upper 8 bits of En (indicated by a) correspond to memory designated by the effective address EA (indicated by a) and next data of general purpose register, for example, lower 8 bits of En (indicated by b) correspond to memory designated by the effective address EA+1 (indicated by b). Data successive to lowest data of first general purpose register, for example, next to data d of RLn, becomes uppermost data of second general purpose register, for example, ERn+1, for example, data e of upper 8 bits of En+1. In the case of word size, although illustration is omitted, data transfer is possible between 2 of En and En+1 and 2 of Rm and Rm+1.

FIG. 9 is also a drawing exemplifying instruction format and instruction code in machine language of CPU 502. Instruction of CPU 502 is constituted by 2 bytes (word) as a unit. Respective instruction includes an operation field (op), a register field (r, gr), an EA expansion portion (EA) and a condition field (cc).

The operation field (op) represents function of instruction and designates processing content of designated operand of an addressing mode. The operation field (op) necessarily includes front 4 bits of instruction. There is a case of providing two operation fields.

The register fields (r, gr) are combined to designate general purpose register. The register field (r) is constituted by 3 bits in the case of an address register, 3 bits in the case of a data register (32 bits register) or 4 bits (8 or 16 bits register). There is a case of providing two of register fields r1, r2 or there also is a case in which the register fields r1 and r2 are not provided.

There is present the register field (gr) of 4 bits and although not particularly limited, lower 2 bits are made effective. Word including the register field (gr) (word including op, gr1, gr2) is made ignorable and in the case of ignoring the word, it is assumed that 0 is given, it is regarded that a register set of group 0 is designated, a register designated by the register field (r) is regarded as register of number 0 through 7 and the general purpose registers ER0 through ER can be selected. Such a word (instruction code including op, gr1, gr2) is referred to as a front instruction code for register expansion.

The register number is calculated by n=gr[1:0]<<3+r[2:0] (<<3 indicates 3 bits left shift). That is, there is designated a register of a number designated by 5 bits with lower 3 bits r[2:0] of r as lower position. For example, in the case of gr=0, r=1, the register number n=1, in the case of gr=2, r=3, the register number n=19. Register ER, register E, register R, register RH or register Rl is designated by a portion designating size of instruction code or content of r[3] of general purpose register ERn in correspondence with register number n. For example, any of long word, word and byte a data size is designated by predetermined bits of operation field of the instruction code. When the data size is word or byte, utilized register position is designated by r[3]. r[3] signifies bit data at 4-th bit from bottom of r. When the data size is word, register E is designated in the case of r[3]=1 and register R is signified in the case of r[3]=0. When the data size is byte, register RL is designated in the case of r[3]=1 and register RH is signified in the case of r[3]=0.

Further gr1, r1 signifies a register designating field of a source register or an address register and gr2, r2 signifies a destination register or a data register. gr1 (bit 7 through 4 in basic word of instruction code) corresponds to r1 (bit 7 through 4 or bit 6 through 4 in basic word of instruction code) and gr2 (bit 3 through 0 in basic word of instruction code) corresponds to r2 (bit 11 through 8 or bit 3 through 0 in basic word of instruction code).

The EA expansion portion (EA) designates immediate data, absolute address or displacement and is constituted by 8 bits, 16 bits or 32 bits. The condition field (cc) designates branch condition of condition branch instruction (Bcc instruction).

An instruction code exemplified for respective instruction format signifies machine language expressed in 16-adic. The instruction code is constituted to become existing instruction code when front instruction code (00) having the group designating field gr1, gr2 is omitted.

For example, when H' 0901 exemplified in (2) of FIG. 9 is used by itself, it becomes ADD.W R0,R1 and when a front instruction code H' 0012 having a group designating field exemplified in (3) of FIG. 9, H' 00120901 becomes ADD.W R8,R17.

Further, H' 0000 for designating group 0 used implicitly becomes NOP (nonoperational) instruction. H' 00xx (xx signifies 01 through FF) designates a group field, executes continuously a successive instruction code (prohibits interruption) as well as executes increment of PC similar to NOP instruction and is executed by a minimum state number.

The register designating field (gr) is provided with 4 bits and accordingly, logically, a number of general purpose register groups can be expanded to 16. In this case, 128 of 32 bits general purpose registers (or 256 of 16 bits general purpose registers) can be utilized.

There may be provided a plurality of kinds of operation fields in correspondence with the register designating field (gr). For example, there may be prepared an operation code further having a function of switching a function of simply designating register and other function (data size).

FIG. 10 is also a drawing for exemplifying an instruction code in machine language of data transfer instruction of a signal general purpose register in CPU 502. Calculation of the effective address of respective addressing mode is in accordance with FIG. 7 and FIG. 8 and an instruction format in machine language is in accordance with FIG. 9.

FIG. 83 exemplifies a front instruction code (front instruction code for instruction expansion) indicating instruction such as the transfer instruction (MOVM) of a plurality of general purpose registers. The transfer instruction of the plural registers is realized by constituting composite instruction by combining the front instruction code for instruction expansion and existing transfer instruction code.

The front instruction code for instruction expansion is as follows. Bit 2 (3-th bit from the lowest), indicates the size of a register, B'0 (B' signifies binary data), signifies word size and B'1 signifies long word size. Bit 5, 4 indicates a number of general purpose registers, B'01 signifies 2, B'10 signifies 3 and B'11 signifies 4. The instruction code is made new instruction code added to an instruction set of lower CPU.

Data transfer instruction using the front instruction code for instruction expansion is equivalent to that constituted by adding an instruction code indicating long word size to an instruction code of word size (for example, 2 words in the case of absolute address 16 bits) such as data transfer instruction (MOV) between a single general purpose register and memory (for example, total 3 words in the case of absolute address 16 bits).

According to FIG. 83, since information of switching size is held, in place of an instruction code indicating long word size of data transfer instruction between a single general purpose register and memory, the front instruction code for instruction expansion may be added. Data transfer instruction (MOVM) of plural number general purpose registers can be realized without prolonging the operation code length.

Further, although "STM ER0–3,@-SP" which is existing save instruction of plural general purpose registers to stacks and "MOVM.L ER0–3,@-SP" which is instruction according to the invention, are operated in substantially the same manner, however, an order of arranging general purpose registers on stacks differs. According to the STM instruction, data is arranged in an order of ER3, ER2, ER1, ER0 from front of stack (effective address), in contrast thereto, according to the MOVM instruction, data is arranged in an order of ER0, ER1, ER2, ER3 from front of stack. Processings by the above-described both instructions significantly differ from each other in an address operation method as described below.

In the case of adopting the front instruction code for instruction expansion, there is no trouble in operation even when save instruction to stack is not provided, however, in view of a standpoint of effectively utilizing software resources, it is preferable to provide both instruction codes.

Further, when an order of reading/writing of general purpose registers in transfer instruction of plural registers, is used from ones having larger numbers, the above-described instruction can be constituted by the same operation. Further, the order of reading/writing the general purpose registers may be designated by inner I/O register.

Figure 84:
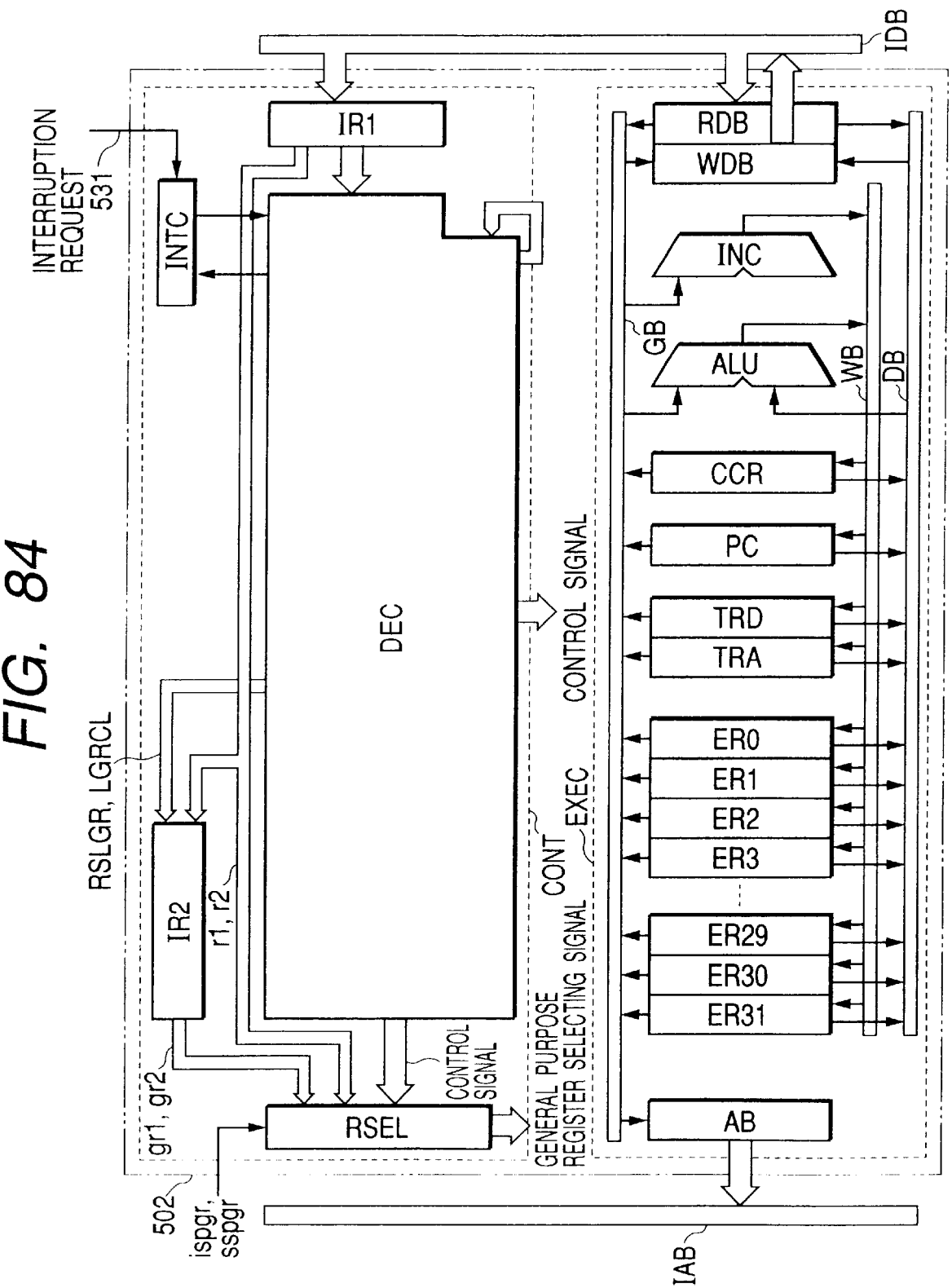
FIG. 84 is a block diagram showing a detailed example of CPU constituting an example of a data processing apparatus according to the invention with regard to study problem E.

FIG. 84 shows a detailed example of upper CPU 502. CPU 502 is constituted by the control unit CONT and the executing unit EXEC.

The control unit CONT is provided with the instruction register IR1, the instruction register IR2, the instruction decoder DEC, the register selector RSEL and the interruption control unit INTC. With regard to lower CPU, the instruction register IR2 is added and the constitution of the register selector RSEL differs. Also the instruction decoder DEC is modified in correspondence with addition of the instruction register IR2 and modification of the constitution of the register selector RSEL. Particularly, the control unit CONT is constituted to execute first control in accordance with presence or absence of the front instruction code for instruction expansion and second control in accordance with presence or absence of the front instruction code for register expansion.

According to the first control combinations of a plurality of general purpose registers which can be designated by instruction are fixed and there is executed control for enabling data transfer between the plurality of general purpose registers having the fixed combinations and a memory address on an address space or general purpose register. Calculation of the effective address of the transfer instruction is executed only once by the functional unit ALU and successive addresses are dealt with by increment or decrement function of the address buffer AB.

The second control is register designating control in consideration of upper compatibility, on one side, an expanded general purpose register is designated by using the front instruction code for register expansion and on the other side, there is executed control in which when the ignorable register designating field gr (gr1, gr2) is ignored, register designation by the unignorable register designating field r (r1, r2) is regarded as designation of register included in register group 0.

The instruction decoder DEC is constituted by, for example, micro ROM or PLA (Programmable Logic Array) or wired logic.

The register selector RSEL is supplied with an output signal of the instruction decoder DEC, output signals of the output registers IR1, IR2 and output signals ispgr,sspgr of the inner I/O register CPUCR included in SYSC3.

The instruction register IR1 is supplied with instruction from the inner data bus IDB. Output of the instruction register IR1 is coupled to another of the instruction register IR2, the instruction decoder DEC and the register selector RSEL. Output of the instruction register IR2 is coupled to the register selector RSEL.

Output of the instruction decoder DEC is coupled to the register selector RSEL and the instruction register IR2. The instruction decoder DEC decodes the operation code of the operation field of instruction fetched by the instruction register IR1.

When the instruction code fetched by the instruction register IR1 is the front instruction code for register expansion, by reading the front instruction code by the instruction decoder DEC, register designating information of the register group designating field (gr) of the front instruction code for register expansion is latched to the instruction register IR2. The latch signal at this occasion is outputted to the instruction decoder DEC. The register field designating information latched by the instruction register IR2 and successively, the register designating information of the register field (r) included in successive instruction fetched to the instruction register IR1 are decoded by the register selector RSEL, a register in the register group directly designated by these information is selected and the successive instruction is executed by utilizing the selected register. After executing the instruction, the instruction decoder DEC supplies the instruction register IR2 with a set signal for clearing all of the latch information of the instruction register IR2 to a bit value "0" (information designating register group 0). Accordingly, even when instruction dispensing with the front instruction code is fetched to the instruction register IR1, output of the instruction register IR2 maintains the information of designating register group 0, as a result, the register selector RSEL regards that the register group 0 is implicitly designated and selects a register in accordance with the register designating information from the instruction register IR1 from register group 0.

The executing unit EXEC further includes the temporary registers TRA, TRD, the arithmetic and logic functional unit ALU, the incrementer INC, the read data buffer RDB, the write data buffer WDB and the address buffer AB. These circuit blocks are connected to each other by the data buses GB, DB and WB. The data buses GB and DB are positioned as data read buses with regard to the registers ER0 through ER31, the data bus WB is positioned as a data write bus with regard to the registers ER0 through ER31. Further, although detailed illustration is omitted, respective portions of the executing unit EXEC is divided in correspondence with divisions E (16 bits), H (8 bits), L (8 bits) of the general purpose registers.

The arithmetic and logic functional unit ALU is used for various operation designated by instruction or calculation of the effective address. The incrementer INC is mainly used for addition of the program counter PC.

The read data buffer RDB temporarily stores read instruction codes or data from ROM 504, RAM 505, inner I/O registers, or outer memories, not illustrated. The write data buffer WDB temporarily stores write data to ROM 504, RAM 505, inner I/O registers or outer memories. Timings of inner operation of CPU 502 and read/write operation from and to outside of CPU 502 are adjusted by the read data buffer RDB and the write data buffer WDB.

The address buffer AB temporarily stores address of data which CPU 502 reads/writes and is provided with increment function with regard to stored content and function of holding increment result. Whereas the BG bus, the DB bus and the WB bus are constituted by 32 bits, IDB is constituted by 16 bits and accordingly, in the case in which data of 32 bits is accessed by twice access of 16 bits data, prior to data access at 2-th time, content of the address buffer AB is incremented.

Figure 85:
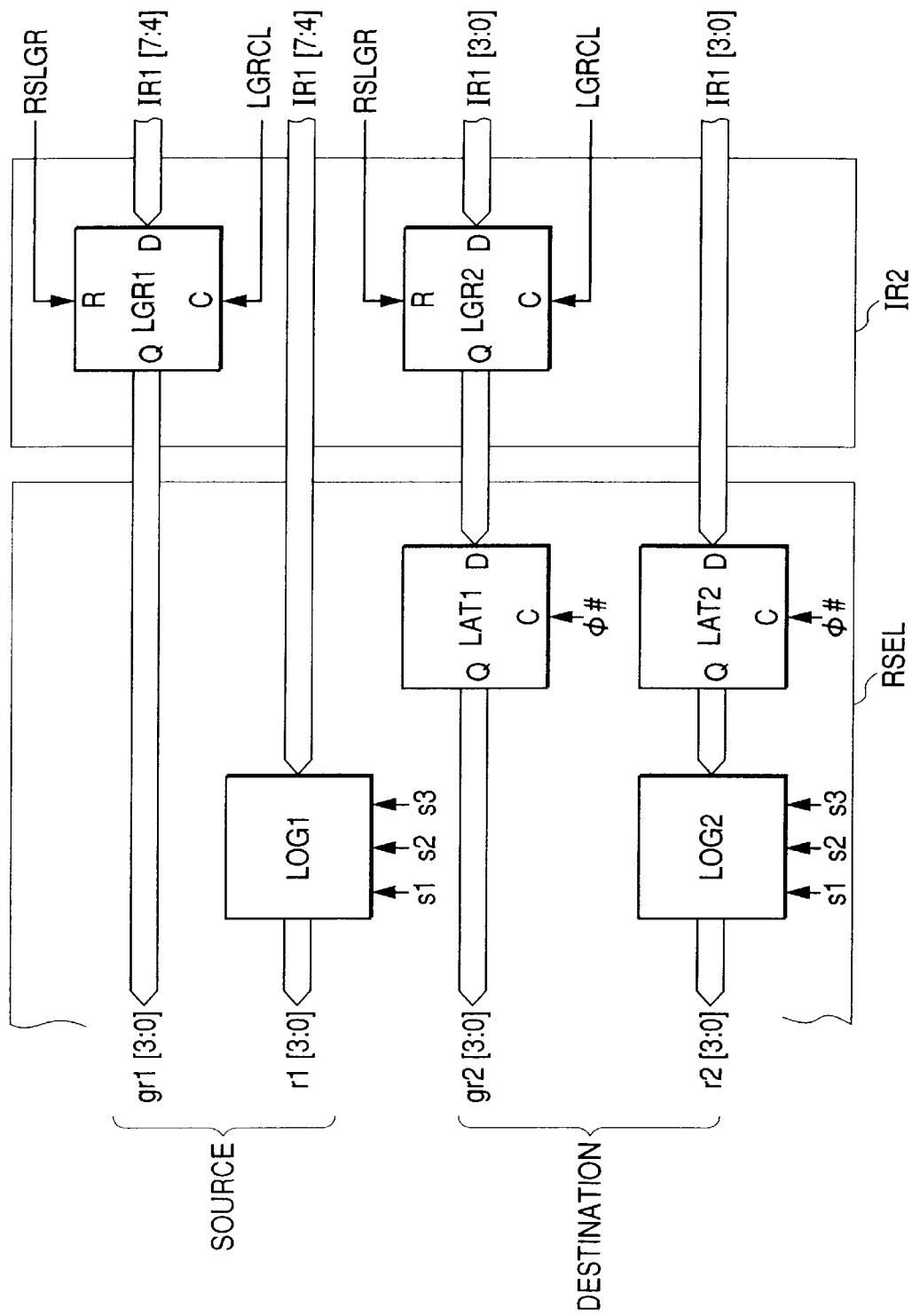
FIG. 85 is a block diagram showing a portion of a register selector and details of the instruction register.

FIG. 85 shows a detailed block diagram of a portion of the register selector RSEL and the instruction register IR2.

The instruction register IR2 is provided with latch circuits LGR1, LGR2 as holding means. As described above, the latch circuits LGR1 and LGR2 latch the register group designating information of the register group designating fields gr1, gr2.

According to FIG. 85, each of the latch circuits LGR1 and LGR2 is constituted by so-to-speak D type flip flop with reset. As reset signal RSLGR, an instruction execution finish signal RSLGR designated by the instruction decoder DEC is inputted. As latch clock, a latch clock LGRCL designated by the instruction decoder DEC is inputted, further, as data, bit 7 through 4, 3 through 0 (may only be bit 5, 4, 1, 0 in the case of group 4) of the instruction code held by the instruction register IR1 are inputted. The latch clock LGRCL is brought into an active state when the instruction code for designating the register group (ignorable front instruction code for register expansion) is executed and latches bit 7 through 4, 3 through 0 which is the register field (gr) at that occasion. The latch circuits LGR1 and LGR2 are all set to a predetermined value, for example, bit 0 based on the reset signal RSLGR which is the control signal from the instruction decoder DEC and is initialized to a state of designating the register block 0 at time point of finishing execution of instruction. With regard to instruction which is not provided with the front instruction code for register expansion for designating a general register group, since the latch circuits LGR1 and LGR2 stay to be cleared to the value "0", when the instruction is executed, the general purpose register of register group 0 is designated.

On the destination register designating side of the register selector RSEL, there are provided a latch circuit LAT1 holding information of the register group designating field (gr2) outputted from the latch circuit LGR2 and a latch circuit LAT2 for latching information of the register designating field (r2) outputted from the instruction register IR1. These latch circuits LAT1 and LAT 2 are constituted to execute latch operation by inverted clock f# of system clock f and operation of selecting the destination register is executed to retard from operation of selecting the source register. Thereby, a timing of latching the register designating information on the destination side, that is, a timing of selecting the destination register is retarded from a timing of selecting the source register by 0.5 state. The source register can be selected precedingly as an address register and the destination register can be selected to retard for writing data.

Further, information of the register designating field r1 outputted from the instruction register IR1 and information of the register designating field r2 outputted from the latch circuit LAT2, are inputted to logical circuits LOG1 and LOG2, bit 0 and 1 of the inputted register designating fields r1 and r2 are controlled by control signals s1 through s3, outputted from the logical circuits LOG1 and LOG2 and used for selecting registers having fixed combinations. The control signals s1 through s3 are used when transfer instruction of a plurality of the general purpose registers is made effective and is made all to 0 otherwise, and the inputs r1 and r2 of LOG1 and LOG2 are outputted as they are.

Figures 86, 87:
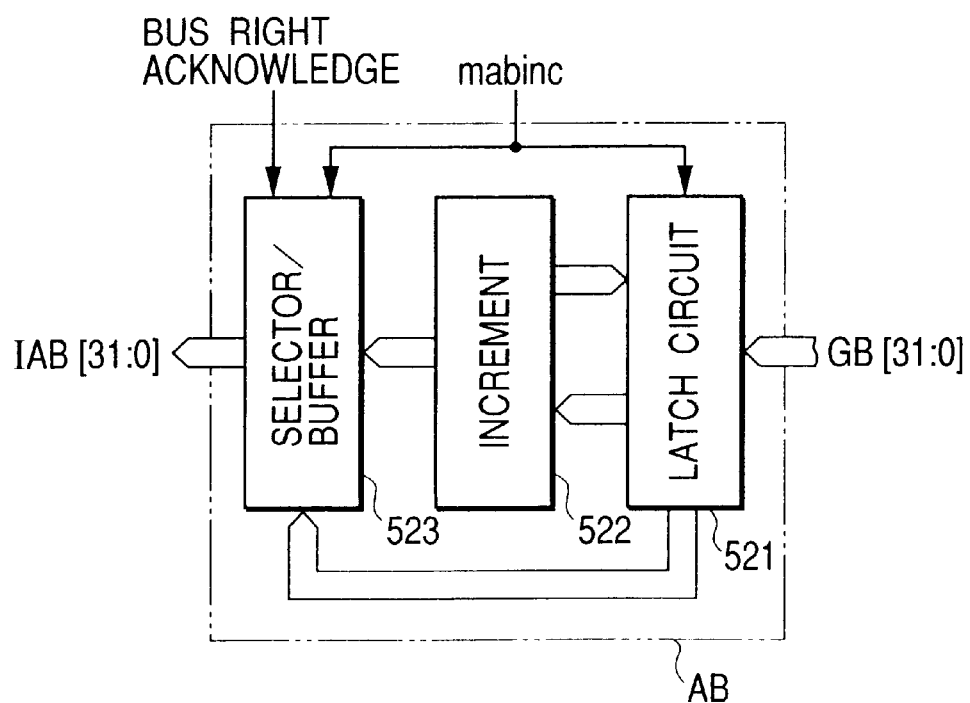
FIG. 86 is an explanatory view exemplifying functions of control signals s1 through s3 inputted to a register selector.
FIG. 87 is a block diagram exemplifying an address buffer.

Functions of the control signals s1 through s3 are exemplified in FIG. 86. The control signal s1 fixes bit 0 of information of register designating field r1, r2 to 1. Similarly, the control signal s2 fixes bit 1 of information of the register designating field r1, r2 to 1 and fixes bit 0 thereof to 0. The control signal s3 fixes both of bit 1 and bit 0 of information of the register designating field r1, r2 to 1. When 2 of the general purpose registers are designated, the control signal s1 is outputted. In the case of 3 of the general purpose registers, the control signals s1 and s2 are outputted in this order and in the case of 4 of the general purpose registers, the control signals s1, s2 and s3 are outputted in this order. Thereby, in transfer instruction with the plurality of general purpose registers as an object, when one register is initially designated by the register designating fields r1, r2, thereafter, registers successive thereto are selected by the control signals s1 through s3 in the prescribed order. Thereby, the general purpose registers are selected successively in a fixed combination. As is apparent from the logic of outputting the control signals s1 through s3, when a register is designated by 3 bits or 4 bits of the register designating areas r1, r2 in transfer instruction of a plurality of general purpose registers, an initial value which can be set to the register designating areas r1, r2, differs depending on the number of the general purpose registers which the instruction constitutes an object of transfer, in the case of 2 of the general purpose registers, *0 must be set, in the case of 3 thereof, 00 must be set and in the case of 4 thereof, **00 must be set. Any value may be adopted for the sign *. Thereby, the register selector SEL per se is made common with other instruction and can deal with transfer instruction of the plural general purpose registers and accordingly, the increase in the logical scale can be restrained as less as possible.

FIG. 87 shows an example of the address buffer AB. The address buffer AB is constituted by a latch circuit 521, an incrementer 522 and a selector/buffer 523. The latch circuit 521 is inputted with outputs from the inner bus GB and the incrementer 522. When a control signal mabinc is brought into an active state, output from the incrementer 522 is latched, when the control signal mabinc is brought into an inactive state, content of the bus GB is latched.

The incrementer 522 inputs output from the latch circuit 521 and executes addition of +2. By bringing the control signal mabinc into the active state, an incremented value is repeatedly returned from the latch circuit 21 to the incrementer 22 to thereby enable increment of plural times +4, +6, aaa.

The selector/buffer 523 inputs content of the latch circuit 521 and the incrementer 522. When the control signal mabinc is brought into the active state, the output of the incrementer 522 is selected, when the control signal mabinc is brought into the inactive state, the output of the latch circuit 521 is selected. The selected content is outputted to the inner address bus IAB in accordance with a bus right acknowledge signal. When the bus right acknowledge is inactive, the address buffer AB does not execute output to the inner address bus IAB and the output is brought into a high impedance state.

Figure 93:
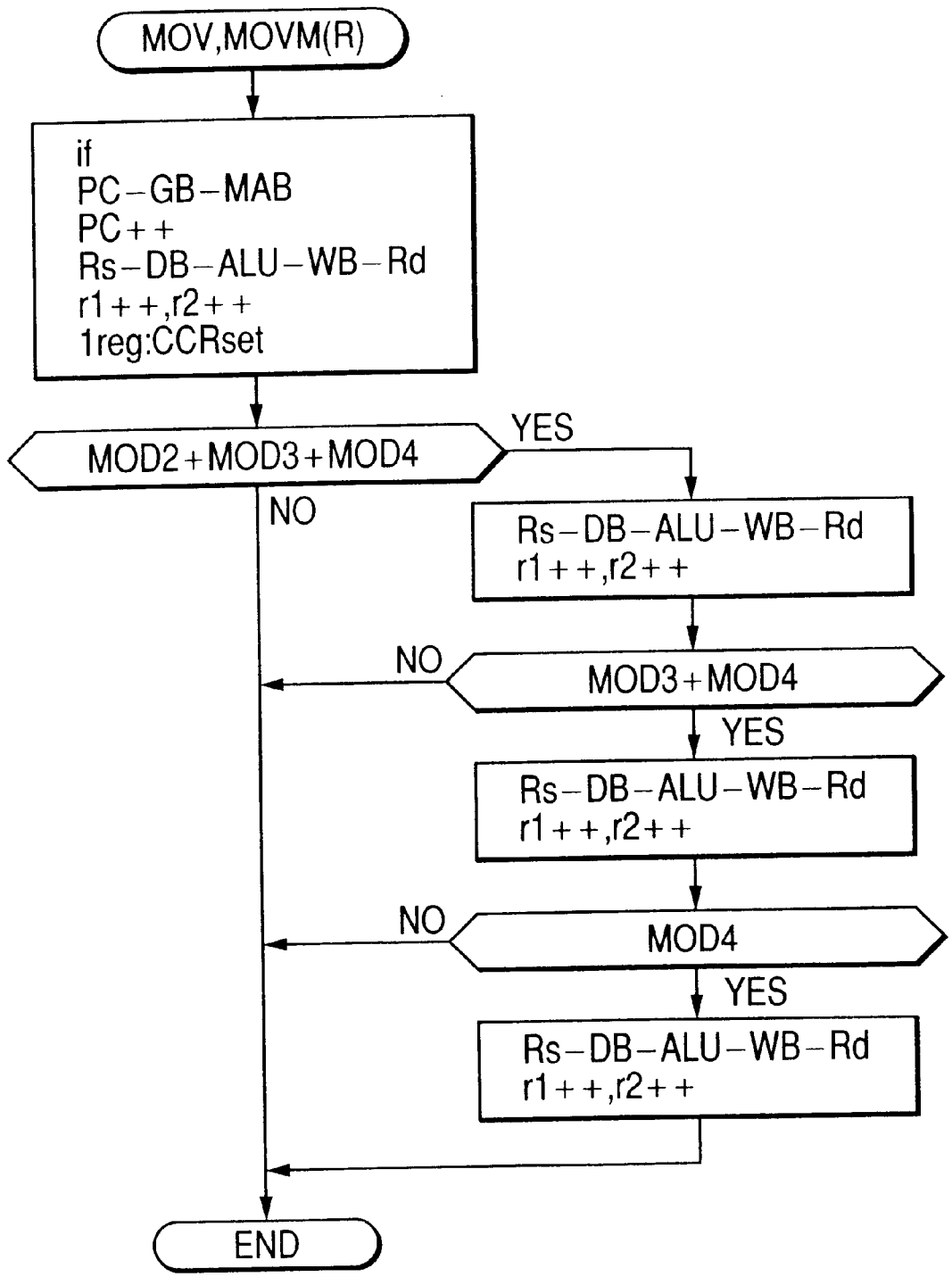
FIG. 93 is a flowchart in correspondence with control operation by the transfer instruction (MOV&MOVM instruction) between registers by control of the logical description illustrated in FIG. 88 and FIG. 89.

FIG. 88 and FIG. 89 show a portion of control logic of the decoder DEC with regard to transfer instruction (MOV and MOVM instruction) of word size between registers by logical description. Description of FIG. 9 is remaining logical description successive to that of FIG. 88. FIG. 93 is a flowchart in correspondence with control operation by transfer instruction (MOV and MOVM) of a single and a plurality of general purpose registers between registers by control of the logical description described in FIG. 88 through FIG. 89.

The logical description shown by FIG. 88 and FIG. 89 is referred to as RTL (Register Transfer Level) or HDL (Hardware Description Language) description and can be logically developed in a logical circuit by publicly-known logic synthesis tool. HDL is standardized as IEEE1364. Syntax of logical description shown here is in conformity to case statement and is provided with content in which there is a change in a value or a signal defined in ( ) successive to always@, a processing of a descriptive line thereafter is executed. "8' b00001000" signifies 00001000 having 8 bit length. Further in the drawings, a signal of small letter is a signal generated by and outputted from the instruction decoder DEC and a signal of capital letter is a signal inputted to the instruction decoder DEC.

In the logical description of FIG. 88, whether transfer instruction uses a single general purpose register or a plurality of general purpose registers is designated by signals MOD2 through MOD4. The signal MOD2 indicates the designation of 2 of general purpose registers, the signal MOD3 indicates designation of 3 of general purpose registers and the signal MOD4 indicates designation of 4 of general purpose registers. These signals MOD2 through MOD4 are generated by content of a front instruction code for instruction expansion.

According to the logical description of FIG. 88 and FIG. 89, a control signal is generated in accordance with state code TMG (information of 5 bits) and determines a value of a state code at current time point and a value of a successive state code NEXTTMG in accordance with values of MOD2 through MOD4 at that time.

In the case of transfer instruction of a single register, state code TMG is 1 (0001) and state codes TMG5 (00101), 9 (01001) and 13 (01101) are added thereto for data transfer control inherent to transfer instruction of plural registers.

Transfer instruction of plural registers is indicated by MOD2 through MOD4 signals. The state code TMG is generated at a first portion (1) of logical description of FIG. 88. In the case of single register, the state code TMG is 1. In the case of plural registers, for example, when MOD4=1, TMG progresses such that 1 ⓑ 5 ⓑ 9 ⓑ 13. In the case of MOD3=1, state code 13 is omitted and in the case of MOD2=1, state codes 9 and 13 are omitted.

Further in the case of NEXTTMG[5]=0, successive TMG is set as NEXTTMG[4:0]. When NEXTTMG[5]=1, successive TMG is set as 5' b00001.

At a second portion (2) of the logical description of FIG. 89, bus control is executed. nop=0 designates start of bus access and nop=1 designates prohibition of bus access. data=0 designates instruction read, data=1 designates data access.

In the case of the transfer instruction, instruction read is executed when state code TMG is 1 and bus access is not executed at state code TMG of 5, 9, 13.

In the case of instruction read, content of the inner data bus IDB is stored to the instruction register IR1 and the read data buffer RDB at a predetermined timing. In the case of data read, content of the inner data bus IDB is stored to the read data buffer RDB at a predetermined timing. In the case of data write, content of the write data buffer WDB is outputted to IDB at a predetermined timing.

At a third portion (3) of the logical description of FIG. 89, transfer data is controlled. At respective state, output is executed from a general purpose register to the inner bus DB and write from the inner bus WB to a general purpose register is designated via the arithmetic and logic functional unit ALU.

In any of the cases, after designating a general purpose register, update of the register designating field r2 is executed. When the signal s1 is 1, bit 0 of the register field r1 is fixed to 1. Similarly, the signal s2 fixes bit 1 to 1 and fixes bit 0 to 0. The signal s3 fixes bit 1, 0 to 1.

In the case in which the state code TMG is 1, when transfer instruction of a single register, that is, MOD2 through MOD4 are all 0, ccrset signal is set to 1 and predetermined bits of the condition code register CCR are changed by reflecting transfer data.

Figure 94:
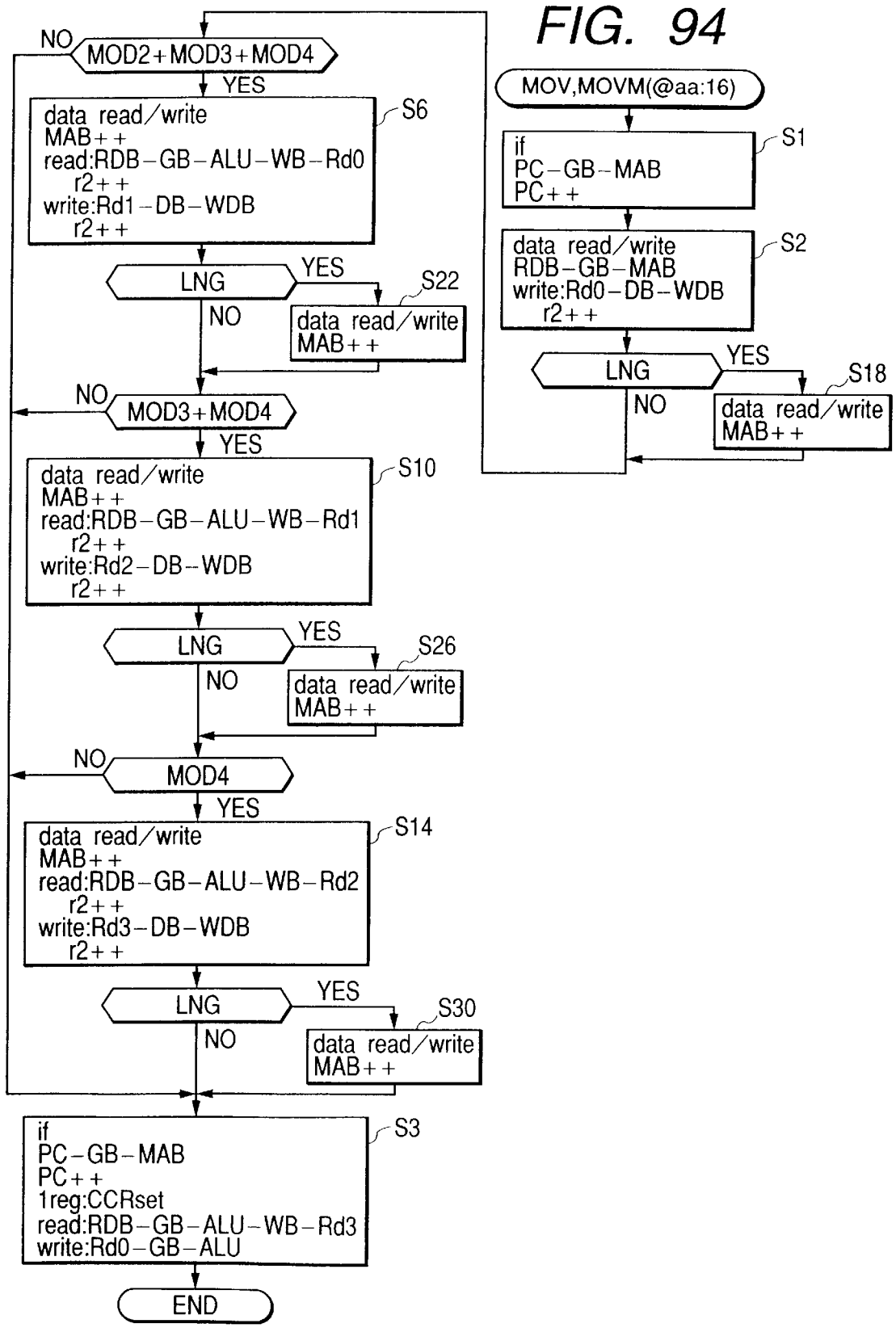
FIG. 94 is a flowchart in correspondence with control operation by the transfer instruction (MOV&MOVM instruction) by the 16 bit absolute address by control of the logical description illustrated in FIG. 90 through FIG. 92.

Logical description described in FIG. 90 through FIG. 92 shows a portion of control logic of the decoder DEC with regard to transfer instruction (MOV and MOVM instruction) by 16 bits absolute address. Description of FIG. 91 is remaining logical description successive to that of FIG. 90 and description of FIG. 92 is remaining logical description successive to that of FIG. 91. FIG. 94 is a flowchart in correspondence with control operation of transfer instruction (MOV and MOVM) of a single and a plurality of general purpose registers by 16 bits absolute address by control of the logical description described in FIG. 90 through FIG. 92.

As shown by "(4) 16 bits absolute address" of FIG. 10, data size is byte size when IR[8] (8-th bit from the lowest position of instruction register IR)=0 and is word size when IR[8]=1 and transfer direction is memory ⓑ general purpose register (read type) when IR[7]=0 and the general purpose register ⓑ memory (write type) when IR[7]=1.

Selection of word size/long word size, single register/ plural registers is designated by signal LNG, signals MOD2 through MOD4. The signal LNG indicates long word size. The signals MOD2 through MOD4 respectively indicate 2 through 4 of register selection and are generated in accordance with a front instruction code for instruction expansion.

States (state code 6, 10, 14) of data transfer inherent to transfer instruction of plural registers and states (state code 18, 22, 26, 30) in the case of long word size of transfer instruction of single/plural registers, are added to flow (state code 1 ⓑ 2 ⓑ 3) of transfer instruction of a single register.

At a first portion (1) of the logical description shown by FIG. 90, state code TMG is generated. In the case of a single register, the state code TMG progresses such that 1 ⓑ 2 ⓑ 3. In the case of plural registers, for example, when MOD4=1, TMG progresses such that 1 ⓑ 2 ⓑ 6 ⓑ 10 ⓑ 14 ⓑ 3. When MOD3=1, state code 14 is omitted and when MOD2=1, state codes 10 and 14 are omitted. Further, in the case of long word size, state codes 18, 22, 26, 30 are added.

At a second portion (2) of the logical description of FIG. 91, bus control is executed. In the case of the transfer instruction, at state code 1, 3 instruction read is executed and at state code 2, 18, 6, 22, 10, 26, 14, 30, data access is executed. Read/write of data access is designated by IR[7]. Other than final data access, long=1 and bus right transfer prohibition is designated.

In the case of instruction read, content of the inner data bus IDB is stored to the instruction register IR and the read data buffer IDB at a predetermined timing. In the case of data read, content of the inner data bus IDB is stored to the read data buffer RDB at a predetermined timing. In the case of data write, content of the write data buffer WDB is outputted to the inner data bus IDB at a predetermined timing.

At a third portion (3) of the logical description shown by FIG. 91, the effective address is calculated. In the case of the transfer instruction, at state code 2, 16 bits of the EX expansion portion of the instruction code held by the read data buffer RDB is subjected to code expansion to 32 bits by a signal dbrext and are outputted to the inner bus GB. Content of the inner bus GB is stored to the address buffer AB at respective state and control is not needed particularly. At state code 18, 5, 22, 10, 26, 14, 30, content held by the address buffer AB is incremented (+2) by a signal mabinc.

At a fourth portion (4) of the logical description shown by FIG. 92, transfer data is controlled. In the case of read type (IR[7]=0), at state code 6, 10, 14, 3, read data is outputted from the read data buffer RDB to the inner bus GB and is stored to the general purpose register via the arithmetic and logic functional unit ALU and the inner bus WB. In the case of write type (IR[7]=1), at state code 2, 6, 10, 14, the read data is outputted from the general purpose register to the inner bus DB and is outputted to the inner data bus IDB via the write data buffer WDB. In any of the cases, after designating the general purpose register, update of the register designating field r1 is executed. When the signal s1 is 1, bit 0 of the register field r1 is fixed to 1. Similarly, the signal s2 fixes bit 1 to 1 and bit 0 to 0. The signal s3 fixes bit 1, 0 to 1. These are indicated as r2++ in FIG. 93.

At state code 3, in the case of transfer instruction of a single register, that is, all of the signals MOD2 through MOD4 are 0, a signal ccrset is set to 1 and predetermined bits of the condition code register CCR are changed by reflecting transfer data.

Also with regard to other addressing modes, similar to the above-described, in addition to predetermined instruction read and calculation of the effective address, operation of data access in correspondence with state codes 18, 6, 22, 10, 26, 14, 30 may be added. These can be made common to various addressing modes.

Figure 95:
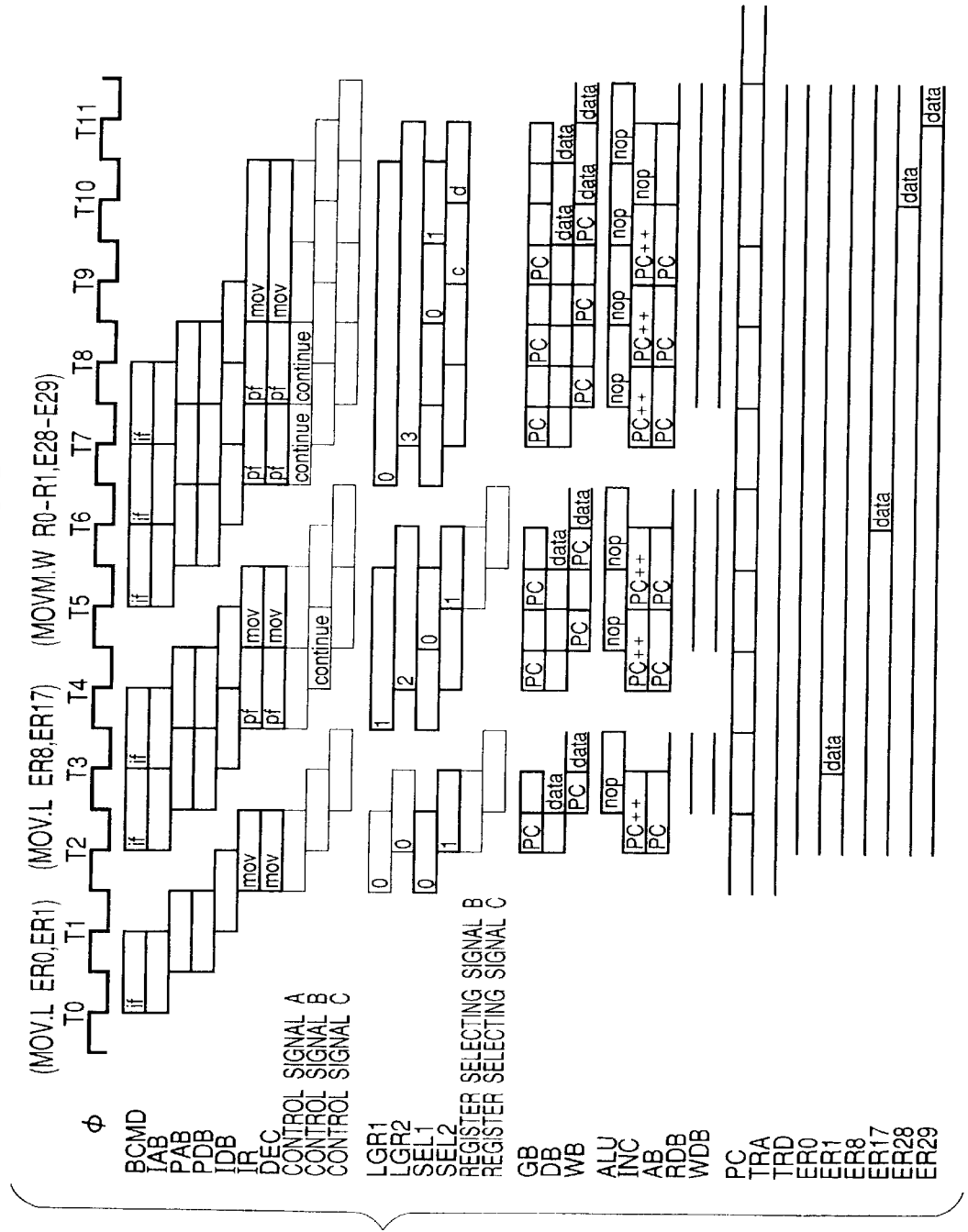
FIG. 95 illustrates timing charts exemplifying execution timings of first transfer instruction (MOV.L ER0,ER1), second transfer instruction (MOV.L ER8,ER17) of a register/register type and a first example of transfer instruction of a plurality of registers (MOVM.W R0–R1,E28–E29)

FIG. 95 exemplifies execution timings of a register/register type first transfer instruction (MOV.L ER0,ER1), second transfer instruction (MOV.L ER8, ER17) and a first example (MOVM.W R0–R1,E28–E29) of transfer instruction of plural registers.

According to the register/register type of the first transfer instruction (MOV.L ER0,ER1), only general purpose registers of group 0 are used and accordingly, an instruction code for designating a general register group is not needed and the transfer instruction is constituted by instruction of 1 word similar to that in lower CPU with regard to CPU2.

Although not particularly restricted, FIG. 95 shows timings in which read/write of RAM 505 is made readable/writable by 1 state. In the following explanation, 1 state in synchronism with rise of f is referred to as f synchronous state and 1 state in synchronism with rise of f#(inverted clock signal of clock signal f, not illustrated) is referred to as f# synchronous state.

At f# synchronous state of cycle T0, an address is outputted from the address buffer AB of CPU 502 to the inner address bus IAB. Further, bus command BCMD indicating instruction fetch (if) is outputted from the instruction decoder DEC.

At f synchronous state of cycle T1, content of the inner address bus IAB is outputted to the inner address bus PAB and based on the bus command BCMD, read cycle is started and data is outputted to the inner data bus PDB. At f# synchronous state of cycle T1, read data of the inner data bus PDB is provided to the inner data bus IDB and the read data is latched to the instruction register IR1 at f synchronous state of cycle T2. The above operation is executed by control of execution of prior instruction (prefetch). In this case, although built-in ROM 504 and RAM 505 are not connected to the inner address bus PAB and the inner data bus PDB, these execute operation in correspondence with the inner bus PAB, PDB in the module and operation in the module is shown in the timing chart.

When execution of immediate instruction has been finished, in the case in which execution of instruction is started most fastly, an instruction code is inputted to the instruction decoder DEC at f synchronous state of cycle T2 and content of the instruction is decoded. In accordance with decoded result, a control signal is outputted and control of respective portions is executed. A value of the register designating field r1, r2 constituting a portion of instruction and the signals s1 through s3 formed by a register number of plural registers, are received by the circuits LOG1, LOG2, the value of the register field r1, r2 is controlled and outputted. The output of the circuit LOG1 is referred to as signal SEL1 and the output of the circuit LOG2 is referred to as signal SEL2.

In register/register operation instruction, at f# synchronous state of cycle T2, content of the program counter PC is read to the inner bus GB and is inputted to the address buffer AB and the incrementer INC. An address signal is outputted from the address buffer AB to the address bus IAB. At this occasion, both of the latch circuits LGR1 and LGR2 are cleared to 0 and accordingly, a register operation signal B (ER0 ® DB) is generated at the register selector RSEL based on the signal SEL1, SEL2 and a control signal B (Rs ® DB) outputted by the instruction decoder DEC.

From cycle T3, next next instruction (in this example, MOV.L ER8,ER17) is read. At f synchronous state of cycle T3, a result incremented (+2) by the incrementer INC is written to the program counter PC via the inner bus WB. The register selector RSEL generates a register selection signal C (WB ® ER1) based on the signal SEL1, SEL2 and a control signal C (WB ® Rd). The register selection signal B selects a register and inputs data of the register (Rs) on the source side to the arithmetic and logic functional unit ALU. Operation content of the arithmetic and logic functional unit ALU is designated by the control signal C of the instruction decoder DEC. Addition, logical operation or shift can be operated in 1 clock. For example, according to the above-describe instruction, addition of 32 bits is designated (input on the bus GB side is set to 0).

Load to next instruction to the instruction decoder DEC is designated. By the control signal B (RSLGR), clear of the latch circuits LGR1 and LGR2 is designated. A result cleared at f synchronous state of cycle T3 is transmitted to the latch circuit LGR1 and the result cleared at f# synchronous state of cycle T3 is transmitted to the latch circuit LGR2.

At f# synchronous state of cycle T3, operation result of the arithmetic and logic functional unit ALU is written to the register (ER1) on the destination side selected by the register selecting signal C via the inner bus WB. Although not illustrated, update of the condition code register CCR is executed by the control signal C. Further, next next instruction is inputted to the instruction register IR1. At the same time, execution of next instruction is started, for example, content of the program counter PC is read and inputted to the address buffer AB and the incrementer INC.

Operation among registers of group 0 can be executed substantially in 1 state.

The register/register type of second transfer instruction (MOV.L ER8,ER17) is constituted by 2 words instruction by adding an instruction code designating the general register group. The second word is the same as that in MOV.L R0,R1. That is, it is interpreted that since gr=1, register number n=8 for same r1=0, further, since gr2=2, register number n=17 for same r2=1.

At f# synchronous state of cycle T2, an address is outputted from the address buffer AB of CPU 502 to the address bus IAB.

At f synchronous state of cycle T3, content of the address bus IAB is outputted to the address bus PAD and read cycle is started. At f# synchronous state of cycle T3, read data is provide to the inner data bus and the read data is latched to the instruction register IR1 at f synchronous state of cycle T4. This is ignorable instruction word (front instruction code) having a register group field.

Successively, at f# synchronous state of cycle T4, next address (content incremented by +2) is outputted to the address bus IAB and the read data is latched to the instruction register IR1 at f synchronous state of cycle T5. The above operation is executed by the register/register type of the first transfer instruction and control of execution of next instruction, not illustrated.

At f synchronous state of cycle T4, an instruction code (front instruction code) is inputted to the instruction decoder DEC and content of instruction is decoded. In accordance with decoded result, a control signal is outputted and control of respective portions is executed. A group field latch signal LGRCL is generated and a register group designating field (bit 7 through 0 of IR1) is latched to the latch circuit LGR1, LGR2.

At f# synchronous state of cycle T4, content of the program counter PC is read to the inner bus GB and is inputted to the address buffer AB and the incrementer INC. An address signal is outputted from the address buffer AB to the address bus IAB.

From cycle T5, further successive instruction (MOVM.W R0–R1,E28–E29 in this example) is read.

At f synchronous state of cycle T5, a result incremented (+2) by the incrementer INC is written to the program counter PC via the inner bus WB. Since the first word and the second word and thereafter are not divided, by the control signal B, a continuous instruction signal continue (same as interruption prohibiting signal nsisint) is outputted to the interruption control circuit INTC. By the signal, even when interruption request is generated, execution of instruction can be continued. Further, content of the latch circuit LGR1, LGR2 is held.

Meanwhile, at f synchronous state of cycle T4, an instruction code (designating transfer instruction) is inputted to the instruction decoder DEC and content of instruction is decoded. In accordance with decoded result, a control signal is outputted and control of respective portions is executed. Since LGR1=1 and LGR2=2, based on the signal SEL1, SEL2 and the control signal B (Rs-DB) outputted by the instruction decoder DEC, the register selecting signal B (ER8-DB) is generated. Based on the signal SEL1, SEL2 and the control signal C (WB-Rd), the register selecting signal C (WB-ER17) is generated. Operation by the second word other than thereof can be made the same as that of the first transfer instruction (MOV.L ER0,Er1) (Similar to the first transfer instruction, by the control signal B (RSLGR), clear of LGR1, LGR2 is designated. Cleared result is transmitted to the latch circuit LGR1 at f synchronous state of cycle T6 and the cleared result is transmitted to the latch circuit LGR2 at f# synchronous state of cycle T6).

That is, other than outputting the latch signal of the latch circuit LGR1, LGR2 in correspondence with the first word (front instruction code) and the continuous instruction signal, content of the instruction decoder DEC can be made equivalent to that of an instruction decoder of existing lower CPU. A portion of the instruction decoder DEC in correspondence with the front instruction code is naturally small relatively. That is, addition of logical scale can be minimized. Further, a large portion of the instruction decoder DEC can be made equivalent to that of the instruction decoder of existing lower CPU and accordingly, conventional design resources can effectively be utilized.

Next, there is shown an example of "MOVM.W R0–R1, E28–E29" which is register/register transfer instruction of plural registers. The register designating field r1 is 3' b000, and r2 is 2' b100 .

The transfer instruction "MOVM.W R0–R1,E28–E29" is constituted by 3 word instruction by adding a front instruction code for register expansion designating the general purpose register group and a front instruction code for register expansion indicating MOVM (also referred to as prefix code). The third word (mov) is the same as that of MOV.W R0,R4. Since gr2=3, it is interpreted that register number n=28 for same r1=4. In word size, r2[3]=1 and accordingly, the general purpose register E is designated.

At f# synchronous state of cycle T5, an address is outputted from the address buffer AB of CPU 502 to the address bus IAB.

At f synchronous state of cycle T6, content of the address bus IAB is outputted to the address bus PAB and read cycle is started. At f# synchronous state of cycle T6, read data is provided to the inner data bus and the read data is latched to the instruction register IR1 at f synchronous state of cycle T7. This is an ignorable instruction word (front instruction code) having the register group field Successively, at f#synchronous state of cycle T7, next address (content incremented by +2) is outputted to the address bus IAB and the read data is latched to the instruction register IR1 at f synchronous state of cycle T8. The above operation is executed by the second transfer instruction of the register/register type and control of execution of next instruction, not illustrated.

At f synchronous state of cycle T7, the first instruction code is inputted to the instruction decoder DEC and content of the instruction is decoded. In accordance with decoded result, group field latch signal LGRCL is generated and the register group designating field (bit 7 through 0 of IR1) is latched to the latch circuit LGR1, LGR2.

At f# synchronous state of cycle T7, content of the program counter PC is read to the inner bus GB and is inputted to the address buffer AB and the incrementer INC. An address signal is outputted from the address buffer AB to the address bus IAB.

From cycle T8, next next instruction is read. At f of cycle T8, a result incremented (+2) by the incrementer INC is written to the program counter PC via the inner bus WB. Since the first word and the second word thereafter are not divided, by the control signal B, a continuous instruction signal (interruption prohibiting signal) is outputted to the interruption control circuit INTC. Further, content of the latch circuit LGR1, LGR2 is held. Further, a second instruction code is inputted to the instruction decoder DEC and content of instruction is decoded. In accordance with decoded result, the control signal MOD2 is outputted. At f# synchronous state of cycle T8, content of the program counter PC is read to the inner bus GB and is inputted to the address buffer AB and the incrementer INC. An address signal is outputted from the address buffer AB to the address bus IAB.

Meanwhile, at f synchronous state of cycle T9, an instruction code (designating transfer instruction) is inputted to the instruction decoder DEC and content of instruction is decoded. In accordance with decoded result, a control signal is outputted and control of respective portions is executed. Since LGR1=0 and LGR2=3, based on the signal SEL1, SEL2 and the control signals B, C (Rs-DB, WB-Rd) outputted by the instruction decoder DEC, the register selecting signals B, C (R0-DB, WB-E28) are generated by the register selector RESL. The control signal s1 is generated and change of SELL and SEL2 (3' b100 ® 101) is designated.

Successively, in accordance with MOD2 signal, based on the signals SEL1, SEL2 and the control signals B, C (Rs-DB, WB-Rd) outputted by the instruction decoder DEC, the register selector RSEL generates the register selecting signals B, C (R1-DB, WB-E29).

Figure 96:
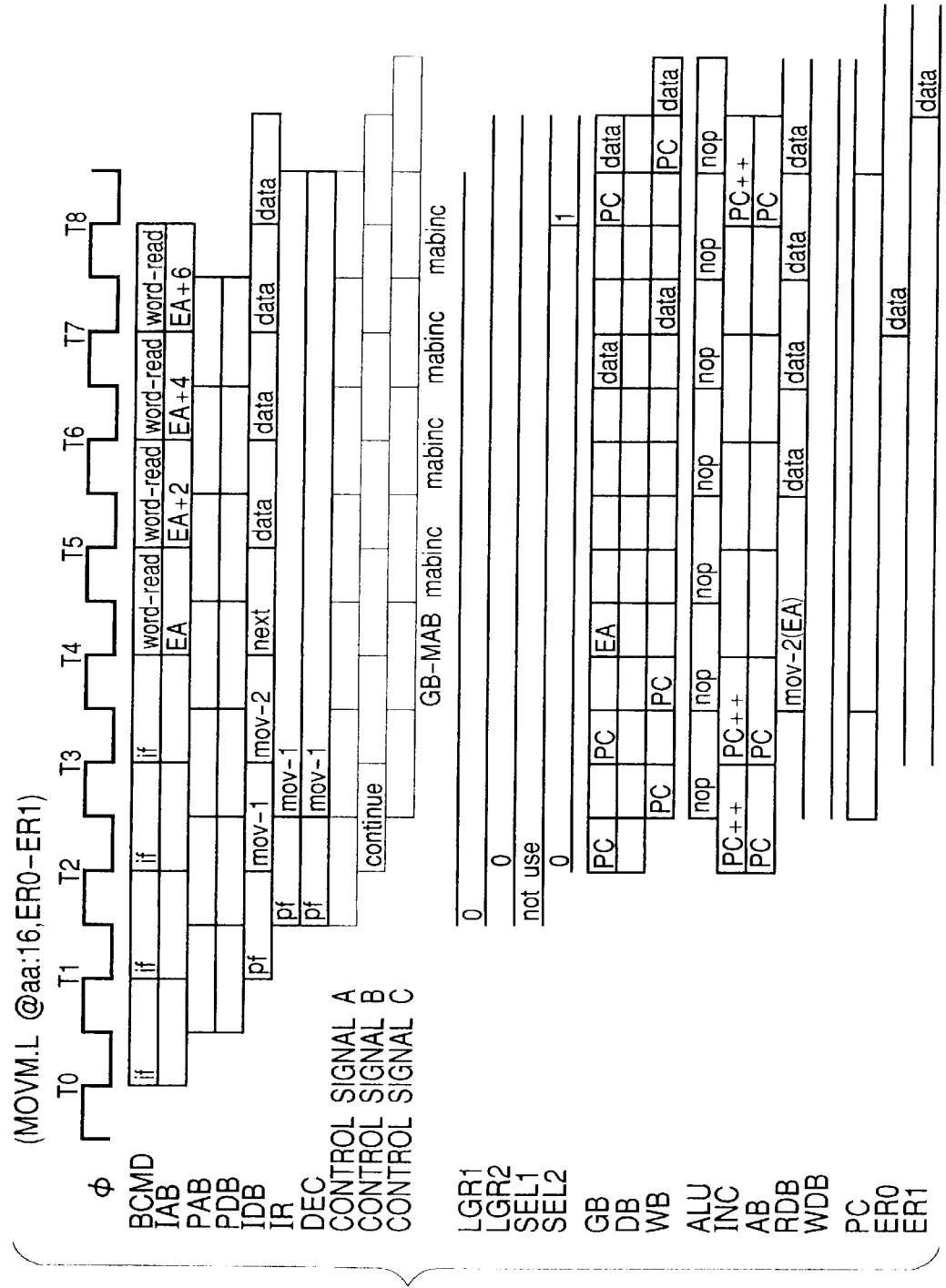
FIG. 96 illustrates timing charts exemplifying an execution sequence of a second example of transfer instruction of a plurality of registers (MOVM.L @aa:16,ER0–ER1)

FIG. 96 shows an execution sequence of a second example of transfer instruction of plural registers (MOVM.L @aa:16,ER0-ER1).

The above-described instruction is an example of reading data to 2 of general purpose registers. The register designating field is 3' b000. The addressing mode is absolute address 16 bits and the effective address is of content in which aa is subjected to code expansion. The code expansion is executed in reading from the read data buffer RDB. In the following, content in which aa is subjected to code expansion is simply described as aa.

From cycle T2, execution of transfer instruction is started. Although not restricted, the first word of an instruction word is a prefix code indicating MOVM which does not execute operation other than designating operation of a successive instruction code (outputting MOD2 signal) and incrementing the program counter PC.

The operation code (mov-1) of the second word is common to that of MOV.L @aa:16,ER0.

At f# synchronous state of cycle T4, content of the read data buffer RDB is outputted to the bus GB and inputted to the address buffer AB. Content of the address buffer AB is outputted to the address bus IAB. At the same time, the buss command DCMD is outputted and word data read and bus right transfer prohibition at next bus cycle are indicated.

At f# synchronous state of cycle T5, upper 16 bits of read data (content of general purpose register E) is outputted to the inner data bus IDB. Further, by the increment function of the address buffer AB, an output value of the address bus IAB is set to aa+2. At the same time, bus command BCMD is outputted and word data read and bus right transfer prohibition at next bus cycle are indicated.

At f synchronous state of cycle T6, read data is stored to read data buffer RDB.

At f# synchronous state of cycle T6, lower 16 bits of read data (content of general purpose register R) are outputted to the inner data bus. Further, by the increment function of the address buffer AB, an output value of the address bus IAB is set to aa+4. At the same time, the bus command BCMD is outputted and read and bus right transfer prohibition at next bus cycle are indicated.

At f synchronous state of cycle T7, content of the read data is transferred to the arithmetic and logic functional unit ALU via bus GB in 32 bits.

At f# synchronous state of cycle T7, upper 16 bits of read data (content of general purpose register E) is outputted to the inner data bus. Further, by the increment function of the address buffer AB, an output value of the address bus IAB is set to aa+6. At the same time, the bus command BCMD is outputted and word data read and bus right transfer permission at next bus cycle are indicated.

At f# synchronous state of cycle T8, lower 16 bits of read data (content of general register R) is outputted to the inner data bus. Further, by the second control signal B, bit 0 of a register selecting signal is inverted. By the first control signal A and the signal SEL2 (=3' b001), a transferred register is selected and the register control signal B is generated.

At and after f# synchronous state of cycle T8, similar to the above-described, read of next next instruction and increment (+2) of the program counter PC are executed.

When 3 of registers are designated, a number of execution states is prolonged by 2 states and increment (+2) of the address buffer AB is executed further 2 times (total +6). Further, in the case in which bit 1 of the signal SEL1, SEL2 is inverted and the register designating field is 000, 010 is provided and the general purpose register ER2 is selected. Write operation is executed by 2 times (total 6 times).

When 4 of registers are designated, the number of execution states is further prolonged by 2 states and increment (+2) of the address buffer AB is executed further 2 times (total +10). Further, bit 1 and bit 0 of the signal SEL1, SEL2 are inverted and in the case in which the register designating field is 000, 011 is provided and the general purpose registers ER2 and ER3 are selected. Write operation is executed by 2 times (total 8 times).

Since lower bits of the register number are fixed, control of changing thereof in accordance with execution of instruction processing is facilitated. By dispensing with a functional unit, the increase in the logical scale can be prevented. For example, when 2 of registers are saved, lower bits of the register designating field on the instruction code are 0 and accordingly, register designation at a first time is executed in accordance with the value of the register designating field and the resister designation at a second time is executed in accordance with control of the instruction decoder DEC and by changing lower 1 bit of the register designating field to 1.

Meanwhile, MOV instruction is executed by reading a single one of the register and is prevented from executing the read operation at the second time to thereby achieve common formation of execution operation.

Figure 97:
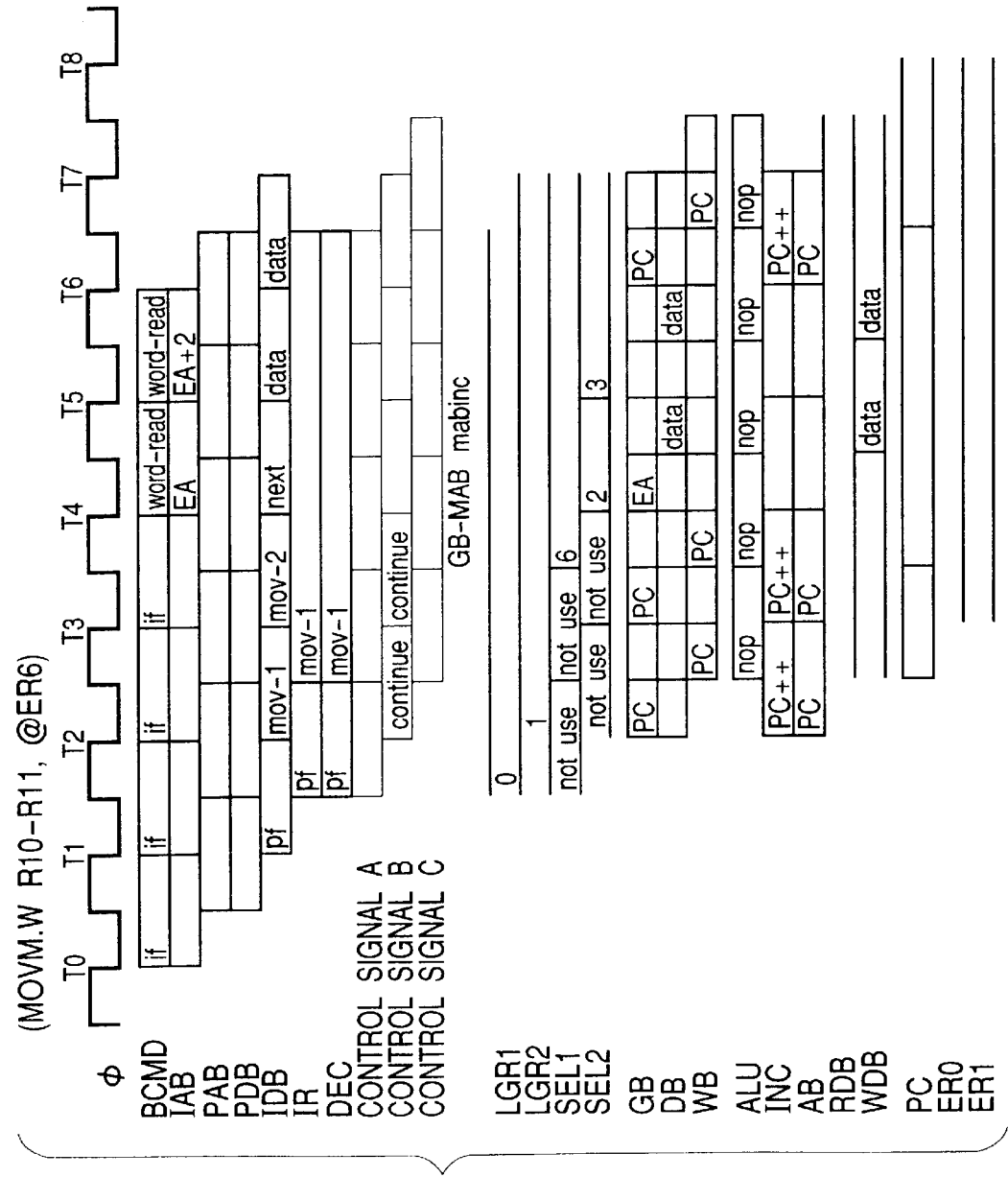
FIG. 97 illustrates timing charts exemplifying an execution sequence of a third example of transfer instruction of a plurality of registers (MOVM.W R10–R11,@ER6)

FIG. 97 shows an execution sequence of a third example of transfer instruction of plural registers (MOVM.W R10–R11,@ER6). The above-described instruction is an example of writing 2 of general purpose registers of word size. The register designating field is 3' b010.

From cycle T2, execution of transfer instruction is started. Although not particularly restricted, the first word of an instruction code is a prefix code having a register group field and the register designating field (bit 7 through 0 of IR1) is latched to the latch circuit LGR1, LGR2 and increments the program counter PC.

The second word of the instruction code is a prefix code indicating MOVM and designates operation of a successive instruction code. The control signal MOD2 is outputted. The third word of the instruction code is made common to that of MOV.W R2,@ER6 instruction.

At f# synchronous state of cycle T4, content of the register ER6 is outputted to the bus GB and is stored to the address buffer AB. Content of the address buffer AB is outputted to address bus IAB. At. the same time, bus command BCMD is outputted and word data write and bus right transfer prohibition at the bus cycle are indicated.

Further, by the first control signal B, latch information of the latch circuit LGR2 (=3' b001) and the signal SEL2 (=3' b010), a transferred register is selected and the register control signal B is generated. The control signal s1 is generated and change of the signal SEL2 (3' b010 ⊕ 011) is designated.

At f# synchronous state of cycle T5, the selected register (content of R10) is transferred to the write data buffer WDB via the bus DB.

At f# synchronous state of cycle T5, the transferred data (content of R10) is outputted to the inner data bus IDB. Further, by the increment function of the address buffer AB, an output value of the address bus IAB is set to EA+2. Further, by the first control signal B, latch information of the latch circuit LGR2 (=3' b001) and the signal SEL2 (=3' b011), the transferred register is selected and the register control signal B is generated.

At f synchronous state of cycle T6, content of the selected register R11 is transferred to the write data buffer WDB via the bus DB.

At f# synchronous state of cycle T6, transfer data (content of R11) is outputted to the inner data bus IDB.

At and after f# synchronous state of cycle T6, similar to the above-described, read of next next instruction and increment (+2) of the program counter PC are executed.

In the case of designating 3 of registers, a number of execution states is prolonged by 1 state and increment (+2) of the address buffer AB is executed by further 1 time (total +4). Further, bit 1 of the signal SEL1, SEL2 is inverted and in the case in which the register designating field is 000, 010 is provided. Bit operation is executed 1 time (total 3 times).

In the case of designating 4 of registers, a number of the execution states is further prolonged by 1 state and increment (+2) of the address buffer AB is executed by further 1 time (total +6). Further, bit 1 and bit 0 of SEL1 and SEL 2 are inverted and in the case in which the register designating field is 000, 011 is provided. Write operation is executed by 1 time (total 4 times).

Figure 98:
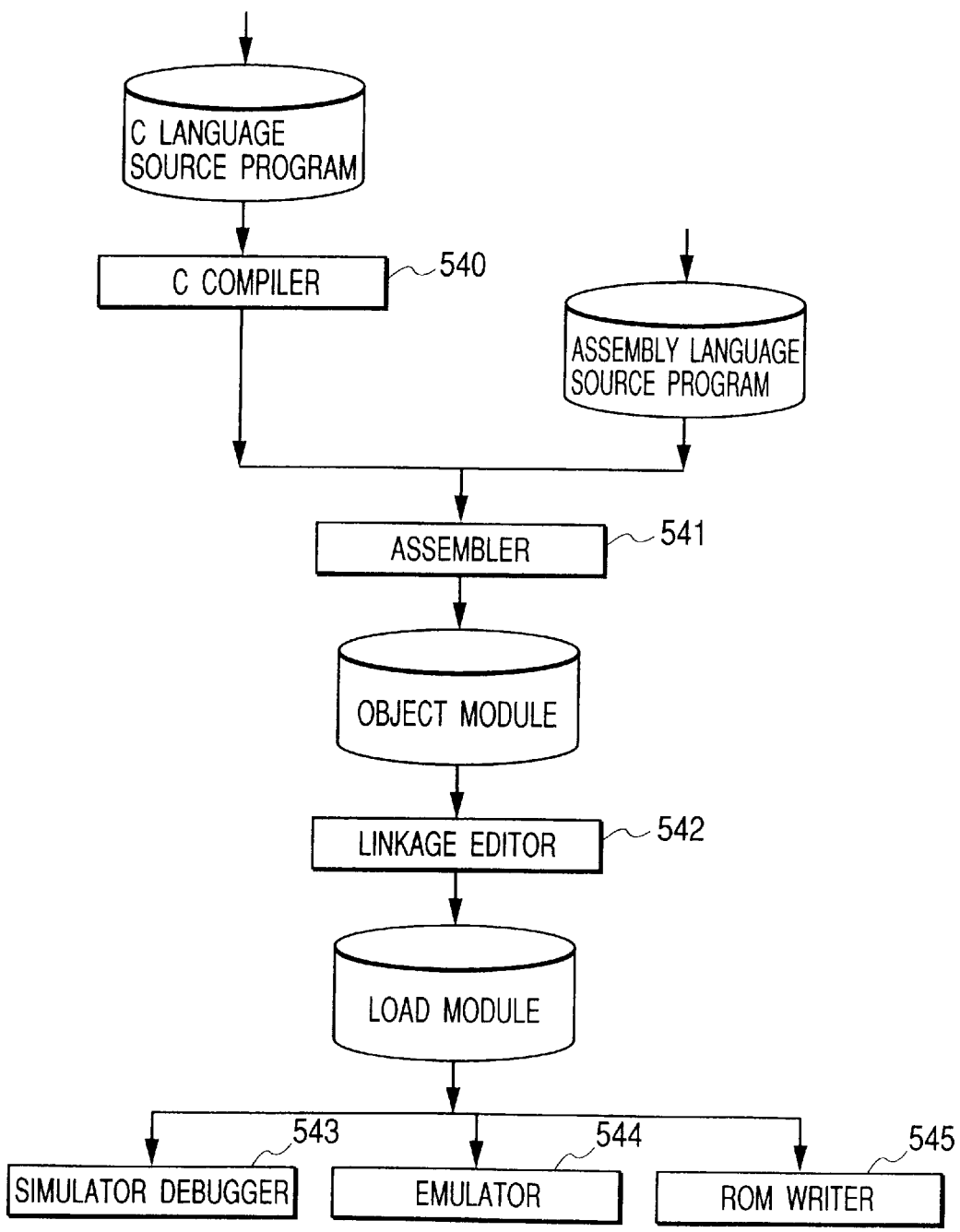
FIG. 98 is an explanatory view exemplifying an outline of a development environment of CPU.

FIG. 98 shows an outline of development environment of CPU 502, mentioned above. According thereto, there can be provided common development environment by existing lower CPU and CPU 502 having upper compatibility therewith.

The user forms programs in C language or assembly language by using various editors.

A C compiler 540 inputs respective C language source programs formed by the user an outputs assembly language source programs or object modules. An assembler 541 inputs the assembly language source programs and outputs object modules. A linkage editor 542 inputs a plurality of object modules generated by the C compiler 540 or the assembler 541, executes outside reference of the respective modules and resolution of relative address, combines them into one program and outputs a load module.

The load module is inputted to a simulator debugger 543, operation of CPU is simulated on a system development apparatus such as personal computer and an execution result is displayed to thereby enable to analyze or evaluate the program. Further, the load module is inputted to an emulator 544 and a so-to-speak in-circuit emulation which is operated on an actual application system, is executed to thereby enable to analyze or evaluate actual operation as a total of the microcomputer. Further, the load module is inputted to a PROM writer 545 and when the ROM 504 of the microcomputer 1 is an electrically writable memory such as flash memory, write can be executed to such memory. Other than these, general subroutines can be provided as librarian.

FIG. 43 is also a drawing exemplifying a method of selecting CPU in the system development apparatus of CPU 502. Content explained in reference to FIG. 43 is applicable to the system development apparatus of CPU 502 as it is. As an method of selecting CPU, CPU can be selected by a drop down menu of window or in the case of a work station, the method can also be inputted as C shell command. Further, kind and operational mode of CPU can be selected as control instruction of a source program of an assembler or a C compiler.

The assembler interprets description on an inputted assembly language source program in accordance with the selected kind and operational mode of CPU, forms an object module and displays error when there is an error. When exiting lower CPU is selected and instruction (the expansion instruction) which is present in higher CPU 502 and is not present in existing CPU is described, error is constituted. Instruction codes per se are incorporated by CPU 502 and accordingly, the assembler 541 therefor is developed and with regard to lower CPU, addition for detecting the instruction which is present in higher CPU 502 and is not present in existing lower CPU, is executed to thereby easily constitute common formation. With regard to existing lower CPU, an assembler is to be present and accordingly, naturally, the assembler can be remodeled easily and applied to higher CPU 2.

The C compiler determines instruction indicated by a usable combination of operation, data size and addressing mode, general purpose registers and address space in accordance with selected kind and operational mode of CPU, converts programs in C language into instruction of CPU and outputs the programs as assembly language programs or object modules.

Although according to the C compiler per se, promotion of a function of converting programs in C language into instruction of CPU as well as functions which have nothing to do directly with instruction sets of CPU such as compiling of programs in C++ language or optimizing modules, is achieved, in individual compilers of respective CPU'S, promotion of these functions must be applied to all of individual compilers. When the common C compiler 540 is constituted as in the invention, promotion of the above-described functions which have nothing to do directly with instruction sets of CPU can easily be achieved, further, the development efficiency can be promoted.

The simulator debugger interprets programs of inputted load module, simulates operation of CPU and displays error when there is an error therein. For example, when existing lower CPU is selected and instruction which is present in CPU 502 according to the invention and which is not present in existing CPU is executed, error is caused. Instruction codes and instruction execution functions per se are incorporated by CPU 502 of the invention and accordingly, the simulator debugger 543 therefor is developed and with regard to existing lower CPU, addition of detecting instruction which is present in CPU 502 and which is not present in existing CPU, is executed to thereby constitute easily common formation. With regard to existing CPU, when there is present a simulator debugger, naturally, the simulator debugger can easily be remodeled and applied to CPU 502 according to the invention.

FIG. 45 is also a drawing showing an emulator for a microcomputer having CPU 502 according to the invention. In FIG. 45, the processor for emulation 410 is constituted by adding interface for emulation to the microcomputer portion. The microcomputer portion corresponds to, for example, the constitution of the microcomputer 501 of FIG. 79. For example, when a program (load module) inputted from the system development apparatus 427 is transferred to the user program storing area of the emulation memory 421 and CPU 520 reads such program to be arranged on built-in ROM 504, the program on the emulation memory 421 is read and executed. Further, a break condition or a real time trace condition can be given from the system development apparatus 427.

The control processor 425 stores a program for selecting kind of CPU which is originally used in the application system 412 at the emulation program storing area of the emulation memory 421. CPU 502 executes such program in a state broken under a predetermined condition and executes setting of control registers for emulation to thereby execute necessary setting in view of emulation. In this case, it is convenient that an execution mode of the program for emulation is made writable only in a so-to-speak break mode. Erroneous setting can be prevented from executing by erroneous operation of software of the user in the midst of development. Further, by using the control registers, even when objects of selecting kinds of CPU which are originally used in the application system 412 are increased, only the constitution of the control registers may be modified, there is no need of changing the interface for emulation and hardware of emulator may not be changed.

Figure 99:
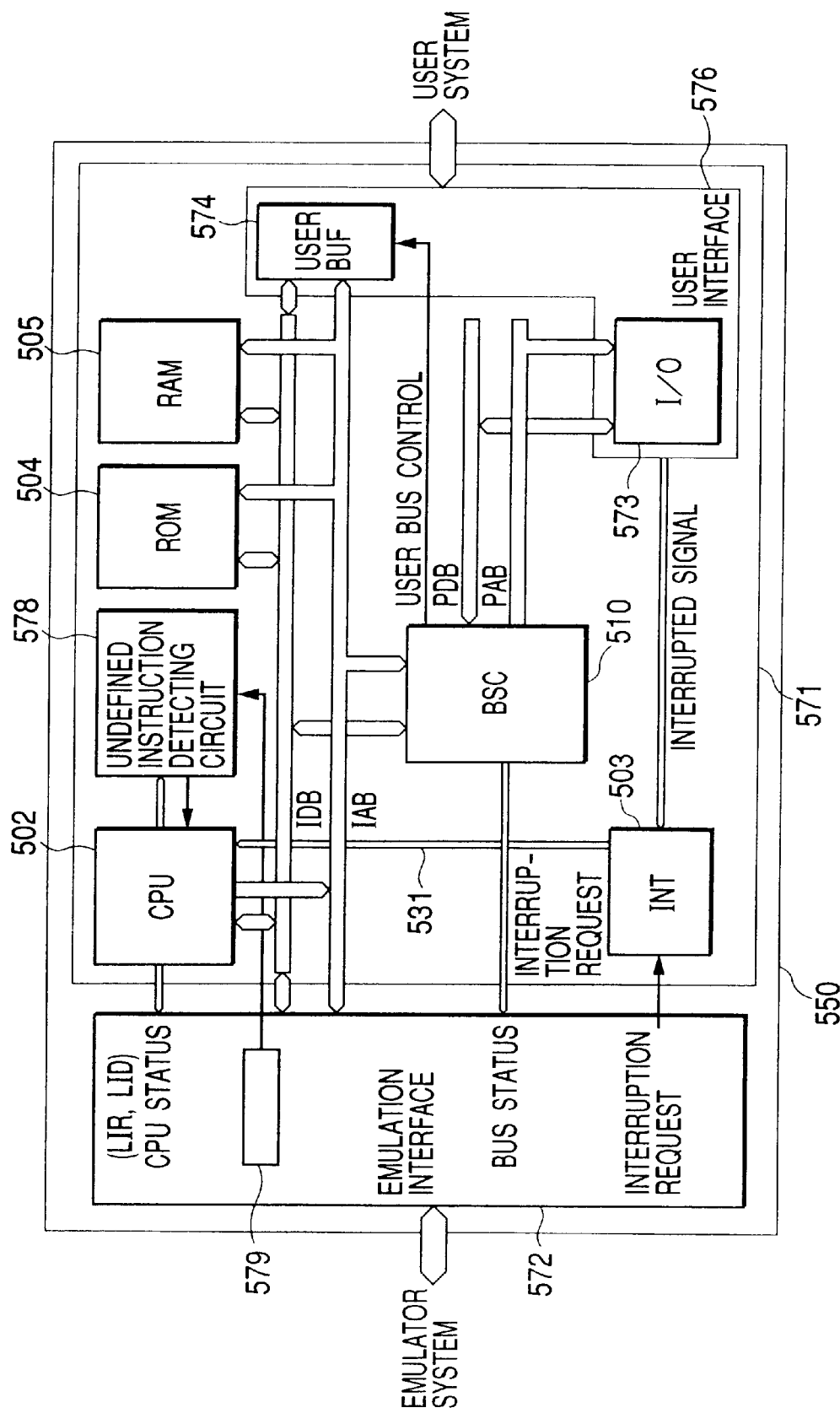
FIG. 99 is a block diagram exemplifying a processor for emulation of a microcomputer.

FIG. 99 shows a block diagram of a processor for emulation in correspondence with the microcomputer 501. A processor for emulation 50 is constituted by a portion of the microcomputer 501 of FIG. 79 (microcomputer core 571) and an emulation interface 572. Further, the timers and the input/output ports of FIG. 79 are represented by I/O, further, details of inner buses and a bus controller are illustrated. Further, the timer 506, the pulse outputting circuit 507, the input/output ports IOP1 through IOP5, IOPA through IOPF are represented by I/O 573 and a user buffer (user BUF) 574. The user interface 574 generally designates an interface circuit including the I/O 573, the user buffer 574 and input/output buffers, not illustrated, and connected to the user system (target system which is an emulation object system).

The microcomputer 571 is constituted by adding an undefined instruction detecting circuit 578 to the microcomputer 501 of FIG. 79. The emulation interface 572 includes a control register 579. The control register 579 is made writable only in a break mode. Signals inputted to and outputted from the emulation interface 572 include bus data signals displaying states of buses such as address bus, data bus, read signal, write signal, data size signal, instruction fetch signal and CPU status signals indicating execution states of CPU 502 such as signal for indicating execution start of instruction and signal indicating execution start of interruption processing and are used for analyzing operation of the microcomputer by the emulator.

When the undefined instruction detecting circuit 578 analyzes instruction codes inputted to CPU 502 and detects that instruction which is not present in selected function of CPU starts executing, the undefined instruction detecting circuit 578 requests break interruption to CPU 502. Which function is selected to CPU 502 is designated from the control register 579. For example, in the case of selecting function of existing lower CPU, when a front instruction code having a register group field is executed, the instruction is detected as undefined instruction. Specifically, the instruction code is latched by the LIR signal and analyzed, and when the instruction code is decoded as undefined, at time point of generating the ID signal, break interruption may be requested, which is easy.

As mentioned above, the processor for emulation 550 incorporates higher CPU 502 and can substitute for other lower CPU by using higher CPU 502. Which is to be selected may be designated by the register 579.

At any rate, when the interface for emulation is made common, even in the case in which CPU or other functional block is changed, hardware on the emulator side needs not to change, only the processor for emulation 550 may be changed and which CPU constitutes an object may be designated to a deassembler in analyzing and displaying operation of instruction. Designation to the deassembler can be designated from the system development apparatus by the user or may automatically be selected by input information from the assembler. Thereby, the development efficiency of the emulator can be promoted and the development environment of the emulator can swiftly be provided.

Figure 100:
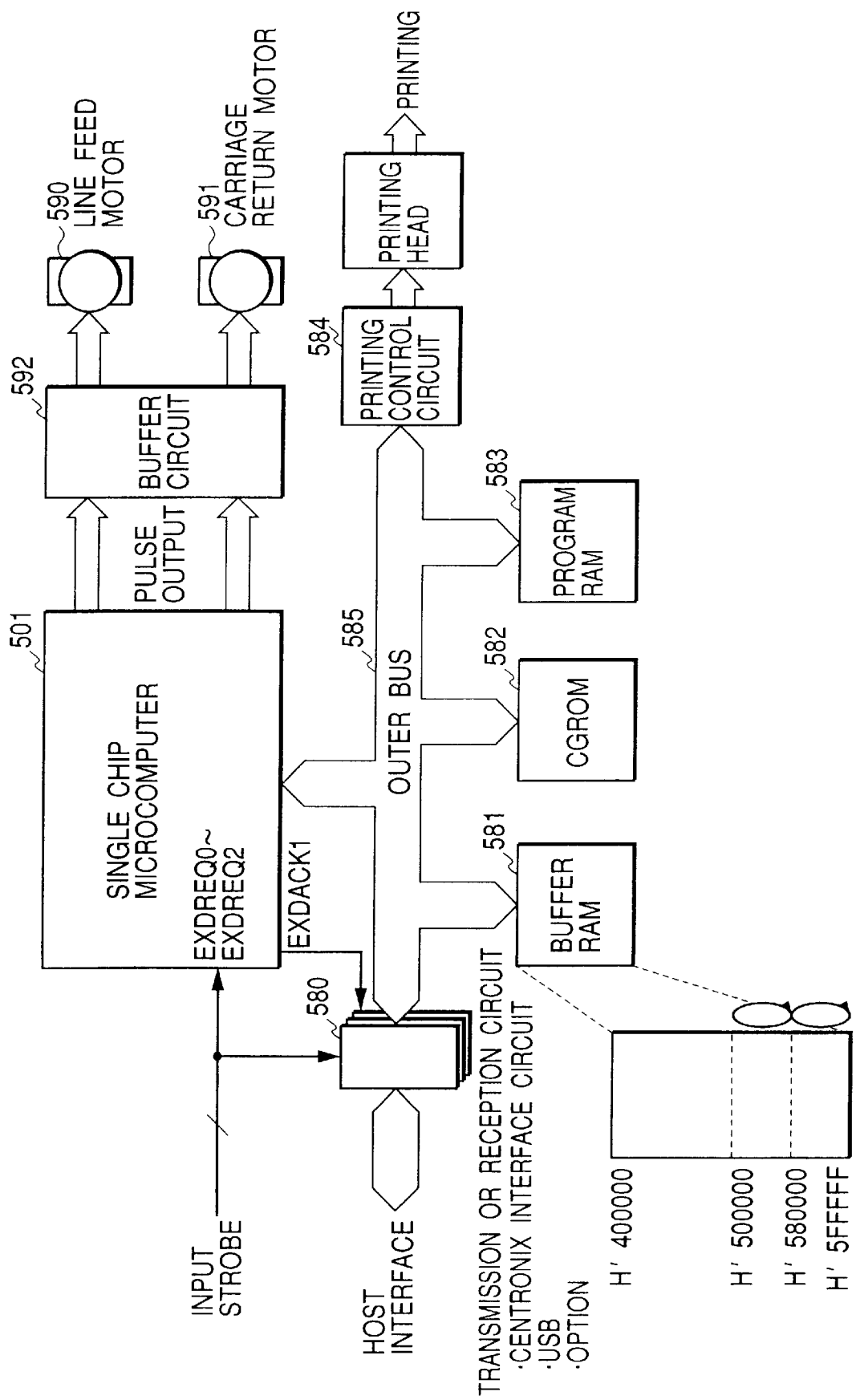
FIG. 100 is a block diagram exemplifying a microcomputer system using a microcomputer in printer control.

FIG. 100 exemplifies a microcomputer system using the microcomputer 501 to which the invention is applied for printer control.

A printer control system includes the microcomputer 501, a transmitting and receiving circuit (receiving circuit or transmitting and receiving circuit) 580 of centronix interface (or IEEE1284) or universal serial bus or option, a buffer RAM (DRAM) 581, a character generating ROM (CGROM) 582, a program ROM 583 and a printing control circuit 584 and these are connected via an outer bus of the microcomputer.

An address space connected to the outer bus 585 is divided into areas having predetermined sizes and respectives thereof can be set with bus specification (bus width, access state number, address multiplex, burst operation). Such bus control for the respective areas is executed by an outer bus controller of the bus controller 510 included in the microcomputer 501.

The program ROM 583 is connected to area 0, the buffer RAM 581 is connected to area 2, CGROM 582 is connected to area 6 and the transmitting and receiving circuit 580 and the printing control circuit 584 are connected to area 7. The buffer RAM 581 is a readable/writable memory and is known to be inexpensive although refresh operation is needed since the memory is a dynamic type memory. The buffer RAM 581 is described with address arrangement. The buffer RAM 581 is provided with storage capacity of 2 MB (16 M bits) and 1 M bytes thereof is allocated to an operational area of CPU 502 and a remaining area is allocated to ring buffers each of 512 kB.

Further, the present system further includes a line field motor 590 and a carriage return motor 591 and theses motors 590 and 901 are controlled by providing the output of the timer 506 and the output of the pulse outputting apparatus 507 via a buffer circuit 592. The line field motor 590 and the carriage return motor 591 are stepping motors, although not particularly restricted.

DMAC 511 incorporated in the microcomputer 501 outputs print data and pulse output for driving the line field motor 590 and the carriage return motor 591. Further, DMAC 511 executes transfer control of transmission data and reception data of SCI 508.

Although not illustrated, SCI 508 is used for communication with host and the A/D converter 509 is inputted with sensor information such as number of sheet.

EXDMAC 512 executes reception of data by a plurality of the transmitting and receiving circuits 580 such as centronix interface or universal serial bus in parallel with operation of CPU 502. Single address transfer can be executed by inputting a transfer request signal to EXDREQ input or to EXDACK output in transfer. For example, by inputting an input strobe signal of centronix interface to EXDREQ0, executing dual address transfer at channel 0, inputting a received signal of option interface to EXDREQ1 and providing EXDACK1 output to option interface.

EXDMAC 512 can make one of destination and source not a memory or inner I/O register on the address space but the data register of EXDMAC 512. The selection is executed by predetermined control bits of a control register of EXDMAC 512.

Prior to the substantial data transfer, transfer information such as packet command is transferred to the data register of EXDMAC 512. CPU 502 analyzes the information, for example, in the case in which the information is preferably received continuous to data transfer at a preceding time, CPU 502 may set the destination such that the destination constitutes memory, set and start a transfer counter register.

In analyzing such information, for example, when the transfer information is constituted by 16 bytes, by executing "MOVM.L @EXD0DR0,ER0–3", the transfer information can be stored to a general purpose register and can be analyzed. Further, EXD0DR0 is a label indicating a front address of a data register of channel 0 of EXDMAC 512. According to the MOVM instruction, by using the addressing mode of the absolute address, the inherent address can easily be accessed. Further, when the data register of EXDMAC512 is not used and transfer information is stored to the buffer RAM 581, "MOV.L @EXDAR0,ER4,MOVM.L @-ER4,ER0–3" may be executed. EXDAR0 is a label of a destination address register of channel 0. The destination address register indicates an address constituting destination of successive data transfer. The content is stored to the general purpose register ER4 and the addressing mode of predecrement register indirect is used. By indirectly dealing with the address, an address which is not fixed on a memory can easily be accessed.

Further, since read of the buffer RAM 581 is continuously executed, high speed formation can be achieved by effectively utilizing high speed page mode of the buffer RAM 581.

By storing transfer information to the general purpose register at high speed and analyzing the transfer information on the general purpose register, a time period from receiving the transfer information to starting a processing based on the transfer information can be shortened. Therefore, the operation contributes to high speed formation of the system.

According to the system, in the case of reading a status of the printer from the host side, CPU 502 can write the status to EXD2DR of channel 2 as necessary, output the status to the transmitting and receiving circuit 580 in accordance with input of EXDREQ2 and transmit the status from the transmitting and receiving circuit 580 to the host. Also in this case, when there are a number of data to be set, EXD2DR can be set by using the MOVM instruction.

For example, CPU 502 sets status indicating to await for transfer information at EXD2DR0 through 7. When transfer information of packet command is received from the host, the status is set to EXD2DR0 through 7 and when the transfer information finishes analyzing, setting of EXDMAC 512 is finished, status awaiting for data reception is set to EXD2DR0 through 7. The host may transmit transfer information or data while confirming the status as necessary.

Print data on the buffer RAM 581 can be operated. High speed formation can be constituted by using plural registers transfer instruction (MOVM) of various addressing modes. By prohibiting bus right transfer by the plural registers transfer instruction, there can be restrained undesirable data change caused by conflicting with data transfer of DMAC511 or EXDMAC 512 constituting other bus master.

By promotion of the integration degree of a semiconductor integrated circuit, a portion of a receiving circuit other than option or the printing control circuit 584 can be integrated to a single semiconductor integrating circuit. Further, a general purpose memory such as the buffer RAM 581 can be integrated to a signal semiconductor integrating circuit. Parts which are changed according to respective microcomputer systems such as kind of individual printer as in the program ROM 583 and CGROM 582 are conveniently integrated to individual semiconductor integrated circuits.

According to the microcomputer and the data processing system of FIG. 79 explained above, the following operation and effect can be achieved.

(1) By executing transfer between plural general purpose registers and memory or between plural general purpose registers by single instruction, relatively, a number of times of reading instruction codes is reduced and high speed formation can be achieved. Further, by continuously reading/writing data, burst operation with regard to outer memory can effectively be utilized. In the case in which a plurality of bus masters process data, in data access, bus right is prohibited from transferring and conflict of undesirable data can be avoided.

By executing calculation of the effective address of the transfer instruction only once and providing increment (or decrement) function and a function of holding increment (or decrement) result to the address buffer AB, instruction operation can be simplified, many controls for transfer instruction can be made common with existing transfer instruction, the increase in the logical scale of the instruction decoder DEC can be minimized. By reducing a number of times of calculation of effective address, high speed formation can be achieved. Further, various addressing modes can commonly be utilized and the increase in the logical scale can be minimized.

In the plural register transfer instruction, by supporting a plurality of instructions having different number of registers, further, by supporting a plurality of instructions having different word size such as word size and long word size, formation of a program is facilitated and the usability of the microcomputer can be promoted.

In the case of architecture in which only general purpose registers can be processed directly by CPU, the processing speed can significantly be promoted by high speed formation of transfer between general purpose registers and memory.

By providing transfer instruction between a plurality of general purpose registers having fixed combinations and address (memory) on an address space, even with data having a bit length larger than that of the general purpose registers, data can be dealt with easily, the usability of the microcomputer is promoted and with regard to read/write of data, a frequency of read of instruction can be reduced and high speed formation of data processing can be achieved.

By realizing transfer instruction of a plurality of general purpose registers by combining an instruction code designating transfer of plural registers and an instruction code of transfer instruction for a single existing general purpose register, even with existing CPU, addition of instruction can be facilitated.

(2) In the case in which a general purpose register can be divided and there are differences in view of functions between divided portions, by providing transfer instruction using a total of the general purpose registers and transfer instruction using divided portions, transfer with the general purpose register which is easy to use can be executed and accordingly, the processing is facilitated and high speed formation can be achieved.

In the case in which there are present CPU having a wide address space and CPU having a small address space, or CPU having a long bit length of a general purpose register and CPU having a short bit length of a general purpose register while maintaining compatibility at an object level, usable transfer instruction can be provided to the latter CPU with no waste.

(3) By designating a register group by a front instruction code and making the front instruction code ignorable and making an instruction code in the case of not adding the front instruction the same as an instruction code of existing CPU, general purpose registers can be increased without deteriorating compatibility.

When only a general purpose register which can be designated implicitly (existing general purpose register) is used, ignorable word can be ignored and therefore, instruction codes are not increased (at least, in the case of using a conventionally equivalent general purpose register, conventionally equivalent instruction code may be used). By not increasing instruction codes, the processing speed is not lowered.

By adding the ignorable word, all of general purpose registers can be selected directly by instruction and accordingly, easiness of program is hardly deteriorated. Further, by ensuring a portion of general purpose registers for desired task or desired interruption processing (which is not used in other task or processing), in the task or the interruption processing, there is no need of saving the general purpose register and high speed formation is achieved. Further, a number of general purpose registers ensured for the task or the interruption processing can be made arbitrary and accordingly, general purpose registers used can easily be circulated in the task or the processing.

By adding word, access of a general purpose register which can be designated can generally be made faster than access to memory such as RAM and accordingly, a number of general purpose registers is increased, by transfer instruction of a plurality of general purpose registers, transfer between plural general purpose register and memory can be executed at high speed by which the processing speed of CPU can be promoted. Further, with regard to a processor having instruction sets of so-to-speak load store type which cannot be operated directly with regard to content of memory, a data amount which can be processed can be increased, further, access of memory can be made fast and the processing speed can be promoted.

The case of increasing the general purpose registers which can be designated by the register transfer instruction can easily be dealt with.

(4) In the case in which there are present CPU having a wide address space and CPU having a small address space, by providing the transfer instruction with regard to a general purpose register of a size in correspondence with the address space (for example, 32 bits, MOVM.L instruction) and the transfer instruction with regard to a general purpose register of a size in correspondence with the address space of CPU having smaller address apace (for example, 16 bits, MOVM.W instruction) in CPU having the wide address space, the transfer instruction of the latter size can easily be realized even by CPU having lower compatibility and small address space. In other words, by the same method, while maintaining compatibility at the object level, the transfer instruction of plural general purpose registers can be realized by CPU having the wide address space and CPU having the small address space.

By incorporating instruction sets of existing CPU at the source program level or the object program level and thereafter adding the instruction, software resources can effectively be utilized and software development efficiency of the user can be promoted. Both of the merit by maintaining compatibility at the source program level or the object program level and the merit by adding the transfer instruction can be enjoyed.

(5) By providing means for making a software development apparatus usable commonly with existing CPU and selecting CPU, undesirable expense of the user can be restrained. Further, it is possible to promote function commonly in the case of a C compiler and accordingly, the development efficiency of the software development apparatus can be promoted. By promoting the development efficiency, resources necessary for development can be reduced and reduced resources can be allocated to promotion of function.

Interface for emulation can be made common with that of existing CPU and accordingly, hardware of the same emulator can be shared. By making common the interface for emulation and making common the hardware of the emulator, the development environment can swiftly be prepared, further, resources necessary for development of the emulator can be minimized.

The embodiment of the invention with regard to means for resolving the study problem E is an example and can variously be modified within a range not deviated from the gist.

For example, instruction sets, register constitution or address space of CPU can be modified. The architecture of CPU is not limited to the load store architecture. However, it is preferable to provide register means which can be utilized faster than a large portion of the address space. Further, various modifications are possible with regard to a detailed specification of transfer instruction of plural registers. As data size, byte size may be provided. Logical constitution of CPU and the logical realizing method of transfer instruction of plural registers can be modified variously. An address buffer may be provided with function of not increment but decrement and access may be executed from large address. Further, inner bus width and inner bus constitution can be modified. Furthermore, CPU for maintaining compatibility may be provided with different address space or number of general purpose registers and may be provided with different instruction sets defined by kind of instruction, kinds of addressing mode and data.

Other functional blocks of the microcomputer are not restricted at all. Application field constituting the data processing system is not limited to a printer. EXDMAC, mentioned above, is shown as a preferable example and can naturally be modified variously.

Although according to the above-described description, an explanation has been given of the case in which the invention by the inventors is mainly applied to a single chip microcomputer which is an application constituting the background, the invention is not limited thereto but is widely applicable to a data processing apparatus of system LSI mounted with CPU and DRAM and VLSI formed in a system on chip. The present invention is at least applicable to a data processing apparatus executing a processing by decoding instruction and executing operation processing.

(Effect of Invention with Regard to Study Problem A)

The effect of the invention with regard to the study problem A is as follows. That is, the register designating field for designating general purpose registers is divided in two portions and the two portions are arranged at separate words on a basic unit of an instruction code, one of the words is made ignorable and when the ignorable word is ignored, implicit designation is executed. Further, the ignorable word is provided with only one portion of the register designating field and kind of operation is not designated. Therefore, when only a general purpose register which can be designated implicitly is used, the ignorable word can be ignored and accordingly, instruction codes are not increased and by not increasing the instruction codes, the processing speed is not lowered.

By adding the ignorable word, all of the general purpose registers can be selected directly by instruction and accordingly, easiness of program is not deteriorated. Further, by ensuring a portion of general purpose registers of an arbitrary amount for respective desired task or desired interruption processing (not used for other task or processing), there is no need of saving the general purpose registers in the task or the interruption processing and high speed formation is achieved. Further, a number of general purpose registers ensured for the task or interruption processing can be made arbitrary and accordingly, general purpose registers used can easily be circulated to each other in the task or processing.

By adding the words, access to the general purpose register which can be designated can be generally faster than access to memory such as RAM and accordingly, by increasing the number of general purpose registers, a data amount which can be processed at high speed can be increased and accordingly, the processing speed of CPU can be promoted. Further, with regard to a processor which is provided with instruction sets of the so-to-speak load store type and which cannot operate directly with regard to content of memory, by increasing general purpose registers, the data amount which can be processed directly can be increased, further, the access frequency of memory can be reduced and the processing speed can be promoted.

(Effect of Invention with Regard to Study Problem B)

The effect of the invention with regard to the study problem B is as follows. That is, in existing ones of a single or a plurality of transfer instruction codes between memory and register and operation instruction codes between registers, a plurality of instruction codes are combined and a front instruction code is coupled to front thereof. In the case of executing the code of the memory/register transfer instruction coupled to the front instruction code, data transfer is executed between not the general purpose register but latching means which is not released in view of program (in other words, not clearly indicated in the instruction code) such as a temporary register in CPU and memory. Further, when the code of the register/register operation instruction coupled to the front instruction code is successively executed, a single or a plurality of data in the operation object is read from the latching means. When the operation result is stored to memory, an address of memory used in executing the code of the transfer instruction is stored to other latching means, the result of the operation instruction is stored to the latching means and the code of the memory/register transfer instruction is generated by itself (that is, generated even not clearly indicted in program) and write to memory is executed with content of the latching means stored with the address as address and with content of the latching means stored with the operation result as data.

In this case, for the data processing apparatus, the operation code of the memory/register transfer instruction or the register/register operation instruction is existing one and accordingly, in executing the operation code per se, the code is operated conventionally similarly and execution of existing instruction is not hampered. Therefore, existing software resources using only existing instruction can effectively be utilized. With regard to the data processing apparatus, promotion of function can be realized while maintaining upper compatibility with regard to software resources.

Further, the merit of existing general purpose register or the load store architecture is maintained and the front instruction code can be used commonly regardless of the addressing mode or the content of operation and accordingly, added instruction codes can be minimized.

With regard to designation of reading data from memory to the latching means, operation, write operation to memory based on content of the latching means, in comparison with existing instruction, only registers used differ and accordingly, the designation can be utilized without significantly changing existing instruction operation.

Thereby, design resources are effectively utilized, and increase in the logical scale by enabling operation with regard to data on memory can be minimized.

By enabling to operate data on memory, a data amount which can be directly processed can be increased, further, save/return of general purpose registers can be dispensed with and the processing speed can be promoted.

In the case in which there are present CPU having a wide address space and CPU having a small address space while maintaining compatibility at an object level, by adding the word and combining existing transfer instruction and operation instruction by CPU having the wide address space, data on memory can directly be calculated even by CPU having the small address space and lower compatibility. In other words, by the same method, while maintaining compatibility at the object level, data on the memory can directly be operated by CPU having the wide address space and CPU having narrow address space.

Both of the merit by maintaining the compatibility at the object level and the merit by enabling to operate directly with regard to data on the memory can be enjoyed.

Existing instructions are combined and new instruction function is realized and accordingly, allowance with regard to future function expansion or high speed formation can be maintained to a degree equivalent to that of existing CPU.

Further, interface for emulation can be made common with that of existing CPU and accordingly, hardware of the same emulator can be shared. By making common hardware of the emulator, the development environment can swiftly be prepared, further, resources necessary for development of the emulator can be minimized.

(Effect of Invention with Regard to Study Problem C)

The effect of the invention with regard to the study problem C is as follows. That is, by providing a plurality of data processing apparatus, for example, CPU's including different instruction sets such that one of them does not incorporate other in view of register constitution, combination of instruction and addressing mode, request in view of software of various application fields can be met, various preferences of the user can be met, CPU having comparatively proximate instruction sets in view of program in assembly language of other CPU can be selected and shift to CPU having promoted function can be facilitated.

By preparing higher CPU having instruction sets incorporating those of any CPU of a plurality of CPU's in which one instruction set does not incorporate other instruction set, while enabling effective utilization of software resources, CPU having promoted function/performance can be prepared. By effectively utilizing software resources, the development efficiency of software development of the user can be promoted.

In higher CPU, by preparing operational modes which can switch a bit number of effective address, unit sizes of vector and stack or method of calculating effective address, for example, a maximum mode, quasi maximum mode and a minimum mode, upper compatibility can be constituted including method of using memory.

In development, there is developed higher CPU in which general purpose register is expanded and combination of instruction and addressing mode is expanded relative to existing CPU (CPU constituting lower CPU). Lower CPU is provided with subsets of instruction sets of higher CPU. Thereby, while minimizing the increase in the logical scale of higher CPU, performance, function and usability can be promoted, development by the other lower CPU can be facilitated and the development efficiency can be promoted. In the case of developing CPU further higher than the above-described higher CPU, when compatibility with the above-described higher CPU is maintained, compatibility with the plurality of CPU's can automatically be maintained and accordingly, while realizing effective utilization of software resources, CPU achieving future function and promotion of performance becomes easy to realize. In other words, a plurality of CPU's suitable for individual application field or system can be provided and general development expense of the plurality of CPU's can be reduced or the development efficiency can be promoted.

In order to expand a general purpose register, a register designating field for designating the general purpose register is divided into two portions and the two portions are arranged at separate words on a basic unit of an instruction code, one word is made ignorable and when the ignorable word is ignored, implicit designation is executed. Only a portion of a register designating field is provided to the ignorable word and kind of operation is not designated thereto. Thereby, when only general purpose register which can be designated implicitly is used, the ignorable word can be ignored. A new instruction cord for designating the expanded processing is not individually added and accordingly, the instruction code is not increased (bit number of instruction code is not increased) and the processing speed of executing instruction is not reduced. By adding the ignorable instruction code, all of the general purpose registers can be selected by instruction and accordingly, easiness of program is not deteriorated. Further, by ensuring a portion of the general purpose register of an arbitrary amount for desired task or desired interruption processing (not used in other task or processing), there is no need of saving the general purpose register in the task or interruption processing and high speed formation can be achieved. Further, a number of general purpose registers ensured for the task or interruption processing can be made arbitrary and accordingly, general purpose registers used are easily circulated to each other in the task or processing.

Generally, access of register is faster than access of memory and therefore, by increasing the number of general purpose registers, the data amount capable of being processed at high speed can be increased and accordingly, the processing speed of CPU can be promoted.

In order to expand combination between instruction and addressing mode, there is adopted a front instruction code for instruction expansion for combining a plurality of instruction codes and coupling them among existing ones of single or a plurality of memory/register transfer instruction and register/register operation instruction. In the case in which the memory/register instruction is executed successive to the front instruction code for instruction expansion, data transfer is executed between not general purpose register but latching means which is not released in view of program such as a temporary register in CPU and memory. Further, in the case of successively executing register/register operation instruction, a single or a plurality of data in the operation object is read from the latching means. When the operation result is stored to memory, address of memory used in the transfer instruction is stored to other latching means, the operation result of the operation instruction is stored to the latching means, the memory/register transfer instruction is generated by itself (that is, generated even not clearly indicated in program), writing to memory is executed with content of the latching means stored with the address as address and with content of the latching means stored with the operation result as data.

In this case, instruction codes of memory/register transfer instruction and register/register operation instruction are existing ones and accordingly, a single thereof operates conventionally similarly and does not hamper execution of existing instruction. Therefore, existing software resources using only existing instruction can be effectively utilized. Data processing apparatus can realize promotion of function while maintaining upper compatibility with regard to software resources.

By providing a program counter of a bit length in correspondence with a total of address space, enabling to utilize linearly a total or at least a large portion of address space for program, reducing an addressing mode of data transfer to a degree by which comparatively small scale data can be dealt with, limiting data size of transfer data, the logical scale can be reduced without deteriorating usability of desired application field.

In data access, by reducing usable address space or efficiently usable address space and dividing such address space in two, without deteriorating usability, compatibility in view of address space with upper CPU can be maintained, by previously preparing operational mode for switching the method of calculating effective address to upper CPU, compatibility of software can be maintained.

By widening address space for program, aptitude with regard to programming using high-level language such as C language can be promoted. Further, by enabling to switch stack pointer, undesirable increase in the capacity of stack in controlling task such as OS can be restrained.

Further, with regard to a development apparatus, by preparing a software development apparatus with regard to instruction sets of higher CPU, enabling to utilize the apparatus commonly with regard to a plurality of CPU's in which one instruction set does not incorporate other and enabling to select CPU by the user, the development efficiency of the software development apparatus can be promoted. For the user, even when the above-described plural CPU's are used, the software development apparatus is common and accordingly, undesirable expense is not generated. As described above, shift in the plurality of CPU's is facilitated and the development efficiency can be promoted.

By permitting a plurality of kinds of description of general purpose register having general function such as assembly language on the software development apparatus, shift from other CPU can comparatively be facilitated. Further, with regard to an emulator, interface for emulation can be made common between upper CPU and lower CPU, further, by developing logical circuit for emulation of higher CPU, the circuit can be utilized also for lower CPU and the development efficiency including the processor emulation can be promoted. Further, hardware of the same emulator can be made common, thereby, the development environment can swiftly be prepared, further, resources necessary for development of the emulator can be minimized. With regard to a deassembler mounted to the emulator, that for higher CPU is developed and by providing means for selecting object CPU on the emulator, substantially, one deassembler may be used and accordingly, the development efficiency can further be promoted.

(Effect of Invention with Regard to Study Problem D)

The effect of the invention with regard to the study problem D is as follows. That is, by realizing bit condition branch instruction/bit condition subroutine instruction by combining word of existing instruction code or a portion of the instruction code, without hampering execution of existing instruction, existing software resources can effectively be utilized. Further, while maintaining compatibility with existing CPU, further, increase in the logical and physical scale can be minimized. Further, by determining a state of bits of data at an arbitrary address on memory, branch and subroutine branch can be executed. Furthermore, it can contribute to promotion of usability of CPU, reduction in the instruction code length and promotion of processing performance. Particularly, in accordance with the state of a plurality bits, there can be realized reduction in the program capacity and promotion of the processing speed of a processing in which branch destination and accordingly, processing content is changed.

(Effect of Invention with Regard to Study Problem E)

The effect of the invention with regard to the study problem E is as follows. That is, by providing transfer instruction between a plurality of general purpose registers and memory or between the plurality of general purpose registers, even data having a bit length larger than that of the general purpose register can easily be dealt with, the usability is promoted and with regard to read/write of data, frequency of read of instruction can be reduced and high speed formation can be achieved.

By executing transfer between a plurality of general purpose registers and memory by single instruction, relatively, a number of times of read of instruction code is reduced and high speed formation of data processing can be achieved. Further, by continuously executing read/write of data, burst operation with regard to outer memory can effectively be utilized.

By constituting fixed combinations for designating a plurality of general purpose registers, the instruction code length can be shortened, further, by fixing execution state number of respective instruction, condition branch at inside thereof can be dispensed with and inner logic can be made concise and the logical scale can be reduced.

By realizing transfer instruction of a plurality of general purpose registers by combining instruction codes for designating transfer of plural registers and an instruction code of transfer instruction of a single existing general purpose register and executing operation made common to the transfer instruction of the single general purpose register, the increase in the logical scale can be minimized. The addressing mode of the transfer function of the single existing general purpose register can commonly be utilized. By enabling to utilize the addressing mode of the transfer instruction of the single existing general purpose register, formation of program is facilitated and usability can be promoted.

By executing calculation of the effective address of the transfer instruction only once by a functional unit and providing increment (or decrement) function and a function of holding increment (or decrement) result to the address buffer, the instruction operation can be simplified, common formation with the existing transfer instruction can be achieved and the increase in the logical scale can be minimized. By reducing a number of times of calculation of the effective address, high speed formation can be achieved.

By supporting the plural register transfer instruction having different number of registers by plural instruction, further, by supporting plural register transfer instruction having different data size such as word size and long word size by plural instruction, formation of program is facilitated and usability can be promoted.

What is claimed is:

1. A data processing apparatus operated by reading an instruction code and having a plurality of registers capable of storing data or addresses:
   wherein the instruction code is constituted by basic units;
   wherein the instruction code is provided with information for designating the registers;
   wherein the information designating the registers is divided into the basic units of a plurality of the instruction codes and the instruction code having the divided information for designating one of the registers can be ignored; and
   wherein when the instruction code is ignored, predetermined register information is implicitly assumed in place of the ignored register information.

2. A data processing apparatus having a plurality of registers capable of storing data or addresses and operated by reading an instruction code and decoding the instruction code by controlling means:
   wherein the instruction code is constituted by basic units and register designating information for designating the registers can be divided into the basic units of a plurality of the instruction codes and held; and
   wherein the controlling means selects the registers based on a decoded result of the register designating information provided by the instruction codes and when a front instruction code having one of the divided register designating information is ignored, the controlling means selects the registers by implicitly assuming predetermined register designating information in place of the ignored register designating information.

3. The data processing apparatus according to claim 2:
   wherein an instruction of utilizing a total of the registers can be executed by using the front instruction code after incorporating an instruction executing function of other data processing apparatus by an instruction code the same as an instruction code for the other data processing apparatus which is not provided with the front instruction code.

4. The data processing apparatus according to claim 2:
   wherein the register can use a total of an area or an area divided in two for holding the data and is used also for holding the address having a bit number larger than a bit number of one of the divided area; and
   wherein an instruction of utilizing a total of the register can be executed after incorporating an instruction executing function of other data processing apparatus by an instruction code the same as an instruction code for the other data processing apparatus having the registers in accordance with a bit number of the one of the divided area.

5. A data processing apparatus having a plurality of register sets each having a plurality of registers, reading an instruction code and decoding the instruction code by controlling means and operable by selecting the registers in accordance with a decoded result:
   wherein the instruction code is provided with an operation designating area and a register designating area; and
   wherein the controlling means regards register designating information held by the register designating area of the instruction code with regard to a front instruction code holding a specific operation code in the operation designating area as designating information of the register set, regards the register designating information held by the register designating area of the instruction code read successive thereto as designating information of the register in the register set and selects the register and regards the register designating information held by the register designating area of the instruction code read without putting the front instruction code at the front as the designating information of the register in a prescribed one of the register set and selects the register.

6. A data processing apparatus operated by reading an instruction code and having a plurality of registers capable of storing data or addresses, said data processing apparatus comprising:
   first instruction code holding means and second instruction code holding means for holding the instruction code;
   instruction decoding means for decoding the instruction code; and selecting means for selecting the registers;

wherein an output of the first instruction code holding means is coupled to the second instruction Code holding means, the instruction decoding means and the register selecting means;

wherein an output of the second instruction code holding means is coupled to the register selecting means;

wherein an output of the instruction decoding means is coupled to the register selecting means and the second instruction code holding means;

wherein the output of the instruction decoding means to the second instruction code holding means includes a latch signal with regard to the second instruction code holding means and a set signal to a predetermined value;

wherein the latch signal with regard to the second instruction code holding means is generated when the instruction decoding means decodes a predetermined instruction code; and wherein the set signal to the predetermined value with regard to the second instruction code holding means is generated after finishing a processing of using the register designated by the predetermined instruction code.

7. The data processing apparatus according to claim 6:

wherein the instruction decoding means generates the set signal to the predetermined value with regard to the second instruction code holding means in response to finishing to execute the instruction.

8. The data processing apparatus according to claim 7, further comprising data holding means;

wherein an output of the data holding means is coupled to the second instruction code holding means; and wherein the second instruction code holding means is set to a value in accordance with a value of the data holding means in response to generating the set signal to the predetermined value.

9. The data processing apparatus according to claim 7, further comprising a stack pointer for designating a stack used in a subroutine branch or an exception processing; and other data holding means;

wherein an output of the other data holding means is coupled to the register selecting means; and wherein an output of the register selecting means selects the stack pointer in response to the output of the instruction decoding means and the output of the other data holding means.

10. A data processing apparatus operated by reading an instruction code and having registers capable of storing data or addresses:

wherein a transfer instruction for executing data transfer between a memory and the register and an operation instruction for executing an operation with regard to the data on the register are included in an instruction set; and wherein a front instruction code, an instruction code of the transfer instruction and an instruction code of the operation instruction are successively read and interpreted as one instruction and a direct operation with regard to the data on a memory is executed.

11. The data processing apparatus according to claim 10:

wherein when the front instruction code, the instruction code of the transfer instruction and the instruction code of the operation instruction are interpreted as the one instruction, an interruption processing is prohibited from executing between executions of processing's prescribed by the respective instruction codes included in the one instruction; and wherein when the transfer instruction and the operation instruction are executed as independent instructions, the interruption processing can be executed between the executions of the individual instructions.

12. The data processing apparatus according to claim 10, further comprising:

flag means for reflecting an operation result;

wherein when the front instruction code, the instruction code of the transfer instruction and instruction code of the operation instruction are interpreted as the one instruction, a change in the flag means is restrained in executing the instruction code of the transfer instruction; and wherein when the transfer instruction is executed as the independent instruction, the change in the flag means is enabled.

13. The data processing apparatus according to claim 10:

wherein the direct operation with regard to the data on the memory is an operation processing of loading the data from the memory to data latching means which is not made explicit in the instruction code and is executed by using the data loaded to the data latching means.

14. A semiconductor apparatus comprising to include in a single semiconductor chip:

the data processing apparatus according to claim 10;

a bus connected to the data processing apparatus; and a memory connected to the bus and accessed by executing the instruction code of the transfer instruction by the data processing apparatus.

15. A data processing apparatus operated by reading an instruction code and having registers capable of storing data or addresses:

wherein a transfer instruction for executing data transfer between a memory and the register and an operation instruction for executing an operation with regard to the data on the register are included in an instruction set; and wherein a front instruction code, an instruction code having a portion designating at least the memory equal to a portion designating at least a memory of an instruction code of the transfer instruction and an instruction code having a portion designating at least the operation equal to a portion designating at least the operation of an instruction code of the operation instruction are successively read and interpreted as one instruction and a direct operation with regard to the data on the memory is executed.

16. A data processing apparatus operated by reading an instruction code and having a register capable of storing data or addresses:

wherein a transfer instruction for executing data transfer between a memory and the register and an operation instruction for executing an operation with regard to the data on the register are included in an instruction set, said data processing apparatus comprising:

means for executing a processing of generating a control signal, a processing of executing transfer from a memory to latching means and a processing of executing an operation with regard to a content of the latching means; and wherein a direct operation with regard to the data on the memory is executed by successively executing the three processings.

17. A data processing apparatus operated by reading an instruction code and having registers capable of storing data or addresses:
- wherein a transfer instruction for executing data transfer between a memory and the register is included in an instruction set; and
- wherein a front instruction code, an instruction code of the transfer instruction and an instruction code of other transfer instruction are successively read and interpreted as one instruction and direct data transfer between the memory and the register is executed.

18. The data processing apparatus according to claim 17:
- wherein when the front instruction code, the instruction code of the transfer instruction and the instruction code of the other transfer instruction are interpreted as the one instruction, an interruption processing is prohibited from executing between executions of processings prescribed by the respective instruction codes included in the one instruction; and
- wherein when the transfer instruction and the other transfer instruction are executed, the interruption processing can be executed between the executions of the individual instructions.

19. The data processing apparatus according to claim 17:
- wherein the direct data transfer between the memory and the register is a processing of loading the data from the memory to data latching means which is not made explicit in the instruction code and storing the data of the data latching means to the memory.

20. A data processing apparatus operated by reading an instruction code and having registers capable of storing data or addresses:
- wherein a transfer instruction for executing data transfer between a memory and the register is included in an instruction set, said data processing apparatus comprising:
  - means for executing a processing of generating a control signal, a processing of executing transfer from the memory to latching means and a processing of executing transfer from the latching means to the memory and direct data transfer with regard to a memory is executed by successively executing the three processings.

21. A data processing apparatus operated by reading an instruction code and having registers capable of storing data or addresses:
- wherein a transfer instruction for executing data transfer between a memory and the register and an operation instruction with regard to the data on the register are included in an instruction set; and
- wherein after incorporating an instruction code of other microcomputer having the transfer instruction and the operation instruction, a front instruction code which does not constitute a processing object for the other microcomputer, an instruction code of the transfer instruction and an instruction code of the operation instruction are successively read and interpreted as one instruction and an instruction for executing a direct operation with regard to the data on the memory which is not provided to the other microcomputer is included in the instruction set.

22. The data processing apparatus according to claim 21:
- wherein when the front instruction code, the instruction code of the transfer instruction and the instruction code of the operation instruction are interpreted as the one instruction, an interruption processing is prohibited from executing between executions of processings prescribed by the respective instruction codes included in the one instruction; and
- wherein when the transfer instruction and the operation instruction are executed as independent instructions, the interruption processing can be executed between the executions of the individual instructions.

23. The data processing apparatus according to claim 21, further comprising:
- flag means for reflecting an operation result;
- wherein when the front instruction code, the instruction code of the transfer instruction and instruction code of the operation instruction are interpreted as the one instruction, a change in the flag means is restrained in executing the instruction code of the transfer instruction; and
- wherein when the transfer instruction is executed as an independent instruction, the change in the flag means is enabled.

24. A data processing apparatus operated by reading an instruction code and having registers capable of storing data or addresses:
- wherein a first and a second transfer instruction for executing data transfer between a memory and the register are included in an instruction set; and
- wherein after incorporating an instruction code of other microcomputer having the first and the second transfer instructions, a front instruction code which does not constitute a processing object for the other microcomputer, an instruction code of the first transfer instruction and an instruction code of the second transfer instruction are successively read and interpreted as one instruction and an instruction of executing direct data transfer with regard to a memory which is not provided to the other microcomputer is included in an instruction set.

25. The data processing apparatus according to claim 24:
- wherein when the front instruction code, the instruction code of the first transfer instruction and the instruction code of the second transfer instruction are interpreted as the one instruction, an interruption processing is prohibited from executing between executions of processings prescribed by the respective instruction codes included in the one instruction; and
- wherein when the first transfer instruction and the second transfer instruction are executed as independent instructions, the interruption processing can be executed between the executions of the individual instructions.

26. A microcomputer operated by reading an instruction code and having registers capable of storing data or addresses:
- wherein a transfer instruction for executing data transfer between a memory and the register is included in an instruction set; and
- wherein an instruction code of the transfer instruction includes a data register field for designating a transfer source or a transfer destination of the data;
- wherein the instruction set further includes other instruction having an instruction code including an instruction code of the transfer instruction at a position other than a front of the instruction code; and
- wherein the data register field for designating the transfer source or the transfer destination of the data in the instruction code of the transfer instruction is not used in the instruction code of the other instruction and an information field for designating the transfer source or the transfer destination of the data is held at other position of the instruction code.

27. A microcomputer operated by reading an instruction code and having registers capable of storing data or addresses:

wherein an instruction including a first instruction code and a second instruction code and an instruction having only the second instruction code are included in an instruction set;

wherein the first instruction code does not include a register field for holding information for reading or writing data on the memory;

wherein in executing the first instruction code, the data on the memory is not read or written, only an operation of reading the instruction is executed and a control signal with regard to a successive instruction code is generated;

wherein the second instruction code includes the register field for holding the information for reading or writing the data on the memory; and wherein in executing the second instruction code, reading of the instruction and reading or writing the memory based on the information of the register field are executed and either of a data transfer destination and a data source of reading or writing with regard to the memory is changed based on a control signal generated by the first instruction code.

28. A microcomputer operated by reading an instruction code, having a register capable of storing data or addresses:

wherein a transfer instruction for executing data transfer between a memory and the register and an operation instruction for executing an operation with regard to the data on the register are included in the instruction set;

wherein the instruction set successively reads and interprets as one instruction, a front instruction code, an instruction code of the transfer instruction and an instruction code of the operation instruction and further includes an instruction for executing an operation with regard to the data on the memory; and wherein a time period of executing the instruction for executing the operation with regard to the data on the memory is shorter than a total of respective time periods of executing the transfer instruction, the operation instruction and a transfer instruction for writing an operation result to the memory.

29. A microcomputer operated by reading an instruction code and having registers capable of storing data or addresses;

wherein a transfer instruction for executing data transfer between a memory and the register and an operation instruction for executing an operation with regard to the data on the register are included in an instruction set;

wherein the instruction set successively reads and interprets as one instruction, a front instruction code, an instruction code having a portion designating at least the memory equal to a portion of designating at least the memory of an instruction code of the transfer instruction and an instruction code having a portion designating at least the operation equal to a portion designating at least the operation of an instruction code of the operation instruction and further includes an instruction for executing an operation with regard to data on the memory; and wherein a time period of executing the instruction for executing the operation with regard to the data on the memory is shorter than a total of respective time periods of executing the transfer instruction, the operation instruction and a transfer instruction for writing an operation result to the memory.

30. The microcomputer according to claim 28:

wherein the instruction set successively reads and interprets as the one instruction, the front instruction code, the instruction code of the transfer instruction and the instruction code of the operation instruction and further includes other instruction for executing an operation with regard to the data on the memory and the data on a general purpose register and storing an operation result to the general purpose register; and wherein a time period of executing the other instruction for executing the operation with regard to the data on the memory and the data on the general purpose register and storing the operation result to the general purpose register is longer than a total of time periods of executing the transfer instruction and the operation instruction.

31. A microcomputer operated by reading an instruction code, said microcomputer including:

means for decoding the instruction code; and wherein the decoding means decodes a predetermined instruction code and generates a first control signal for designating an output designation or an input source of first data to a successive instruction code and a second control signal for designating an output destination or an input source of second data thereto;

wherein the decoding means decodes the predetermined instruction code and further generates a signal of designating a size of the data constituting an object of operation or transfer to the successive instruction code.

32. The microcomputer according to claim 31:

wherein said microcomputer is a microcomputer operated by reading the instruction code, further including:

means for decoding the instruction code;

a register capable of storing data or addresses; and operating means for operating the data; and latching means for latching the data without being made explicit in the instruction code;

wherein the decoding means generates a first control signal and generates the second control signal for controlling to decode a predetermined instruction code and the first control signal and selects at least one of an input source of input data of the operating means and an output destination of output data of the operating means from either of the register and the latching means.

33. The microcomputer according to claim 32:

wherein the latching means is a register selected from a temporary register and a data buffer register.

34. The microcomputer according to claim 32:

wherein the decoding means decodes a first instruction code and outputs the first control signal and decodes a second instruction code and the first control signal and outputs the second control signal; and wherein the second control signal is an address signal for reading the data on a memory and a read signal for designating a reading operation and when the first control signal is at a first level, read data from the memory is stored to the register and when the first control signal is at a second level, the read data from the memory is stored to the latching means.

35. The microcomputer according to claim 34:
wherein the first instruction code is a front instruction code and the second instruction code is a transfer instruction code.

36. The microcomputer according to claim 34:
wherein the decoding means decodes a third instruction code and the first control signal, supplies the data of the register to input of the operating means when the first control signal is at the first level and supplies the data of the latching means to the input of the operating means when the control signal is at the second level.

37. The microcomputer according to claim 36:
wherein the decoding means decodes the third instruction code and the first control signal, supplies output data of the operating means to the register when the control signal is at the first level and supplies the output data of the operating means to the latching means when the first control signal is at the second level.

38. The microcomputer according to claim 37:
wherein the decoding means decodes the third instruction code and the first control signal, generates a fourth instruction signal, inputs and decodes the generated fourth instruction code and generates a control signal for writing the data to the memory in accordance with a result of the fourth instruction code.

39. The microcomputer according to claim 38, further comprising other latching means for latching data without being made to explicit in the instruction code; and
wherein the decoding means decodes the second instruction code (transfer instruction code) and stores the generated information of an address of the memory to the other latching means and writes the data to the memory based on the information of the address stored to the latching means in accordance with a result of decoding the fourth instruction code.

40. The microcomputer according to claim 38:
wherein the decoding means generates a control signal for prohibiting an interruption processing from executing between executions of processings prescribed by the first instruction code, the second instruction code, the third instruction code and the fourth instruction code.

41. The microcomputer according to claim 36:
wherein the third instruction code is an operation instruction code.

42. The microcomputer according to claim 36:
wherein the decoding means generates a control signal for prohibiting an interruption processing from executing between executions of processings prescribed by the first instruction code, the second instruction code and the third instruction code.

43. A data processing apparatus for executing an instruction in accordance with a predetermined procedure:
wherein an instruction code the same as an instruction code of first other microcomputer can be executed by incorporating an instruction executing function of the first other data processing apparatus;
wherein an instruction code the same as an instruction code of second other data processing apparatus can be executed by incorporating an instruction executing function of the second other data processing apparatus, said data processing apparatus comprising to include:
instruction executing means for executing an instruction combined with a plurality of designations with regard to both or either one of an operand designation and an operation designation which are not included in the instruction executing function of the first other data processing apparatus and incorporated in the instruction executing function of the second other data processing apparatus; and
an instruction combined with the plurality of designations with regard to both or either one of the operand designation and the operation designation which are not incorporated in the instruction executing function of the second other data processing apparatus and incorporated in the instruction executing function of the first other data processing apparatus.

44. The data processing apparatus according to claim 43:
wherein the operand designation is a designation with regard to an operation of an execution address, a general purpose register or an address space.

45. The data processing apparatus according to claim 43, switchably including:
a first operation mode and a second operation mode having different bit numbers of effective addresses and unit sizes of vectors and stacks;
wherein the bit number of the effective address and the unit sizes of the vector and the stack in the first operation mode are equivalent to a bit number of an effective address and unit sizes of a vector and a stack of the first other data processing apparatus; and
wherein the bit number of the effective address and the unit sizes of the vector and the stack in the second operation mode are equivalent to a bit number of an effective address and unit sizes of a vector and a stack of the second other data processing apparatus.

46. A processor for emulation including:
the data processing apparatus according to claim 43; and
an emulation interface;
wherein execution of the order of the data processing apparatus can substitute for execution of the instruction of the first and second other data processing apparatus.

47. An emulator mounted with the processor for emulation according to claim 46 and comprising to include an emulation program area capable of storing a control program for making the processor for emulation for executing a user program control an inner state thereof and a control processor for storing the control program in the emulation program area.

48. The emulator according to claim 47:
wherein the processor for emulation can substitute for the first and the second other data processing apparatus to execute the instruction thereof in accordance with the set inner state in accordance with the control program.

49. A software developing apparatus which is a software developing apparatus capable of forming a program of the data processing apparatus, the first other data processing apparatus or the second other data processing apparatus according to claim 43, said software developing apparatus having means for selecting a data processing apparatus constituting an object of the program to be formed.

50. A data processing apparatus for executing an instruction in accordance with a predetermined procedure, said data processing apparatus including:
a plurality of general purpose registers capable of utilizing a total of an area or the area divided in two for holding data information and capable of being utilized also for holding address information by a bit number larger than a bit number on a lower side divided in two, said data processing apparatus comprising to include:
instruction executing means incorporating an instruction executing function of a first other data processing apparatus such that a code of an instruction of a bit number the same as a bit number of a code of an instruction of the first other data processing apparatus having a predetermined plurality of general purpose registers in correspondence with the bit number on the lower side divided in two can be executed for executing an instruction of utilizing a total of the general purpose registers dividable in two; and incorporating an instruction executing function of second other data processing apparatus such that an instruction code having a bit number the same as a bit number of a code of an instruction of the second other data processing apparatus having the general purpose registers dividable in two by a number smaller than the predetermined plurality of general purpose registers can be executed.

51. A method of developing a data processing apparatus wherein a code of an undefined instruction in a first data processing apparatus is made a front instruction code and the front instruction code changes a definition of an instruction code of the first data processing apparatus successive thereto and defines an instruction combined with a plurality of designations with regard to both or either one of operand designation and operation designation which are not defined in the first data processing apparatus to thereby realize an instruction of a second data processing apparatus having an instruction incorporating the instruction of the first data processing apparatus; and wherein an instruction of a third data processing apparatus is realized by a portion of the instruction of the second data processing apparatus.

52. The method of developing a data processing apparatus according to claim 51:

wherein the front instruction code makes changeable a designation of the general purpose register designated by an instruction code successive thereto.

53. The method of developing a data processing apparatus according to claim 51:

wherein the front instruction code defines an operation of data on a memory by a transfer instruction code successive thereto and two or more of instruction codes in a code of other transfer instruction or a code of an operation instruction.

54. The method of developing a data processing apparatus according to claim 53:

wherein the first and the second data processing apparatus are CPU's, the first data processing apparatus is a lower CPU relative to the second data processing apparatus in view of an instruction executing function thereof and the second data processing apparatus is a higher CPU relative to the first data processing apparatus in view of an instruction executing function thereof.

55. A data processing apparatus having a plurality of registers capable of storing data or addresses and operated by reading an instruction code and decoding the instruction code by controlling means:

wherein the instruction code is constituted by basic units and register designating information for designating the registers can be held by being divided into a plurality of the basic units of the instruction code;

wherein a transfer instruction code for executing data transfer between a memory and the register and an operation instruction code for executing an operation with regard to the data on the register are included in an instruction set; and wherein the controlling means selects the registers based on a result of decoding the register designating information held by the instruction code and when a front instruction code having a divided one of the register designating information is ignored, the controlling means selects the register by implicitly assuming predetermined register designating information in place of the ignored register designating information and successively reads and interprets as one instruction, a front instruction code, the transfer instruction code and the operation instruction code and executes a direct operation with regard to the data on the memory.

56. The data processing apparatus according to claim 55:

wherein when the front instruction code, the instruction code of the transfer instruction and the instruction code of the operation instruction are interpreted as the one instruction, an interruption processing is prohibited from executing between executions of processings prescribed by the respective instruction codes included in the one instruction; and wherein when the transfer instruction code and the operation instruction code are executed as independent instructions, the interruption processing can be executed between the executions of the individual instructions.

57. The data processing apparatus according to claim 55:

wherein the direct operation with regard to the data on the memory is an operation processing of loading the data from the memory to data latching means which is not made explicit in the instruction code for executing the operation by using the data loaded to the data latching means.

58. A semiconductor apparatus comprising to include in a semiconductor chip:

the data processing apparatus according to claim 55;

a bus connected to the data processing apparatus; and a memory connected to the bus and accessed by executing the instruction code of the transfer instruction by the data processing apparatus.

59. A data processing apparatus having a plurality of registers capable of storing data or addresses and operated by reading an instruction code and decoding the instruction code by controlling means:

wherein the instruction code is constituted by basic units and register designating information for designating the registers can be held by being divided into a plurality of the basic units of the instruction code;

wherein a transfer instruction code for executing data transfer between a memory and the register is included in an instruction set; and wherein the controlling means selects the registers based on a result of decoding the register designating information held by the instruction code and when a front instruction code having a divided one of the register designating information is ignored, the controlling means selects the register by implicitly assuming predetermined register designating information in place of the ignored register designating information and successively reads and interprets as one instruction, a front instruction code, the transfer instruction code and other transfer instruction code and executes a direct data transfer between a memory and the register.

60. The data processing apparatus according to claim 59:

wherein when the front instruction code, the transfer instruction code and other transfer instruction code are interpreted as the one instruction, an interruption processing is prohibited from executing between executions of processings prescribed by the respective instruction codes included in the one instruction; and wherein when the transfer instruction code and the other transfer instruction code are executed individually, the interruption processing can be executed between the executions of the individual instruction codes.

61. The data processing apparatus according to claim 59:

wherein the direct data transfer between the memory and the decoding means is a processing of loading the data from the memory to data latching means which is not made explicit in the instruction code and storing the data of the data latching means to the memory.

62. A data processing apparatus operated by reading an instruction code and having a plurality of registers capable of storing data or addresses, said data processing apparatus comprising:

first instruction code holding means and second instruction code holding means for holding the instruction code;

instruction decoding means for decoding the instruction code; and selecting means for selecting the registers;

wherein an instruction set includes a transfer instruction code for executing data transfer between a memory and the register and an operation instruction code for executing an operation with regard to the data on the register;

wherein the decoding means can successively read and interpret as one instruction, a front instruction code, the transfer instruction code and the operation instruction code and execute a direct operation with regard to the data on the memory;

wherein an output of the first instruction code holding means is coupled to the second instruction code holding means, the instruction decoding means and the register selecting means;

wherein an output of the second instruction code holding means is coupled to the register selecting means;

wherein an output of the instruction decoding means is coupled to the register selecting means and the second instruction code holding means; and wherein the output of the instruction decoding means to the second instruction code holding means includes a latch signal with regard to the second instruction code holding means and a set signal to a predetermined value, the latch signal to the second instruction code holding means is generated when the instruction decoding means decodes a predetermined instruction code and the set signal to the predetermined value with regard to the second instruction code holding means is generated after finishing a processing of using the register designated by the predetermined instruction code.

63. A data processing apparatus operated by reading an instruction code and having a plurality of registers capable of storing data or addresses, said data processing apparatus comprising:

first instruction code holding means and second instruction code holding means for holding the instruction code;

instruction decoding means for decoding the instruction code; and selecting means for selecting the registers;

wherein an instruction set includes a transfer instruction code for executing data transfer between a memory and the register;

wherein the decoding means can successively read and interpret as one instruction, a front instruction code, the transfer instruction code and other transfer instruction code and execute direct data transfer between the memory and the decoding means;

wherein an output of the first instruction code holding means is coupled to the second instruction code holding means, the instruction decoding means and the register selecting means;

wherein an output of the second instruction code holding means is coupled to the register selecting means;

wherein an output of the instruction decoding means is coupled to the register selecting means and the second instruction code holding means; and wherein the output of the instruction decoding means to the second instruction code holding means includes a latch signal with regard to the second instruction code holding means and a set signal to a predetermined value, the latch signal to the second instruction code holding means is generated when the instruction decoding means decodes a predetermined instruction code and the set signal to the predetermined value with regard to the second instruction code holding means is generated after finishing a processing of using the register designated by the predetermined instruction code.

64. A data processing apparatus comprising:

program counting means having a bit number in correspondence with a bit number of an address space;

a plurality of general purpose registers capable of utilizing a total of an area or the area divided in two for holding data information and capable of being utilized also for holding address information by a bit number larger than a bit number of one of the area divided in two; and instruction executing means;

wherein the instruction executing means can execute an instruction utilizing a total of the general purpose registers for holding data information and an instruction of transferring the data between the general purpose registers and other storing apparatus;

wherein a bit number of transfer data of the data transfer instruction can be made equal to or smaller than the bit number of the area divided in two of the general purpose register; and wherein a portion of an addressing mode for designating data on the address space can be made effective at portions of the address space divided in a plural number.

65. The data processing apparatus according to claim 64:

wherein one portion on the address space divided in the plurality includes a vector for designating an address of starting to execute the instruction and other portion is mapped with an address of other readable and writable storing apparatus.

66. A data processing apparatus operated by reading an instruction code included in an instruction set:

wherein a branch instruction for executing a branch by reading data on an address space and in response to a predetermined bit of the data being brought into a predetermined state is included in the instruction set;

wherein the branch instruction is constituted to include information of plural times of a basic unit of the instruction code;

wherein first basic unit information of the branch instruction reads the data designated on the address space and stores the data to latching means which is not freed in view of a programming; and wherein second basic unit information of the branch instruction inspects a predetermined bit of the data stored to the latching means and instructs a processing of whether the branch is executed in accordance with a result of inspection.

67. The data processing apparatus according to claim 66:

wherein the first basic unit information is made usable from among a plurality of kinds in accordance with a method of designating the data on the address space;

wherein the second basic unit information is made usable from among the plurality of kinds in accordance with a method of designating the branch destination address; and wherein the branch instruction instructs an operation in accordance with a combination of the kinds of the first basic unit information and the second basic unit information.

68. The data processing apparatus according to claim 66, further including flag means for reflecting an operation result; and wherein the second basic unit information can function as an independent condition branch instruction and when the second basic unit information functions as the independent condition branch instruction, the independent condition branch instruction inspects a single or a plurality of predetermined bits of the flag means and instructs to execute the branch in accordance with a result of the inspection.

69. A data processing apparatus operated by reading an instruction code included in an instruction set:

wherein a transfer instruction for executing data transfer between a memory and a register and a branch instruction for inspecting a predetermined bit of the data stored to the register and executing an operation of whether a branch is executed in accordance with a result of the inspection are included in the instruction set; and wherein a front instruction code, an instruction code of the transfer instruction and an instruction code of the branch instruction are successively read and interpreted as one instruction, data designated on an address space is read and stored to latching means which is not freed in view of a programming, the predetermined bit of the data stored to the latching means is inspected and the operation of whether the branch is executed in accordance with the result of the inspection is executed.

70. The data processing apparatus according to claim 69, further comprising:

flag means for reflecting a result of operation;

wherein the transfer instruction interpreted as the one instruction along with the front instruction code restrains a change in the flag means.

71. The data processing apparatus according to claim 69, further comprising:

bit inspecting means coupled to the latching means;

wherein the bit inspecting means outputs the result of the inspection in accordance with a predetermined bit of the branch instruction interpreted as the one instruction along with the front instruction code; and wherein the branch instruction interpreted as the one instruction along with the front instruction code executes a determination of whether the branch is executed in response to the output of the result of the inspection.

72. The data processing apparatus according to claim 69, further comprising:

decoding means for decoding the instruction code; and wherein the decoding means decodes the transfer instruction interpreted as the one instruction along with the front instruction code and generates a control signal for designating a change in the operation to an instruction code of a successive branch instruction.

73. The data processing apparatus according to claim 69:

wherein in executing the transfer instruction and the branch instruction interpreted as the one instruction along with the front instruction code, an interruption processing is prohibited from inserting between a processing prescribed by the instruction code of the transfer instruction and a processing prescribed by the instruction code of the branch instruction.

74. A data processing apparatus operated by reading an instruction code included in an instruction set:

wherein a composite instruction for reading data on an address space and executing a data processing by using the read data is included in the instruction set;

wherein the composite instruction is constituted to include information of plural times of basic units of the instruction code; and wherein first basic unit information of the composite instruction designates a processing of reading designated data on the address space and storing the designated data to latching means which is not freed in view of a programming; and wherein second basic unit information of the composite instruction instructs a predetermined data processing using the data stored to the latching means.

75. The data processing apparatus according to claim 74:

wherein the latching means is a temporary data register or a temporary address register.

76. A data processing apparatus comprising:

executing means having a plurality of general purpose registers for executing an instruction; and controlling means for controlling the executing means by decoding the instruction; and wherein a combination of the plurality of general purpose registers capable of being designated to the controlling means is made to be fixed and a transfer instruction between the plurality of registers and a memory for executing data transfer between the plurality of general purpose registers having the fixed combination and the memory on an address space is included in an instruction set, wherein the controlling means makes a functional unit of the executing means calculate a memory address initially accessed in accordance with information held by the transfer instruction between the plural registers and the memory and successively updates the accessed memory address in an address buffer of the executing means.

77. The data processing apparatus according to claim 76:

wherein the transfer instruction between the plural registers and the memory is constituted by an instruction code of a plurality of units and an instruction code of a portion thereof is common to an instruction code of a transfer instruction between a single one of the general purpose registers and the memory.

78. The data processing apparatus according to claim 76:

wherein the transfer instruction between the plural registers and the memory is designated with one addressing mode selected from the plurality of kinds of addressing modes for designating addresses of the memory.

79. The data processing apparatus according to claim 76:

wherein a combination of the plurality of general purpose registers capable of being designated to the controlling means is made to be fixed and the transfer instruction between the plurality of registers for executing data transfer between the plurality of general purpose registers having the fixed combination is included in the instruction set.

80. The data processing apparatus according to claim 79:

wherein a lower bit of information designating the register of the transfer instruction between the plurality of registers is made common by the register of a transfer source and the register of a transfer destination.

81. The data processing apparatus according to claim 76;

wherein the register can use a total of an area or the area divided in two for holding the data and is used also to hold an address by a bit number larger than a bit number of a divided one of the area; and wherein an instruction of utilizing a total of the registers can be executed after incorporating an instruction executing function of other data processing apparatus by an instruction code the same as an instruction code of the other data processing apparatus having registers in correspondence with a bit number of the divided one of the area.

82. The data processing apparatus according to claim 76:

wherein the instruction code includes information of designating the register, the information of designating the register is divided into basic units of a plurality of instruction code, an instruction code having information of designating a divided one of the register can be ignored and when the instruction code is ignored, predetermined register information is implicitly assumed in place of the ignored register information.

83. A data processing system comprising:

the data processing apparatus according to claim 76;

a transmitting or receiving circuit; and storing means for storing transmitted or received data;

wherein the storing means is constituted by being arranged on an address space of the data processing apparatus.

84. A data processing apparatus including:

executing means having a plurality of general purpose registers for executing an instruction; and controlling means for controlling the executing means by decoding the instruction;

wherein a combination of the plurality of general purpose registers capable of being designated to the controlling means is made to be fixed and a plurality of register transfer instructions for executing data transfer between the plurality of general purpose registers having the fixed combination or the plurality of general purpose registers and a predetermined address area on an address space are included in an instruction set, wherein the plurality of register transfer instructions include an instruction expansion code and a data transfer instruction code;

wherein the data transfer instruction code designates presence of at least one of source data and destination data by a register designating area;

wherein the instruction expansion code includes a register number designating area for designating a number of the plurality of registers to be successively selected with the register designated by the register designating area at a front; and wherein the controlling means designates a range designated by the register number designating area with the register designated by the register designating area of the data transfer instruction code as a start point, as the plurality of general purpose registers having the fixed combination.

85. The data processing apparatus according to claim 84:

wherein the plural register transfer instruction further includes an ignorable register expansion code, the register expansion code includes information of designating the register along with the information of the register designating area of the data transfer instruction code and when the register expansion code is ignored, predetermined register information is implicitly assumed in place of the ignored register information.

86. The data processing apparatus according to claim 84:

wherein the register designating area designates presence of both of the source data and the destination data.

87. The data processing apparatus according to claim 86:

wherein the controlling means forms lower plural bits of information for successively designating the plurality of general purpose registers having the fixed combination capable of being designated in accordance with information of the register designating area by making the lower plural bits common to the transfer source register and the transfer destination register.

88. The data processing apparatus according to claim 84:

wherein the register designating area designates either one of the source data and the destination data and other data thereof is data on the memory designated by the data transfer instruction code.

89. The data processing apparatus according to claim 88:

wherein the controlling means makes a functional unit of the executing means calculate a memory address initially accessed in accordance with information held by the plural register transfer instructions and updates a memory address successively accessed in an address buffer of the executing means.

* * * * *